US012808844B2

(12) United States Patent
Marriott et al.

(10) Patent No.: US 12,808,844 B2
(45) **Date of Patent: *Nov. 24, 2026**

(54) HIGH PRESSURE ION OPTICAL DEVICES

(71) Applicants: THERMO ELECTRON MANUFACTURING LIMITED, Altrincham Cheshire (GB); THERMO FISHER SCIENTIFIC (BREMEN) GMBH, Bremen (DE)

(72) Inventors: Philip Marriott, Cheshire (GB); Alexander Makarov, Bremen (DE); Eric Wapelhorst, Bremen (DE)

(73) Assignees: Thermo Fisher Scientific (Bremen) GmbH, Bremen (DE); Thermo Electron Manufacturing Limited, Altrincham (GB)

( * ) Notice: Subject to any disclaimer, the term of this patent is extended or adjusted under 35 U.S.C. 154(b) by 383 days.

This patent is subject to a terminal disclaimer.

(21) Appl. No.: 18/546,918

(22) PCT Filed: Feb. 18, 2022

(86) PCT No.: PCT/EP2022/054103
§ 371 (c)(1),
(2) Date: Aug. 17, 2023

(87) PCT Pub. No.: WO2022/175467
PCT Pub. Date: Aug. 25, 2022

(65) Prior Publication Data

US 2024/0310330 A1 Sep. 19, 2024

(30) Foreign Application Priority Data

Feb. 19, 2021 (GB) .................................. 2102367.6

(51) Int. Cl.
*G01N 27/624* (2021.01)
*H01J 49/04* (2006.01)
*H01J 49/06* (2006.01)

(52) U.S. Cl.
CPC ........ *G01N 27/624* (2013.01); *H01J 49/0495* (2013.01); *H01J 49/061* (2013.01)

(58) Field of Classification Search
CPC . G01N 27/624; G01N 27/622; H01J 49/0495; H01J 49/061; H01J 49/062; H01J 49/065; H01J 49/4235; Y10T 29/49119
See application file for complete search history.

(56) References Cited

U.S. PATENT DOCUMENTS 5,572,035 A 11/1996 Franzen
8,067,747 B2 11/2011 Wollnik
(Continued)

FOREIGN PATENT DOCUMENTS

WO 2009064350 A2 5/2009
WO 2017062102 A1 4/2017
WO 2019152129 A1 8/2019

OTHER PUBLICATIONS

Expert Rev Proteomics. Oct. 2012;9(5):505-517. doi: 10.1586/epr.12.50 (Year: 2012).*
(Continued)

*Primary Examiner* — David E Smith
*Assistant Examiner* — Christopher J Gassen
(74) *Attorney, Agent, or Firm* — Klarquist Sparkman, LLP

(57) ABSTRACT

An ion optical device comprises: first and second electrode arrangements, spatially separated from one another, for receiving ions and a gas and arranged to operate in a high gas pressure environment; and an RF voltage supply applying: a first RF voltage comprising one or more RF drive frequen-
(Continued)

cies to the first electrode arrangement; and a second RF voltage of the one or more RF drive frequencies, having a different phase, to the second electrode arrangement, wherein the first and second RF voltages have an asymmetric waveform, the application of the first and second RF voltages to the first and second electrodes arrangements respectively causing the received ions to experience an electric field. The first and second electrode arrangements and the RF voltage supply are configured such that a strength of the electric field experienced by the received ions is sufficient for ions to experience mobility variation.

12 Claims, 82 Drawing Sheets

(56) References Cited

U.S. PATENT DOCUMENTS

| | | | | |
|---|---|---|---|---|
| 8,299,443 | B1 | 10/2012 | Shvartsburg et al. | |
| 8,362,421 | B2 | 1/2013 | Fernandez De La Mora | |
| 8,835,839 | B1 | 9/2014 | Anderson et al. | |
| 8,841,611 | B2 | 9/2014 | Li et al. | |
| 8,975,578 | B2 | 3/2015 | Green et al. | |
| 9,053,915 | B2 | 6/2015 | Ristroph et al. | |
| 9,245,725 | B2 | 1/2016 | Ibrahim et al. | |
| 9,620,346 | B2 | 4/2017 | Giles | |
| 9,978,572 | B2 | 5/2018 | Giles et al. | |
| 9,984,861 | B2 | 5/2018 | Giles et al. | |
| 9,991,108 | B2 | 6/2018 | Green et al. | |
| 2004/0251411 | A1* | 12/2004 | Bateman | H01J 49/005 250/293 |
| 2006/0038121 | A1 | 2/2006 | Guevremont | |
| 2006/0097156 | A1 | 5/2006 | Guevremont | |
| 2008/0017791 | A1* | 1/2008 | Wilks | G01N 27/624 250/282 |
| 2008/0210861 | A1 | 9/2008 | Wu et al. | |
| 2009/0057546 | A1* | 3/2009 | Giles | H01J 49/065 250/281 |
| 2009/0173880 | A1* | 7/2009 | Bateman | H01J 49/065 250/282 |
| 2014/0124663 | A1* | 5/2014 | Green | H01J 49/06 250/290 |
| 2014/0299766 | A1 | 10/2014 | Anderson et al. | |
| 2015/0294848 | A1 | 10/2015 | Green et al. | |
| 2015/0323500 | A1 | 11/2015 | Davis et al. | |
| 2016/0071714 | A1 | 3/2016 | Zhang et al. | |
| 2016/0071715 | A1 | 3/2016 | Anderson et al. | |
| 2019/0004011 | A1* | 1/2019 | Garimella | H01J 49/0027 |
| 2020/0080967 | A1* | 3/2020 | Green | G01N 27/623 |

OTHER PUBLICATIONS

Tolmachev et al, "Characterization of ion dynamics in structures for lossless ion manipulations," Analytical chemistry, 86(18): 9162-9168 (2014).

Tolmachev et al., "A collisional focusing ion guide for coupling an atmospheric pressure ion source to a mass spectrometer," Nuclear Instruments and Methods in Physics Research Section B: Beam Interactions with Materials and Atoms, 124(1): 112-119 (1997).

Guevremont et al., "Ion trapping at atmospheric pressure (760 Torr) and room temperature with a high-field asymmetric waveform ion mobility spectrometer," International Journal of Mass Spectrometry, 93(1): 45-56 (1999).

Viehland et al., "Comparison of high-field ion mobility obtained from drift tubes and a FAIMS apparatus," International Journal of Mass Spectrometry 197(1-3): 123-130 (2000).

Tao et al., "A collision cross-section database of singly-charged peptide ions," Journal of the American Society for Mass Spectrometry, 18(7): 1232-1238 (2007).

Search Report under Section 17(5) for related GB Application No. 2102367.6 dated Jul. 20, 2021, 4 pages.

International Search Report and Written Opinion for related International Application No. PCT/EP2022/054103, 12 pages, mailed May 13, 2022.

Zeng et al., "Performance enhancement of high-field asymmetric waveform ion mobility spectrometry by applying differential-RF-driven operation mode," Review of Scientific Instruments, 88(9):095113 (2017).

Costanzo et al., "Portable FAIMS: Applications and future perspectives," International Journal of Mass Spectrometry, 422: 188-196 (2017).

* cited by examiner

HIGH PRESSURE ION OPTICAL DEVICES

CROSS REFERENCE TO RELATED APPLICATIONS

This is the U.S. National Stage of International Application No. PCT/EP2022/054103, filed Feb. 18, 2022, which was published in English under PCT Article 21(2), which in turn claims the benefit of foreign application No. GB2102367.6, filed Feb. 19, 2021, both of which are incorporated herein in their entirety

TECHNICAL FIELD OF THE DISCLOSURE

The disclosure concerns ion optical devices, ion repulsive surfaces, ion optical systems, multipole ion optical devices and mass or ion mobility spectrometers.

BACKGROUND TO THE DISCLOSURE

This disclosure concerns the manipulation and confinement of ions at atmospheric pressure. Many technical disclosures, including patent documents, purport to confine ions at pressures approaching, including and exceeding atmospheric pressure (which is referred to herein as "high pressure") using pseudopotential effects due to radio frequency (RF) fields.

In particular, many known approaches assume that the pseudopotential effect is sufficient to confine ions at close to atmospheric pressures, for example U.S. Pat. Nos. 8,362,421, 8,835,839 (relying on inhomogeneous electric fields as described in U.S. Pat. No. 5,572,035), Tolmachev et. al. (Anal. Chem. 86 18 9162-9168 (2014)), WO-2017062102 A1, U.S. Pat. No. 9,984,861 B2, U.S. Pat. No. 8,975,578 B2, U.S. Pat. No. 8,841,611 B2, U.S. Pat. No. 8,067,747 B2 and U.S. Pat. No. 9,620,346 B2. Devices as described in these documents include arrays of electrodes having opposing phases of RF applied to them (phases that are 180 degrees different from one another) in order to create field gradients local to the electrode array, the ion oscillations in these regions of field gradient causing the pseudopotential effect to occur, resulting from a net field over each oscillation cycle (a pseudo-field) which applies a force in the direction of lower field gradient. Advantageously, the pseudo-field acts in this way on ions of either charge polarity. U.S. Pat. No. 8,299,443 B1 and U.S. Pat. No. 9,053,915 B2 take this approach further by attempting to increase the pseudopotential by operating at very high electric field strengths.

With such approaches in mind, note should be made of Tolmachev et. al. (Nucl. Intr. and Meth. in Phys. Res. B 124 (1997) 112-119), which explains that the pseudopotential is severely attenuated at atmospheric pressure, by ion-gas collisions suppressing oscillation amplitude and changing the phase shift between ion velocity and field oscillations. Significantly, U.S. Pat. No. 9,991,108 (column 2 lines 4 to 9) states: "However, efficient ion trapping with RF confining fields is difficult at pressures approaching atmospheric pressure and also at very low pressures where ions do not lose kinetic energy rapidly due to collisions with background gas molecules. Commercial atmospheric pressure IMS devices do not employ either RF ion traps or RF ion guides."

This might suggest that existing approaches for using the pseudopotential effect to confine ions at atmospheric pressure with RF fields do not operate in practice as well as predicted by their designers. Effective and useful confinement of ions using RF fields at high pressure is a challenge.

SUMMARY OF THE DISCLOSURE

Against this background, there are provided a number of approaches for the confinement of ions using RF fields at high pressure. These approaches may be combined and features and/or options of any one approach may be used in another approach without difficulty.

In one aspect, an arrangement is considered based around two (or more) spatially-separated electrodes for receiving ions in a high gas pressure environment. This environment may include a chamber, housing or optionally, be open without any enclosure. RF drive voltages having an asymmetric waveform are applied to the electrodes. The RF drive voltages applied to the two electrodes have the same drive frequencies (for example, same base frequency and preferably same secondary frequency components and may have the same amplitude and/or other waveform characteristics) but different phases. A high electric field strength is experienced by the received ions, in particular sufficient for ions to experience mobility variation (for example, at least 1 MV/m). A phase difference is considered of at least $\pi/2$ and in some implementations, at least $\pi$. Beneficially, an amplitude of the asymmetric waveform has an integral over time of substantially zero. The asymmetric waveform preferably has a shape defined by a sum of two or more cosine functions, although the shape may be alternatively defined by a rectangular function or a sum of rectangular functions.

A high gas pressure may be sufficiently high such that, in combination with the one or more RF drive frequencies, the phase shift between the electric field and a velocity of the received ions experiencing the electric field is substantially zero. In embodiments, the gas pressure is at least 10 kPa, 25 kPa, 50 kPa, 75 kPa, 100 kPa or atmospheric pressure (1 atm). The gas may be air.

The electrodes may be formed as two sets of interleaved electrodes, with one phase of RF applied to alternate electrodes and the other phase of RF applied to the interleaving electrodes. The electrodes may be in the same plane or provided in opposing (parallel) planes.

There may be more than two sets of electrodes generating the electric field. Each set of electrodes may receive an asymmetric RF voltage with the one or more drive frequencies, but a different phase than the other sets of electrodes. In some embodiments, two sets of electrodes may be provided in one plane and another set (or sets) may be provided in a different plane, for example a parallel, separated plane.

Although RF voltages are supplied to the sets of electrodes and generally only RF (that is, no DC) is applied to the sets of electrodes, one or more further electrodes may be provided to which one or more DC voltages may (only) be applied. This may assist in confinement of ions in other dimensions, for example. The electrode or electrodes to which DC are applied may be outside the spatial extent of the sets of electrodes, especially in such cases.

Another aspect may consider an ion repulsive surface, formed by two sets of electrodes, preferably on a substrate, which is typically planar and may be substantially electrically-insulating. Alternatively, the two sets of electrodes can be held by one or more supports positioned near the ends of the electrodes. Each of the electrodes is elongated and distributed along an axis (for example, linear or curved, with the electrodes being essentially parallel with a linear axis), alternating between an electrode from the first set and an electrode from the second set. RF voltages having an asymmetric waveform are applied to both sets of electrodes with the phase differing between the RF voltage applied to the first set and the RF voltage applied to the second set (normally, by at least π/2). The electric field strength adjacent the ion repulsive surface is high, particularly sufficient for ions to experience mobility variation (for instance, at least 1 MV/m). The ion repulsive surface may be arranged in an environment (which may be a chamber, housing or simply open) that is configured to operate at a high gas pressure (for instance, at least 10 kPa and even approaching or at atmospheric pressure), and/or in air.

Each of the electrodes (from one or more than one set) typically has the same shape, the same dimensions and the same spacing. Additionally or alternatively, one, some or each of the electrodes (from one or more than one set) may have one or more of a range of properties, including: a height that is at least as large as a gap between adjacent electrodes; a height that is smaller than a thickness of the substrate; a width that is at least as large as or larger than a gap between adjacent electrodes; a width that is smaller than 100 μm (or 50 μm in some cases); a length in the direction of elongation that is at least 2, 3, 5, 10, 20, 25 or 50 times as long as a gap between adjacent electrodes; and a cross-section (taken perpendicular to the direction of elongation) that is one of: rectangular with rounded corners; hemispherical; and semi ovoid. The lengths in the direction of elongation of some or each of the electrodes (from one or more than one set) may be substantially the same.

Each electrode of a set may be connected at one end to a respective common conductor (that receives the appropriate RF voltage). The common conductor for a first set of electrodes may be connected at one end of that set of electrodes and the common conductor for a second set of electrodes may be connected at the opposite end of that set of electrodes than the first set of electrodes.

As above, generally only RF (that is, no DC) is applied to the sets of electrodes. Other electrodes may be provided, to which a DC (only) voltage is applied. These electrodes may be substantially planar and essentially in the same plane electrodes to which RF is applied. For example, one DC electrode may be provided adjacent a first end of the RF electrodes (perpendicular to a direction of their elongation) and another DC electrode may be located adjacent the opposite end of the RF electrodes. A conductive back-plate may be provided on a side of the substrate opposite to that on which the sets of electrodes are located. A DC voltage may be applied to the conductive back-plate.

There may be more than two sets of electrodes generating the electric field (for example, as discussed above with reference to the first aspect). For example, two other sets of electrodes (third and fourth sets of electrodes), similar to the first and second sets of electrodes discussed above, may be distributed along a second axis (for instance, an extension of or parallel to the first axis, alternating between an electrode from the third set and an electrode from the fourth set. RF voltages having an asymmetric waveform are applied to the third and fourth sets of electrodes with the phase differing between the RF voltages applied to each of the first, second, third and fourth sets.

In another aspect, there may be considered an ion optical device (such as an ion guide, ion storage device, ion trap, collision cell or similar), comprising an ion repulsive surface as described herein. In one embodiment, the ion optical device further comprises a plate electrode, spatially separated from (and preferably substantially parallel to) the ion repulsive surface, so as to define an ion channel between the ion repulsive surface and the plate electrode. A DC voltage or an RF voltage with a time-invariant potential offset may be applied to the plate electrode.

In another embodiment, the ion repulsive surface may be a first ion repulsive surface and the ion optical device may further comprise a second ion repulsive surface as described herein, spatially separated from the first ion repulsive surface, so as to define one or more ion channels between the first and second ion repulsive surfaces. The electrodes of the two ion repulsive surface may be opposite to and aligned with each other. The RF voltages applied to electrodes of the ion repulsive surfaces may be same (at least in magnitude). These features may apply even where each ion repulsive surface has more than two sets of electrodes.

In some embodiments, the axes of the ion repulsive surface (or surfaces) are linear. Alternatively, the axes of the ion repulsive surface (or surfaces) may be curved, for example circular. In this case, the ion channel defines a circular flight path for ions to travel therethrough (or ion channels may define multiple circular flight paths for ions to travel therethrough).

For ion optical device according to any embodiment, the frequency of the RF voltages may be selected such that ion oscillation amplitudes are less than a substantial fraction of a width of the ion channel.

The ion optical device may have more than one ion channel. For example, a plate electrode may be used to separate between two ion repulsive surfaces, thereby defining a respective ion channel between each ion repulsive surface and the plate electrode. In this case, the polarity of the asymmetric waveform of the RF voltages applied to the two repulsive surfaces may be opposite. In another example, each ion repulsive surface may have four sets of electrodes, with two sets of electrodes along one length of the respective axis and two sets of electrodes along a different length of the respective axis. The RF voltage applied to the first two sets of electrodes may have opposite polarity to that applied to the other two sets of electrodes. Any embodiment with two ion channels to which opposite polarity RF voltages are applied may thus be able to handle ions having different ion mobility types. An upstream FAIMS separator may be used to separate ion of different ion mobility types before transferring the ions to the appropriate ion channel of the ion optical device.

A transport controller may induce movement of ions within the or each ion channel by controlling one or more of: (i) application of time-invariant potentials to create a steady-state electric field along a length of the or each ion channel; (ii) gas flow along the length of the or each ion channel; and (iii) application of travelling wave potentials to create a moving electric field along the length of the or each ion channel. The transport controller may control the application of potentials to any of the electrodes to which the RF voltages are applied and/or supplementary electrodes each positioned between the electrodes to which the RF voltages are applied.

In a further aspect, an ion optical system may be considered, comprising: an ion optical device as herein disclosed and configured to receive ions. The ion optical system may further include at least one gating electrode. A DC power supply may be configured selectively to provide a DC potential to gating electrode (or electrodes), so as to cause transfer of ions from the RF ion guide to an output device (for example, another ion optical device). An aperture in an ion repulsive surface or a plate electrode may allow ions to travel therethrough, with the output device receiving ions via the aperture. For instance, the gating electrode may be positioned on or adjacent to an ion repulsive surface (for instance on the substrate) near the aperture. Multiple gating electrodes may be used, for instance with one positioned on or adjacent to ion optical device and another positioned on or adjacent to the output device. Two different DC gating potentials may be applied to the gating electrodes, for instance to cause ions to travel from the first ion optical device through the aperture and to another ion optical device. The second ion optical device may be orientated parallel to the first ion optical device, with the first ion optical device having a first aperture in an ion repulsive surface for ions to travel therethrough and the second ion optical device having a second aperture in an ion repulsive surface for ions to be received. Alternatively, the second ion optical device may be orientated perpendicular to the first ion optical device, with the first ion optical device having an aperture in an ion repulsive surface for ions to travel therethrough and the second ion optical device being positioned such that ions can travel through the aperture and be received in an end of an ion channel of the second ion optical device.

A further aspect may be found in an ion optical system, comprising a plurality of RF ion guides, each of the plurality of RF ion guides being formed by an ion optical device as disclosed herein.

In one example of an ion optical system, each of multiple ion optical devices may comprise one or more ion repulsive surfaces, each having a respective circular axis for the first and second pluralities of electrodes. In other words, the ion channel for each ion optical device may define a respective circular flight path for ions to travel therethrough.

For instance, the plurality of RF ion guides may comprise two ion optical devices each having circular axes in respective planes, but with different (that is, offset) centres, such that the axes overlap. In particular, the axes may be in parallel planes. Ion transfer optics may transfer ions between the ion optical devices in the region in which the axes overlap. In another example, four ion optical devices may each have respective circular axes. The axes of a first pair of devices (that is, two devices) may be concentric but of different radius (and beneficially in the same plane). Similarly, the axes of a second pair of devices may be concentric, but offset from the axial centre of the first pair (and advantageously, in a plane parallel to the axial plane of the first pair). The axial radii of the second pair match those of the first pair, such that the axis with the smaller radius of one pair overlaps with the axis with the larger radius of the other pair. Ion transfer optics may transfer ions between the RF ion guides in regions in which their axes overlap.

A yet further aspect may be considered in a mass spectrometer, comprising an ion optical system as herein disclosed. The mass spectrometer may further comprise at least one ion optical processing device, configured to receive ions from the ion optical system.

Another aspect may be found in an ion optical interface between two parts of a mass spectrometry system, in which an RF ion guide is formed from an ion optical device or an ion optical system as herein disclosed. Ions are received at one end of the RF ion guide and output at the opposite end of the RF ion guide. For example, ions may be received from an ion source or some other part at atmospheric pressure. The interface may output to a part operating below atmospheric pressure. This aspect may be further found in a mass spectrometer or ion mobility spectrometer, comprising an ion source (of APCI, APPI, ESI, EI, CI, ICP or MALDI type, for instance, optionally having an ion current of at least 5 nA), an ion optical interface as herein described and an ion processing system (for example, an ion mobility analyser. An accelerating potential may be applied between the ion source and ion optical interface. The temperature of the RF ion guide in the interface may be higher than that of the ion source. An ion mobility spectrometer may be considered, comprising an ion mobility analyser formed from an ion optical device as herein described.

A multipole ion optical device may be provided. Two opposing pluralities of electrodes (for instance, each provided along a respective axis, the two axes being parallel) may define an ion channel therebetween, typically equally spaced along the respective axes. As discussed above, asymmetric RF voltages may be provided to the electrodes, with adjacent electrodes receiving RF voltages having different phases. Generally, only RF (that is, no DC) is applied to the opposing electrodes. A high strength electric field (sufficient for ions to experience mobility variation, for instance at least 1 MV/m) may be formed in ion channel. Ions may thereby be trapped. A high gas pressure is preferably used (for example, at least 10 kPa), such that there is substantially zero phase shift between the electric field and ion velocity. A ratio of a positive to negative peak voltages of the RF voltages (or a ratio of negative to positive peak voltages of the RF voltages, for instance depending on the polarity of the waveform) preferably has a magnitude of at least 2.

A simple trap may have a phase difference between adjacent electrodes of approximately $\pi$ (180 degrees). In other words, this phase difference between adjacent electrodes on the same axis and adjacent electrodes between the two axes.

A more complex, multipole configuration may involve the electrodes being grouped, such that adjacent electrodes within the group (and between groups) receive RF voltages of the same waveform (frequency or frequencies) and having a phase differing by $2\pi$ divided by the number of electrodes in the group. For example, a group of four electrodes, with phase differing by approximately $\pi/2$ (90 degrees) between adjacent electrodes may provide a quadrupole ion optical device. Similarly, a group of three electrodes, with phase differing by approximately $2\pi/3$ (120 degrees) between adjacent electrodes may provide a tripole ion optical device. It should be noted that, where multiple groups of electrodes are provided, the same phase difference should also apply between adjacent electrodes of two different groups, as between adjacent electrodes within the group. Thus, a repeating unit of six electrodes may also define an array of tripole traps.

Two adjacent multipole traps in the same ion optical device may be provided with RF voltages having opposite polarity (polarity referring to the polarity of the average voltage and/or higher peak voltage over one cycle of the asymmetric waveform). In this way, ions of different mobility types may be trapped in the same ion optical device. An upstream ion mobility separator may be used to provide ions to the two traps.

Ions may be transported within and/or traps by different approaches, which may be controlled (for example, by a controller). In one approach, a steady-state electric field may be applied to the electrodes, for instance by biasing the electrodes (and/or supplementary electrodes) with time-invariant voltages of a monotonically varying magnitude (to generate a voltage gradient). Changing the bias voltage may allow separation of ions by their mass and/or mobility. In another approach, a gas may flow through the array (the flow rate being set to cause ions of a minimum mass and/or maximum mobility to be transported, thereby making an ion mass or mobility filter possible). Gas flow may also make possible transport of ions in a direction perpendicular to that along which the electrodes are arranged. A further approach may be applying a time-varying set of voltages to the electrodes to produce a travelling wave. An electric field that moves across the array may then be caused.

Using these approaches, the ion optical device may act as one or more of: a mass filter; a mass analyser; an ion mobility filter; an ion mobility analyser; and a drift tube. A mass spectrometer or ion mobility spectrometer may also be realised.

Methods of manufacturing and/or operating any apparatus, device, system or instrument (for example, spectrometer) are also provided. This may have steps corresponding with those of any of the respective products disclosed herein (for instance, providing and/or configuring the features of the product).

BRIEF DESCRIPTION OF THE DRAWINGS

The invention may be put into practice in a number of ways, and preferred embodiments will now be described by way of example only and with reference to the accompanying drawings, in which.

Figure 8A:
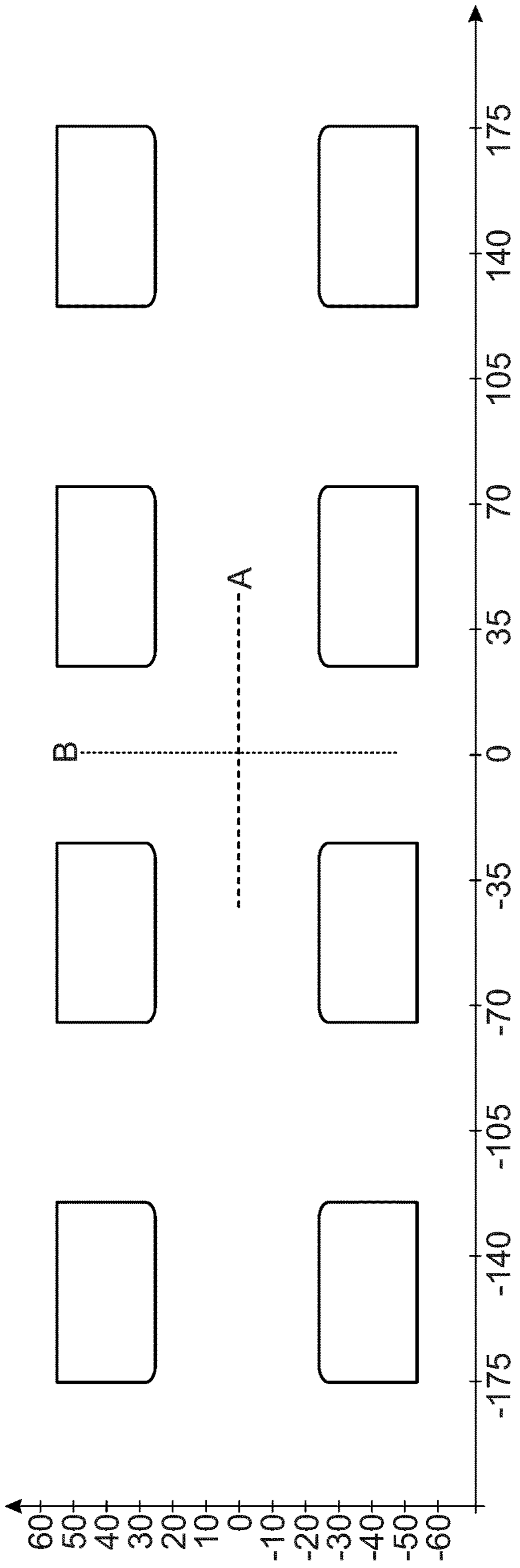
FIG. 8A schematically shows an electrode structure with test lines to indicate where pseudo-potential is calculated.
Figure 23A:
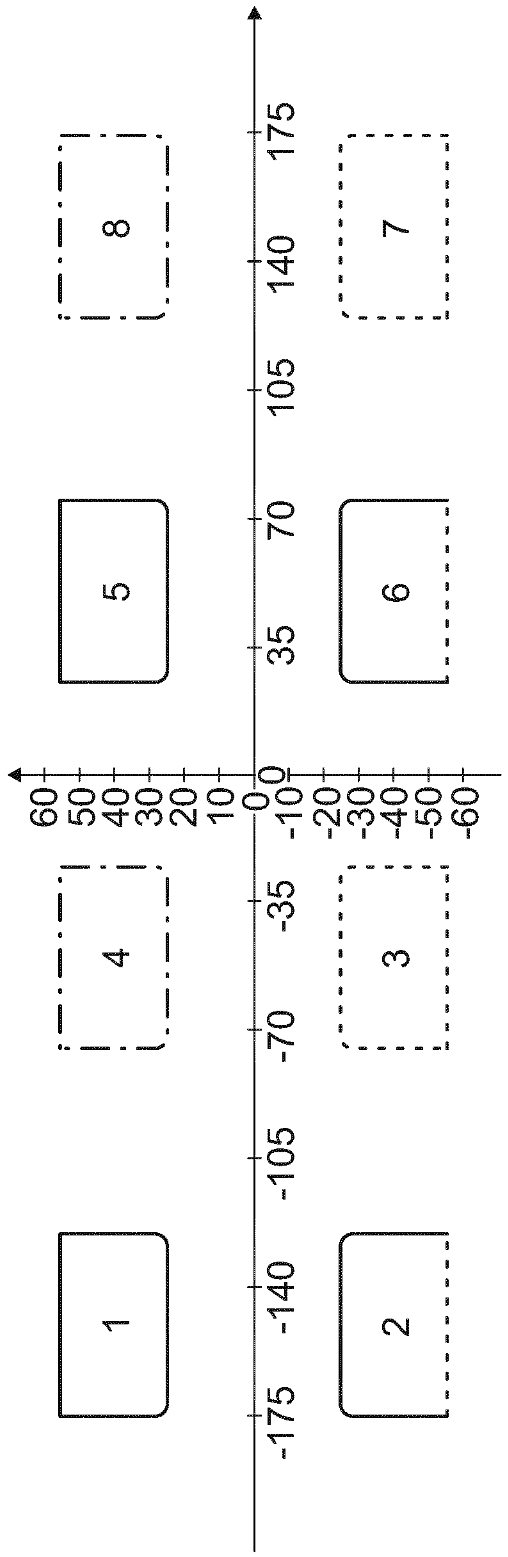
Figure 23B:
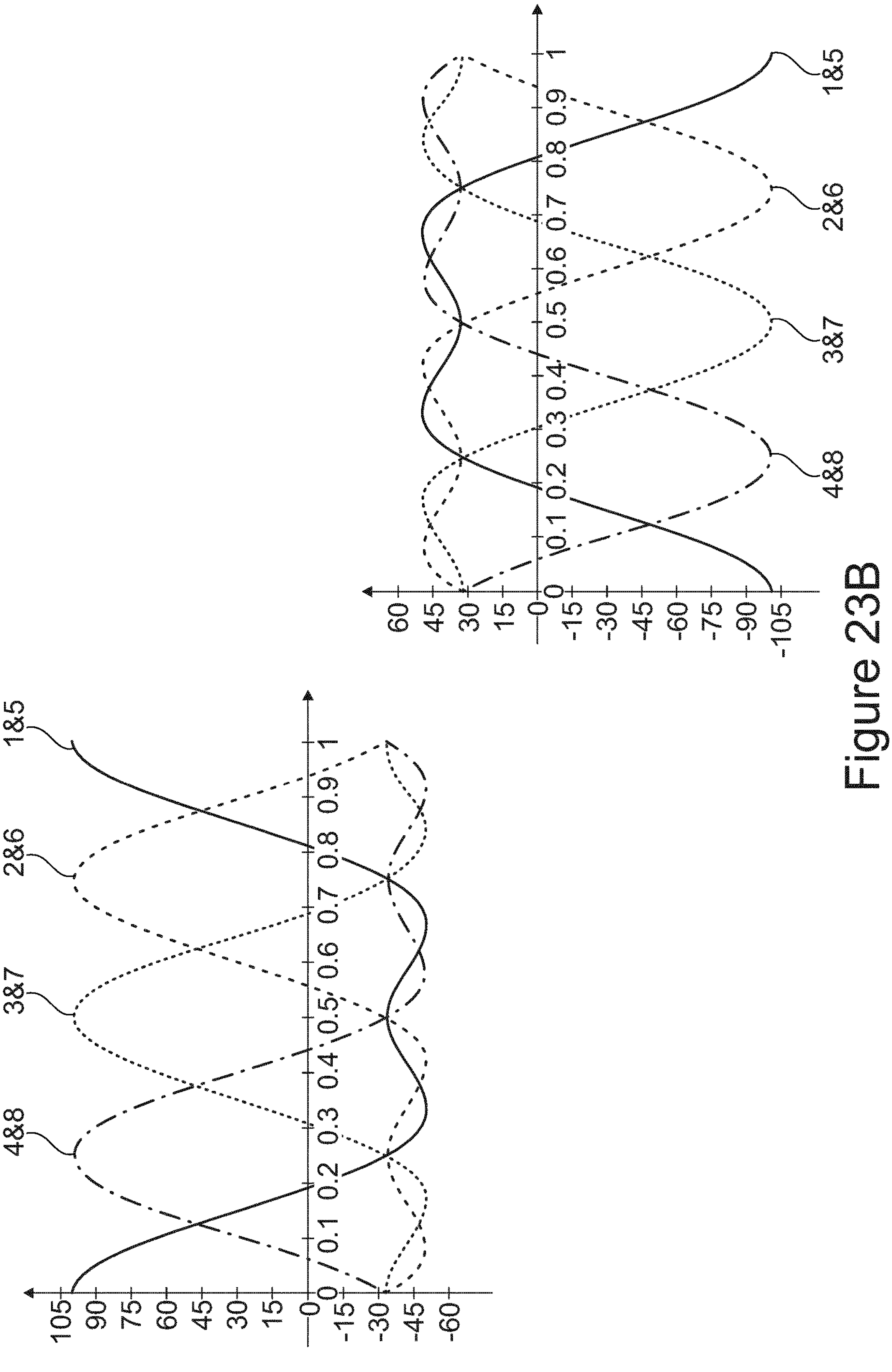
Figure 23C:
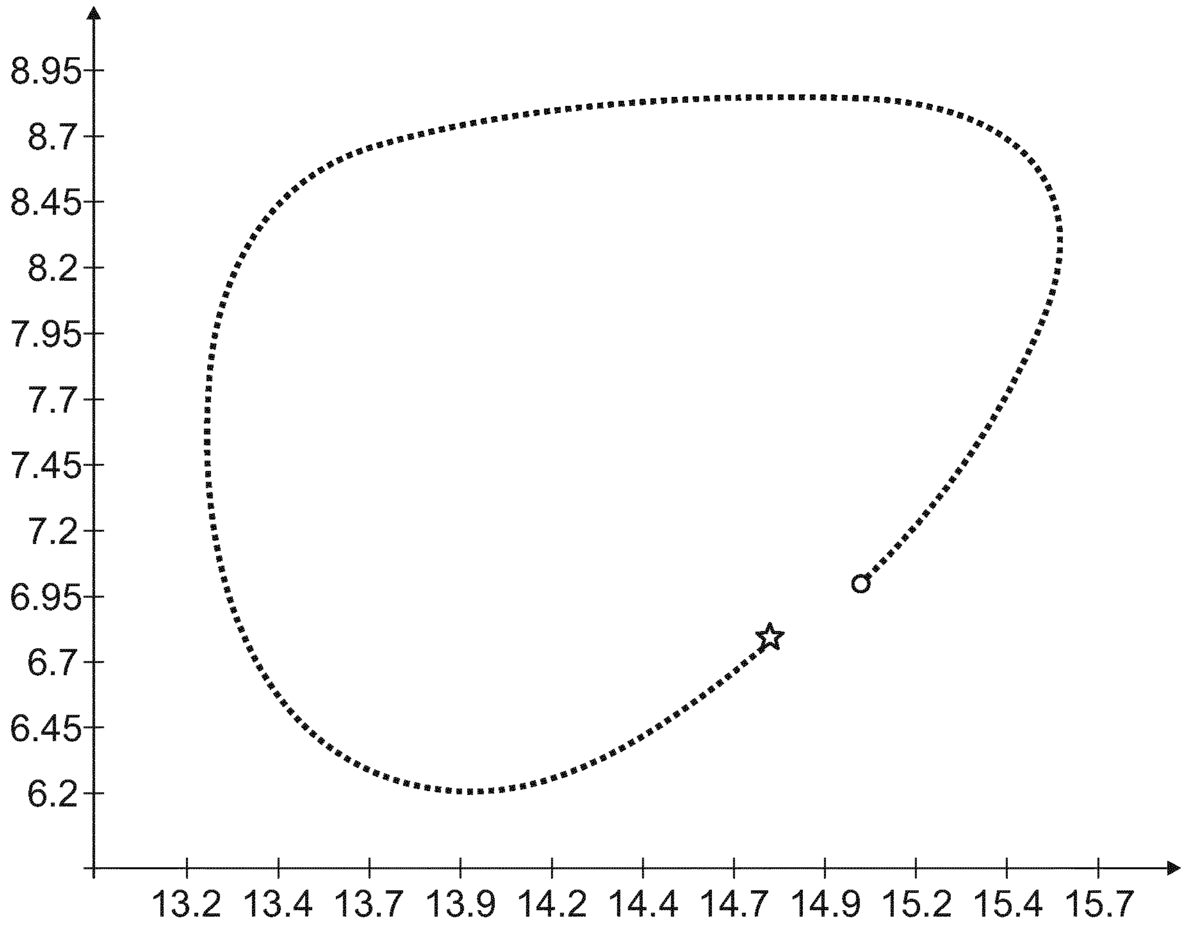
Figure 24:
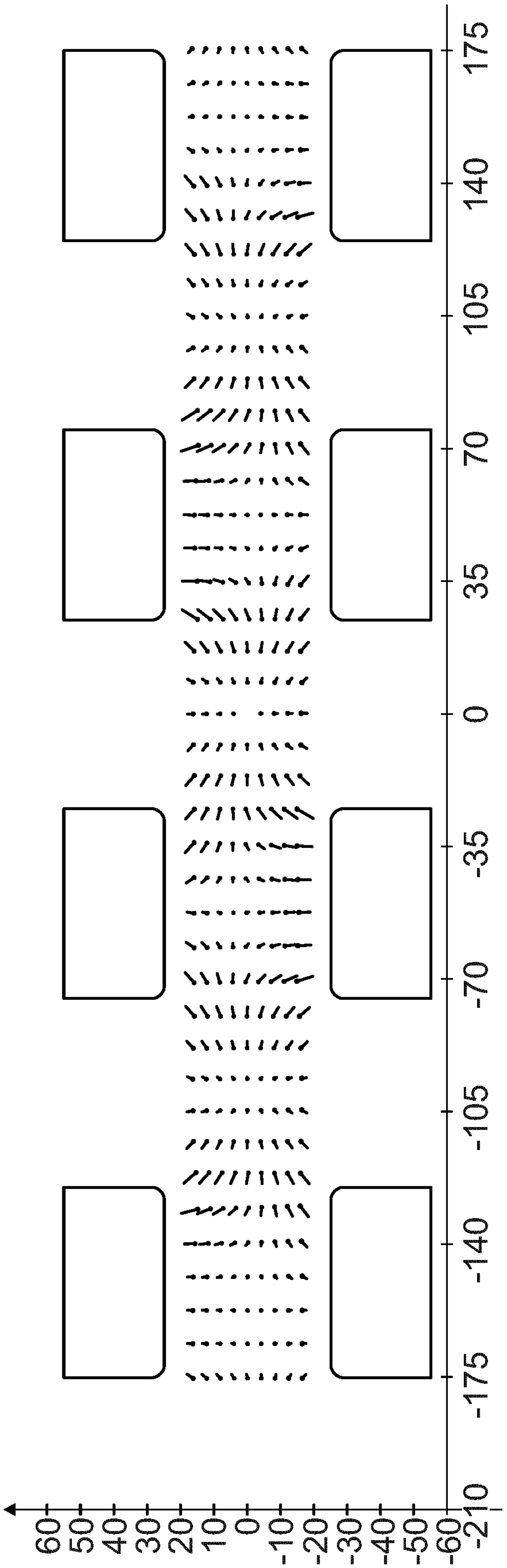
Figure 25A:
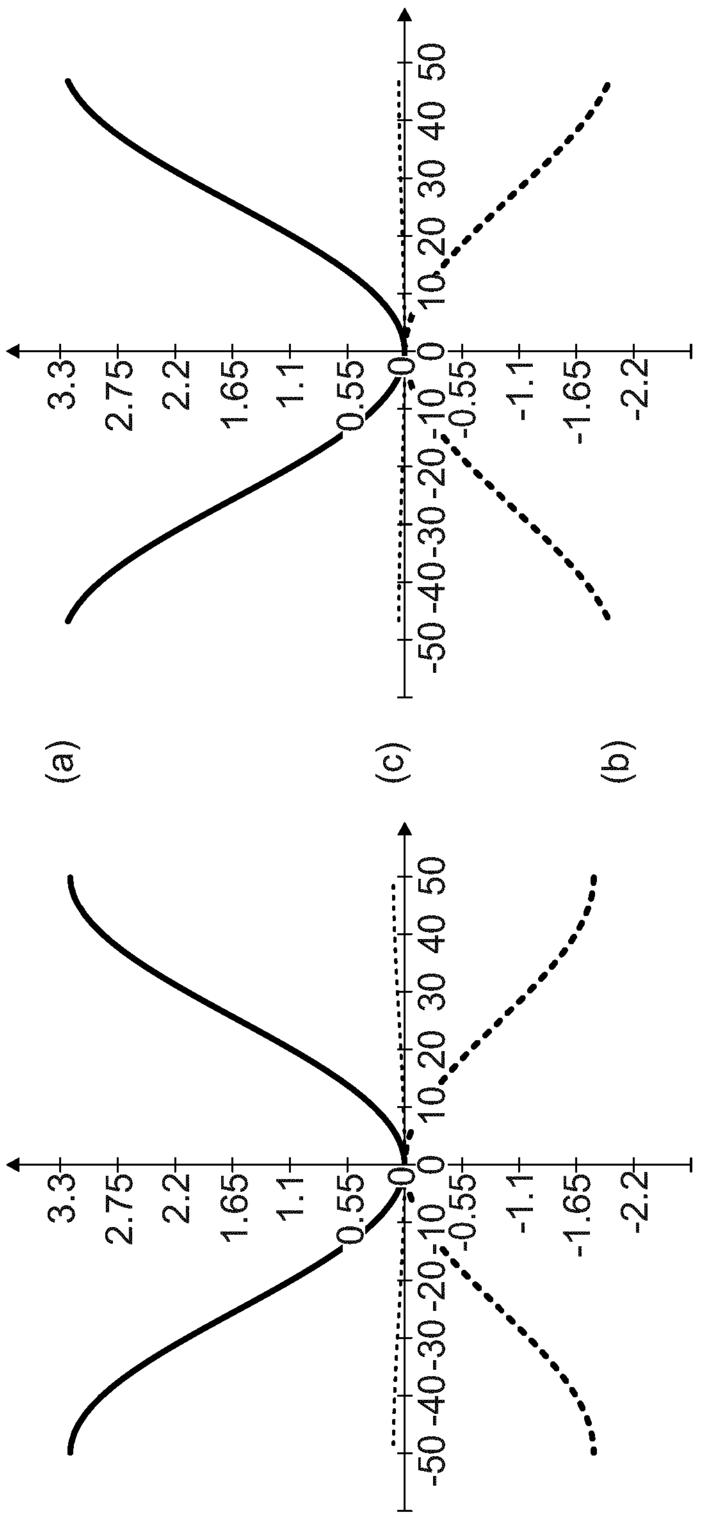
Figure 25B:
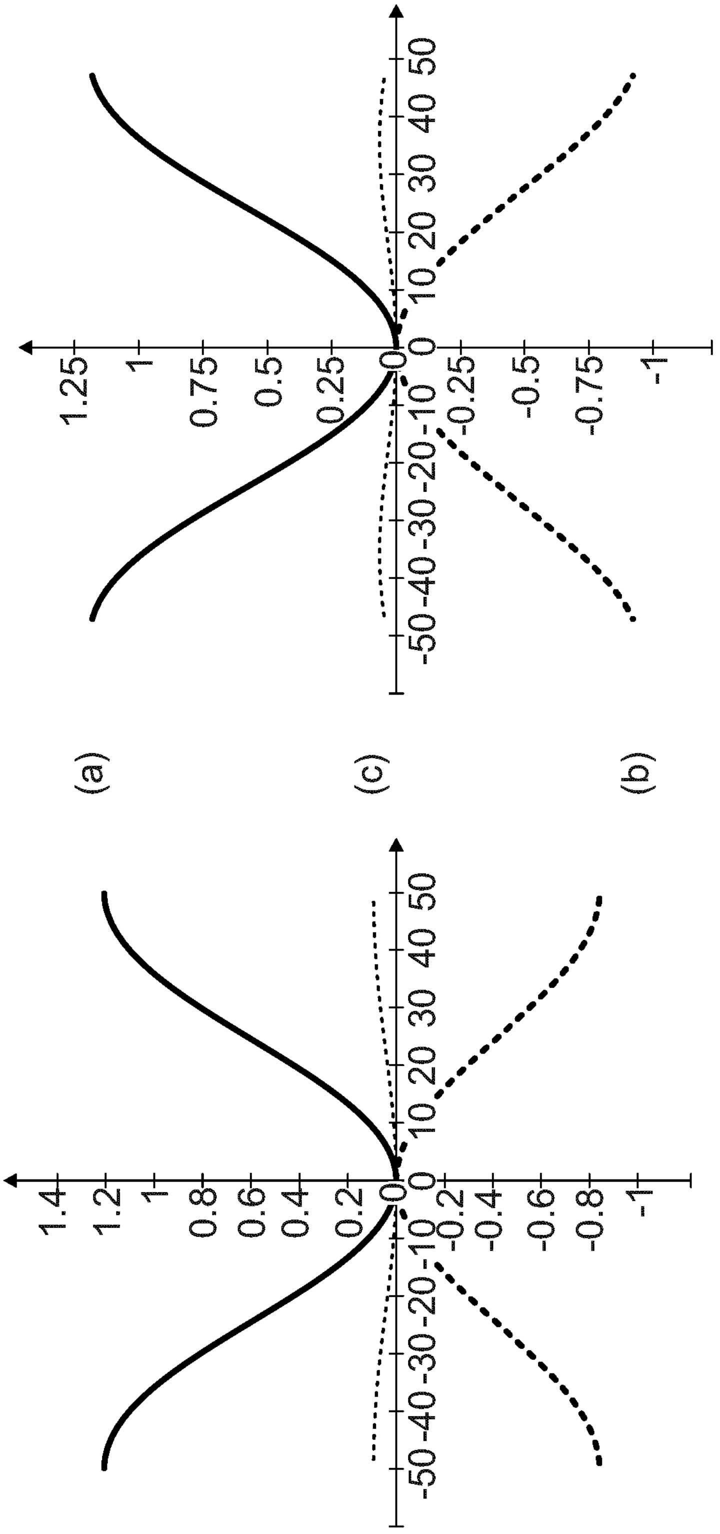
Figure 26:
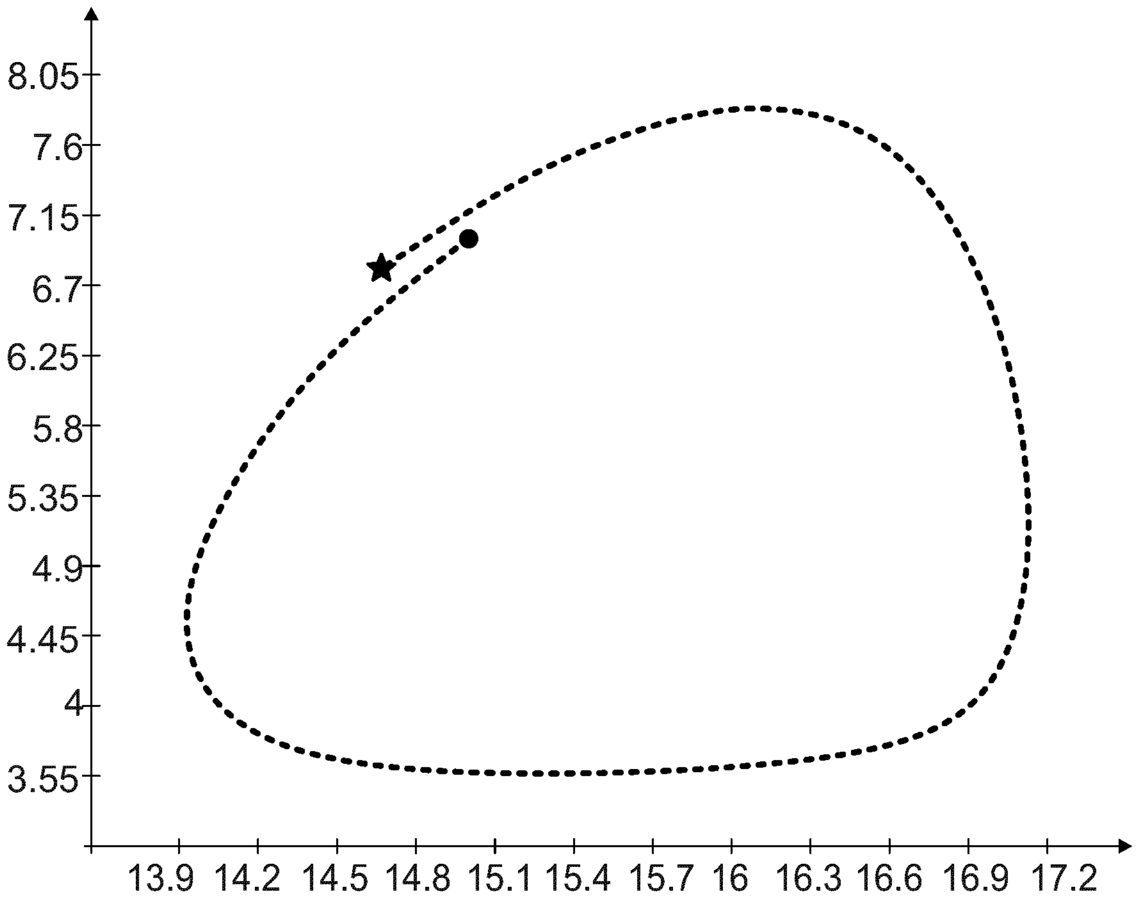
Figure 27A:
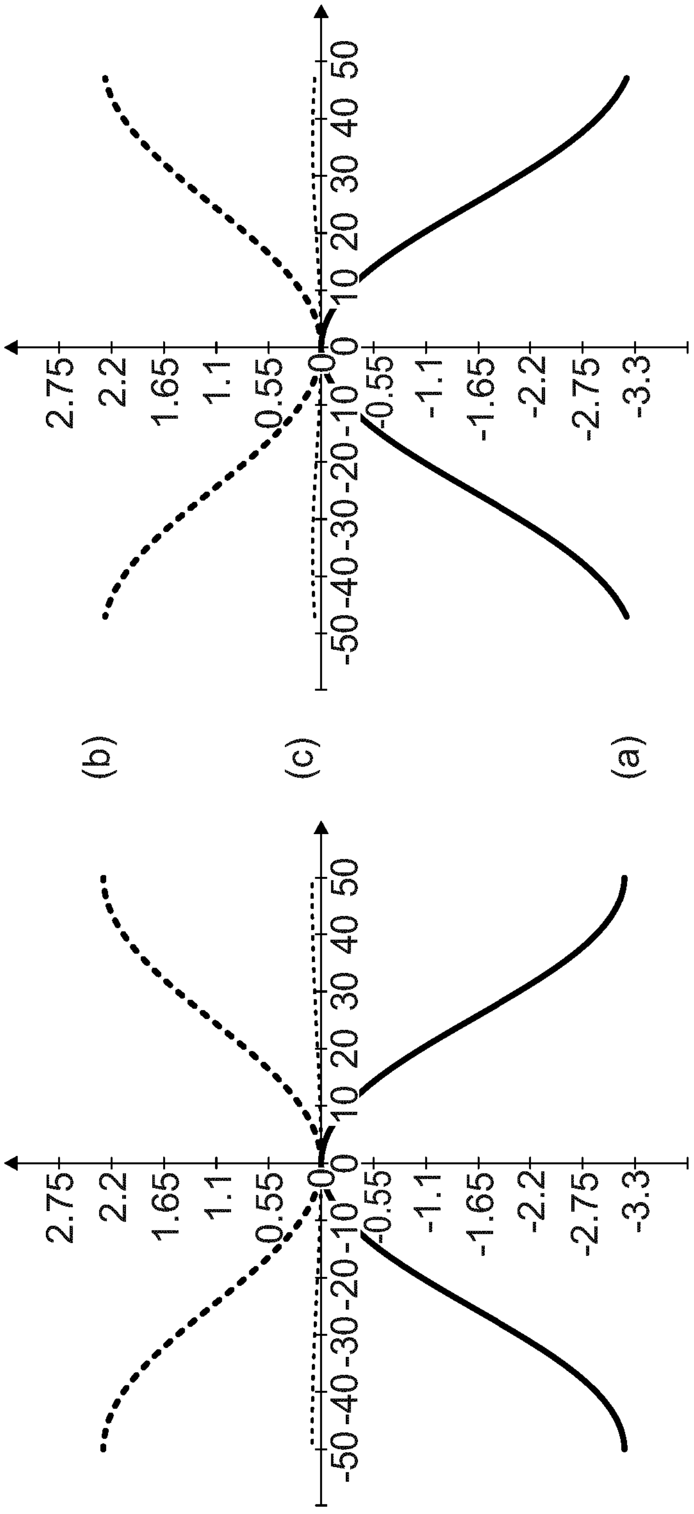
Figure 27B:
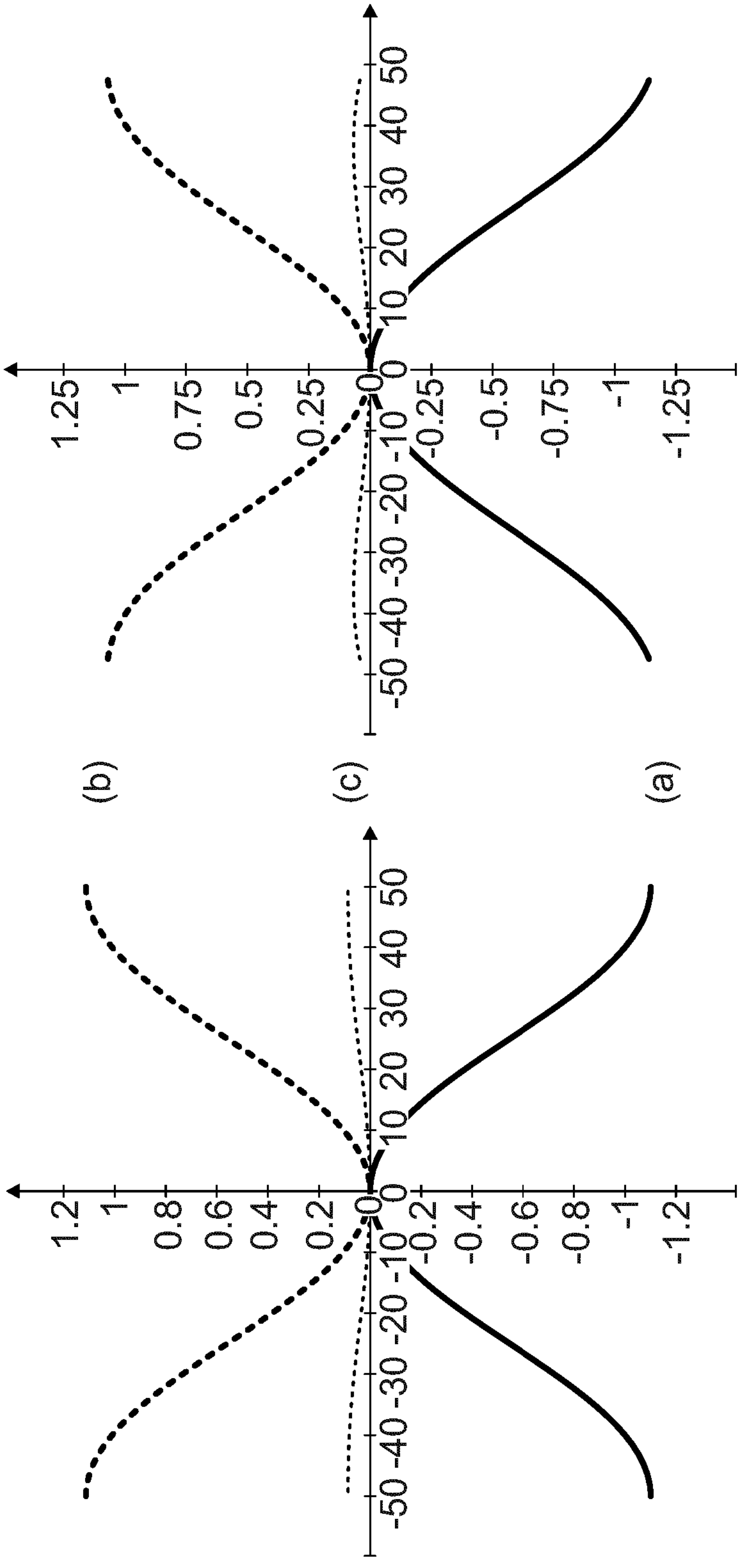
Figure 28A:
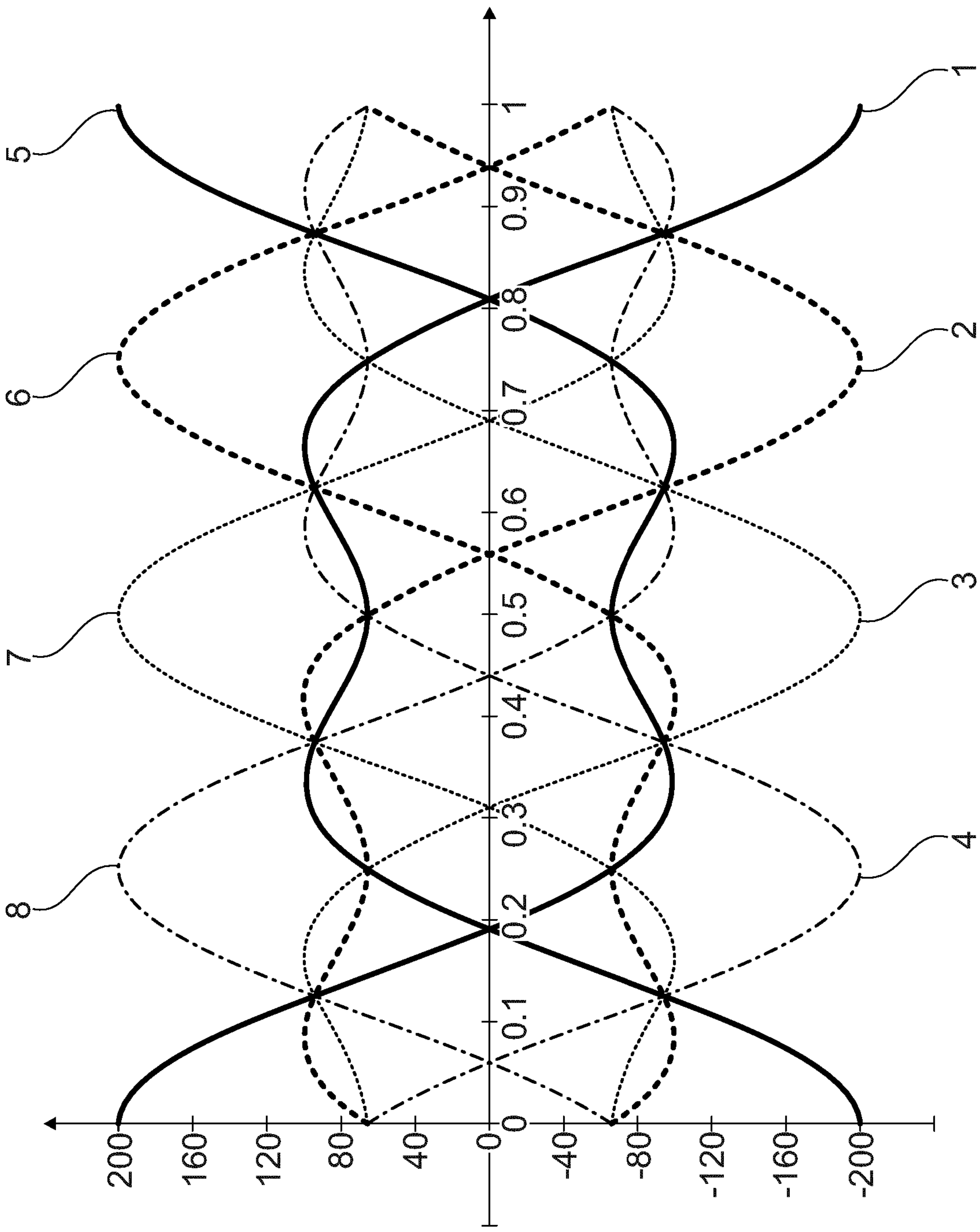
Figure 28B:
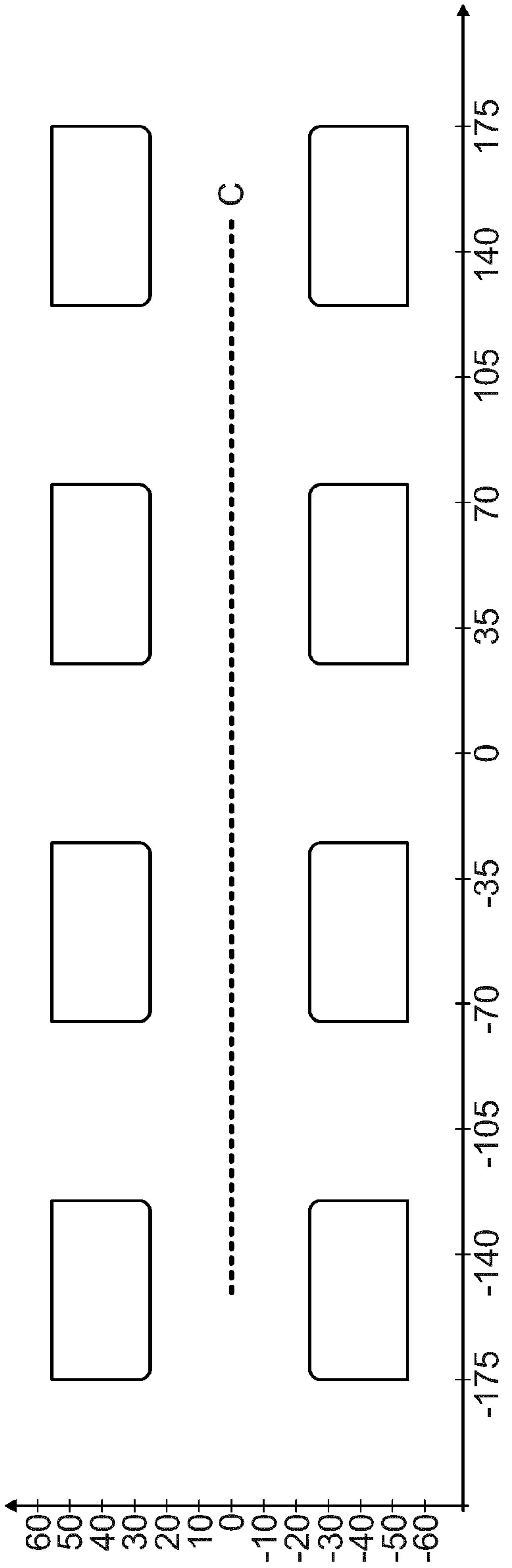
Figure 29A:
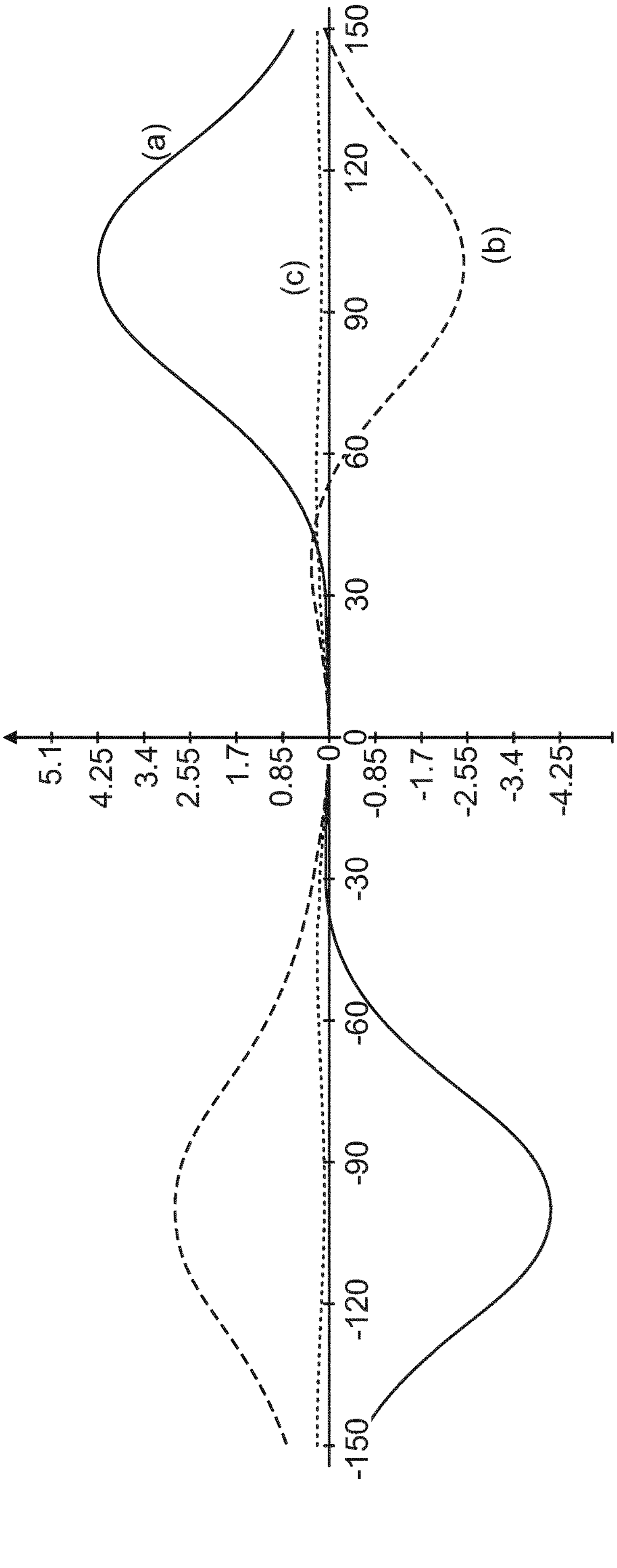
Figure 29B:
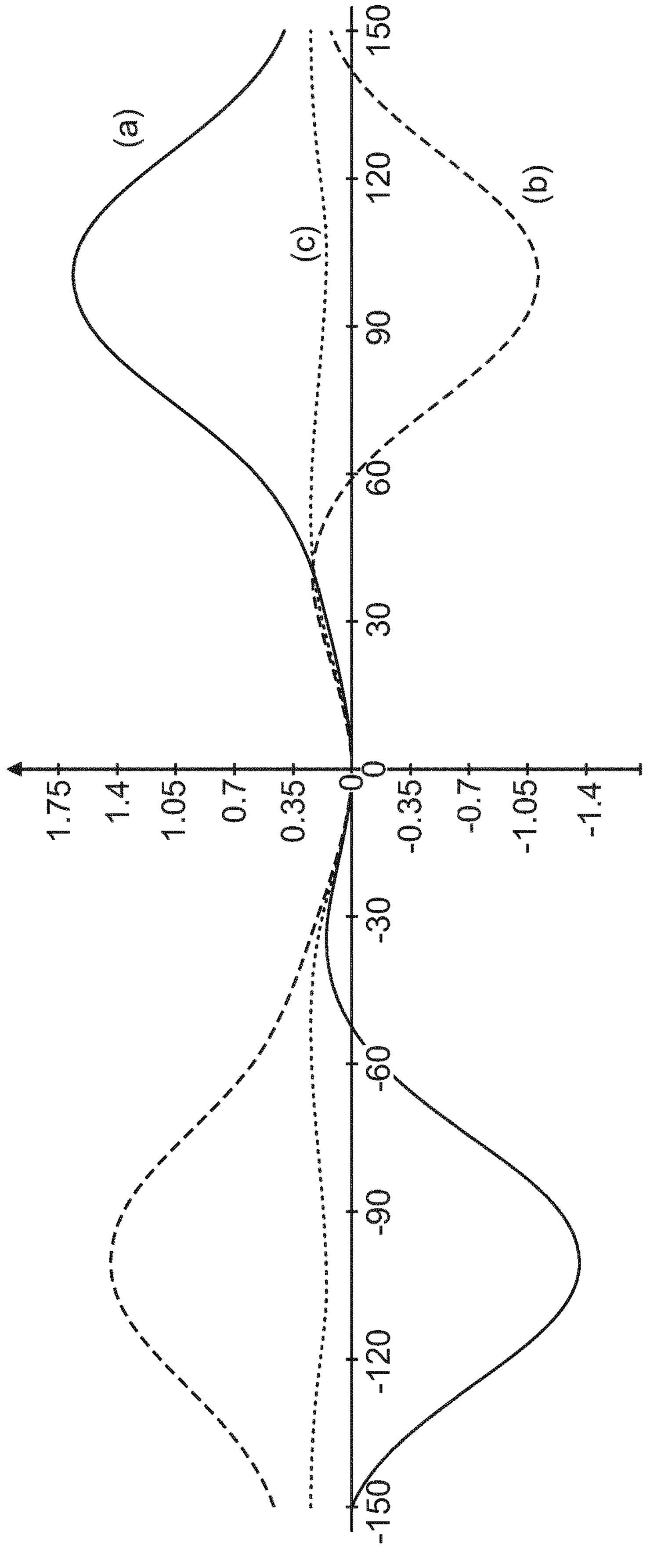
Figure 30A:
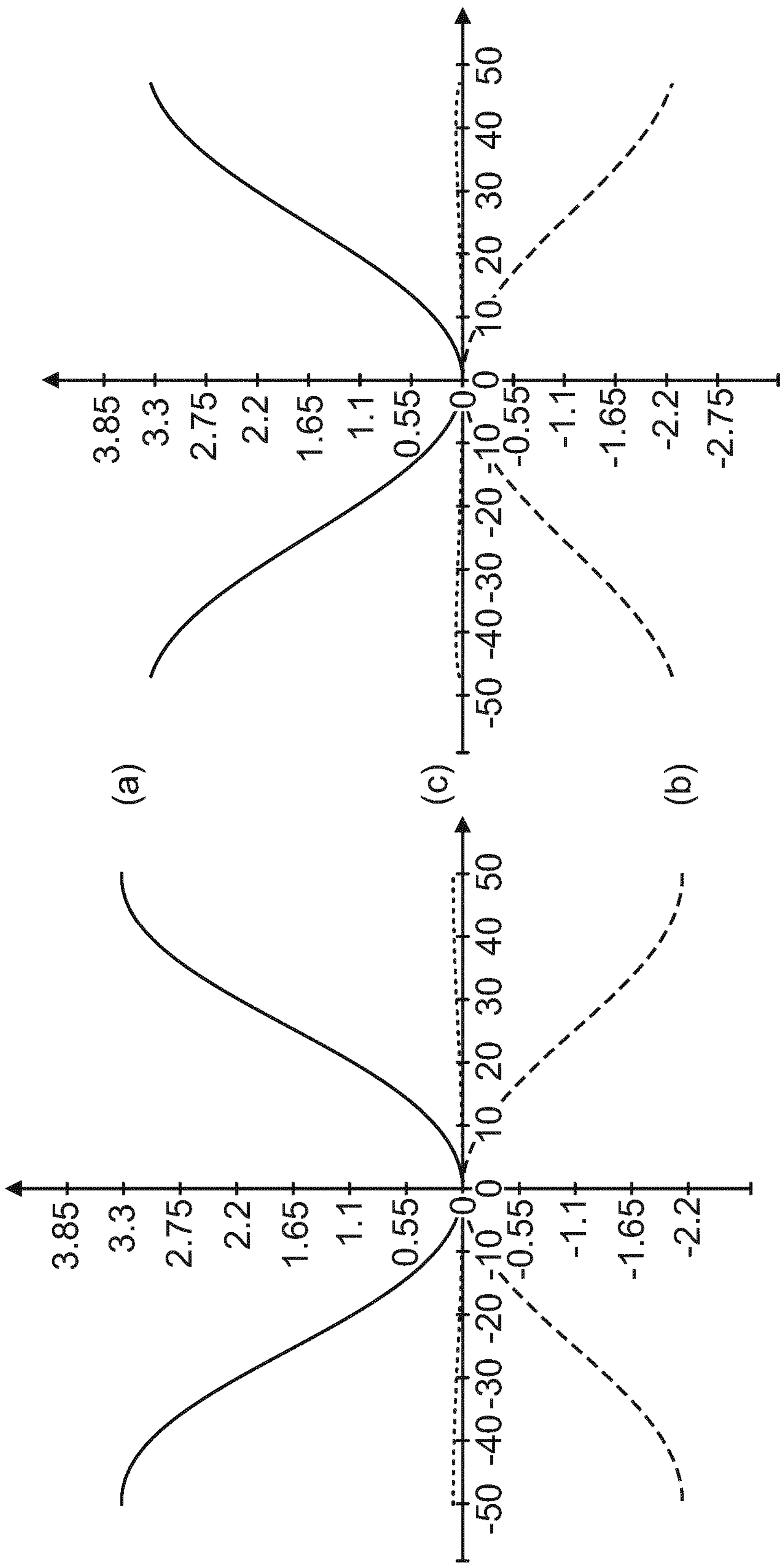
Figure 30B:
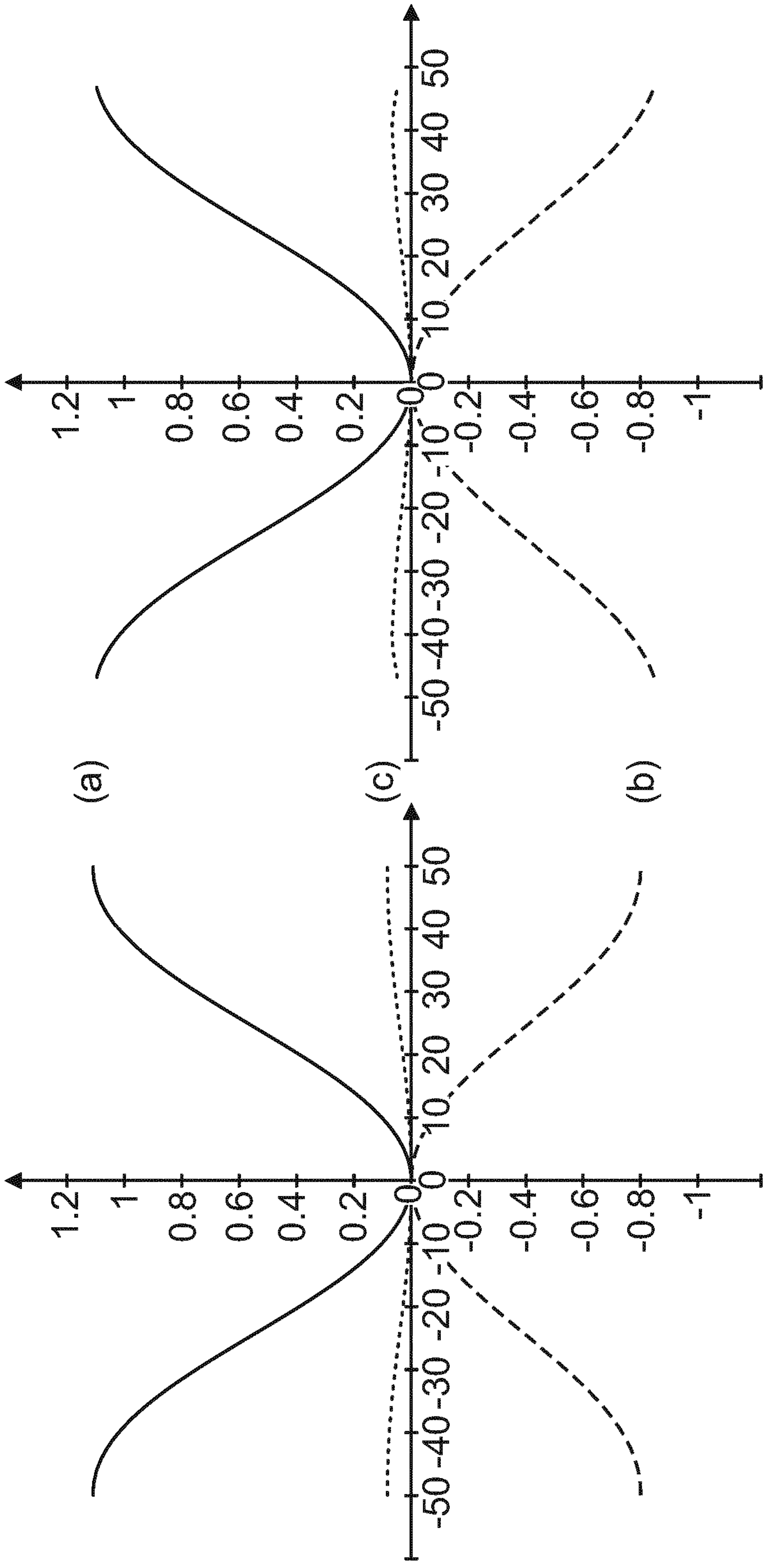
Figure 30C:
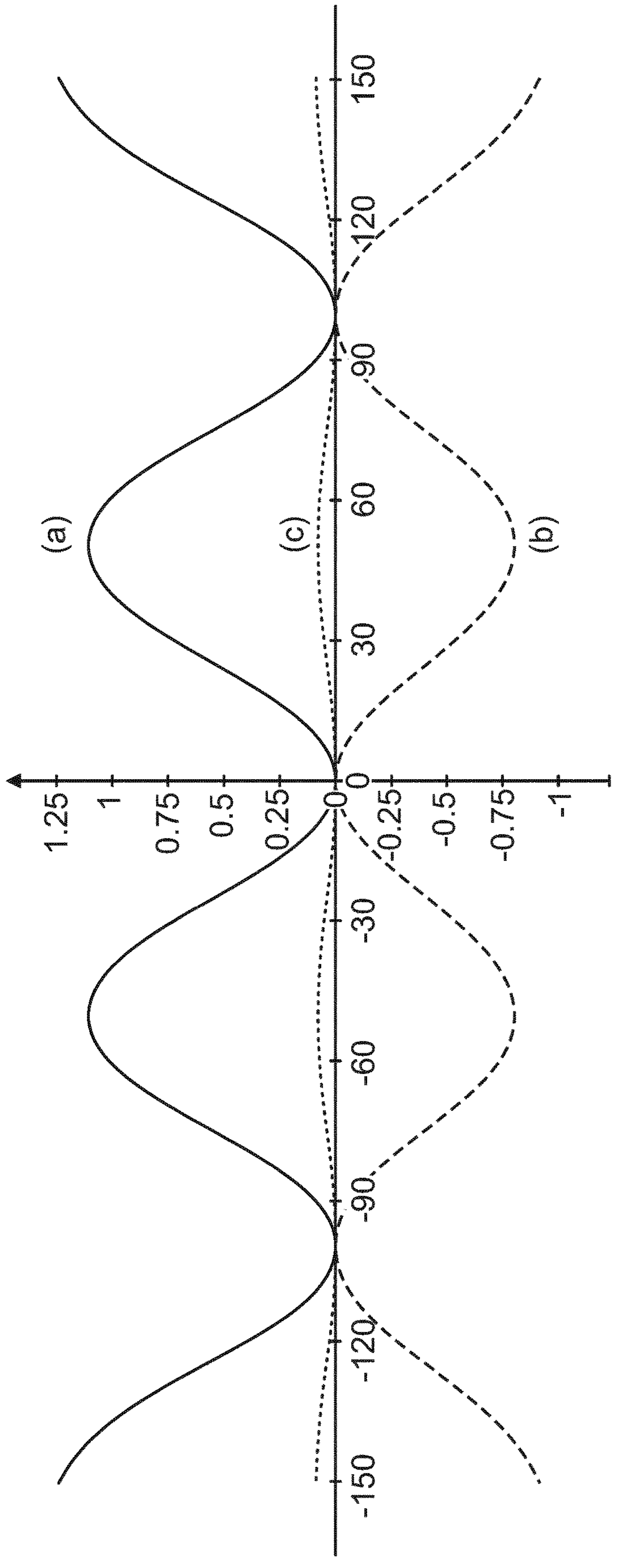
Figure 31A:
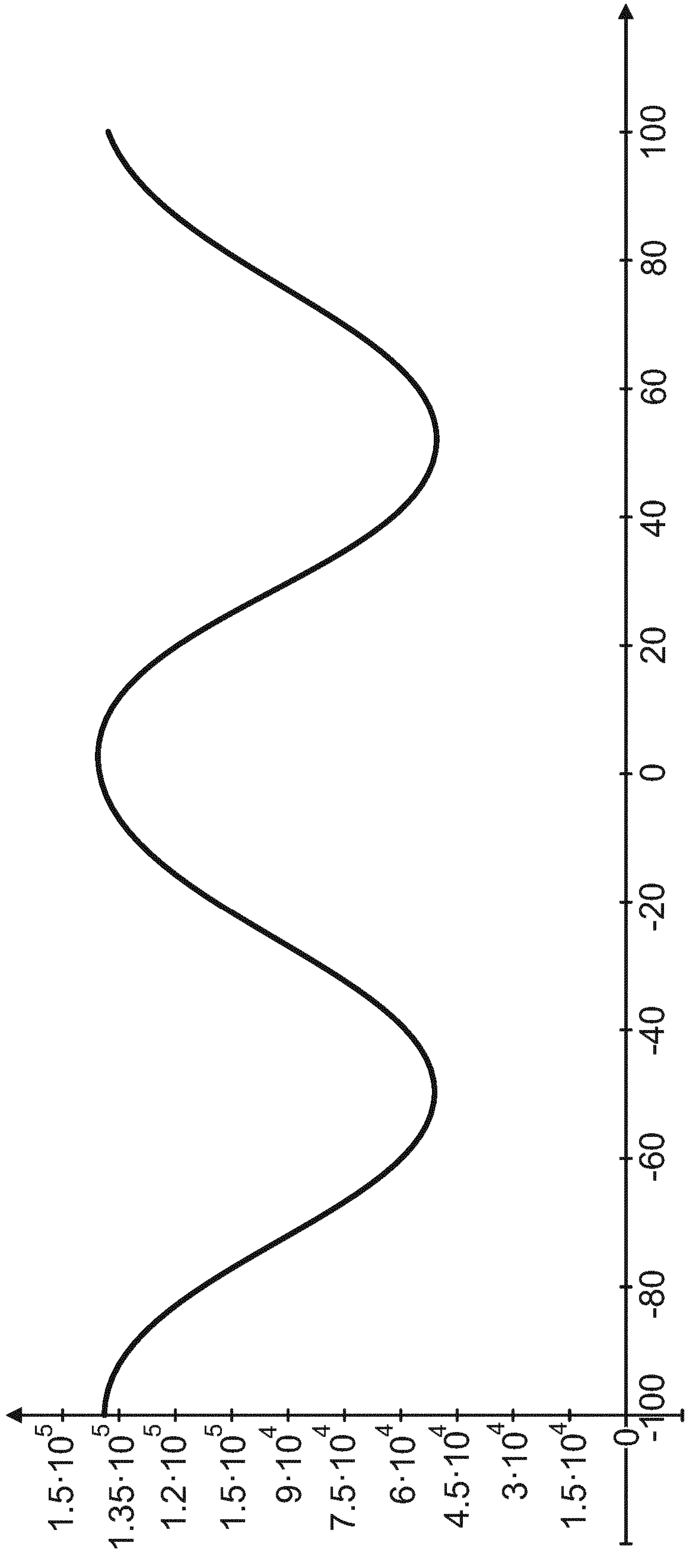
Figure 31B:
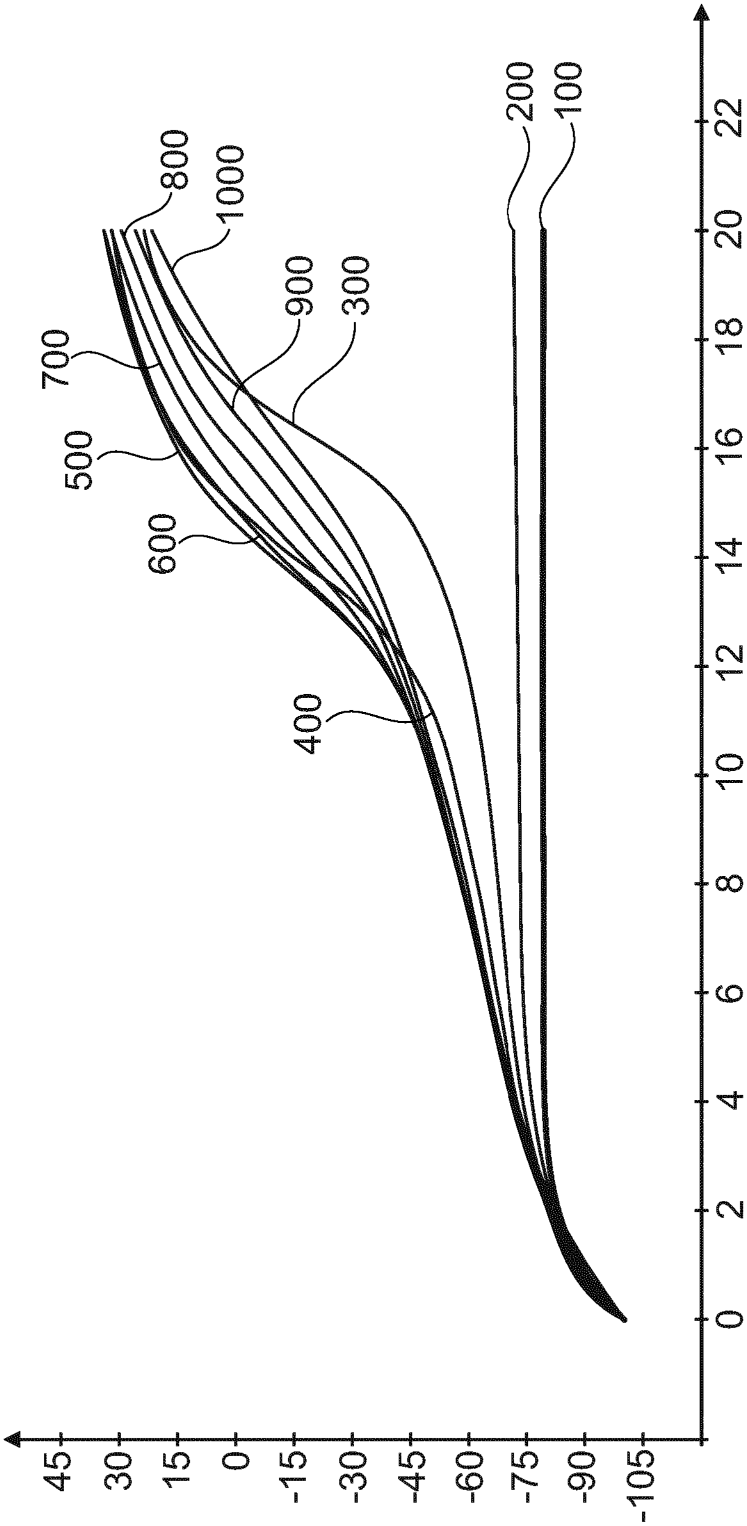
Figure 31C:
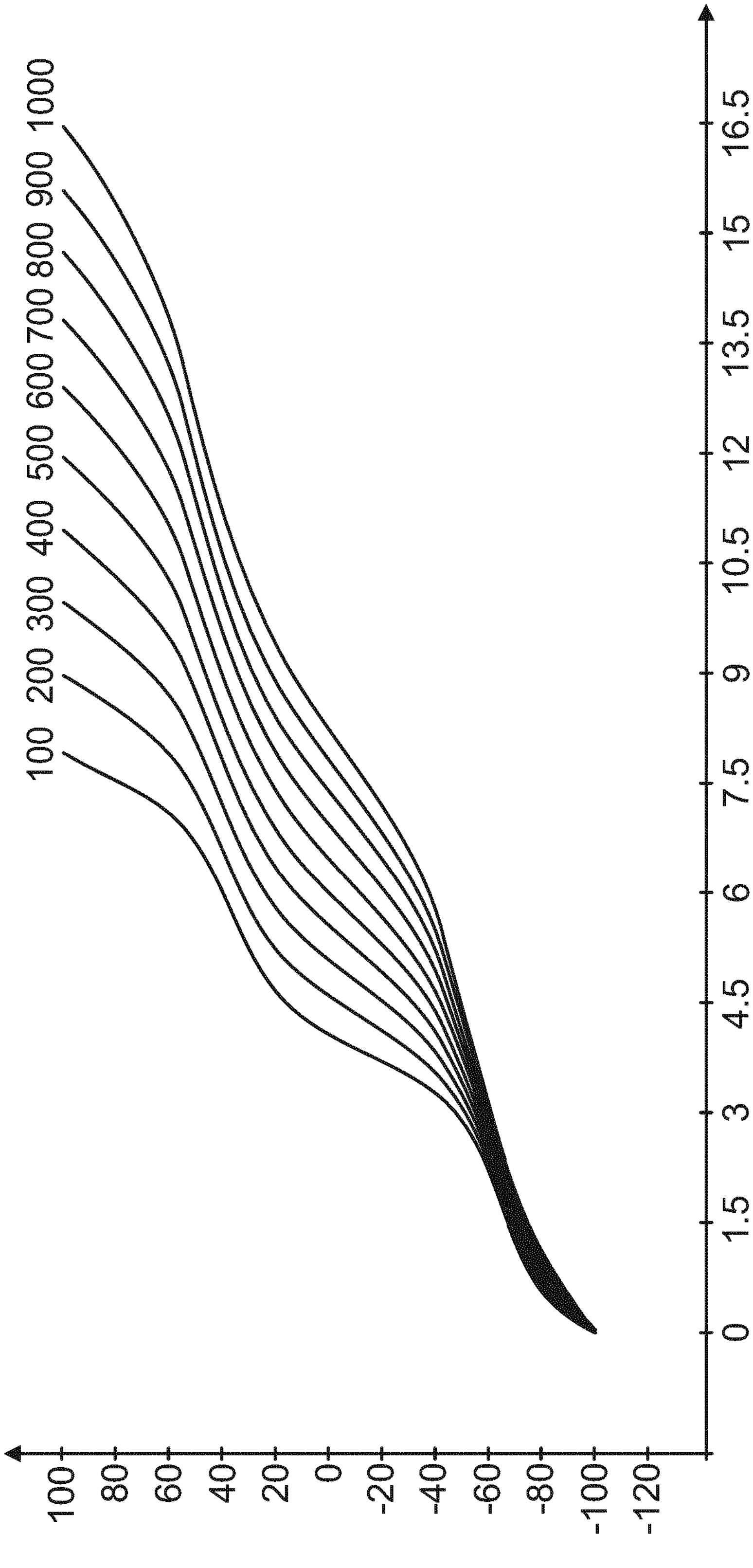
Figure 31D:
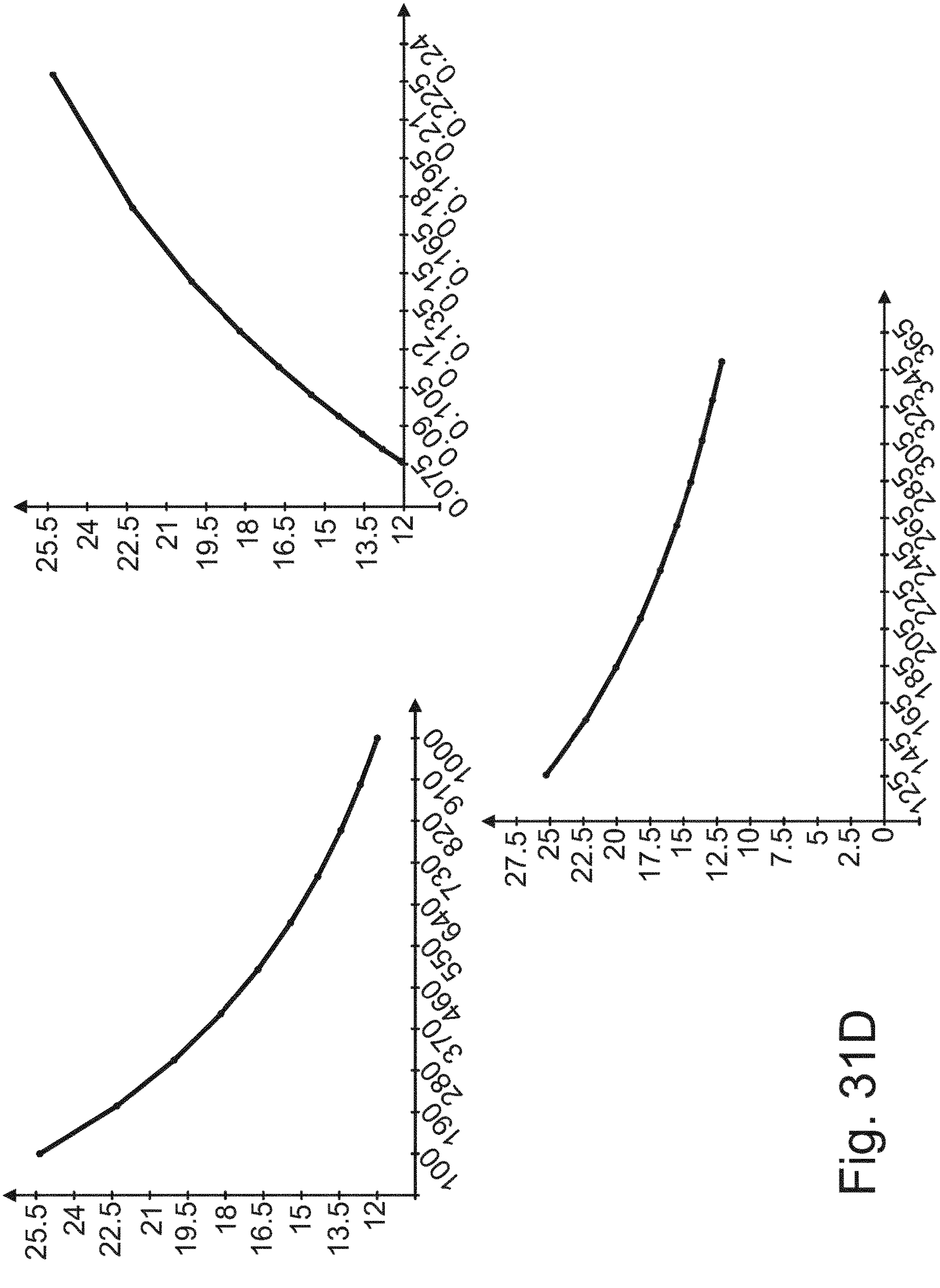
Figure 32A:
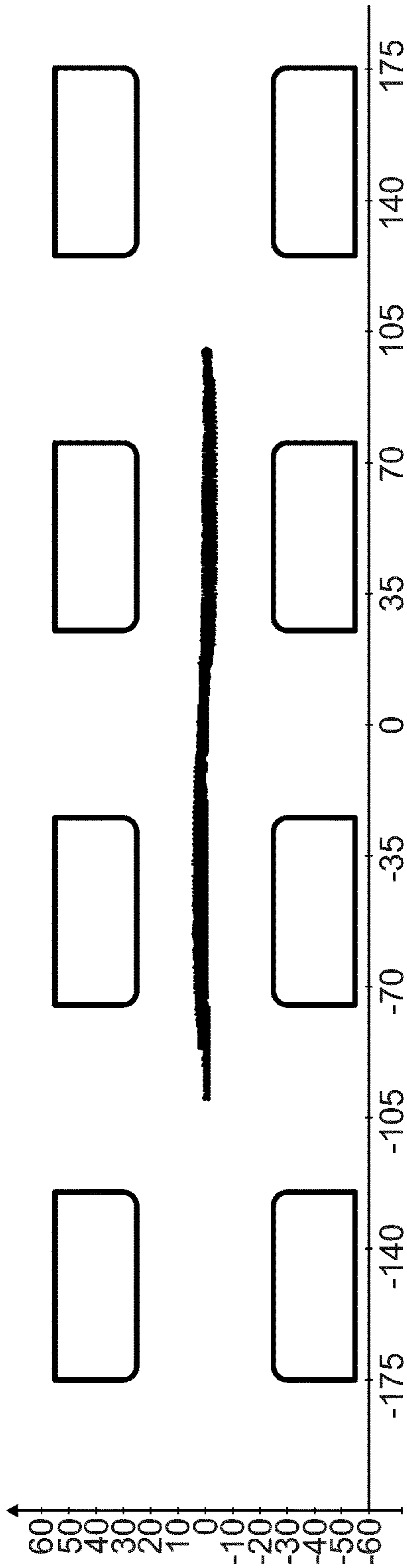
Figure 32B:
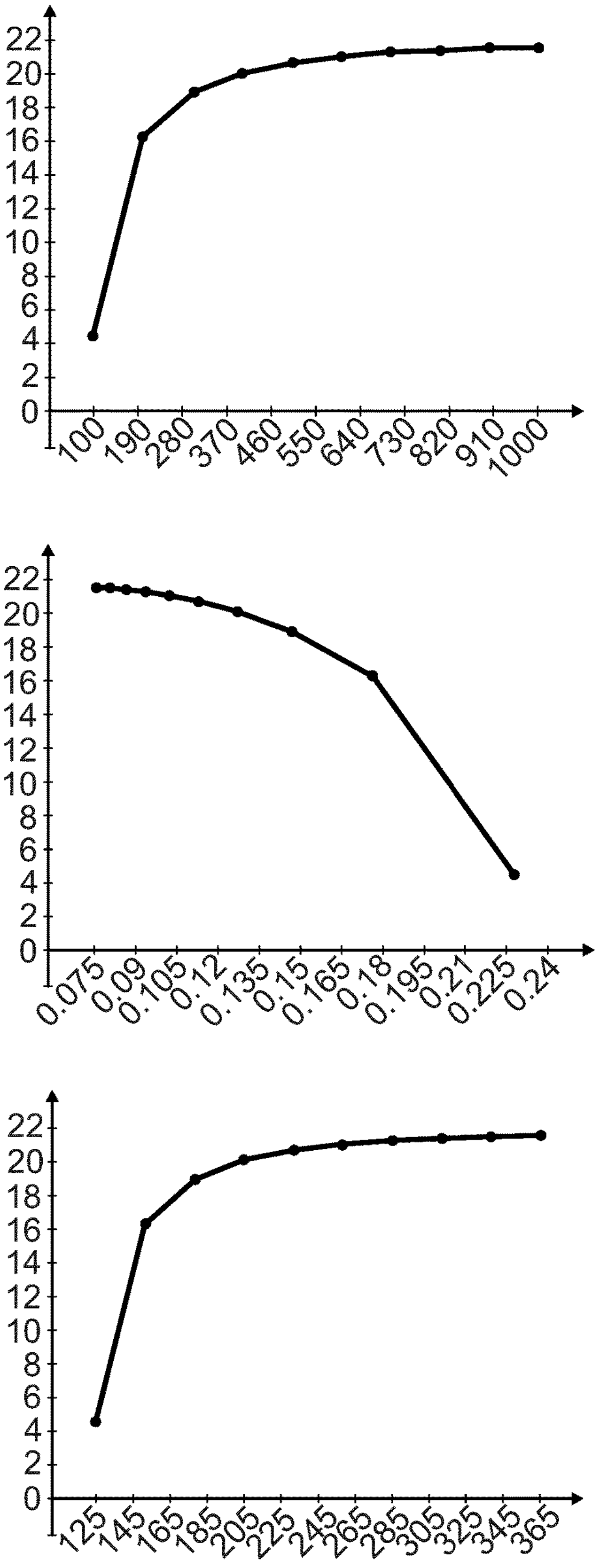
Figure 33A:
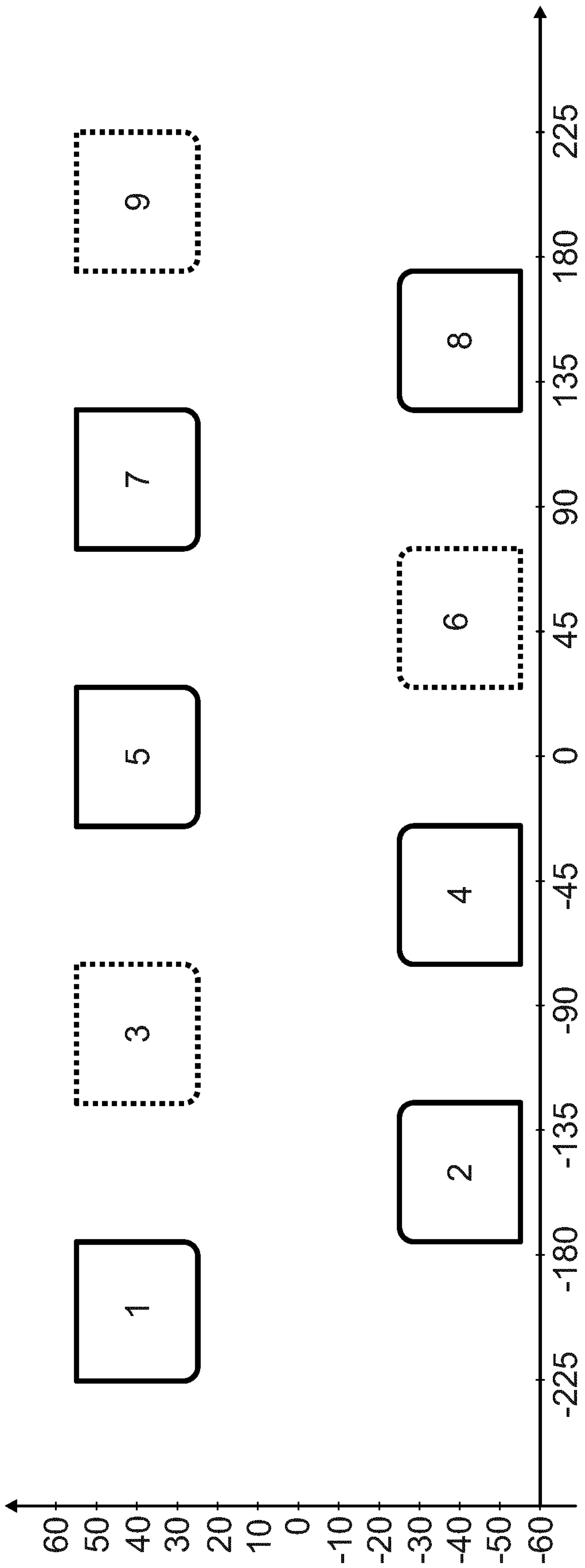
Figure 33B:
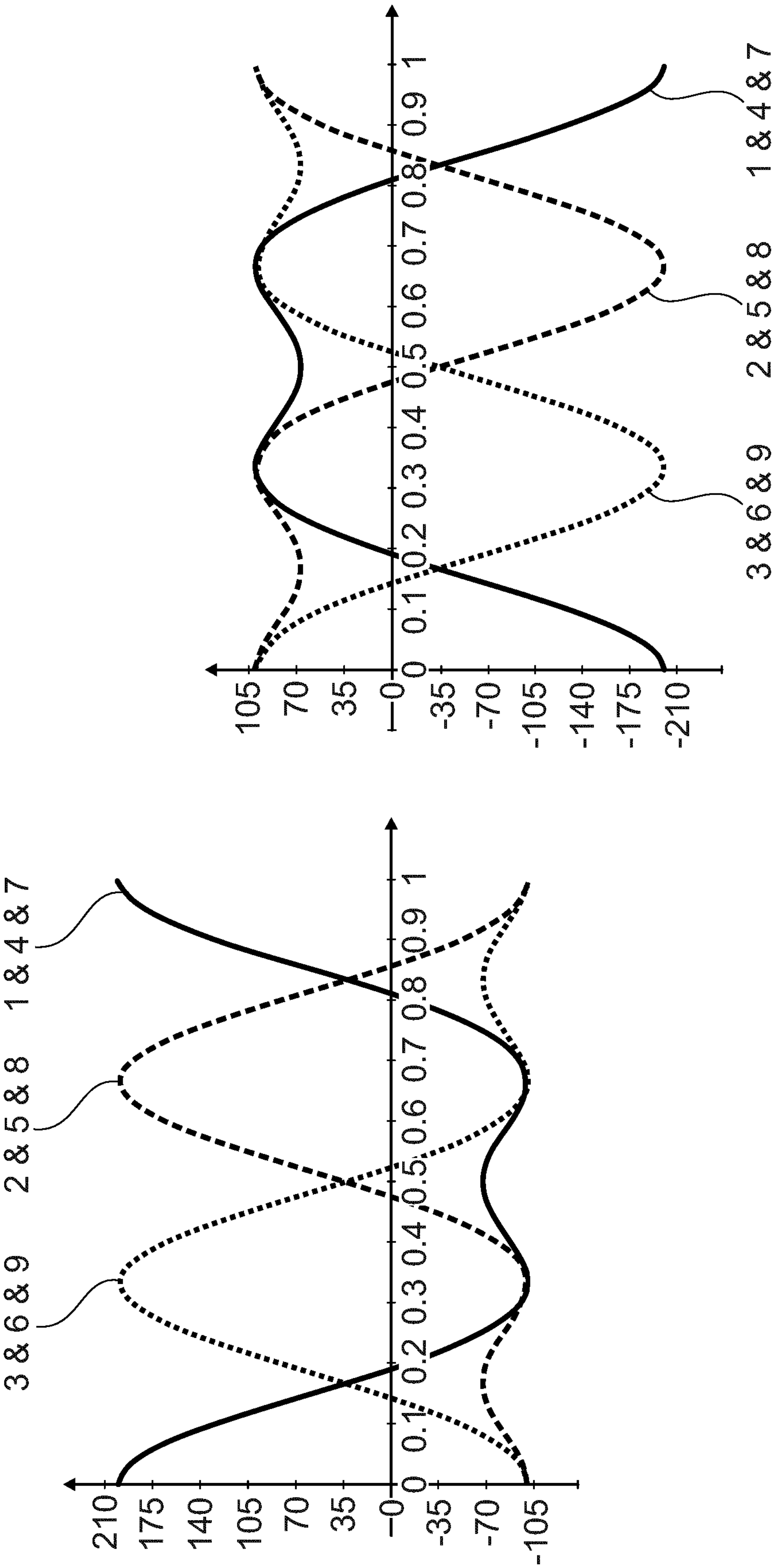
Figure 33D:
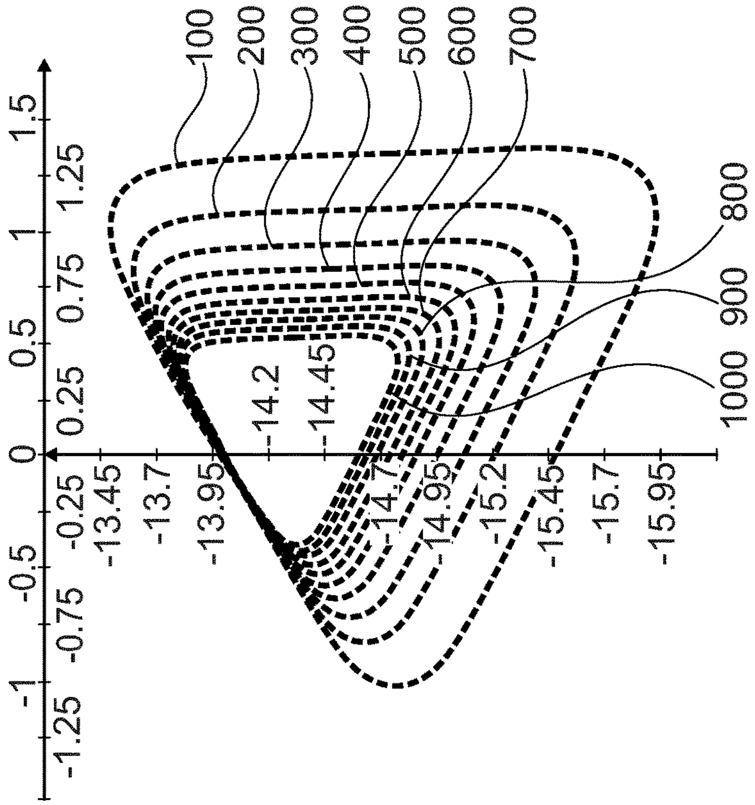
Figure 33C:
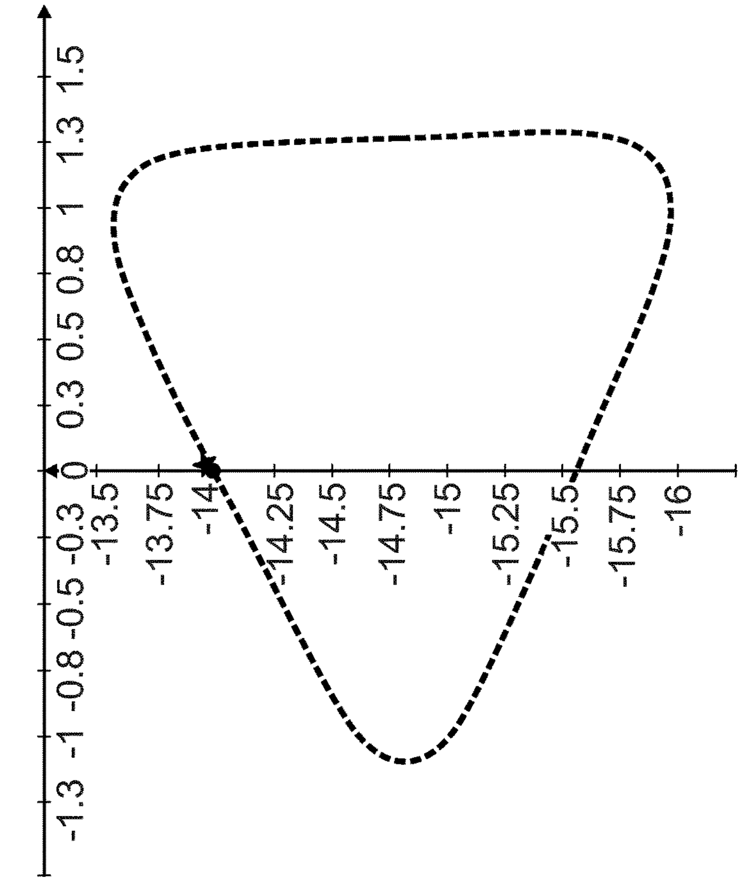
Figure 34:
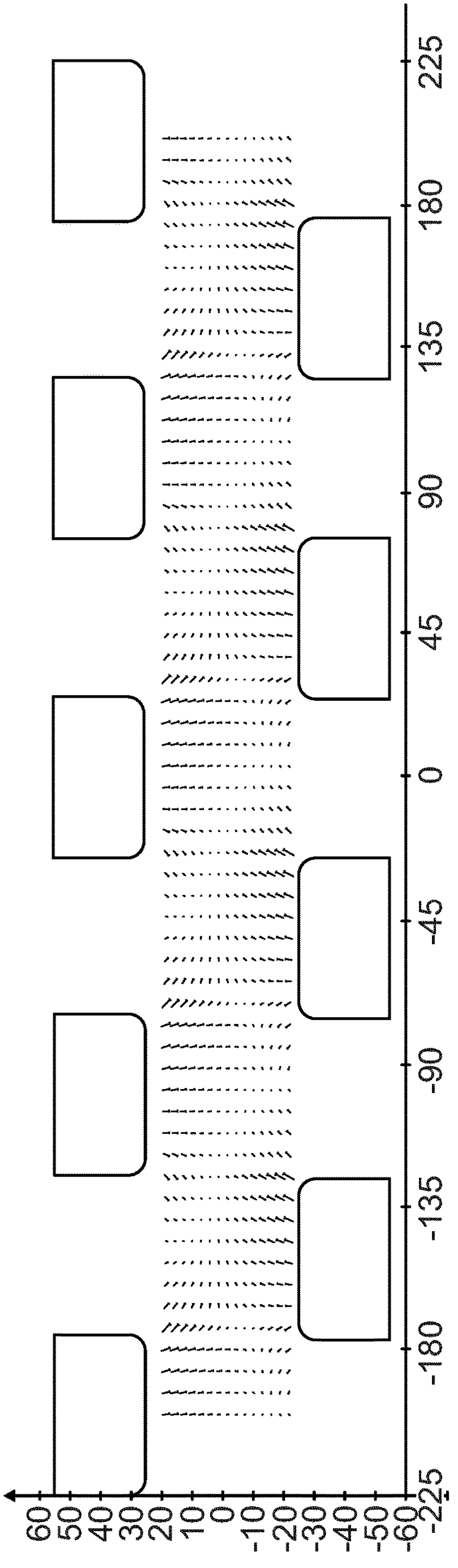
Figure 35:
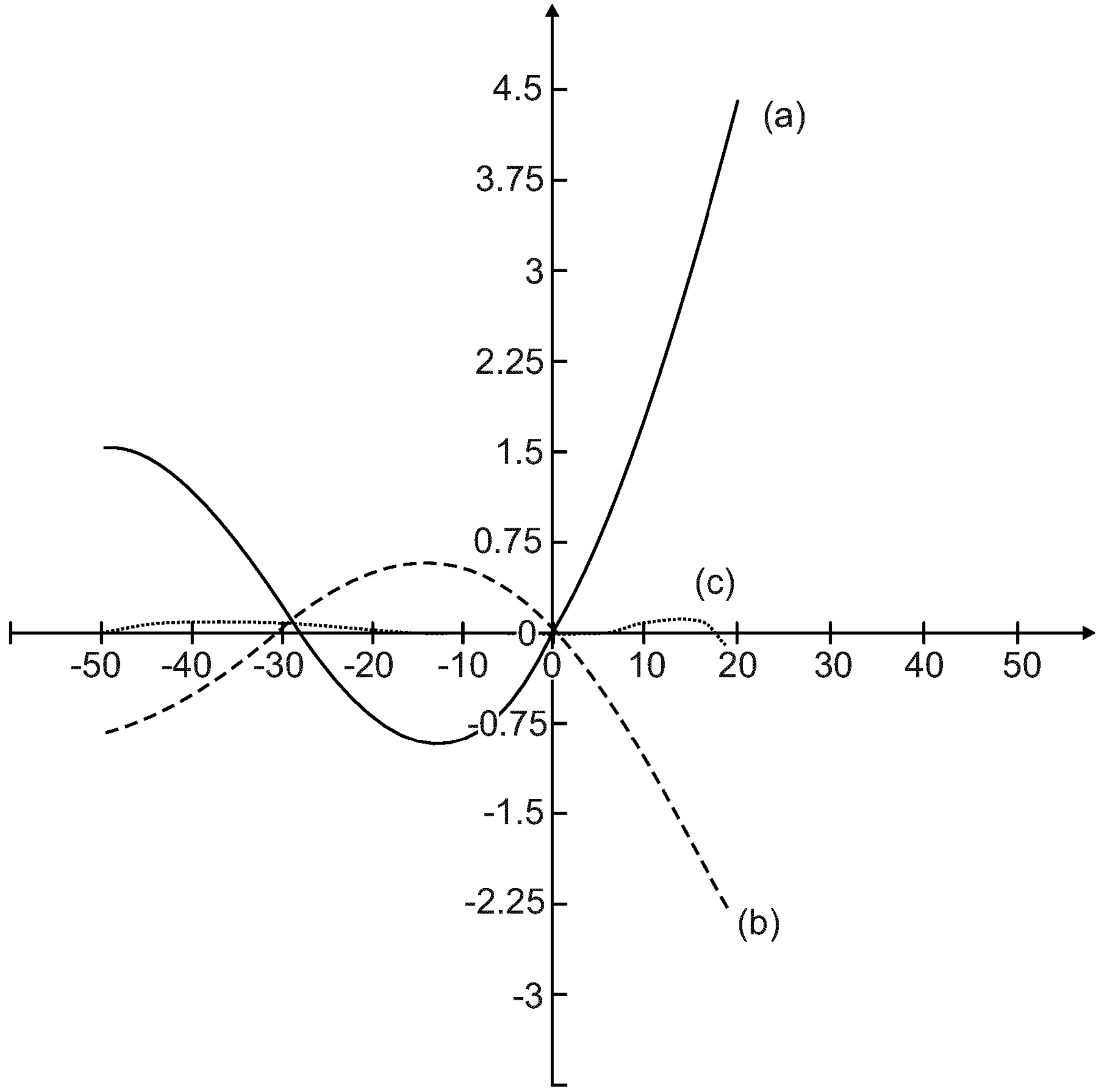
Figure 36A:
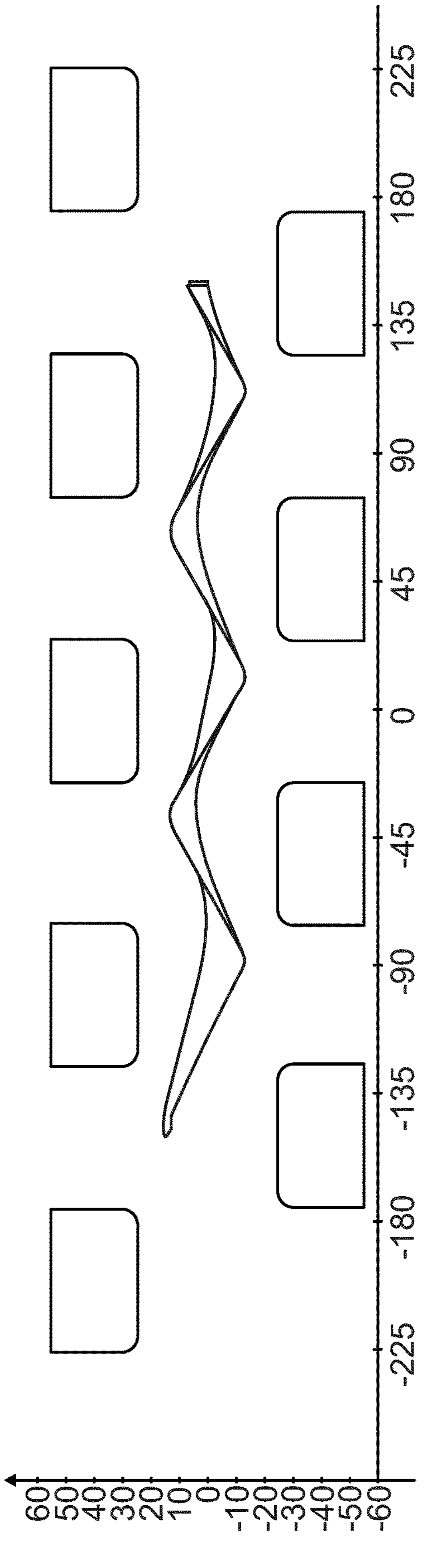
Figure 36B:
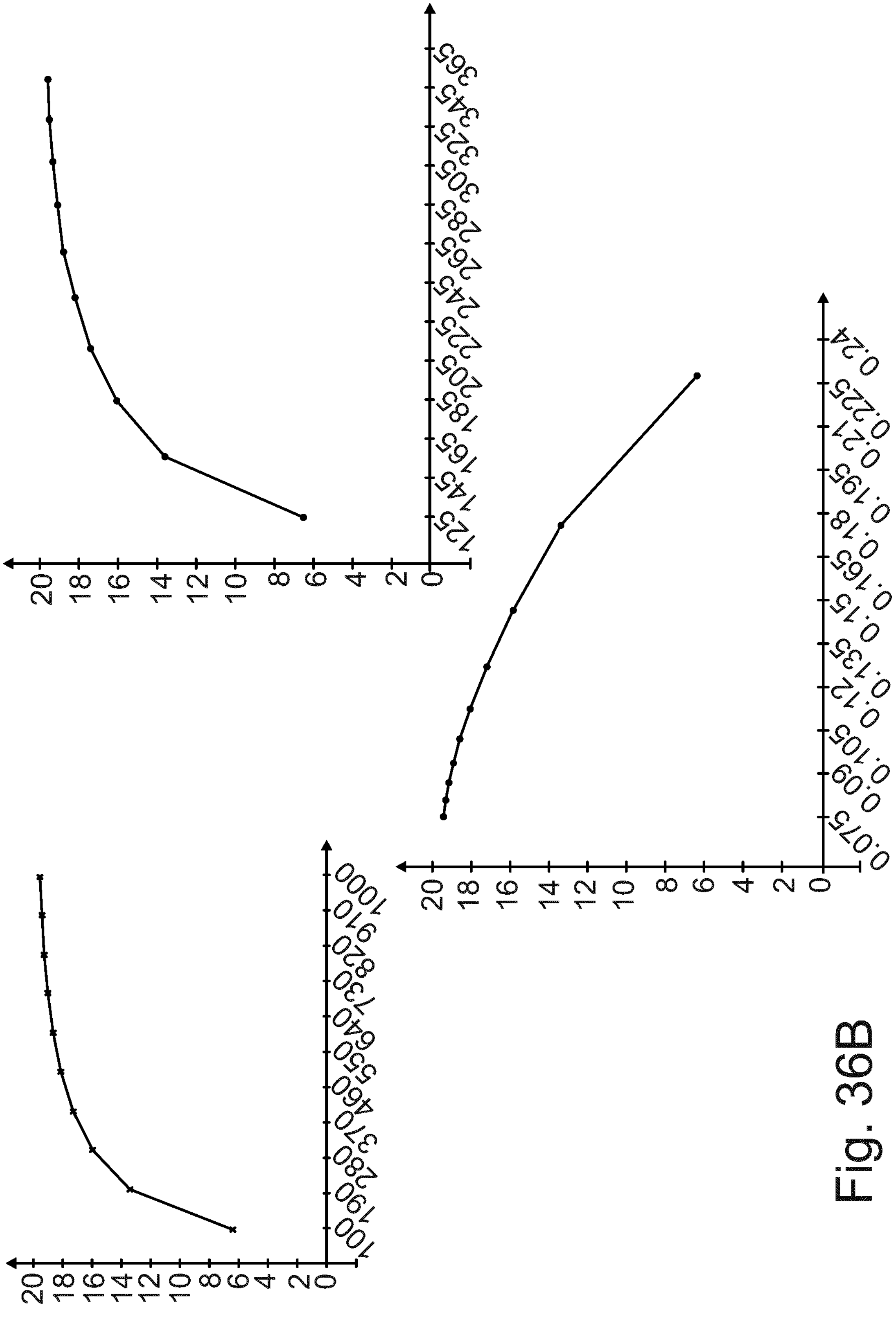
Figure 37A:
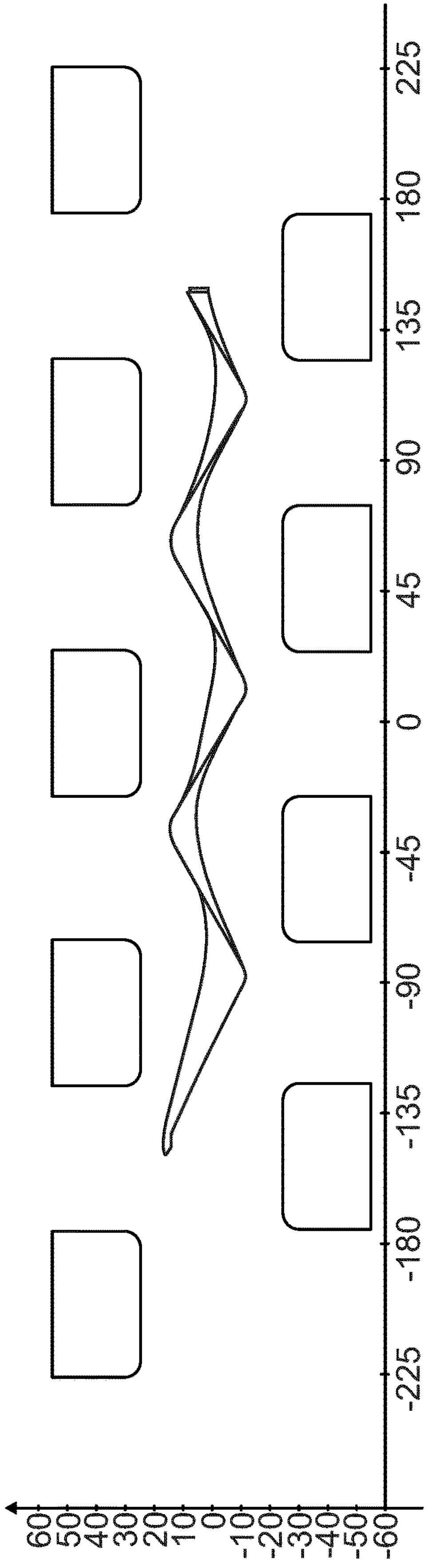
Figure 37B:
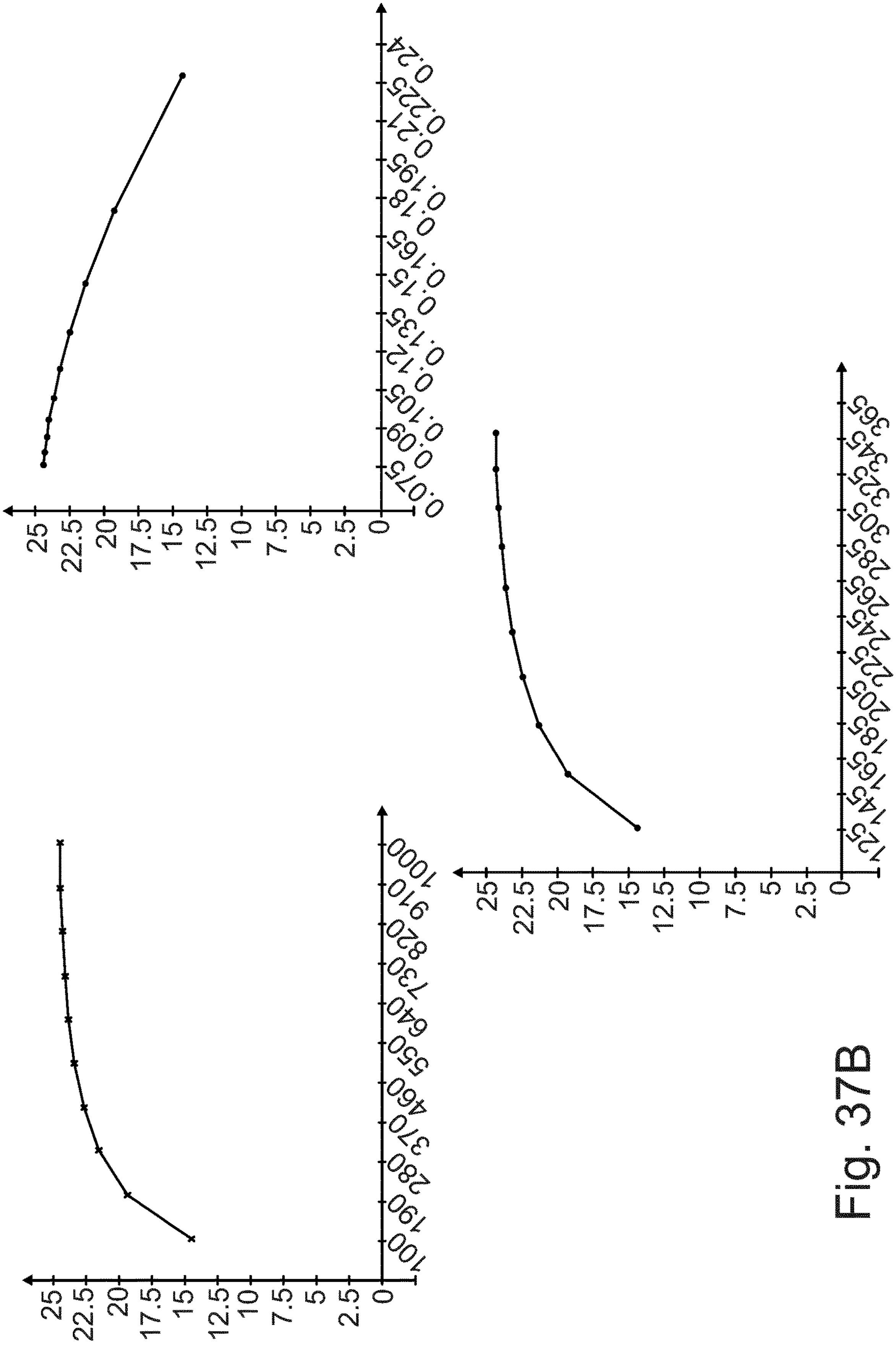

devices;

FIG. 23A schematically shows a cross-sectional view of a portion of an electrode structure in x-y space;

FIG. 23B shows voltage waveforms over one cycle of a base frequency and phases applied to corresponding electrodes in FIG. 23A;

FIG. 23C illustrates an average ion trajectory calculated over one cycle of a negative polarity voltage waveform of FIG. 23B applied with four-fold phase splitting to the electrode array of FIG. 23A;

FIG. 24 illustrates a vector field plot of the net or effective electric field experienced each cycle by type C ions of mass 100 Da in the electrode structure of FIG. 23A when the voltage waveforms of FIG. 23B are applied;

FIGS. 25A 25B show plots of effective potential against position experienced by ions along the two test lines of FIG. 8A in the electrode structure of FIG. 23A when negative polarity voltage waveforms of FIG. 23B are applied for singly charged ions of mass 100 Da (FIG. 25A) and 1000 Da (FIG. 25B);

FIG. 26 illustrates an average ion trajectory calculated over one cycle of a positive polarity voltage waveform of FIG. 23B applied to the electrode array of FIG. 23A;

FIGS. 27A and 27B show plots of effective potential against position, experienced by ions along the two test lines of FIG. 8A when positive polarity voltage waveforms of FIG. 23B are applied for singly charged ions of mass 100 Da (FIG. 27A) and 1000 Da (FIG. 27B);

FIG. 28A depicts voltage waveforms over one cycle of a base frequency, split into four phases applied to corresponding electrodes in FIG. 23A;

FIG. 28B schematically shows a cross-sectional view of a portion of the electrode structure of FIG. 23A with a test line to indicate where an effective potential is calculated;

FIGS. 29A and 29B show plots of effective potential against x-position experienced by ions along the test line of FIG. 28B when the potentials shown in FIG. 28A are applied;

FIGS. 30A and 30B show plots of effective potential against position experienced by ions along the test lines of FIG. 8A when three-term cosine RF negative polarity voltage waveforms are applied to the electrodes of FIG. 23A;

FIG. 30C shows plots of effective potential against x-position experienced by ions along the test line of FIG. 28B when three-term cosine RF negative polarity voltage waveforms are applied to the electrodes of FIG. 23A;

FIG. 31A depicts a plot of a time-invariant axial electric field strength against x position in the electrode array of FIG. 23A when a time-invariant voltage is applied to the electrodes along the array;

FIG. 31B shows a plot of axial distance travelled against time for average type C ions of different mass when both RF potentials with four-fold phase splitting and a lower voltage time-invariant potential are applied to the electrode array of FIG. 23A;

FIG. 31C shows a plot of axial distance travelled against time for average type C ions of different mass when both RF potentials with four-fold phase splitting and a higher voltage time-invariant potential are applied to the electrode array of FIG. 23A;

FIG. 31D shows plots of axial ion velocity against mass, mobility and collision cross section in the electrode structure of FIG. 23A;

FIG. 32A shows a plot of the average trajectory of singly charged type C ions in the electrode arrangement of FIG. 23A with a gas flow applied;

FIG. 32B shows plots of axial ion velocity against mass, mobility and collision cross section in the electrode structure of FIG. 23A with a gas flow applied having a velocity of 22 m/s in the positive x direction;

FIG. 33A depicts a cross sectional view of a portion of an array of tripoles formed from strip electrodes on aligned opposing substrates;

FIG. 33B shows voltage waveforms over one cycle of the base frequency and phases applied to corresponding electrodes in FIG. 33A;

FIG. 33C plots average ion trajectory for a single ion calculated over one cycle of the negative polarity voltage waveform of FIG. 33B;

FIG. 33D plots average ion trajectories for ions of different masses calculated over one cycle of the negative polarity voltage waveform of FIG. 33B;

FIG. 34 plots a vector field of effective electric field experienced each cycle by type C ions of mass 100 Da when waveforms according to FIG. 33B are applied to the electrode arrangement shown in FIG. 33A;

FIG. 35 plots effective potential against y position along a test line for ions of different mobility types when waveforms according to FIG. 33B are applied to the electrode arrangement shown in FIG. 33A;

FIG. 36A shows a plot of the average trajectory of singly charged type C ions in the tripole electrode arrangement of FIG. 33A with a gas flow applied having a velocity of 20 m/s in the positive x direction;

FIG. 36B shows plots of axial ion velocity against mass, mobility and collision cross section in the electrode structure of FIG. 33A under the conditions of FIG. 36A;

FIG. 37A shows a plot of the average trajectory of singly charged type C ions in the tripole electrode arrangement of FIG. 33A with a gas flow applied having a velocity of 25 m/s in the positive x direction; and FIG. 37B shows plots of axial ion velocity against mass, mobility and collision cross section in the electrode structure of FIG. 33A under the conditions of FIG. 37A.

DETAILED DESCRIPTION OF PREFERRED EMBODIMENTS

Approaches in accordance with the present disclosure improve ion repulsion and ion confinement at high pressure by utilising a differential mobility effect. Existing approaches suggest that ion repulsion and ion confinement can be achieved at high pressure due to a pseudo-potential effect. However, it has been recognised that the magnitude of this effect is much smaller than previously anticipated.

This may be because ion motion in gas at pressures approaching, including and exceeding atmospheric pressure (which is referred to herein as "high pressure"), is heavily damped due to ion-gas molecule collisions. The damping restricts the amplitude of oscillations that ions undergo in RF fields applied to multipole structures. Pseudo-potential effects rely upon the ion oscillations taking the ions into and out of higher field regions due to the field gradient, and the suppression of the ion oscillation amplitudes by ion-gas molecule collisions greatly reduces the pseudo-potential effect at high pressures. A second effect of the ion-gas molecule collisions at high pressure is that the phase shift between the ion velocity oscillation and the electric field oscillation is changed from a shift approaching-π/2 in vacuum to a shift tending towards zero in high pressure gas. This phase shift also supresses the pseudo-potential effect, the net field experienced by an ion over the oscillation cycle tending to zero as the phase shift tends to zero.

These issues with the pseudo-potential effect will firstly be discussed, before establishing the greater magnitude of a differential mobility effect and the combination of these two effects to improve ion repulsion and ion confinement at high pressure.

Pseudo-Potential Effects in Gas

Existing devices, including multipoles and planar multi-electrode structures, are driven with voltages of a sinusoidal waveform applied. They utilise pseudo-potential gradients to confine ions. Such gradients are sometimes also referred to as quasi-potentials or effective potentials. Herein, they shall be referred to as pseudo-potentials.

Pseudo-potential in vacuum is described by equation (1) below, where $E_0$ is the peak electric field of the oscillation cycle, w=2πf and f is the drive frequency, q is the charge on the ion and m is the ion mass. A pseudo-potential barrier requires a field gradient and does not utilise any variance in ion mobility that an ion might possess. For simplicity, and in accordance with use of the term in many existing publications, the term "pseudo-potential effect" is used herein as being the effect on an ion of a symmetrical oscillating electric field which has a field gradient, but which does not require or take any advantage of the presence of any velocity-dependent mobility variance. The field gradient is required, so that the difference in field experienced by the ion as it oscillates provides a net electric field over each oscillation cycle, from which the pseudo-potential gradient is derived.

$$V = \frac{q}{m} \cdot \frac{|E_0|^2}{4 \cdot \omega^2}. \quad (1)$$

The pseudo-potential effect is attenuated in the presence of a dense gas. The attenuation depends upon the collision rate and the energy loss of the ion due to the collisions with gas molecules. Tolmachev et. al. (Nucl. Instr. and Meth. in Phys. Res. B 124 (1997) 112-119) derived a factor, y, to apply to the pseudo-potential in vacuum in order to obtain the pseudo-potential in the gas (equation (2) below), under the assumption that ion velocity was low such that T is not dependent on ion velocity:

$$\gamma = \frac{\omega^2 \cdot \tau^2}{1 + \omega^2 \cdot \tau^2}, \quad (2)$$

where T is the relaxation time of the particular ion in the gas. The relaxation time is the time it takes the ion to slow from an initial velocity in the gas by a factor 1/e. (This is not the mean time between collisions, as is sometimes incorrectly stated in some publications.) In a gas, the pseudo-potential is then given by equation (3):

$$V = \frac{\omega^2 \cdot \tau^2}{1 + \omega^2 \cdot \tau^2} \cdot \frac{q}{m} \cdot \frac{|E_0|^2}{4 \cdot \omega^2}. \quad (3)$$

The relaxation time is related to the ion's mobility, μ, by equation (4):

$$\tau = \frac{m}{q} \cdot \mu. \quad (4)$$

Equation (4) above is especially considered valid under conditions where the ion velocity remains smaller than the Maxwellian average thermal velocity of the gas molecules, which is approximately 1.35 times the speed of sound in the gas. Such conditions prevail in practical embodiments and the simulation results presented herein (subject to mobility variance, which causes variation in the relaxation time, as discussed below).

Mobility is pressure dependent. The attenuation of the pseudo-potential is therefore also pressure dependent.

At high ion velocities, the relaxation time is not a constant but is a function of the ion's velocity, since the mobility will vary if that velocity approaches the speed of sound in the gas. The attenuation factor γ therefore also varies under these conditions.

The attenuation is in part due to the smaller ion oscillation amplitude due to the damping effect of the gas, which takes the ion across a smaller field gradient, and is also in part due to the phase difference between ion velocity and electric field becoming smaller as the result of frequent collisions. At low pressures, the phase difference approaches-π/2; in a dense gas, the phase difference tends towards zero at low drive frequencies. When the phase difference is-π/2, the pseudo-potential effect is at its maximum; when the phase shift equals zero, there is no pseudo-potential effect. The phase difference depends, amongst other things, upon the density of the gas and also on the drive frequency.

Pseudo-Potential Plateau as a Function of Frequency

In a dense gas, at low enough drive frequencies where $\omega^2T^2<<1$, $\gamma \sim \omega^2T^2$. With this approximation and equation (4) above, equation (3) above is then described by equation (5) below and the pseudo-potential is seen to be independent of drive frequency. This is the maximum pseudo-potential that can be derived in high pressure gas for any frequency for the ion in question. At higher drive frequencies, the pseudo-potential falls as a result of the $1/\omega^2$ term. Once in the regime described by equation (5), lowering the drive frequency does not result in a greater pseudo-potential, but it does produce larger ion oscillation amplitudes.

$$V = \frac{m}{q} \cdot \mu^2 \cdot \frac{|E_0|^2}{4}. \quad (5)$$

Note that in equation (5), q/m is inverted compared to the vacuum regime of equation (1) above. Equation (5) shows that the pseudo-potential follows the product of mass-to-charge ratio and mobility-squared and does not follow q/m as in vacuum (equation (1)). The product of mass-to-charge ratio and mobility squared varies across the mass range and with ion species. Typically, singly charged ions below ~250 Da have a low product of mass and mobility squared and are more difficult to confine using pseudo-potential when the gas pressure is high (approaching atmospheric pressure).

The attenuation is substantial and pseudo-potential at atmospheric pressure is low, requiring very high electric fields to be sufficient to confine ions. In high fields, the ion velocity is a substantial fraction of the speed of sound in the gas and mobility varies with the ion velocity. This understanding is utilised and further developed in the present disclosure.

As noted above, attempts suggested in U.S. Pat. No. 8,299,443 B1 and U.S. Pat. No. 9,053,915 B2 to increase the pseudo-potential at high pressures by operating them at very high electric strengths, have effects not recognised by those publications. At the high electric fields and the operating pressures proposed in these documents, the ion velocity for part of the electric field cycle is sufficiently high that the ion mobility is no longer invariant. These changes to the ion mobility affect the pseudo-potential (equation (5) above), as will be described below.

Differential Mobility Effect

With a time-varying electric field, the variance of mobility as ion velocity approaches the speed of sound in the gas can be used to give the ions a net velocity over each cycle, if the electric field experienced by the ion is asymmetric.

Figure 1:
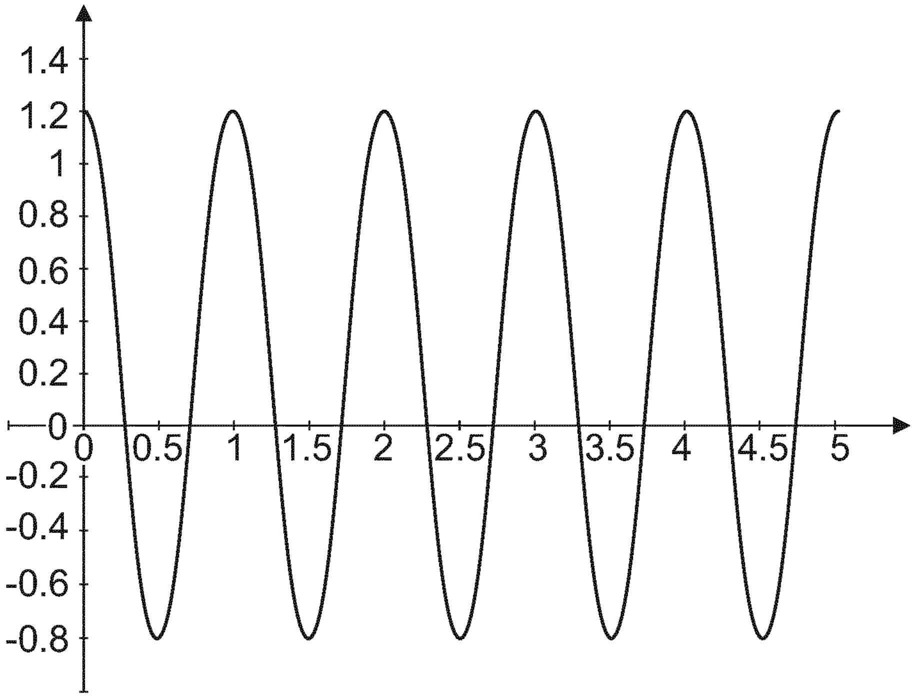
FIG. 1 shows a first example of an asymmetric waveform.

Referring to FIG. 1, there is shown a first example of an asymmetric waveform. An electric field waveform such as that shown in FIG. 1 is asymmetrical, but this waveform is formed from a symmetrical waveform (cosine) with an offset added. This will cause all ions of a given charge polarity to acquire a net velocity over the cycle in the same direction, with a magnitude which is related to their ion mobility and to the magnitude of the electric field offset. If the peak electric field and the prevailing pressure is sufficient to cause the ion velocity to approach the speed of sound in the gas, ions having the same low velocity mobility but having differing mobility variance will travel at different average velocities in the field, but they will all travel in the same direction. The total area under the waveform over each cycle is non-zero.

Figure 2:
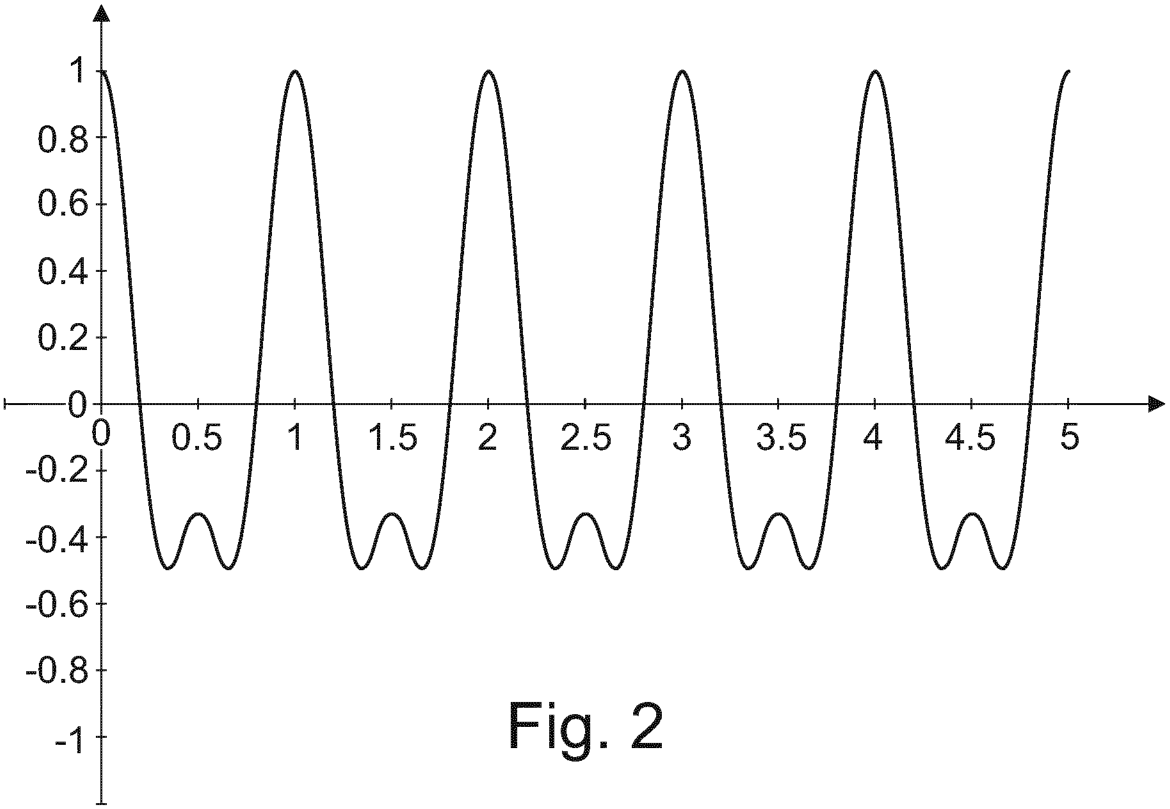
FIG. 2 shows a second example of an asymmetric waveform.

Thus, the form of the asymmetry may be relevant. Referring next to FIG. 2, there is shown a second example of an asymmetric waveform. An electric field waveform such as that shown in this drawing is asymmetrical, but the total area under this waveform in each cycle is zero. The waveform is described by the two-term cosine in equation (6):

$$wv1(t,\phi)=\frac{2}{3}\cdot\left(\cos(2\cdot\pi\cdot f\cdot t+\phi)+\frac{1}{2}\cdot\cos(2\cdot(2\cdot\pi\cdot f\cdot t+\phi))\right). \tag{6}$$

This waveform has an asymmetry that has different proportions of the cycle given to the two opposite polarities. This asymmetric waveform applies a large field in one direction (first polarity) for a small proportion of the cycle and a smaller field in the opposite direction (second polarity) for a larger proportion of the cycle. The smaller and larger proportions of time and electric field magnitudes are chosen so that the area under the waveform (electric field strength multiplied by time) is zero over a cycle. This is achieved, for example, with the waveform shown in FIG. 2 and equation (6). This electric field waveform causes ions of the same charge polarity to acquire a net velocity over the cycle, but now the net velocity for some of those ions is in the opposite direction from the net velocity of others of the same charge polarity, because the magnitude and polarity of the net velocity is dependent not upon the ion mobility but upon the mobility variance with velocity.

The waveform of equation (6) and FIG. 2 is formed of two cosine terms and has a ratio of peak heights of opposing polarity of 2:1. Other forms of asymmetrical waveforms can be produced using multiple cosine terms. Equation (7a) below describes a three-term cosine waveform with a ratio of peak heights of opposing polarity of 3:1, and equation (7b) below describes the general case for a ratio of peak heights of opposing polarity of $N_{ratio}$.

$$wv2(t,\phi)=\frac{1}{2}\cdot\left(\cos(2\cdot\pi\cdot f\cdot t+\phi)+\frac{2}{3}\cdot\cos(2\cdot(2\cdot\pi\cdot f\cdot t+\phi))+\frac{1}{3}\cdot\cos(3\cdot(2\cdot\pi\cdot f\cdot t+\phi))\right) \tag{7a}$$

$$wv(t,\phi)=\frac{N_{ratio}}{\sum_{n=1}^{N_{ratio}} n}\cdot\sum_{n=1}^{N_{ratio}}\left(\frac{n}{N_{ratio}}\cdot\cos((N_{ratio}-n+1)\cdot((2\cdot\pi\cdot f)\cdot t+\phi))\right). \tag{7b}$$

Figure 3:
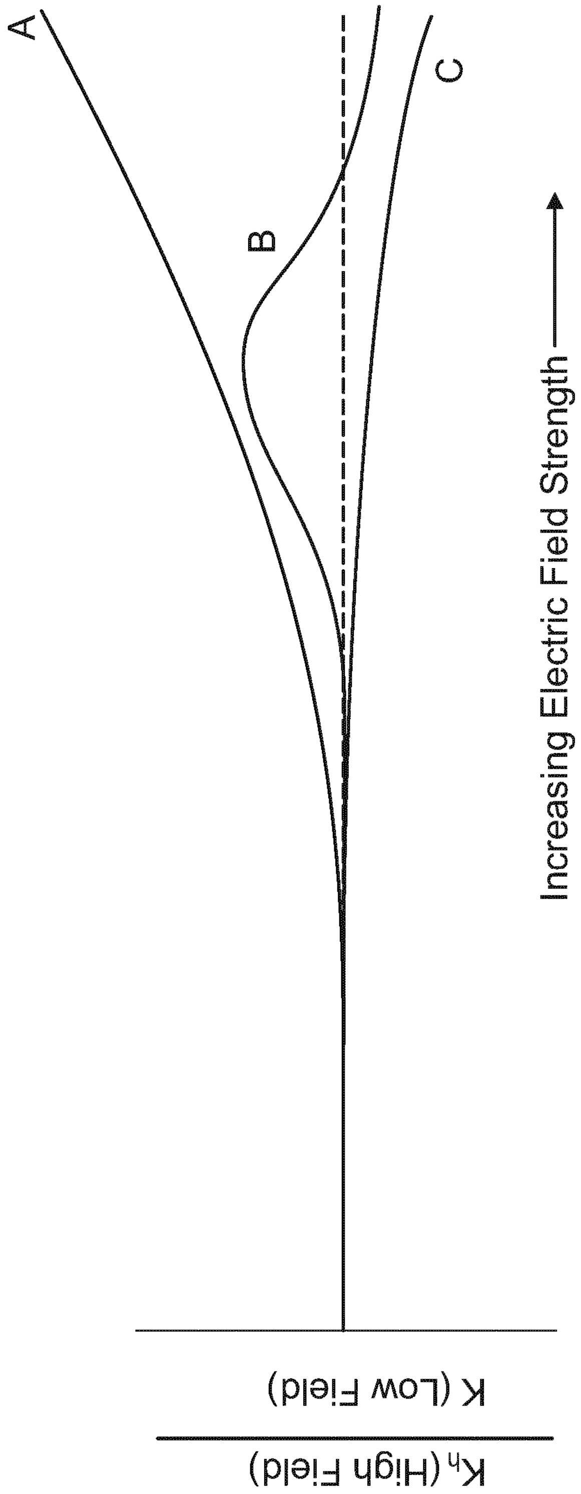
FIG. 3 depicts plots showing a ratio of high field mobility to low field mobility against electric field strength for three different types of ion.

Reference is now made to FIG. 3, in which there are depicted plots showing a ratio of high field mobility to low field mobility against electric field strength for three different types of ion. This is based on a drawing that appeared in Guevremont et. al. Int. J. Mass Spectrom., 193 (1999) pp. 45-56. Mobility variance at high velocity has been classified as one of three types, which some have denoted as types A, B and C. The net velocity given to an ion having type C mobility variance has the opposite direction and possibly a different magnitude than the net velocity given to an ion of type A mobility variance, even though the ions have the same charge polarity. The net velocity is produced by an asymmetric electric field waveform, because although the ions are accelerated by the electric field, they attain a different velocity depending upon their mobility. Thus, an ion travels a first distance in a first direction when there is a large field in one direction for a small proportion of the cycle. However, the ion travels a second distance, different from the first distance, in the second opposite direction when there is a smaller field in the opposite direction for a larger proportion of the cycle. This is because the ion mobility changes with electric field strength, if the field is sufficient to give the ions a velocity that is a substantial fraction of the velocity of sound in the gas. Ions of type C mobility variance travel a smaller distance in the first direction than they do in the second, opposite, direction. Conversely, ions of type A mobility variance travel farther in the first direction than they do in the second direction.

Type B ions having characteristics as shown in FIG. 3 appear, at the onset of the varying ion mobility, to behave in the same way as ions of type A, displaying an increase in ion mobility with increasing electric field strength. Only at still higher electric field strengths does the mobility reach a peak and then decline. It is possible that many and possibly all ions of type A reach a peak in ion mobility and then decline if they experience sufficiently high electric field strengths. A decline in ion mobility is a natural result of the increased frequency of collisions as ion velocity rises.

This difference due to the ion mobility variance at high velocity (the differential ion mobility) is used in Field Asymmetric Ion Mobility Spectrometry (FAIMS) to separate ions. The net velocity an ion attains over each cycle due to this effect is referred to herein as a “differential mobility effect”. This effect demands: (1) the ions have a mobility which varies with ion velocity (probably all ions possess this property to some degree); (2) the ions experience some form of asymmetric electric field over each cycle, the asymmetry being such that the peak field is higher than average when at one polarity and lower than average when at the opposite polarity; and (3) the peak electric field is high enough at the pressure concerned to cause the ion velocity to exceed a substantial fraction of the speed of sound in the gas, so that for some of the cycle the ion mobility is not constant.

More generally in the field of ion mobility spectrometry, a sufficient field strength to cause the differential mobility effect to occur is referred to as a "high field". Conversely, the high field may be understood a field strength that is sufficiently high: to cause a non-linear dependence of ion mobility; and/or such that the mobility of ions is dependent on the field strength. This is typically at least $10^6$ V/m, although mobility variance with electric field may start to occur for some ion species in fields as low as $2.5\times10^5$ V/m (Viehland, Guevremont, Purves & Barnet, Int. J. Mass Spectrom. 197 123-130 2000). For example, this is discussed in "Ion Mobility Spectrometry", G. A. Eiceman, Z. Karpas, Second Edition, CRC Press, 23 Jun. 2005, section 2.5 ("Dependence of Mobility on Electric Field").

As noted above, the differential mobility effect is utilised in a flat plate FAIMS analyser. This analyser comprises two parallel flat plate electrodes, (as in a capacitor). If the analyser has plates having dimensions much larger than the gap between the plates (for instance, at least 10%, 20%, 25%, 50% or 100% larger), the field strength away from the plate edges is substantially invariant with position and there is no field gradient. One plate of the analyser is provided with an asymmetric voltage waveform, which may be a rectangular waveform, or, as described herein, a waveform of similar shape to that in FIG. 2 and described by equation (6) above. The other plate is held at a constant potential, which may be ground. The electric field waveform is derived from the difference in voltages across the plates and hence is also asymmetric and of the form as shown in FIG. 2. If the electric field strength is sufficiently high, ions having type C mobility variance experience a net drift velocity towards one of the plates and ions having type A mobility variance experience a net drift velocity towards the opposite plate. The charge polarity of both types of ions is the same but the net drift velocity is in opposite directions. Application of a constant bias voltage to either of the plates can be used to give all the ions an offset drift velocity (as described above in connection with the offset in FIG. 1). This can be used to balance the net velocity due to the differential mobility effect of only some of the ions, allowing them to remain in the gap between the plates and not strike the electrodes. A band-pass filter can thereby be formed, the bandpass being selected using the DC offset.

The pseudo-potential effect and differential mobility effect have thus far been described separately, but it can immediately be recognised that the two effects interact. Consequently, the motion of ions can be controlled by both effects together. Conversely, it is possible to confuse the two effects.

Differential Mobility Affects Pseudo-Potential Effect.

The differential mobility effect requires a mobility variance with ion velocity and does not require any field gradient. Nevertheless, the presence of a field gradient can cause an ion to undergo an asymmetric electric field over a cycle. The pseudo-potential changes due to changing ion mobility with ion velocity, as has already been noted in relation to equation (5) above. Now, it can be seen that a net drift velocity is induced in ions by an asymmetric electric field acting on the ions, derived from a symmetrical electric field waveform plus a field gradient—as long as the field is sufficient to induce ion velocities approaching the speed of sound in the gas for a proportion of the cycle.

This affects the pseudo-potential effect. The pseudo-potential effect does not require any mobility variance, but the presence of ion mobility variance when the applied field strengths are sufficiently high at the prevailing pressure causes changes to the net drift velocity and hence the pseudo-potential, the changes coming from the differential mobility effect.

The two effects can therefore be distinguished by modelling in the same field otherwise identical ions that have no mobility variance. Any net motion per cycle of these ions can only be due to the pseudo-potential effect. Subtracting the net motion of these ions from the motion of ions that do possess mobility variance reveals the net drift velocity due to this differential mobility effect alone. This simulation technique for separating out the different effects of the pseudo-potential and differential ion mobility is only useful if there is a field gradient. In the flat plate analyser described above, the pseudo-potential effect does not occur and pseudo-potential is zero because there is no field gradient.

Limited Pseudo-Potential Well Formed at Atmospheric Pressure

Known devices that utilise pseudo-potential to confine ions at high pressures include multipoles (for example, U.S. Pat. No. 8,362,421 B2) and opposing substrates having a plurality of strip electrodes formed on each substrate (for example, U.S. Pat. No. 10,014,167 B2, U.S. Pat. No. 8,835,839 B1, WO-2017/062102 A1, U.S. Pat. No. 8,841,611 B2, U.S. Pat. No. 9,245,725 B2, U.S. Pat. No. 8,299,443 B1, U.S. Pat. No. 8,067,747 B2, U.S. Pat. No. 9,053,915 B2). Strip electrodes are often aligned on the opposing substrates and as such can form an array of multipole devices and hence are not dissimilar to the multipoles contemplated by U.S. Pat. No. 8,362,421 B2. The operation of such devices will now be discussed based on modelling and simulation.

Figure 4A:
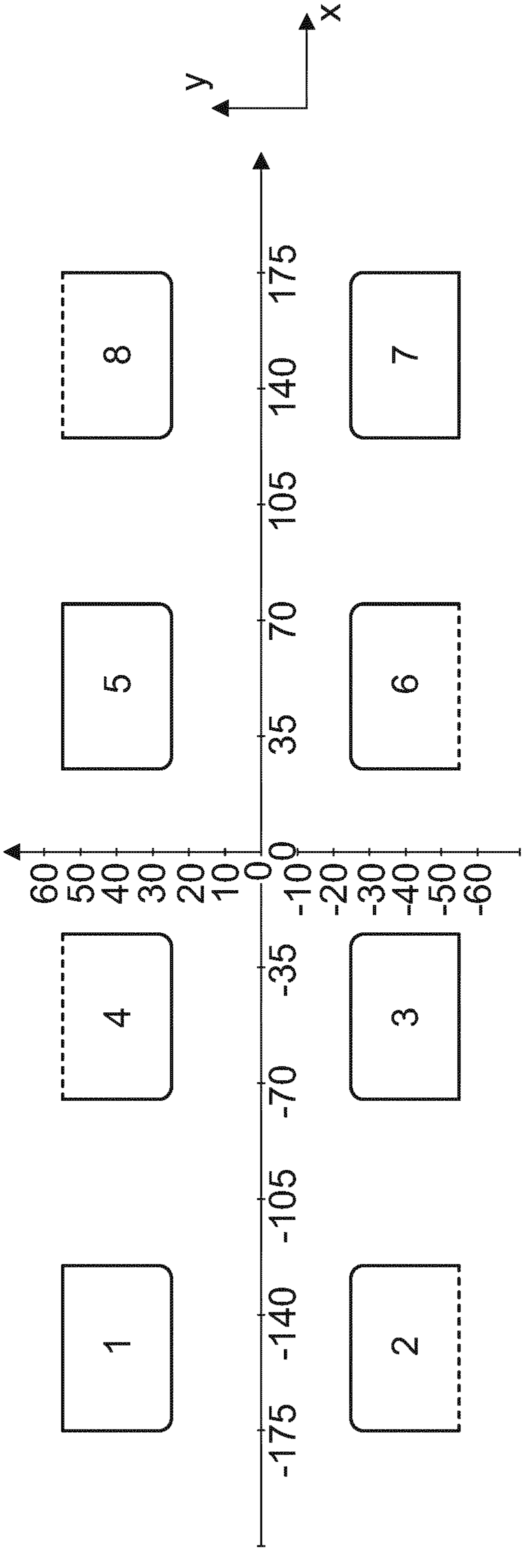
FIG. 4A schematically depicts a portion of an array of strip electrodes.

Referring now to FIG. 4A, there is schematically depicted a portion of an array of strip electrodes. The electrodes are shown in two opposing rows: in each row, four electrodes are evenly distributed along the x-direction; and the two rows are separated in the y-direction, such that pairs of electrodes are aligned in the x-direction. Units on this drawing should be understood in μm. The two rows of electrodes are considered mounted on respective parallel substrates (not shown). The electrodes are shown in cross-section, being strips running into and out of the paper, in what is termed herein as the z-direction.

Sinusoidal RF voltages applied to the electrodes are split in phase, adjacent electrodes having a phase shift of 180 degrees applied. The strip electrodes are 50 μm wide (in the x-direction) with rounded corners of radius 3.5 μm, the gap between adjacent electrodes on the same substrate is 50 μm and the electrode height (in the y-direction) is 30 μm. The gap between the opposing strip electrode surfaces on opposing substrates is 50 μm. Unless otherwise stated, the ion motion simulations herein are for positively charged ions in air at atmospheric pressure (101325 Pa) and room temperature (293 K).

As an example, a sinusoidal voltage waveform of 100 V zero-to-peak voltage at 60 MHz is applied to the electrodes of FIG. 4A, being split into two phases 180 degrees apart, and with different phases (that is, of the same waveform with some phase shift, but not different polarities) applied to alternate electrodes on both substrates. Electrodes labelled 1, 4, 5 and 8 are on the upper substrate, and electrodes labelled 2, 3, 6 and 7 are on the lower substrate. The waveform applied to electrodes on the lower substrate is 180 degrees out of phase with the waveform applied to the corresponding electrodes (that is, those directly opposite) on the upper substrate.

Figure 4B:
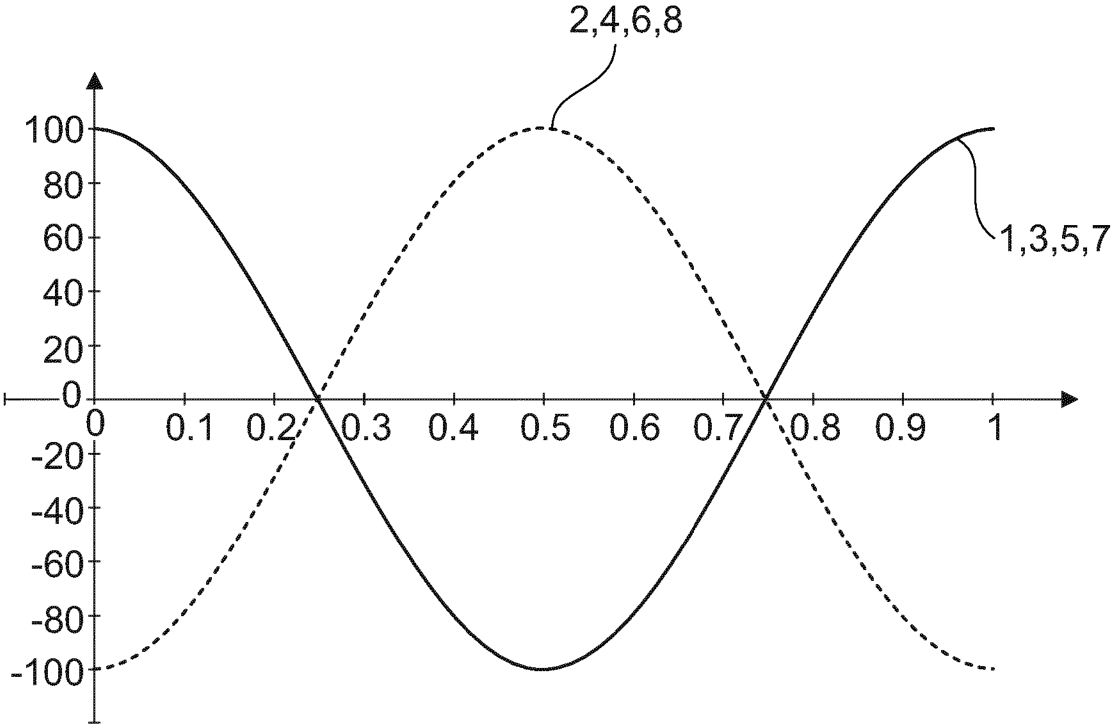
FIG. 4B shows voltage waveforms applied to corresponding electrodes in FIG. 4A.

Referring to FIG. 4B, there are shown voltage waveforms applied to corresponding electrodes in FIG. 4A. The electrodes labelled 1, 3, 5, 7 in FIG. 4A all have one phase applied and the electrodes labelled 2, 4, 6, 8 have the other phase applied. By modelling this arrangement, it can be seen that the peak electric field in a region between the electrodes is $4\times10^6$ V/m, which at atmospheric pressure and room temperature is sufficient to drive singly charged ions below some hundreds of Da in mass above the speed of sound in the gas.

Figure 5A:
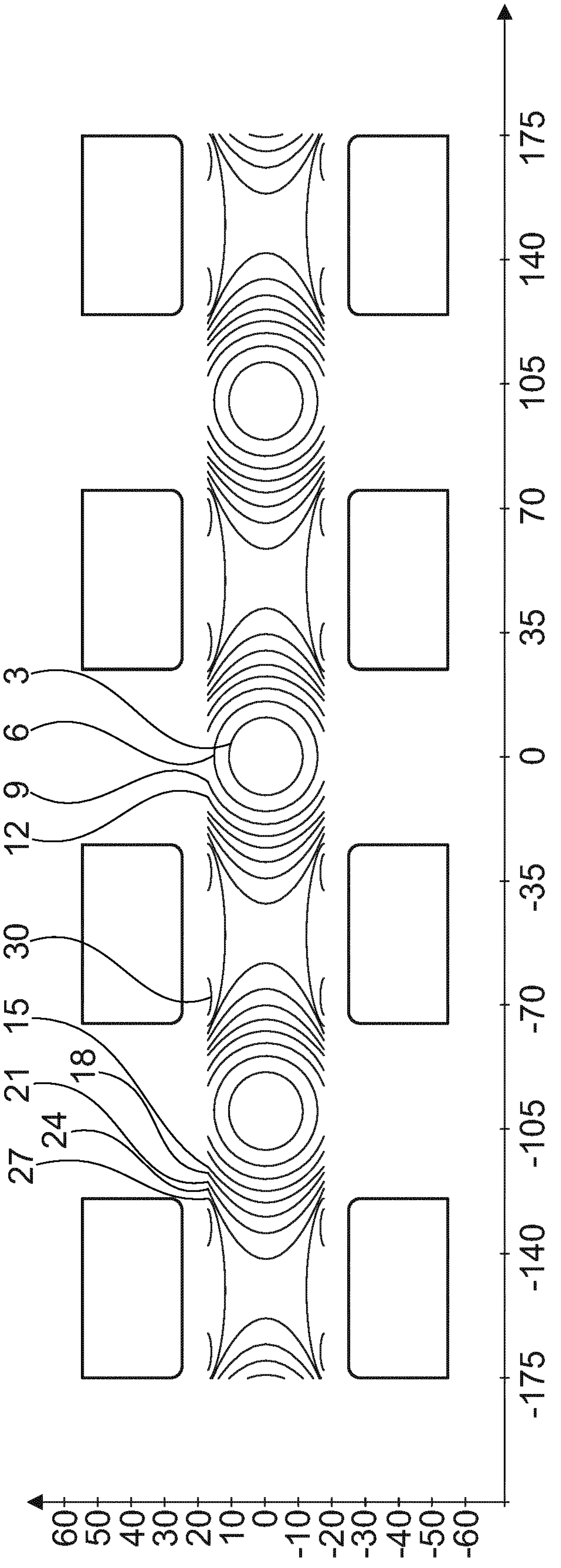
FIG. 5A shows a contour plot of pseudo-potential in a vacuum within the structure of FIG. 4A for an ion of 100 Da.

Referring next to FIG. 5A, there is shown a contour plot of pseudo-potential (in Volts) in a vacuum within the structure of FIG. 4A. The electrodes are shown in x-y space (μm). The pseudo-potentials are calculated using equation (1) above, for a singly charged positive ion of mass 100 Da, when the sinusoidal voltage waveform of FIG. 4B is applied. The potential wells that are created are some 30 V deep. The ion mobility and any invariance it might have is not relevant for the calculation of the pseudo-potential in vacuum.

Figure 5B:
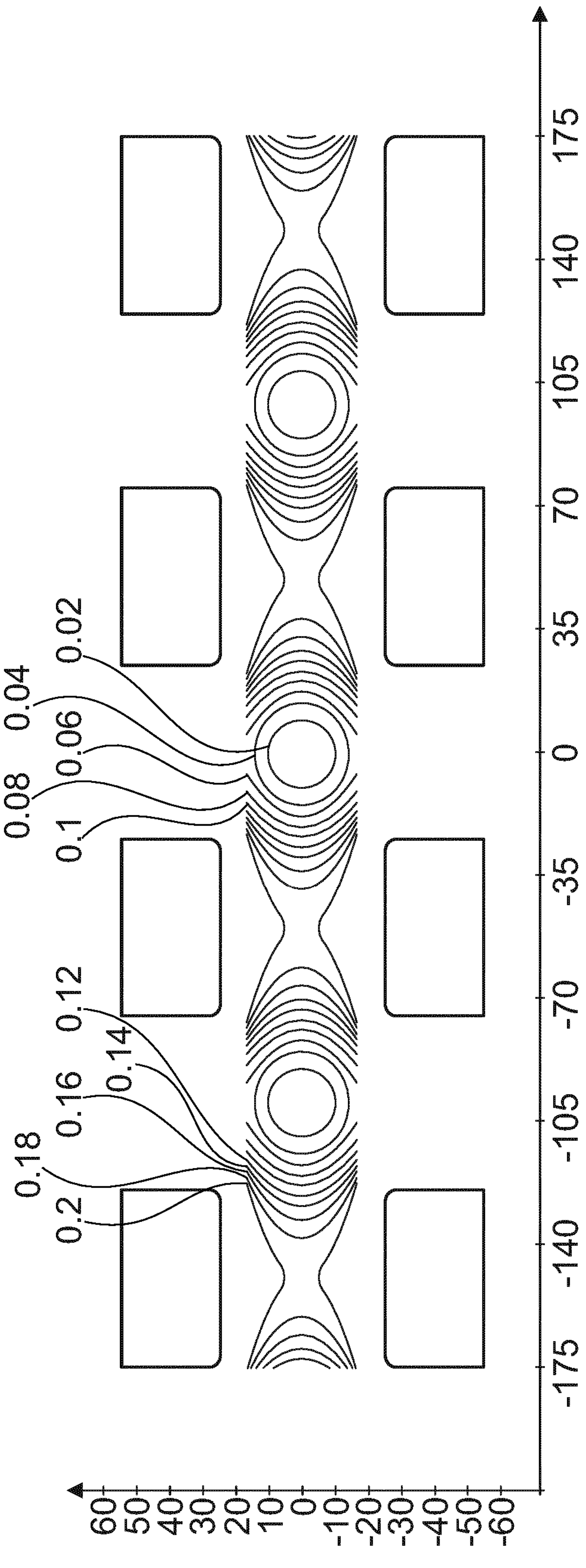
FIG. 5B shows a contour plot of pseudo-potential in air at atmospheric pressure and room temperature within the structure of FIG. 4A for an ion of 100 Da.

Now referring to FIG. 5B, there is shown a contour plot of the pseudo-potential (in Volts) in air at atmospheric pressure and room temperature for an ion of the same mass to charge ratio as shown in FIG. 5A, when the sinusoidal voltage waveform of FIG. 4B is applied. This ion has invariant mobility with velocity. The pseudo-potential is calculated using equation (3) above, where the attenuation factor γ (equation (2) above) is therefore taken to be a constant. The attenuation is a factor of about 1/150.

Figure 5C:
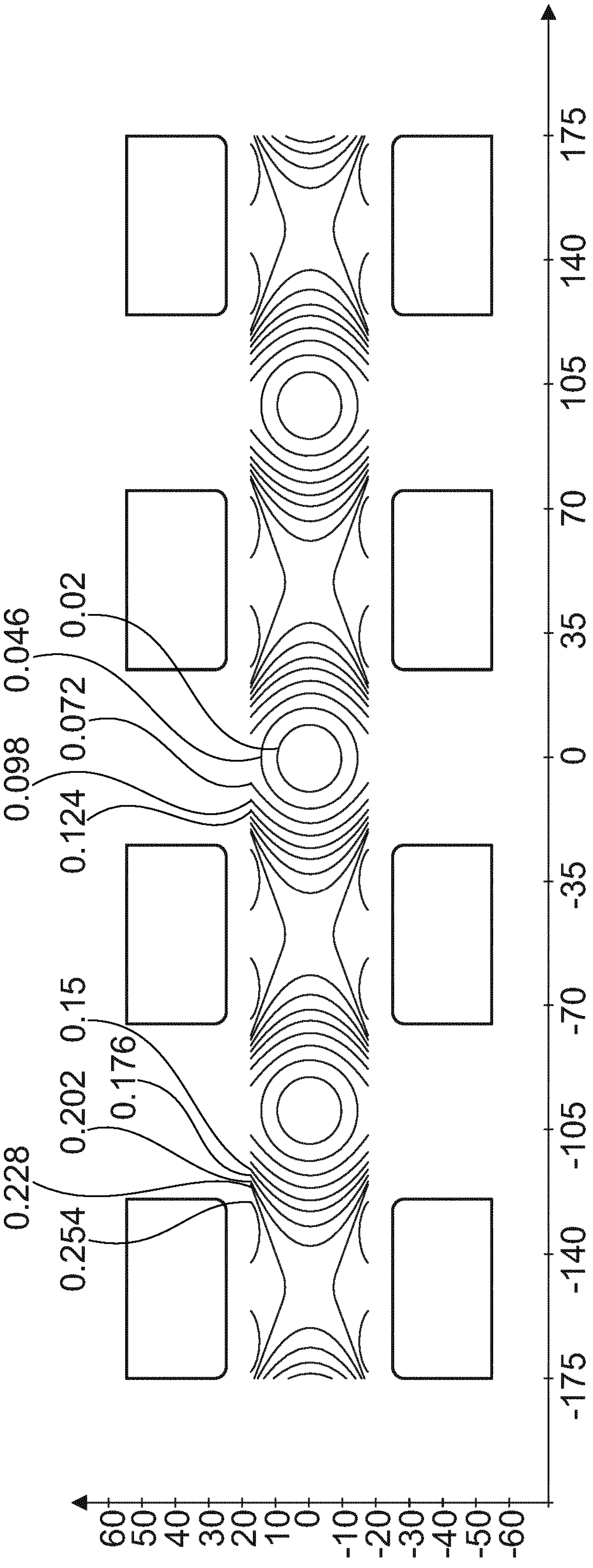
FIG. 5C shows a contour plot of pseudo-potential in air at atmospheric pressure and room temperature within the structure of FIG. 4A for an ion of 1000 Da.

Next referring to FIG. 5C, there is shown a contour plot of the pseudo-potential (in Volts) in air at atmospheric pressure and room temperature for an ion of 1000 Da, when the sinusoidal voltage waveform of FIG. 4B is applied. Thus, this is an equivalent plot to that in FIG. 5B, but for a singly charged ion of mass 1000 Da. The ion has mobility that is invariant with ion velocity. The pseudo-potential well is notably deeper for this higher mass ion, as expected from the discussion in relation to equation (5) above. Lower mass ions are not well-confined using the pseudo-potential effect in air at atmospheric pressure and room temperature. This severely limits transmitted current as space charge effects or even diffusion force ions over the barrier onto the electrodes.

Figure 6:
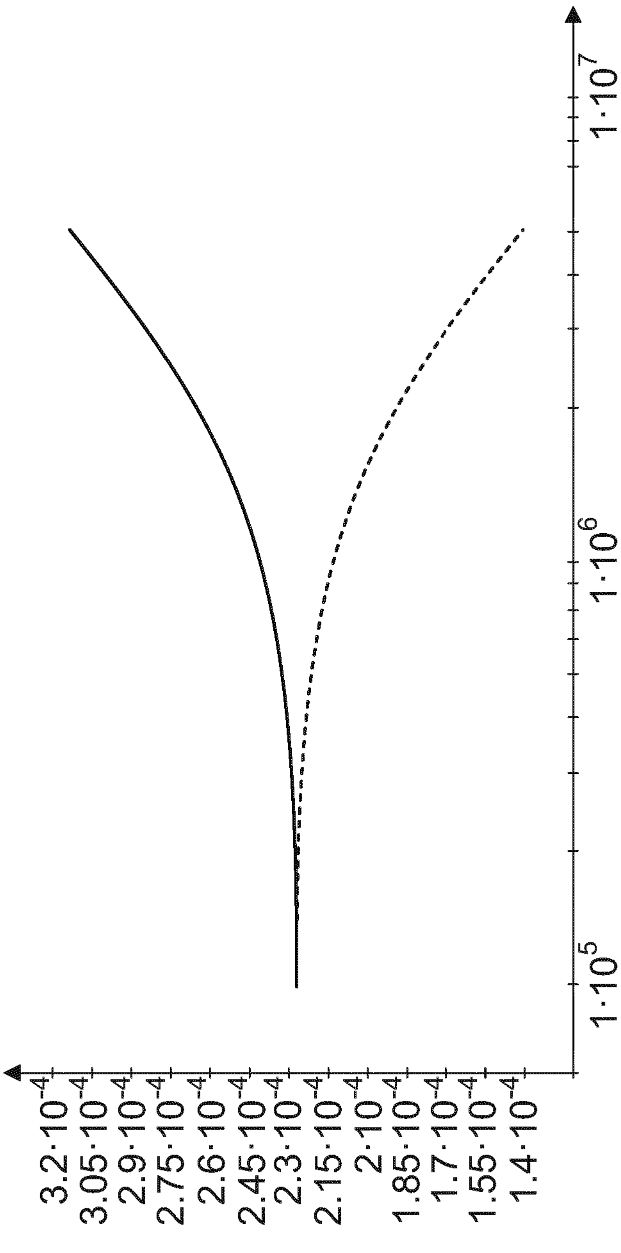
FIG. 6 depicts plots of ion mobility against electric field strength for ions of types A and C mobility variance.

Referring to FIG. 6, there are depicted plots of ion mobility ($m^2$/V·s) against electric field strength (V/m) for ion of types A and C mobility variance. These plots assume singly charged ions of mass 100 Da and diameter $9.08\times10^{-10}$ m in air at room temperature and atmospheric pressure. As described above, at the field strengths utilised at the prevailing pressure and temperature, ion velocities will be such as to cause mobility variance over parts of the waveform applied, especially for the more mobile low mass ion species. As shown in FIG. 6, the ion mobility of an ion of type C mobility variance is a consequence of an increased ion-gas molecule collision rate (reduced mean time between collisions) as ion velocity approaches and exceeds the speed of sound in the gas, for elastic collisions. A simulated type A mobility variance is also shown, derived from the inverse of type C variance, and is the result of a decreased ion-gas molecule collision rate with increasing ion velocity.

Figure 7A:
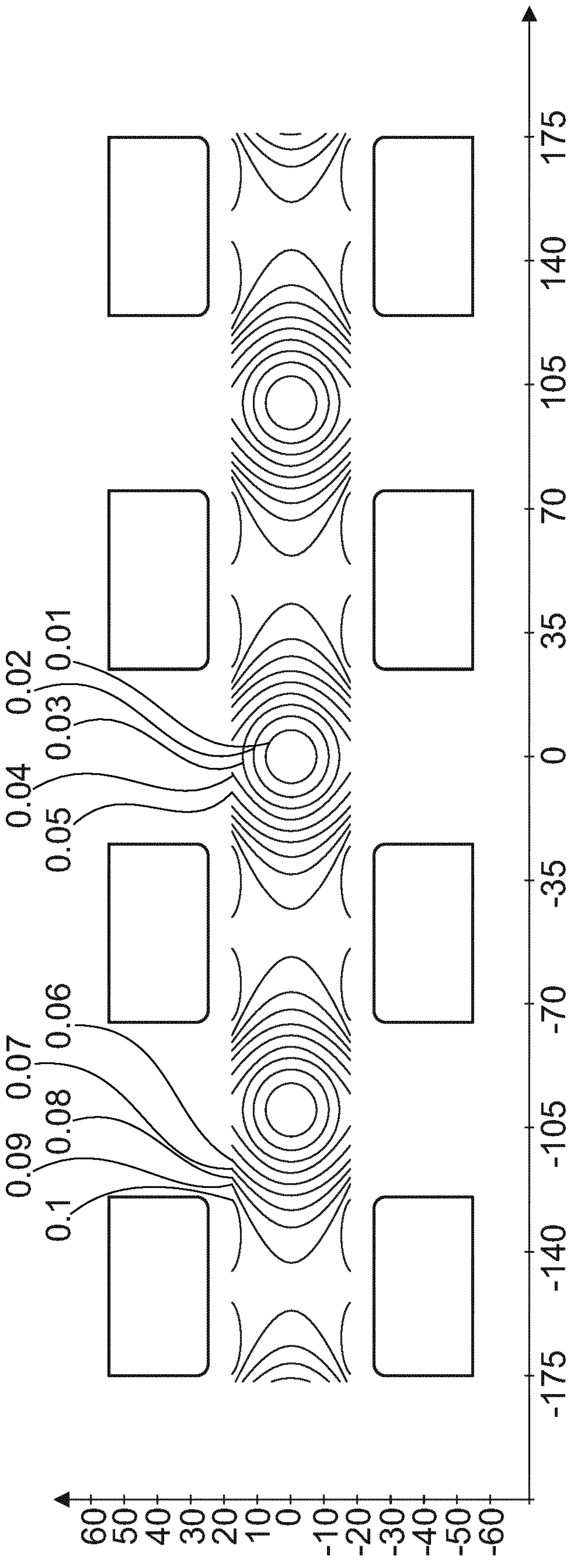
FIGS. 7A and 7B show contour plots of the pseudo-potential in air at atmospheric pressure and room temperature for an ion of the same mass and charge but having type C mobility variance (FIG. 7A) and type A mobility variance (FIG. 7B)
Figure 7B:
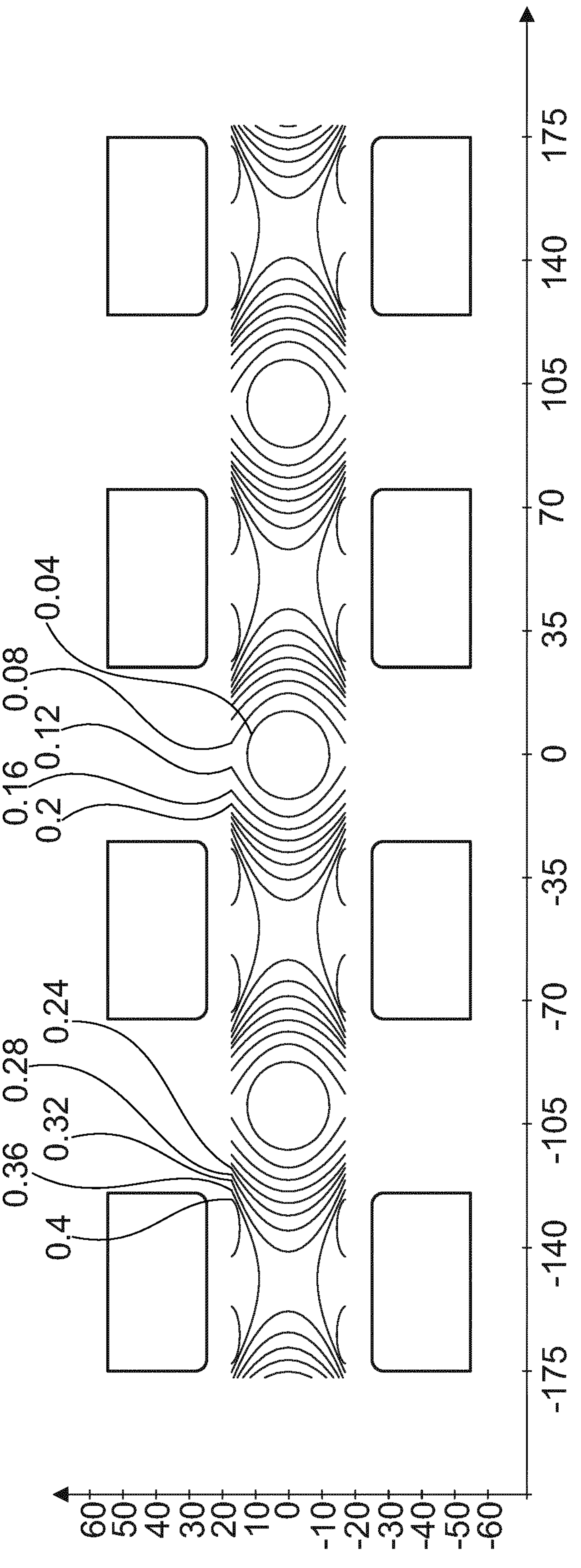
Figure 7C:
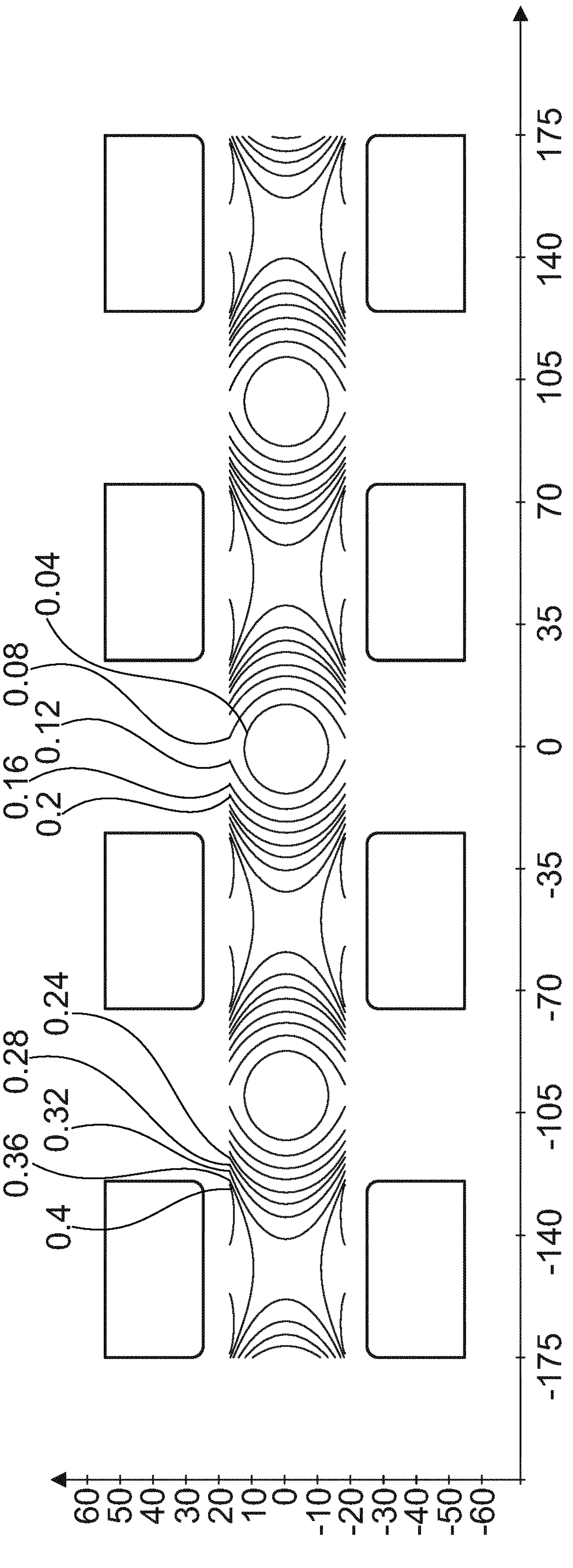
FIG. 7C shows a contour plot of the pseudo-potential in air at atmospheric pressure and room temperature for an ion of the same mass, charge and mobility variance as in FIG. 7B but calculated using 'average' ion trajectory.

Reference is now made to FIGS. 7A, 7B and 7C, showing contour plots of the pseudo-potential in air at atmospheric pressure and room temperature for ions of the same mass and charge but having type C mobility variance (FIG. 7A) and type A mobility variance (FIG. 7B). In both cases, the plot is for a singly charged ion of mass 100 Da when the sinusoidal voltage waveform of FIG. 4B is applied. Electrodes are shown in x-y space (μm).

At the field strength in this example, ions of type A mobility variance experience a pseudo-potential approximately a factor of two larger than mobility-invariant ions and a factor four larger than type C ions. The maximum pseudo-potential well is only some 0.4 V for type A ions, even though the field strength within the trapping region is in excess of 4 million V/m. The effect of pseudo-potential can be seen as low in magnitude and highly variable with ion type. Existing electrode arrangement designs did not take this into account and may explains why, in the words of U.S. Pat. No. 9,991,108 (column 2 lines 4-9): "Commercial atmospheric pressure IMS devices do not employ either RF ion traps or RF ion guides."

The pseudo-potential effect describes a net ion velocity from each oscillation cycle. The pseudo-potential can be calculated by considering the ion motion under the action of the electric field in the presence of the gas, which can be calculated by numerical methods, solving equation (8) below. The solution to equation (8) is referred to herein as an 'average' ion trajectory, because equation (8) does not take into account the effects of diffusion. Diffusion will cause ions to spread in all three degrees of freedom, but the average ion trajectory is nonetheless described by the solution to equation (8).

$$\frac{d}{dt}v(t) + \frac{v(t)}{\tau(t)} = \frac{q}{m}\cdot E(t). \tag{8}$$

The relaxation time in equation (8), T(t), is found using equation (4) above and mobility variance with ion velocity is as depicted in FIG. 6, for type C and type A ions. The average net displacement over one cycle of ion motion is determined for many different starting phases and from this, the net drift velocity may be found. An effective field may be determined using this and this effective field may be integrated to calculate the effective potential. This method follows the ion under the influence of the field. FIG. 7C is a plot of the effective potential calculated in this way for type A ions under exactly the same conditions as were used for the plot of FIG. 7B.

Reference is now made to FIG. 7C, which shows a contour plot of the pseudo-potential in air at atmospheric pressure and room temperature for an ion of the same mass, charge and mobility variance as in FIG. 7B but calculated using 'average' ion trajectory (that is, effective fields and effective potential calculated using numerical solution to equation (8) above). The peak pseudo-potential calculated using equation (3) is 0.446 V, and the maximum calculated in the manner just described is 0.442 V. The pseudo-potential barrier peaks near to electrodes. A representative measure is to consider the potential barrier on moving between adjacent quadrupole structures, along two line scans at x=0 and y=0.

Figure 8B:
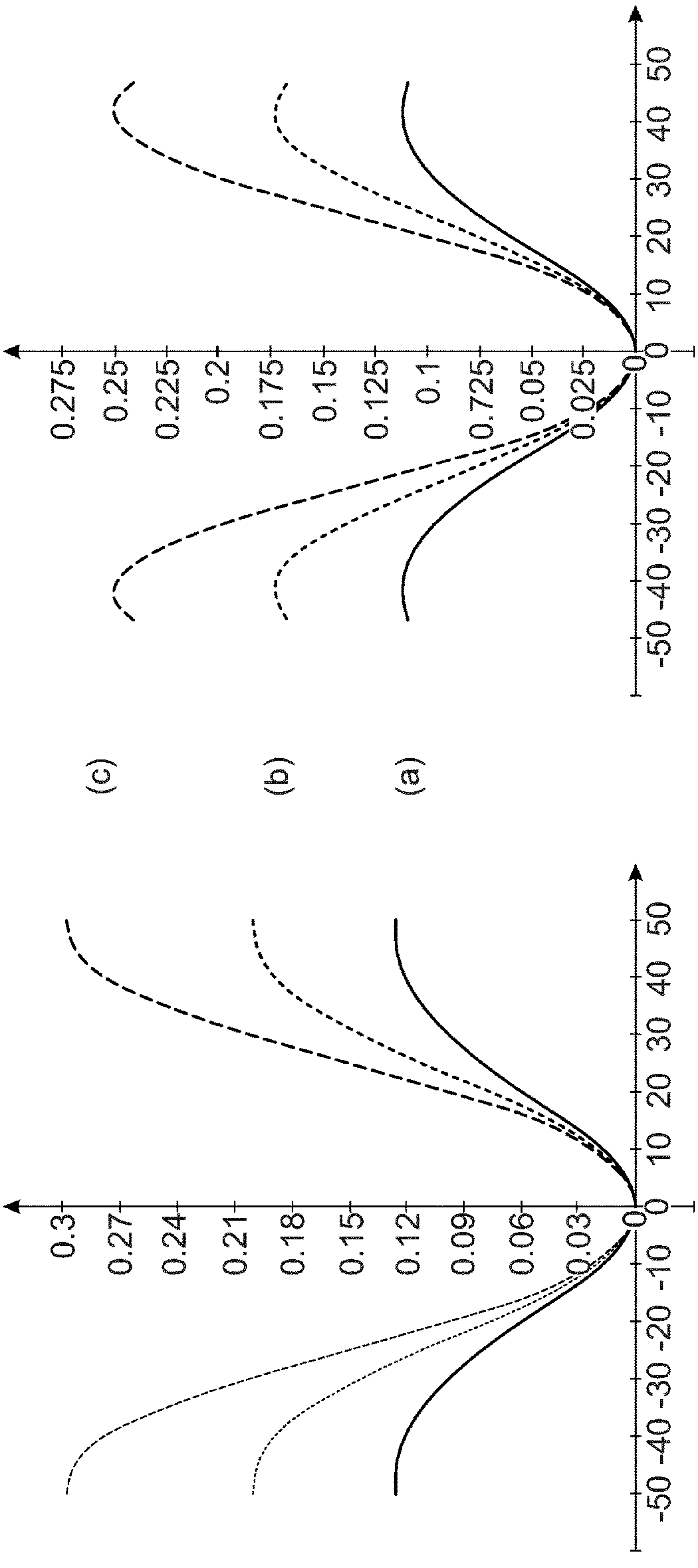
FIGS. 8B and 8C show pseudo-potential against x position at y=0 and against y position at x=0 along the test lines of FIG. 8A for singly charged ions of 100 Da (FIG. 8B) and 1000 Da (FIG. 8C)
Figure 8C:
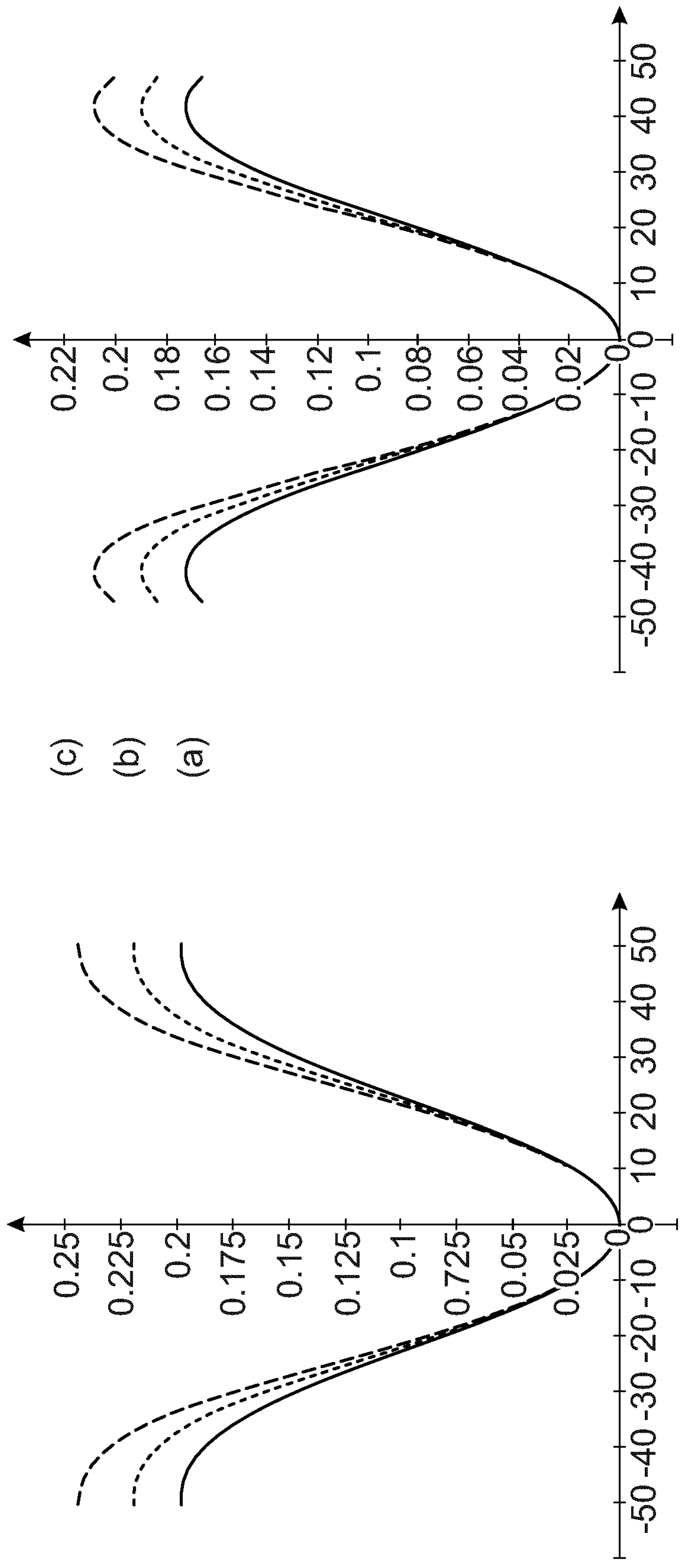

Reference is now made to FIG. 8A, schematically showing an electrode structure in x-y space (μm) (solid lines) with test lines A (dashed line) and B (dotted line) to indicate where pseudo-potential is calculated. Further reference is made to FIGS. 8B and 8C, showing pseudo-potential (V) against x position (μm) at y=0 along the test line A of FIG. 8A (left plot) and pseudo-potential (V) against y position (μm) at x=0 along the test line B of FIG. 8A (right plot). Both plots are for singly charged ions of 100 Da (FIG. 8B) and 1000 Da (FIG. 8C) with (a) type C mobility variance (solid line), (b) type A mobility variance (dashed line), (c) invariant mobility (dotted line). Zero to peak sinusoidal RF voltage of 100 V is applied to the electrodes at 60 MHz as in FIG. 4B.

Figure 8D:
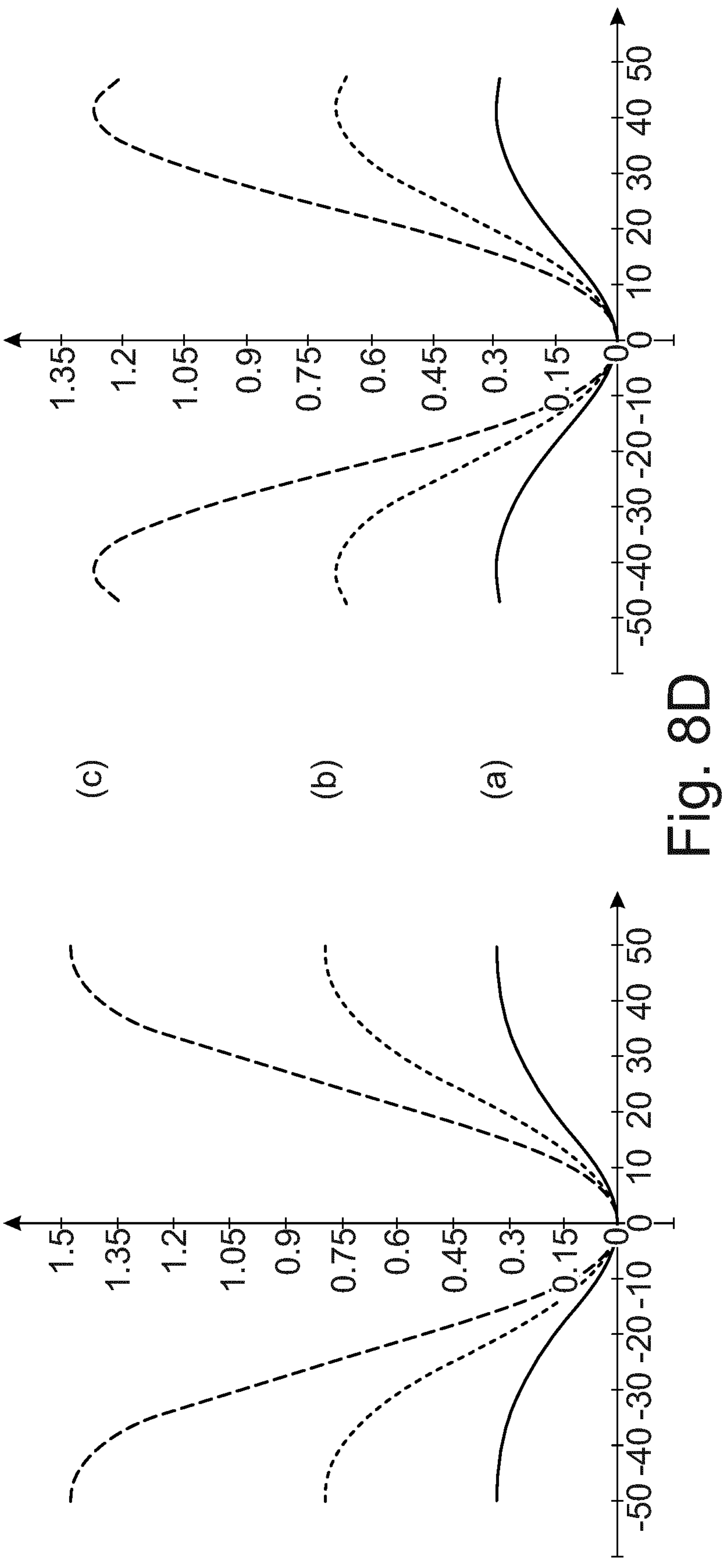
FIGS. 8D and 8E plot the pseudo-potential against x and y positions along the two test lines of FIG. 8A for mass 100 Da ions (FIG. 8D) and mass 1000 Da ions (FIG. 8E) with a higher magnitude voltage.
Figure 8E:
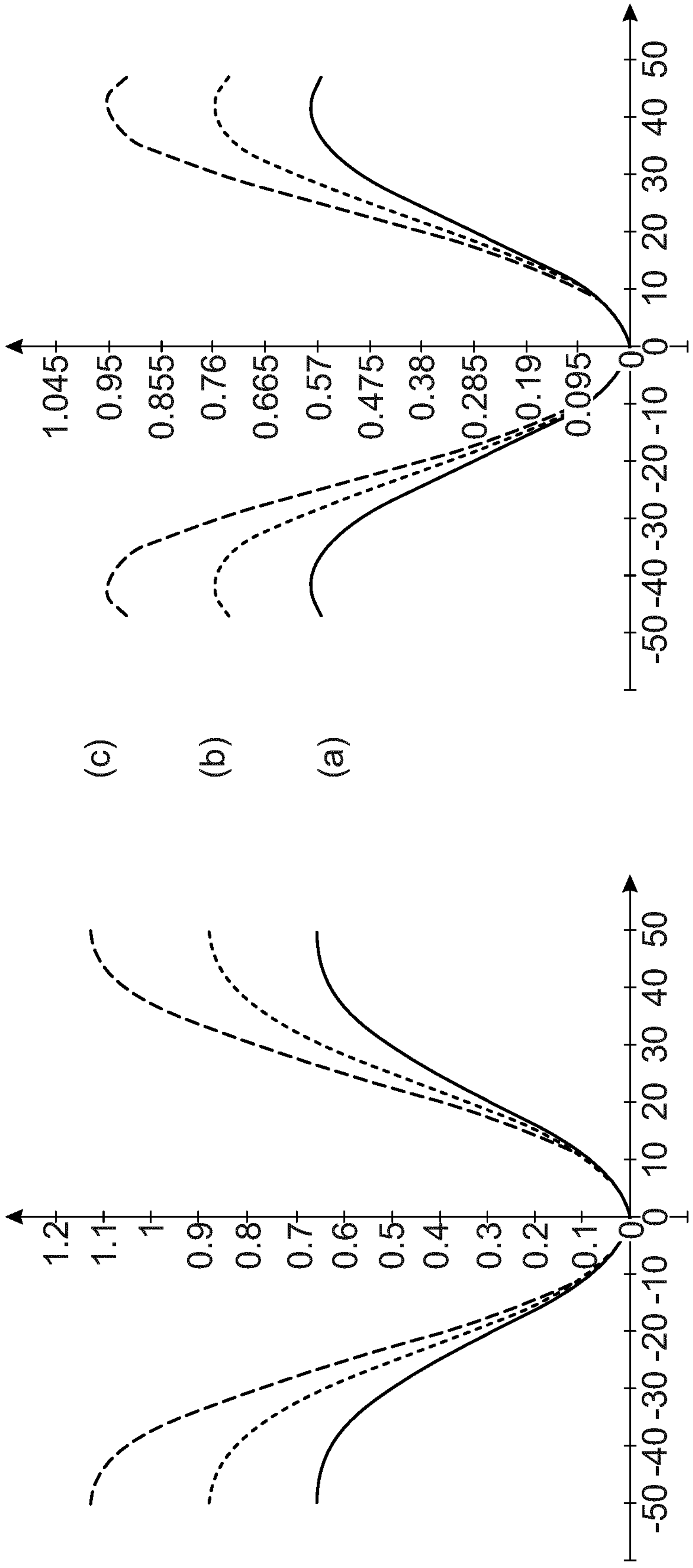

Comparison of FIG. 8C with FIG. 8B shows how low mass ions of type C experience a much lower pseudo-potential barrier in the structure. As noted above, the suppression of the pseudo-potential at atmospheric pressure is substantial and increased applied voltages have been proposed to at least partially compensate for this. The effects of doubling the applied voltage are now considered with reference to FIGS. 8D and 8E, plotting the pseudo-potential against x and y positions along the two test lines of FIG. 8A for mass 100 Da ions (FIG. 8D) and mass 1000 Da ions (FIG. 8E) with a higher magnitude voltage. Again are shown pseudo-potential (V) against x position (μm) at y=0 along the test line A of FIG. 8A (left plot) and pseudo-potential (V) against y position (μm) at x=0 along the test line B of FIG. 8A (right plot). Both plots are for singly charged ions of 100 Da (FIG. 8B) and 1000 Da (FIG. 8C) with (a) type C mobility variance (solid line), (b) type A mobility variance (dashed line), (c) invariant mobility (dotted line). Zero to peak sinusoidal RF voltage of 200 V is applied to the electrodes at 60 MHz as in FIG. 4B.

Increasing the voltage to obtain higher pseudo-potential is effective for type A ions but of limited use for type C ions, especially those of low mass. The higher field strengths drive higher mobility ion species at velocities, which reach and may exceed the speed of sound in the gas. The decreased ion mobility that results diminishes the pseudo-potential experienced by type C ions.

The higher field strengths to trap high mobility ions may also result in larger oscillation amplitudes, which limit the volume of space within the electrode structure that ions can remain in and not strike electrodes and be lost. Larger oscillation amplitudes are experienced by high mobility ions, which tend to be low mass ions. A practical issue is that, in order to generate the higher electric fields whilst avoiding breakdown within the air at atmospheric pressure, smaller gaps between electrodes may be necessary, as study of the Paschen curve shows. This is one of the reasons that the electrodes being described are a few tens of microns in size. However, such high fields generating larger oscillation amplitudes may reduce the volume of space in which such ions can remain stable between the electrodes for high mobility ions. Attempts to increase the field strength to trap high mobility ions better may result in smaller and smaller volumes of space in which those ions are stable.

The method for deriving the effective potential experienced by ions calculated by numerical methods solving equation (8) above demands an asymmetric voltage waveform to be applied to the electrodes. In assessing the effective potential, equations (1), (3) and (5) above no longer apply, as they were derived for the pseudo-potential effect requiring a field gradient, and for a sinusoidal field in the low velocity approximation. Instead, ion motion under the action of the electric field in the presence of the gas is calculated by numerical methods, solving equation (8), which takes into account all effects so far discussed, whether due to motion in an asymmetric electric field, whatever voltage waveform is applied and whatever the mobility variation with ion velocity.

Effect of Phase Difference Between Electric Field and Ion Velocity

The differential mobility effect is affected by the phase difference between the electric field and the ion velocity. However, it has been discovered that the effect is the inverse of that for the pseudo-potential. The differential mobility effect is zero in vacuum, when the phase difference between the electric field and ion velocity is-π/2. For ions moving through a gas, as the RF drive frequency is increased, the phase shift tends to that in vacuum and the differential mobility effect diminishes. Consider an electric field waveform consisting of a two-term cosine, such as that given by equation (6) above, created in the FAIMS flat plate analyser discussed above. Then, the ion velocity is also a two-term cosine, but each term is multiplied by the cosine of a phase shift, which is the arc-tangent of $-\omega T$ (where $\omega$ is the angular frequency of the relevant cosine term). The phase shift is therefore different for each cosine term. Again, T is a function of the electric field strength and so varies over the oscillation cycle.

As the differential mobility effect diminishes as the phase difference tends to $-\pi/2$, the frequency is chosen to be low enough so that $\omega^2T^2<<1$ and $\gamma\sim\omega^2T^2$ for all cosine terms in the applied voltage waveform for the ion of interest, which has the lowest ion mobility. This is intended to keep all phase shift terms close to zero, which provides a maximum differential mobility effect. It also has the effect of being on the plateau of maximum pseudo-potential, so that whatever small amount of residual pseudo-potential remains available in the high pressure gas, it is at its maximum. In summary, a key aspect of the disclosure may be found in the application of an asymmetrical voltage waveform to electrodes having an RF frequency, such that the combination of RF frequency and the gas pressure produces a phase shift that is close to zero. A magnitude of the phase shift is preferably not more than (or less than) 0.1π, more preferably not more than (or less than) 0.05π, even more preferably not more than (or less than) 0.02π and possibly not more than (or less than) 0.01π. A phase shift of not more than (or less than) 0.005π or 0.001π may even be possible.

Basic Electrode Configuration for Ion Manipulation at High Pressures

It can be understood from the above discussion that two electrodes may be sufficient for controlling ions in high pressures (for instance, approaching atmospheric, particularly tens of kPa). RF potentials having an asymmetric waveform of differing phase are applied to the two electrodes, such that the strength of the electric field experienced by ions coming close to the electrodes causes mobility variation. This application of RF voltages causing mobility variation is sufficient at high pressures to control the ions and even confine them. The two electrode pattern may be repeated to create larger control and/or confinement.

The most basic arrangement therefore, only comprises two electrodes or more preferably, two groups of electrodes, to which suitable RF potentials are applied. DC voltages may be applied to these electrodes, but more typically, only RF (that is, no DC, such as a FAIMS compensation voltage) is applied to the sets of electrodes. Instead, a third electrode (or third group of electrodes) with DC voltages applied is provided. A possible electrode arrangement for achieving control along these lines, or at least acting as an ion repelling surface, is now discussed.

Figure 8F:
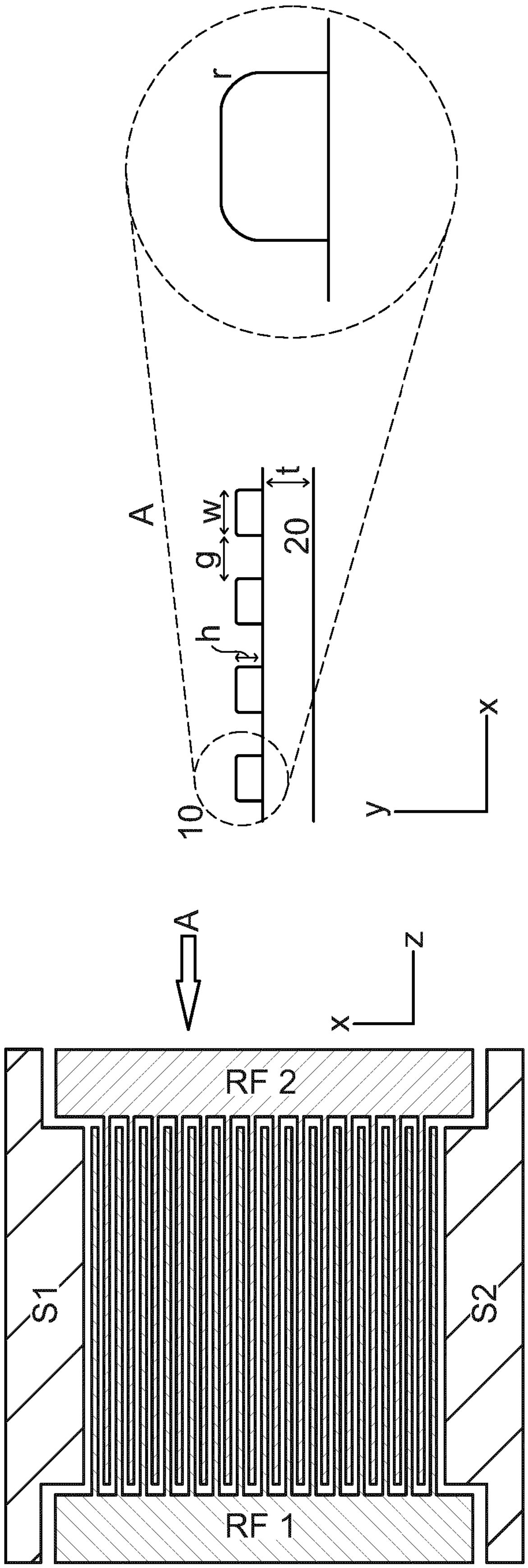
FIG. 8F illustrates a substrate with two interleaved groups of electrodes formed upon it.

Reference is now made to FIG. 8F, which illustrates a substrate with two interleaved groups of electrodes formed upon it. This schematic diagram shows an interleaved array of strip electrodes 10 upon a semi-conductive or insulating substrate 20 (of thickness t). The strip electrodes are separated into groups, RF 1 and RF 2, the two groups being suitable for differing phases of RF drive voltage to be applied. There are two end electrodes S1 and S2, which can be used to control the motion of ions in their vicinity. Ions may be directed parallel to the strip electrodes, in which case electrodes S1 and S2 can be used to prevent ions spreading beyond the widths of the strip electrode arrays by the application of a small positive DC potential (for positively charged ions). More preferably, ions may be directed across the strip electrodes, from S1 to S2 (in which case, additional DC electrodes may be placed along the other edges, perpendicular to the direction of elongation of the RF electrodes, to restrict lateral spread of ions). A plan view is shown on the left-hand side (with the x-axis and z-axis shown) and the right-hand side shows a section of a side view A with a selection of strip electrodes, one strip electrode section being enlarged (showing the x-axis and y-axis). The strips have width w, height h and adjacent strips are separated by gap g. Optionally, each strip electrode has rounded exposed corners having radius r, which may help to avoid the generation of excessively high electric fields. It will be understood that, by suitable sizing and shaping of the electrodes, the magnitude of the electric field can be configured to allow mobility variation.

In one implementation, each strip electrode width (in x) is 25 μm, and height (in y) 15 μm, the gaps between adjacent strip electrodes are 15 μm, and the distance from the outer faces of the strip electrodes to the flat plate electrode is 100 μm. The outer corners of the strip electrodes are rounded with a radius of 2.5 μm to avoid sharp corners, which may generate very high electric fields locally. The strip electrodes are many times longer (in z) than is the gap between the substrate and the flat plate electrode. The array extends (in x)+/−6 multiples of the gap between the substrate and the flat plate electrode and we obtain results in the central portion.

One general sense of the disclosure will now be discussed, before discussing more sophisticated implementations using the specific embodiments considered above. In general terms and according to this aspect, there may be considered an ion optical device comprising: first and second electrode arrangements, spatially separated from one another, arranged to receive ions and a gas and further arranged to operate in an environment having a high gas pressure; and an RF voltage supply, configured to apply: a first RF voltage of one or more RF drive frequencies to the first electrode arrangement; and a second RF voltage of the one or more RF drive frequencies, having a different phase than the first RF voltage, to the second electrode arrangement (for instance, a phase difference of at least $\pi/2$), wherein the first and second RF voltages have an asymmetric waveform (preferably having an integral over time of substantially zero), the application of the first and second RF voltages to the first and second electrodes arrangements respectively causing the received ions to experience an electric field. The asymmetric waveform may have a shape defined by a sum of two or more cosine functions or by a rectangular function or sum of rectangular functions. In that case, the asymmetric waveform has a base frequency (main frequency component) and may have one or more secondary frequency components. The environment (and/or the ion optical device) may include a housing or chamber. Generally, only RF (that is, no DC, such as a FAIMS compensation voltage) is applied to the first and second electrode arrangements.

The first and second electrode arrangements and the RF voltage supply are configured such that a strength of the electric field experienced by the received ions is high and beneficially sufficiently high for ions to experience mobility variation (in some embodiments, at least 1 MV/m). Advantageously, the first and second electrode arrangements are arranged (or the housing is configured) to operate in an environment having a gas pressure that is sufficiently high such that, in combination with the one or more RF drive frequencies, the phase shift between the electric field and a velocity of the received ions experiencing the electric field is substantially zero. For example, a gas pressure of at least 10 kPa may be considered. The gas may be air.

In one embodiment, the first electrode arrangement comprises a plurality of first (elongated) electrodes and the second electrode arrangement comprises a plurality of second (elongated) electrodes interleaved with the first electrodes. Additionally or alternatively, the first electrode arrangement and the second electrode arrangement may be positioned in a same plane. For example, the first and second electrode arrangements may be arranged on a substantially insulating substrate.

In some embodiments of the present disclosure, multiple elongated electrodes are arranged in an array on a substantially insulating substrate, where the direction of elongation is similar for each electrode, forming a set of substantially parallel electrodes. This may be termed an array of strip electrodes. The substrate is substantially planar. A single substrate of this type in a high pressure gas can be used to repel ions from the outer surface of the strip electrodes. The array of electrodes may be manufactured using conventional MEMS techniques.

In embodiments, a third electrode arrangement may be, spatially separated from the first electrode arrangement and the second electrode arrangement. The third electrode arrangement may be arranged to operate in the environment having a high gas pressure. Then, the RF voltage supply may be further configured to apply a third RF voltage of the one or more RF drive frequencies, having a different phase than the first RF voltage and than the second RF voltage, to the third electrode arrangement. Advantageously, the third RF voltage has an asymmetric waveform. As a result, the application of the first, second and third RF voltages to the first, second and third electrodes arrangements respectively causes the received ions to experience the electric field. Optionally, the first and second electrode arrangements are positioned in a first plane and the third electrode arrangement is positioned in a second plane that is substantially parallel to and spatially separated from the first plane.

The ion optical device may further comprise: a DC electrode arrangement; and a DC voltage supply, configured to apply a DC voltage to the DC electrode arrangement. For instance, the DC electrode arrangement may be positioned outside a spatial extent of the first and second electrode arrangements. The DC electrode arrangement may be arranged parallel to or perpendicular to a direction of elongation of the first and second electrode arrangements. The DC electrode arrangement and DC voltage supply may be configured to confine ions beyond the extent of the RF electrode arrangements.

Simple Ion Optical Devices for One Type of Ions

Reference is again made to FIG. 8F, showing an array of strip electrodes. A simple ion optical device may be formed using a single substrate having such an array of strip electrodes and being arranged substantially parallel to a flat plate electrode. An ion channel is thereby created in the space between the outer face of the strip electrodes and the flat plate electrode.

Figure 9A:
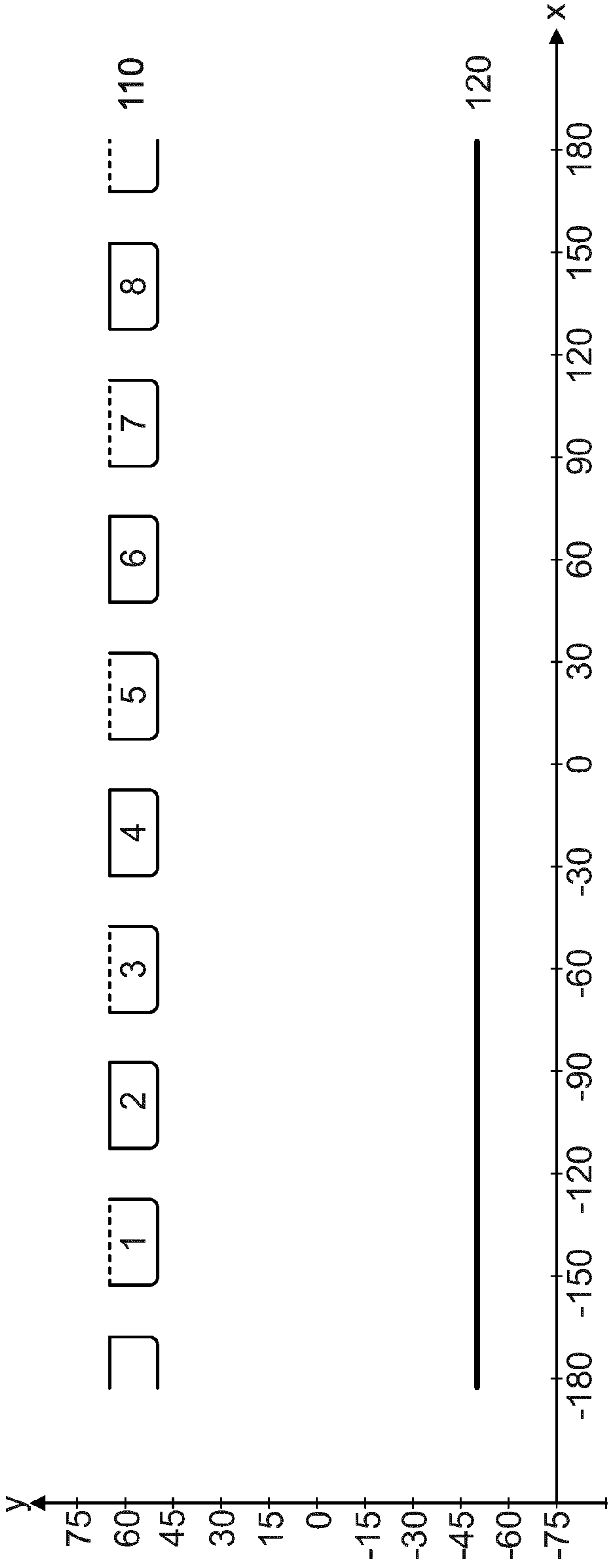
FIG. 9A shows a schematic plot of a portion of an electrode array and parallel flat plate electrode in x-y space.

Referring now to FIG. 9A, there is shown a schematic plot of a portion of an electrode array 110 and parallel flat plate electrode 120 in x-y space (μm). It should be noted that it is not essential for the electrode opposite the strip electrodes to be parallel to the substrate of the strip electrodes. The gap between the plate electrode and the substrate may vary (or an electrode of different shape may be used), to alter the electric field strength across the ion channel at different locations and may thereby provide a driving force to the ions across the channel.

A conductive back plate can also be applied to the substrate. Such an electrode can then be advantageously biased so as to create an electric field in the y direction in the troughs between the strip electrodes. This electric field may serve to repel ions from the troughs.

In a first example, a two-term cosine voltage waveform, as described by equation (6) above and shown in FIG. 2, is applied to the strip electrodes. FIG. 2 depicts a higher peak voltage (which is positive voltage), and this is defined herein as positive polarity. In this example, a negative polarity voltage waveform is applied (that is, the inverse of the waveform shown in FIG. 2) and of a lower peak voltage. The peak voltage (zero to peak) is 150 V, and the base frequency is 20 MHz. The second term of the cosine waveform therefore oscillates at 40 MHz. The flat plate electrode has +1 V potential difference applied between it and the strip electrodes. This potential difference may be created by applying a voltage supply to the flat plate electrode, or by biasing the RF voltage applied to the strip electrodes with a time-invariant potential offset, or both.

The electric field created in the space between the flat plate and the strip electrodes is arranged to apply a force onto a chosen charge polarity of ions of interest, the force being towards the strip electrode array. In the example considered, the ions of interest have positive charge polarity. In this example there is no back-plate to the substrate.

The RF voltages are split into two phases, with a first phase applied to electrodes 1, 3, 5, 7 and a second phase having 180 degrees difference being applied to electrodes 2, 4, 6, 8, this waveform being the sum of two cosine terms as in equation (6) above. Thus, the voltage difference between two electrodes of differing phase is given by equation (9).

$$wv(t, 0) - wv(t, \pi) = \frac{4}{3} \cdot \cos(\omega \cdot t). \tag{9}$$

Figure 9B:
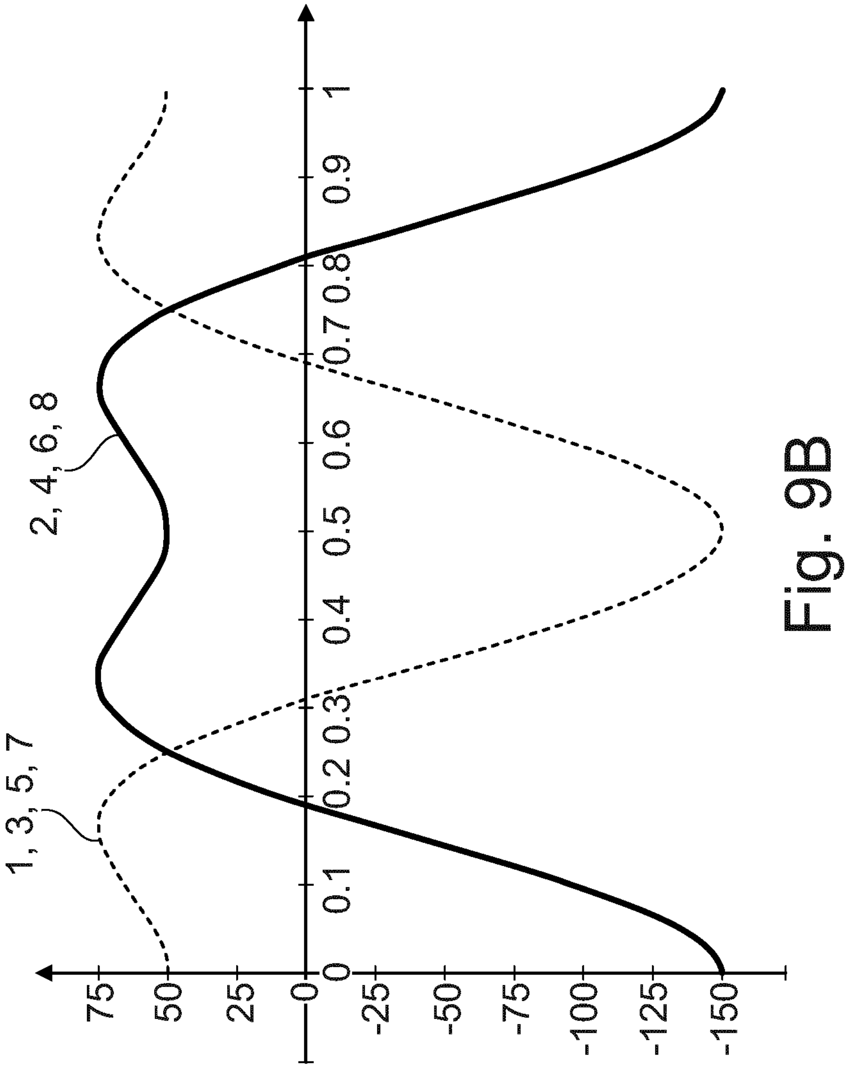
FIG. 9B plots voltage waveforms applied to the electrodes of FIG. 9A.

Referring to FIG. 9B, there are plotted voltage waveforms applied to the strip electrodes in this embodiment. Although the applied voltage waveform is asymmetrical, the voltage difference is a symmetrical waveform and the electric field along a plane midway between the two electrodes of differing phase voltage drive is therefore also symmetrical. The time-invariant voltage applied to the flat plate electrode generates an electric field in the y direction. The strip electrodes repel ions and the combination of the two effects produces an effective potential well for ions of a given charge polarity.

Figure 10A:
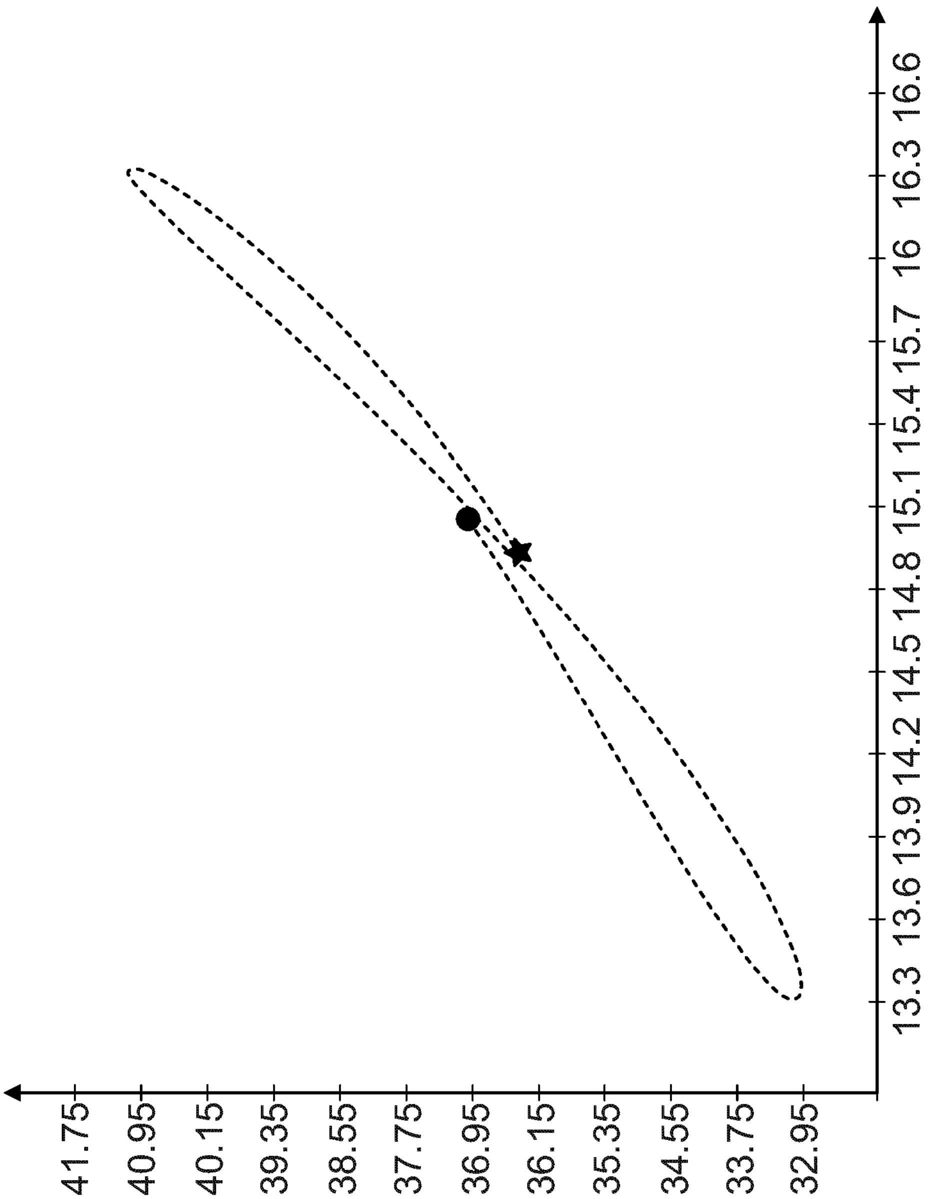
FIG. 10A illustrates an average ion trajectory in x-y space calculated over one cycle of a voltage waveform of FIG. 9B applied to the electrode array of FIG. 9A.

Reference is now made to FIG. 10A, in which there is illustrated an average ion trajectory in x-y space (μm) calculated over one cycle of a voltage waveform of FIG. 9B applied to the electrode array of FIG. 9A, by solving equation (8). An average ion trajectory is plotted for a singly charged type C ion of mass 100 Da starting from (15,37) (μm), as indicated by the circular symbol, under the action of the RF voltage waveform depicted in FIG. 9B, plus a time-invariant voltage of +1 V applied to the flat plate electrode. The type C ion follows the dotted trajectory reaching the star symbol after one cycle.

Figure 10B:
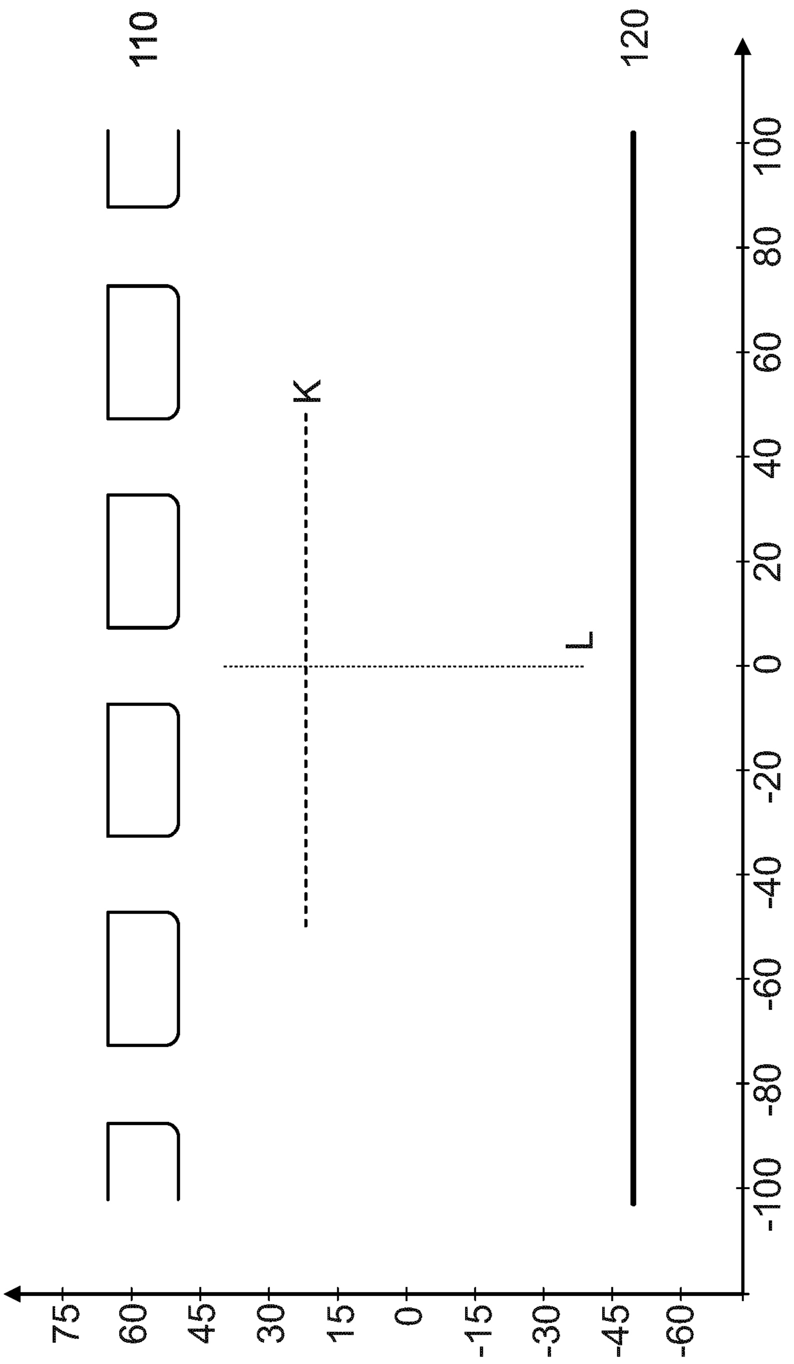
FIG. 10B shows a portion of the electrode structure of FIG. 9A in x-y space with test lines to indicate where pseudo-potential is calculated.

Reference is now made to FIG. 10B, showing a portion of the electrode structure of FIG. 9A in x-y space (μm) (solid lines) with test lines K (dashed line) and L (dotted line) to indicate where pseudo-potential is calculated. Test line L extends to 10 μm of the face of the strip electrodes for ions of mass 100 Da, whilst for ions of mass 1000 Da it extends to 4 μm of the face of the strip electrodes.

Figure 10C:
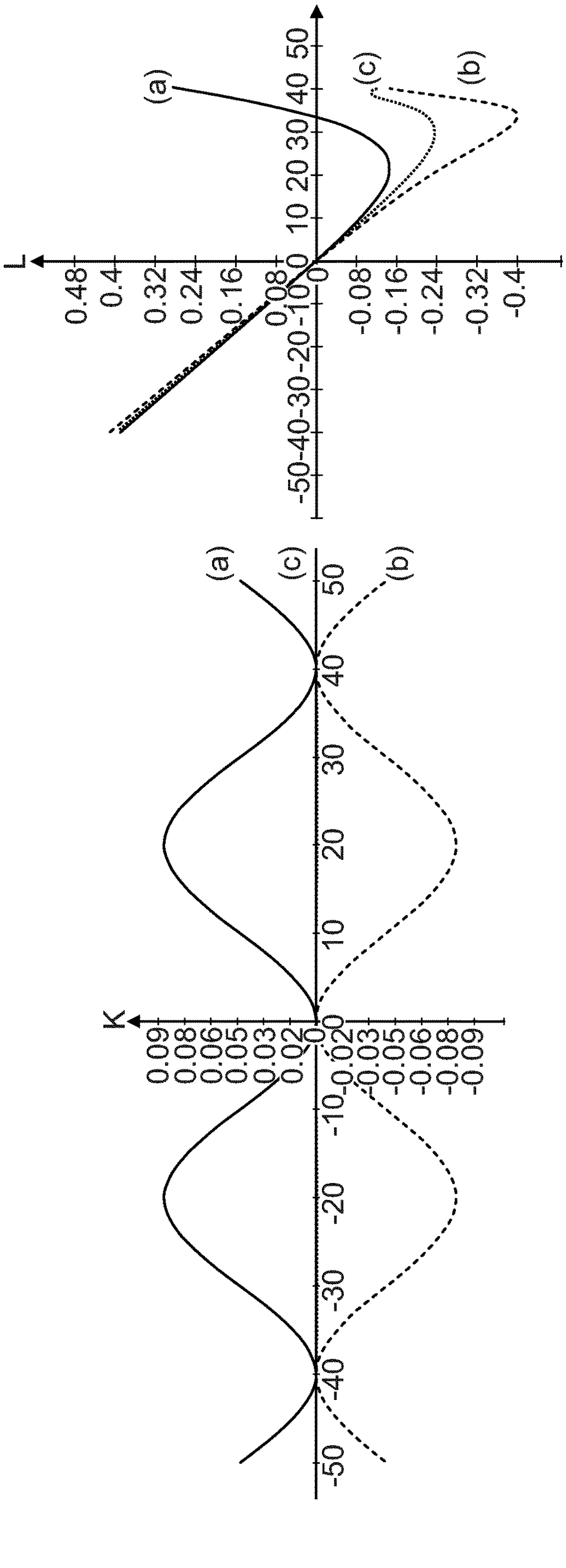
FIG. 10C shows plots of effective potential against distance along the test lines of FIG. 10B for singly charged ions of 100 Da.

Now, referring to FIG. 10C, there are shown plots of effective potential against distance along the test lines of FIG. 10B for singly charged ions of 100 Da. The term "effective potential" is used to distinguish from the often-used term of pseudo-potential as applied to known methods having sinusoidal voltage waveforms applied and which rely on the presence of a field gradient, as has been discussed above. The left-hand plot of this drawing shows effective potential (V) against x position (μm) at y=+22 μm along the test line K of FIG. 10B. The right-hand plot shows effective potential (V) against y position (μm) at x=0 along the test line L of FIG. 10B. The plots are for ions with: (a) type C mobility variance (solid line); (b) type A mobility variance (dashed line); and (c) invariant mobility (dotted line). The zero reference point for potential has been set at (0, 0). A zero to peak two-term cosine RF voltage waveform of 150 V is applied with negative polarity to the electrodes at a base frequency of 20 MHz with 2-fold phase splitting.

Figure 10D:
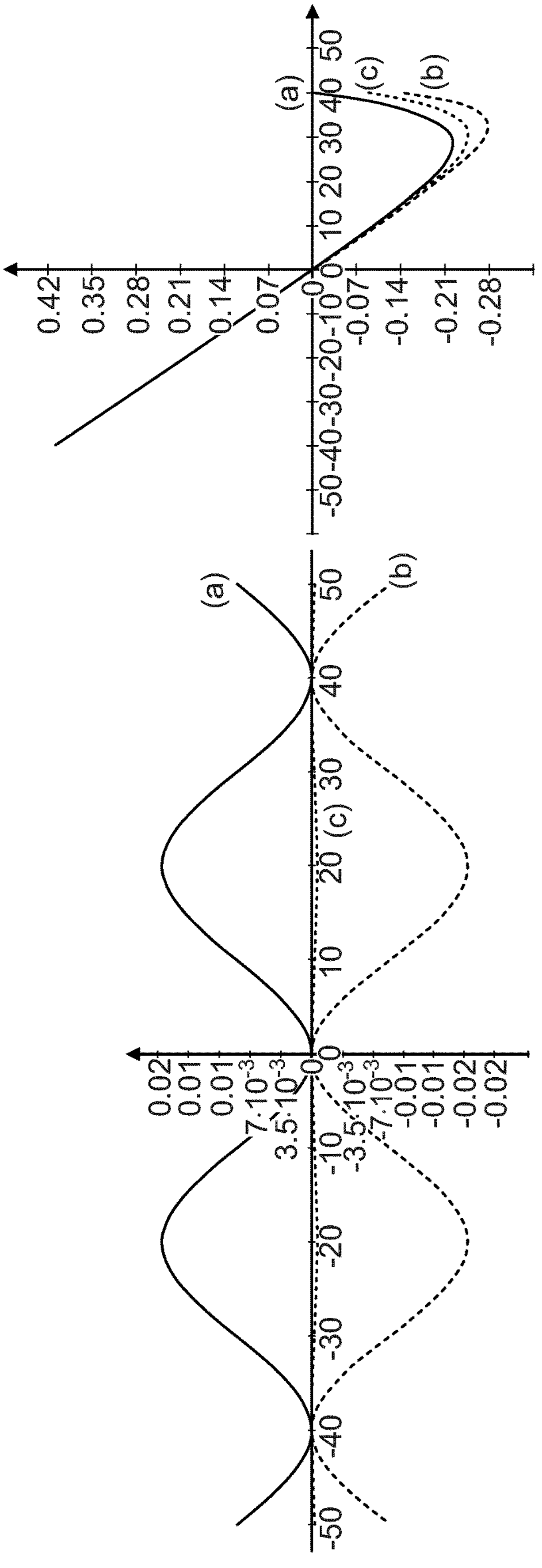
FIG. 10D shows plots of effective potential against distance along the test lines of FIG. 10B for singly charged ions of 1000 Da.

Referring next to FIG. 10D, there are shown plots of effective potential against distance along the test lines of FIG. 10B for singly charged ions of 1000 Da. The left-hand plot of this drawing shows effective potential (V) against x position (μm) at y=+22 μm along the test line K of FIG. 10B. The right-hand plot shows effective potential (V) against y position (μm) at x=0 along the test line L of FIG. 10B. The plots are again for ions with: (a) type C mobility variance (solid line); (b) type A mobility variance (dashed line); and (c) invariant mobility (dotted line). A zero to peak two-term cosine RF voltage waveform of 150 V is applied with negative polarity to the strip electrodes at a base frequency of 20 MHz with 2-fold phase splitting. A DC voltage of +1V is applied to the flat plate electrode.

It can therefore be seen that higher mass ions have a smaller oscillation amplitude and are therefore able to get closer to electrodes before their oscillations take them into contact with the electrode. The effective potential can therefore be determined closer to electrodes for ions of higher mass. The volume of space between the flat plate electrode and the strip electrodes may be larger for such ions, and such ions are stable at distances closer to the strip electrodes.

Figure 11A:
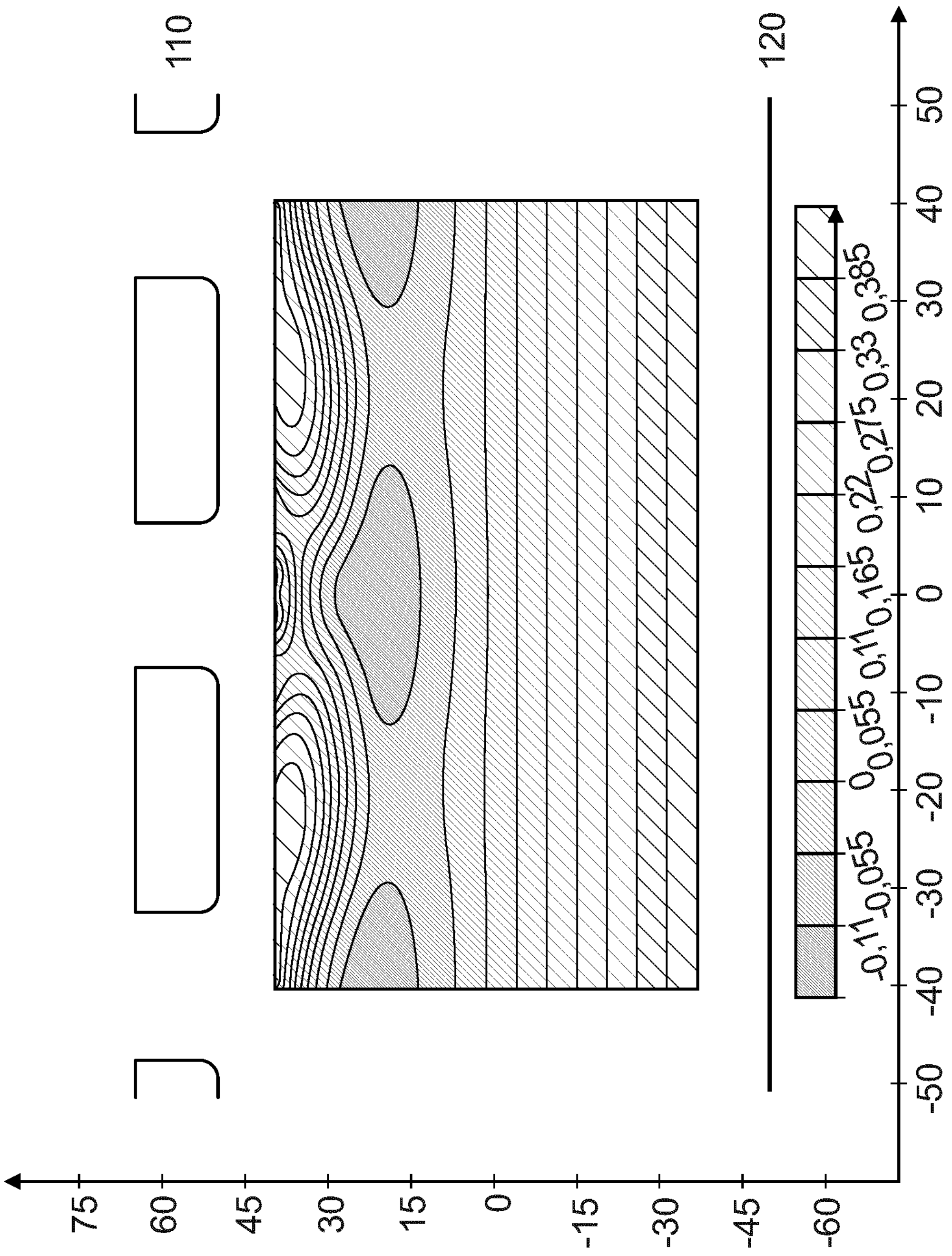
FIG. 11A shows a contour plot of the effective potential in x-y space for type C ions of FIG. 10C.
Figure 11B:
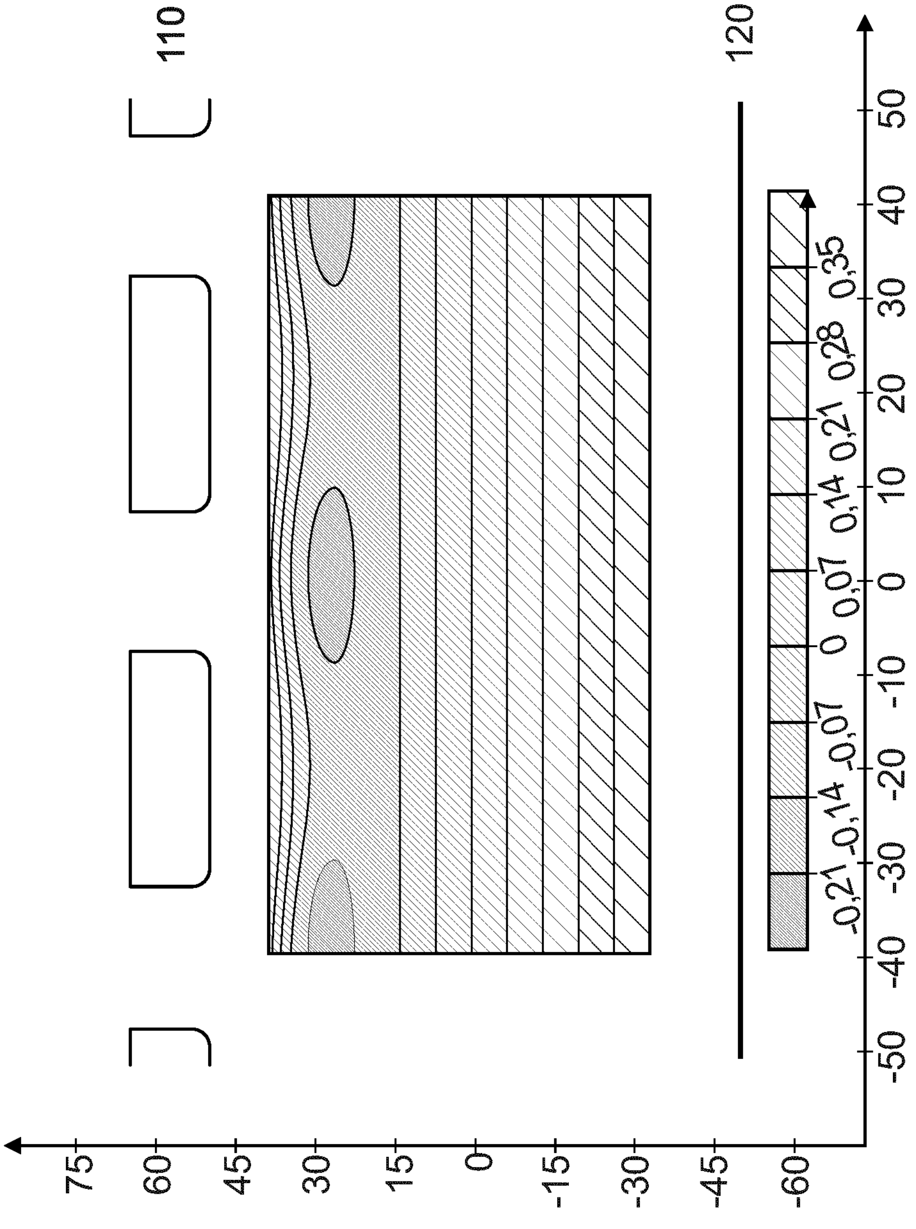
FIG. 11B shows a contour plot of the effective potential in x-y space for type C ions of FIG. 10D.

Reference is now made to FIG. 11A, which shows a contour plot of the effective potential in x-y space (μm) for type C ions of FIG. 10C (that is, singly charged and mass of 100 Da) and to FIG. 11B, which shows a contour plot of the effective potential for ions of FIG. 10D (that is, singly charged and mass of 1000 Da). In both cases, this is considered under the action of a negative polarity two-cosine voltage waveform of 150 V zero to peak, at a base frequency of 20 MHz, with +1 V time-invariant voltage applied to the flat plate electrode.

Ions move into the bottom of the effective potential well, some few microns from the surface of the strip electrodes. Once there, the barrier to moving along the array (in x) is low (see FIG. 10D left-hand plot) in this structure allowing ions to be readily transported along the array and across the array. In a trap configuration according to this design, the effective potential barrier in x is much the same as it is in y and both are high enough to confine ions.

In other embodiments, the flat plate electrode may be replaced with a second substrate having a second array of strip electrodes the same as the first array of strip electrodes 110 and being arranged facing and substantially parallel to the first array, such that an ion channel is thereby created in the space between the two arrays of strip electrodes. The strip electrodes of the first and second arrays are aligned and have the same voltage waveform applied.

Figure 11C:
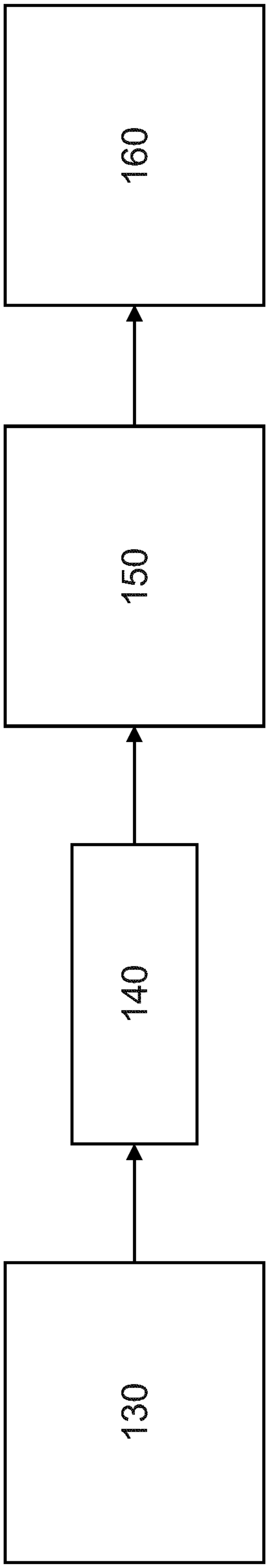
FIG. 11C depicts a schematic block diagram of a first spectrometry system in accordance with the disclosure.

Devices of this type (as well as other devices as disclosed herein) may be used as part of an interface between an atmospheric pressure ion source and downstream ion optics, particularly operative at lower pressures. An accelerating potential may be applied between the ion source and the interface. This may be used for mass spectrometry and/or ion mobility analysis. For example, reference is made to FIG. 11C, in which there is depicted a schematic block diagram of a first spectrometry system, for mass spectrometry. The spectrometry system comprises: an atmospheric pressure ion source 130; an interface 140 in accordance with the disclosure, operative at atmospheric pressure; ion optics 150, operative in a vacuum (for example, one or more ion guides, a mass filter, a collision cell or combinations thereof); and a mass analyser 160 also operative in a vacuum. The ion optics 150 may be optional in certain embodiments.

Figure 11D:
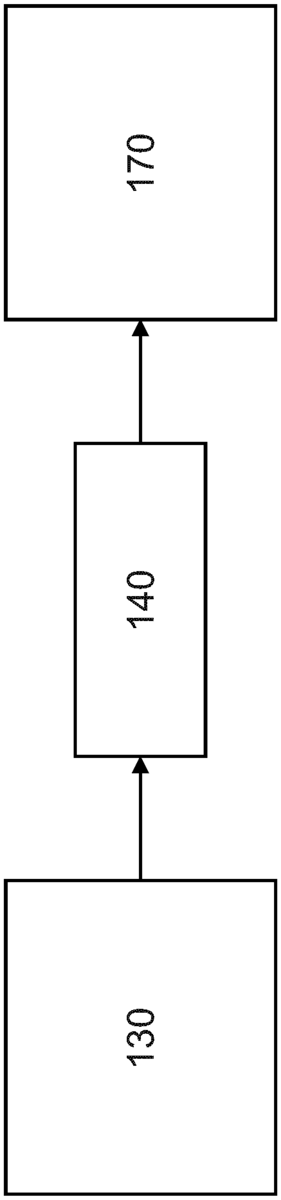
FIG. 11D depicts a schematic block diagram of a second spectrometry system in accordance with the disclosure.

Referring to FIG. 11D, there is depicted a schematic block diagram of a second spectrometry system, for ion mobility spectrometry. The spectrometry system comprises: an atmospheric pressure ion source 130; an interface 140 in accordance with the disclosure, operative at atmospheric pressure; an ion mobility analyser, operative at atmospheric pressure or in a vacuum.

Figure 11E:
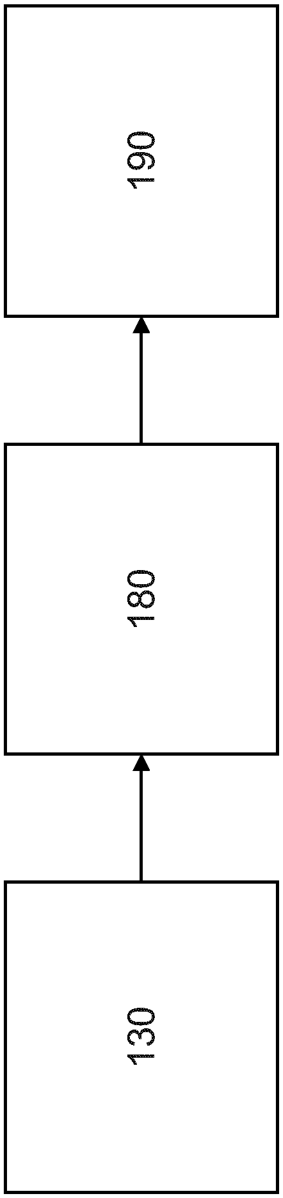
FIG. 11E depicts a schematic block diagram of a third spectrometry system in accordance with the disclosure.

Referring to FIG. 11E, there is depicted a schematic block diagram of a third spectrometry system, for either mass spectrometry or ion mobility spectrometry. The spectrometry system comprises: an atmospheric pressure ion source 130; and an ion optical system 180 in accordance with the disclosure, operative at atmospheric pressure; and an optional analyser device 190 (which may be a mass analyser or ion mobility analyser), operative at atmospheric pressure or in a vacuum. The ion optical system 180 comprises one or more RF ion guides as described herein. Optionally, the ion optical system 180 may form an ion mobility analyser (and in this case, the analyser device 190 may not be used).

In an aspect of the disclosure (which may be combined with other aspects described herein), there may be provided an ion repulsive surface, comprising: a first plurality of elongated electrodes distributed along an axis (which may be linear and/or curved), configured to receive a first RF voltage with an asymmetric waveform; and a second plurality of elongated electrodes distributed along the axis, the second plurality of electrodes being interleaved with the first plurality of electrodes and configured to receive a second RF voltage with an asymmetric waveform, having a different phase than the first RF voltage. If the axis is linear, the first and second pluralities of elongated electrodes are beneficially substantially parallel. Alternatively (and as will be discussed more below), the axis of the first and second pluralities of electrodes of each ion repulsive surface may be circular, such that the ion channel defines a circular flight path for ions to travel therethrough. The first plurality of elongated electrodes and/or the second plurality of electrodes are preferably on a substrate. Alternatively, one or both pluralities of electrodes may be supported at their ends (for example, similar to the rods in a conventional quadrupole ion optical device).

There may also be considered a method of manufacturing and/or operating an ion repulsive surface, an ion optical device, an ion optical system or a spectrometer (which may be combined with other aspects described herein). This may have steps corresponding with those of any of the apparatus, devices or systems disclosed herein. For example, these may include: providing a first plurality of elongated electrodes distributed along an axis (which may be linear and/or curved); receiving a first RF voltage with an asymmetric waveform at the first plurality of electrodes; providing a second plurality of elongated electrodes distributed along the axis, the second plurality of electrodes being interleaved with the first plurality of electrodes; receiving a second RF voltage with an asymmetric waveform, having a different phase than the first RF voltage at the second plurality of electrodes.

The first and second plurality of electrodes and first and second RF voltages are advantageously configured such that a strength of an electric field adjacent the ion repulsive surface is high, particularly sufficient for ions to experience mobility variation. For instance, the first and second plurality of electrodes and first and second RF voltages may be configured such that a strength of an electric field adjacent the ion repulsive surface is at least 1 MV/m and/or a phase difference between the first RF voltage and the second RF voltage is at least $\pi/2$. The ion repulsive surface may be provided in an environment (such as a housing, chamber or open environment) configured to operate at a high gas pressure (at least 10 kPa, 25 kPa, 50 kPa or 75 kPa). The gas may be air. Generally, only RF (that is, no DC, such as a FAIMS compensation voltage) is applied to the first and second pluralities of elongated electrodes.

In embodiments, the substrate is substantially electrically-insulating, for instance formed of or comprising one or more of: a ceramic material; a polymer; or a printed circuit board material. However, the substrates used are preferably slightly conductive, sufficient to avoid charging. Additionally or alternatively, the substrate may be planar.

Optionally, each of the first plurality of electrodes and/or each of the second plurality of electrodes have one or more of: the same shape, the same dimensions and the same spacing; a height that is at least as large as a gap between adjacent electrodes; a height that is smaller than a thickness of the substrate; a width that is at least as large as or larger than a gap between adjacent electrodes; a width that is smaller than 100 μm (preferably 50 μm); a length in the direction of elongation that is at least 2, 3, 5, 10, 20, 25 or 50 times as long as a gap between adjacent electrodes; and a cross-section (in particular, taken perpendicular to the direction of elongation) that is one of: rectangular, preferably with rounded corners; hemispherical; and semi ovoid. The lengths in the direction of elongation of some or each of the electrodes (from one or more than one set) may be substantially the same.

The elongated strip electrodes preferably have a height (in y) which is similar to, as large as, or larger than the gap between adjacent electrodes, so that the exposed substrate is at the bottom of the trough which is formed between adjacent strip electrodes and the depth of the trough is similar to its width. The electric field produced in the ion channel from charging of the exposed substrate in the bottom of the troughs is then greatly reduced. Simulations indicate that, under these conditions, charging to several tens of volts of the substrate in the bottom of such a trough need not disturb ions in the ion channel to significant degree. It has also been found that if ions are being transported through the ion channel by use of a gas flow, or a supplementary electric field, for example, motion is more stable in the x direction than if ions are moved in the z direction, when charging of the exposed substrate in the bottom of the troughs is present. Ions moving in the x direction cross strip electrodes and troughs successively and the average effect of a charged trough is reduced. Moving in the z direction places ions above troughs for extended proportions of time and their trajectories are more affected by the charging of the exposed substrate.

In an implementation, each of the first plurality of electrodes is connected to a first common conductor (for instance, configured to receive the first RF voltage) at a first end of the first plurality of electrodes. Then, each of the second plurality of electrodes may be connected to a second common conductor (in particular, configured to receive the second RF voltage) at a first end of the second plurality of electrodes. Here, the first end of the second plurality of electrodes is distal the first end of the first plurality of electrodes.

In some embodiments ions are free to move in the direction parallel to the elongation of the electrodes (termed herein as the z direction). Ions can be retained, for example in the z direction, by the placement of additional (elongated) electrodes on the substrate ("blocking electrodes"), for instance just beyond the ends of the pluralities of (strip) electrodes, and running in the x direction. For instance, a DC electrode arrangement is preferably provided, comprising one or more electrodes configured to receive a DC (only) voltage. Each of the one or more electrodes may have a planar form and be positioned in substantially the same plane as the first plurality of electrodes and the second plurality of electrodes. Optionally, the DC electrode arrangement comprises: a first DC electrode located adjacent a first end of the first and second pluralities of electrodes perpendicular to a direction of elongation; and a second DC electrode located adjacent a second end of the first and second pluralities of electrodes perpendicular to a direction of elongation, distal the first end. Thus, the blocking electrodes may be at either end of the array of elongated electrodes to confine the ions by being biased with a time-invariant potential. Ions may then be free to expand along the array of strip electrodes in +/−z directions under the influence of space charge until they reach the vicinity of the blocking electrodes. A large length of the elongated array electrodes may allow much larger ion currents to be used as the space charge capacity of the structure is enhanced. Ions can be moved in the x direction through the array (as will be further described below) or ions may be moved in the z direction, by the use of a gas flow or a supplementary electric field.

In embodiments, a conductive back-plate is provided on a side of the substrate opposite to a side on which the first and second plurality of electrodes are located. The conductive back-plate may be configured to receive a DC voltage. The DC voltage may create an electric field in the y direction in the troughs between the strip electrodes, which may serve to repel ions from the troughs.

More than two groups of electrodes may be provided on the substrate. For example, the ion repulsive surface (or an ion optical device comprising the ion repulsive surface) may further comprise: a third plurality of elongated electrodes on the substrate, distributed along a second axis and distinct from the first and second pluralities of electrodes and configured to receive a third RF voltage with an asymmetric waveform having a different phase than the first and second RF voltages. In addition, there may be provided a fourth plurality of elongated electrodes on the substrate, the fourth plurality of electrodes being interleaved with the third plurality of electrodes along the second axis and configured to receive a fourth RF voltage with an asymmetric waveform, having a different phase than the first, second and third RF voltages. Advantageously, the second axis is an extension to the first axis, such that the third and/or fourth pluralities of electrodes are formed on the same substrate as the first and second pluralities of electrodes. Alternatively (as will be discussed further below), the second axis may be parallel to the first axis, with the third and/or fourth pluralities of electrodes being formed on a different substrate to the first and second pluralities of electrodes.

In many embodiments a second substantially planar surface is placed (preferably) parallel to the first substrate (and/or ion repulsive surface). For example, an ion optical device according to some embodiments may be provided, comprising: an ion repulsive surface as disclosed herein; and a plate electrode, spatially separated from the ion repulsive surface, so as to define an ion channel between the ion repulsive surface and the plate electrode. For example, the plate electrode may be configured to receive a DC voltage or an RF voltage with a time-invariant potential offset. The plate electrode may be biased with a potential that differs from the average potential applied to the pluralities of electrodes of the ion repulsive surface and is of a polarity to repel ions towards the ion repulsive surface. In this embodiment, the plate electrode bias creates an electric field in the ion channel (in the y direction), such that the gap between the first substrate and the plate electrode can be within a range of sizes. A larger gap may demand a larger potential difference to create the same strength of electric field. The electric field creates a force on the ions and the electrodes of the ion repulsive surface create an opposing force, holding the ions within a region of the ion channel. Beneficially, the plate electrode is substantially parallel to the ion repulsive surface. In other embodiments, the gap between the plate electrode and the substrate may vary (or an electrode of different shape may be used), for instance to increase or decrease the gap across the ion channel, so as to alter the electric field strength across the ion channel at different locations. In this way, an axial DC field gradient may be provided. The frequency (in particular, the base frequency) of the first and second RF voltages may be selected such that ion oscillation amplitudes are less than a substantial fraction of a width of the ion channel. Other second surfaces will be discussed below.

Another aspect of the present disclosure may be found in an ion optical system, comprising a plurality of RF ion guides, each of the plurality of RF ion guides being formed by an ion optical device as herein disclosed.

A further aspect may be seen in a mass spectrometer, comprising: an ion optical system as herein disclosed; and at least one ion optical processing device, configured to receive ions from the ion optical system. Alternatively, there may be considered an ion mobility spectrometer, comprising an ion mobility analyser formed from an ion optical device or an ion optical system as herein described.

In an additional aspect, there may be considered an ion optical interface between a first part of a mass spectrometry system and a second part of a mass spectrometry system, comprising an RF ion guide formed from an ion optical device or an ion optical system as herein disclosed. In this case, the RF ion guide may be configured to receive ions from the first part of the mass spectrometry system at a first end of the RF ion guide and to output ions at a second opposite end of the RF ion guide towards the second part of the mass spectrometry system. For example, the first part of the mass spectrometry system may comprise an ion source. In an advantageous implementation, the first end of the RF ion guide is arranged to operate at atmospheric pressure and the second end of the RF ion guide is arranged to operate at pressure below atmospheric pressure.

The ion optical interface may form part of a mass or ion mobility spectrometer that preferably further comprises an ion source, configured to generate ions to be received at the ion optical interface. For example, the ion source comprises one of: an Atmospheric Pressure Chemical Ionization (APCI) ion source; an Atmospheric Pressure Photoionization (APPI) ion source; an Electrospray Ionization (ESI) ion source; an Electron Ionization (EI) ion source; a Chemical Ionization (CI) ion source; an Inductively Coupled Plasma (ICP) ion source; and a Matrix Assisted Laser Desorption Ionization, (MALDI) ion source. A potential difference between the ion source and the ion optical interface in operation may cause ions generated by the ion source to travel to the RF ion guide and enter the first end of the RF ion guide. Additionally or alternatively, a temperature of RF ion guide in operation may be higher than that of the ion source. The ion source may be configured to generate an ion current of at least 5 nA.

An ion processing system may then be configured to receive ions from the ion optical interface. For instance, the ion processing system may comprise an ion mobility analyser, arranged to receive ions from the RF ion guide and separate the received ions according to their respective ion mobilities.

Further reference will be made to this general sense below. Now, other specific embodiments are discussed.

Simple Ion Optical Devices for More than One Type of Ions

Figure 12A:
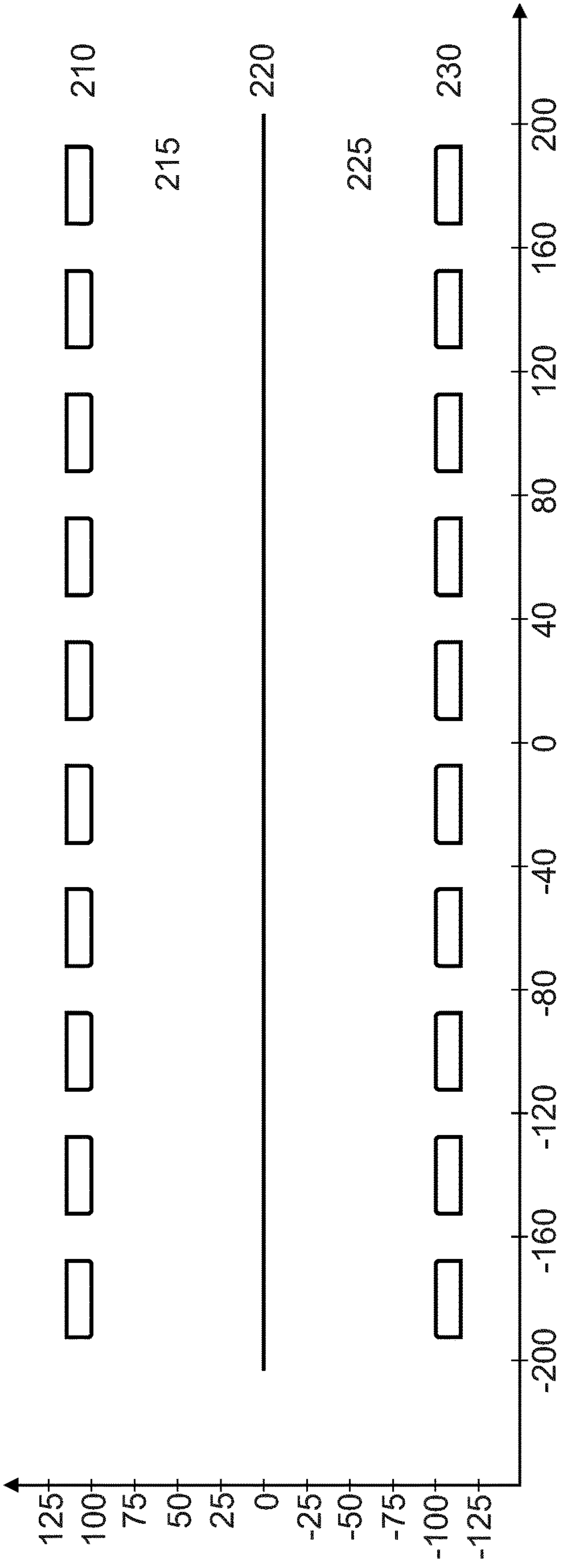
FIG. 12A illustrates a cross-sectional view of a portion of two parallel arrays of strip electrodes on a substrate and with a flat plate electrode positioned between the arrays.

Reference is now made to FIG. 12A, showing a cross-sectional view of a portion of two parallel arrays of strip electrodes on a substrate and with a flat plate electrode, y (μm) against x (μm). The arrays of strip electrodes form multipoles. This device is intended to transmit a sample of a given charge polarity of ions along an electrode array, the sample comprising both type C and type A mobility variance ions of a given charge polarity.

A double structure is employed. A first substrate (not shown), on which are provided a strip electrode array 210 having a first polarity asymmetric RF voltage waveform applied to the electrodes, is separated from a substantially parallel second substrate (not shown), on which a strip electrode array 230 is formed having a second opposite polarity voltage waveform applied to the electrodes, by a flat plate electrode 220. Two ion channels are thereby formed, a first ion channel 215 between the first substrate and the flat plate electrode 220, and a second ion channel 225 between the second substrate and the flat plate electrode.

The first ion channel 215 is arranged to transmit ions of type C mobility variance, by the choice of polarity of the voltage waveform applied to the strip electrodes 210 on the first substrate, and the second ion channel 225 is arranged to transmit ions of type A mobility variance by the choice of polarity of the voltage waveform applied to the strip electrodes 230 of the second substrate. The flat plate electrode 220 serves to generate an electric field which applies a force to both type C and type A mobility variance ions, for example by applying a DC voltage to the plate electrode, the force being towards the respective strip electrode array. By this means, a given charge polarity of ions of both type A and type C mobility variance is transmitted.

Advantageously, the separation of type C and type A ions may be accomplished upstream of the device in FIG. 12A by the use of a simple low-resolution FAIMS separator having an axis aligned with the flat plate electrode, and having FAIMS separation in the y direction. The FAIMS electrodes in this upstream device are parallel to the two substrates and are either side of the axis of the FAIMS separator. Only modest FAIMS separation is required to guide type C ions to one side of the axis and type A ions to the other side of the axis (in y). The FAIMS electrodes are positioned so that this modest separation does not result in ions of interest striking the FAIMS electrodes. Instead, they are delivered to the device of FIG. 12A either side of the flat plate electrode.

Figure 12B:
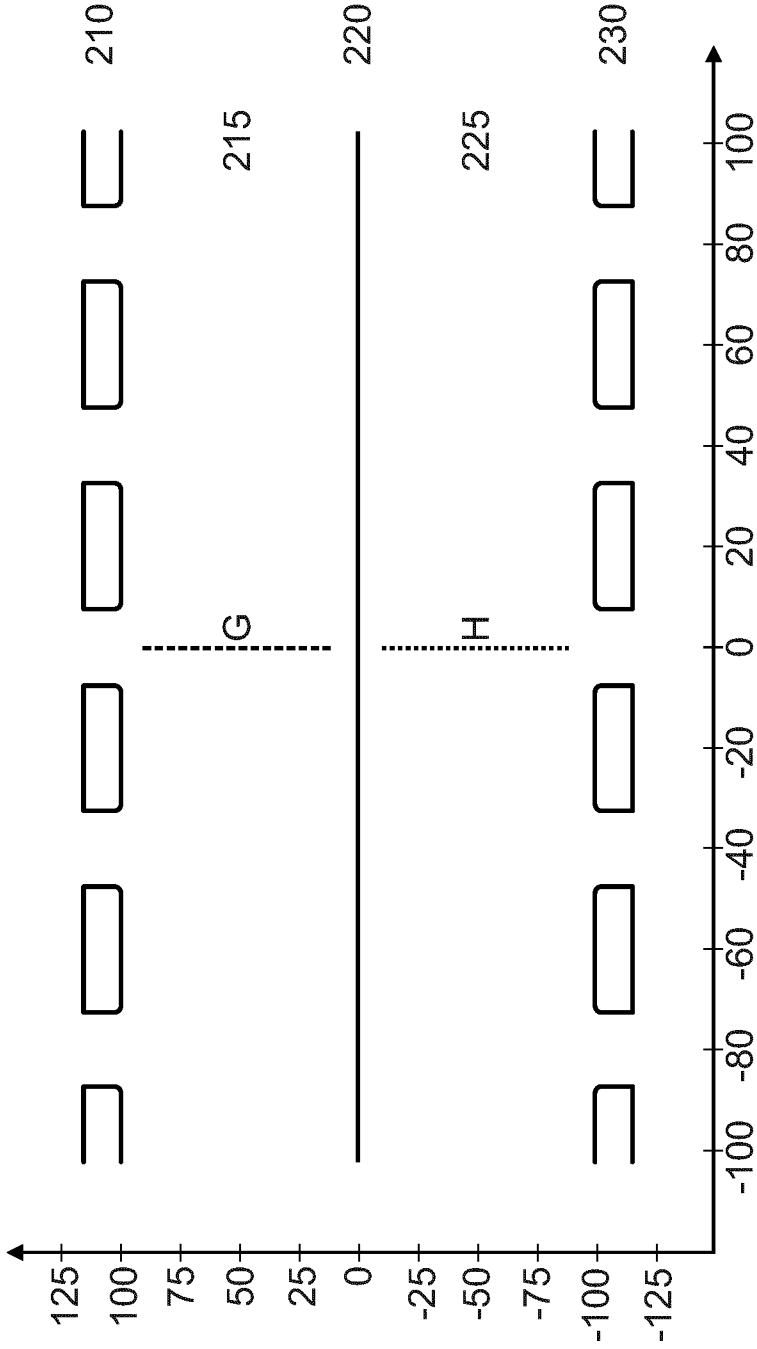
FIG. 12B illustrates a portion of the electrode structure of FIG. 12A with test lines.

Reference is now made to FIG. 12B, showing a portion of the electrode structure of FIG. 12A in x-y space (μm) (solid lines) with test line G (dashed line) within the first ion channel 215 for type C ions and test line H (dotted line) within the first ion channel 225 for type A ions, to indicate where pseudo-potential is calculated.

Figure 12C:
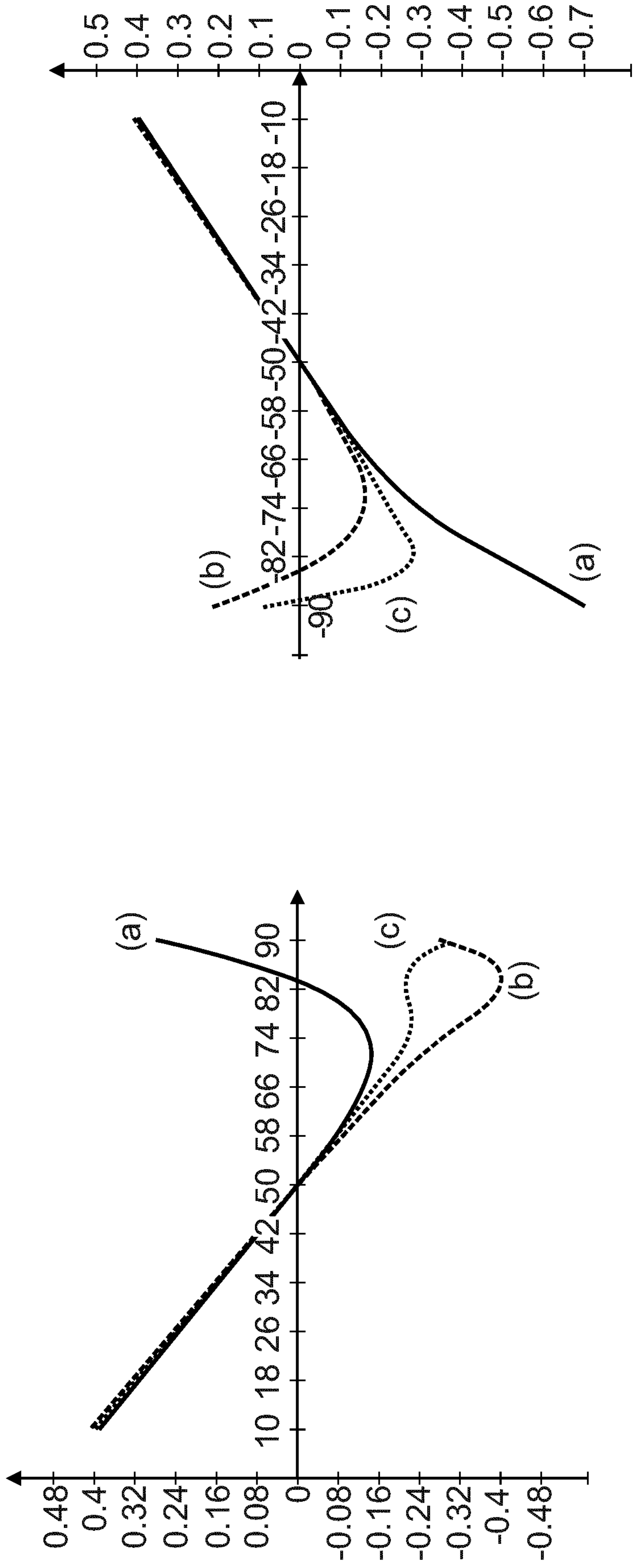
FIGS. 12C and 12D show plots of effective potential against y position along the test lines of FIG. 12B for singly charged ions.
Figure 12D:
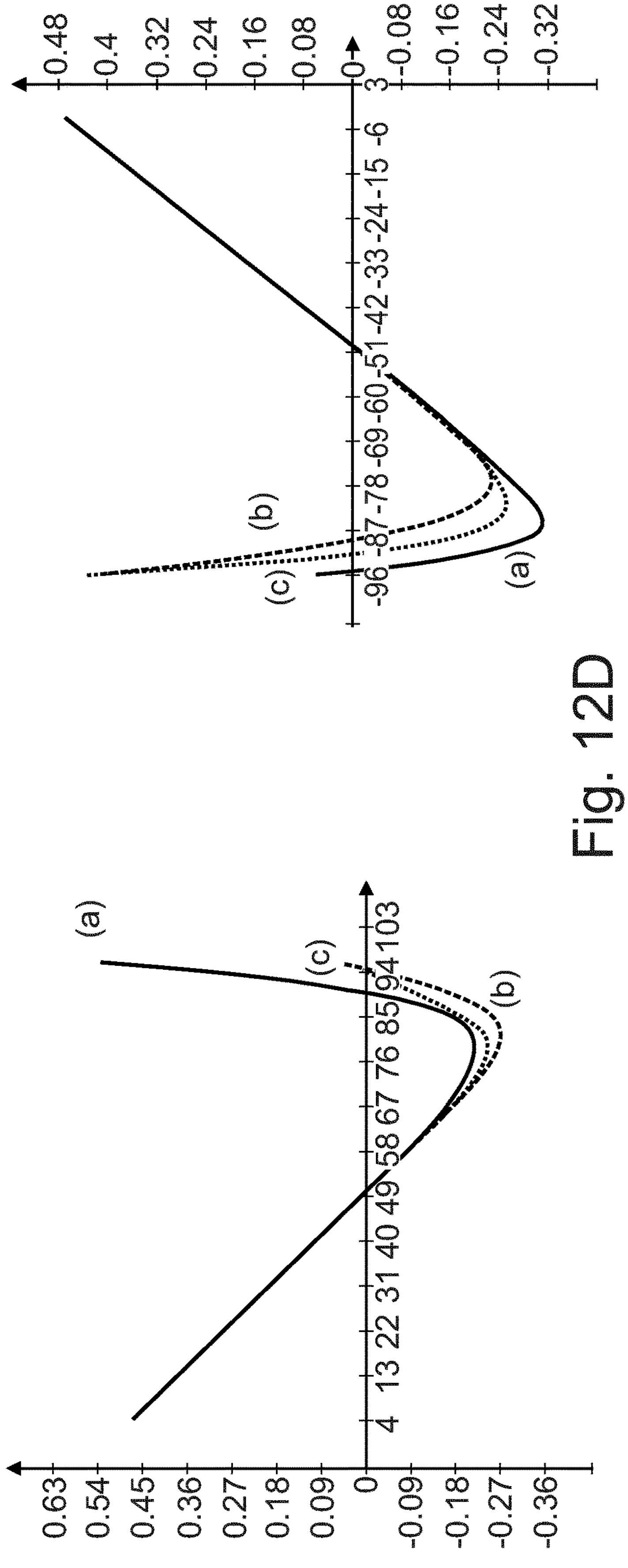

Now, referring to FIGS. 12C and 12D, there are shown plots of effective potential (V) against y position (μm) along the test lines of FIG. 12B for singly charged ions. The mass of the ions in FIG. 12C is 100 Da and in FIG. 12D, the mass of the ions is 1000 Da. The left-hand plot of each drawing is along the test line G of FIG. 12B and the right-hand plot is along the test line H of FIG. 12B. The plots are for ions with: (a) type C mobility variance (solid line); (b) type A mobility variance (dashed line); and (c) invariant mobility (dotted line). A zero to peak two-term cosine RF voltage waveform of 150 V is applied with negative polarity to the upper electrodes at a base frequency of 20 MHz with 2-fold phase splitting. A DC voltage of +1V is applied to the flat plate electrode.

It is noted how there is a considerable residual pseudo-potential effect for ions of mass 1000 Da (FIG. 12D), but very little residual pseudo-potential effect for ions of mass 100 Da (FIG. 12C). The present disclosure utilises whatever residual pseudo-potential effect there is under the action of the asymmetric voltage waveform.

Figure 13A:
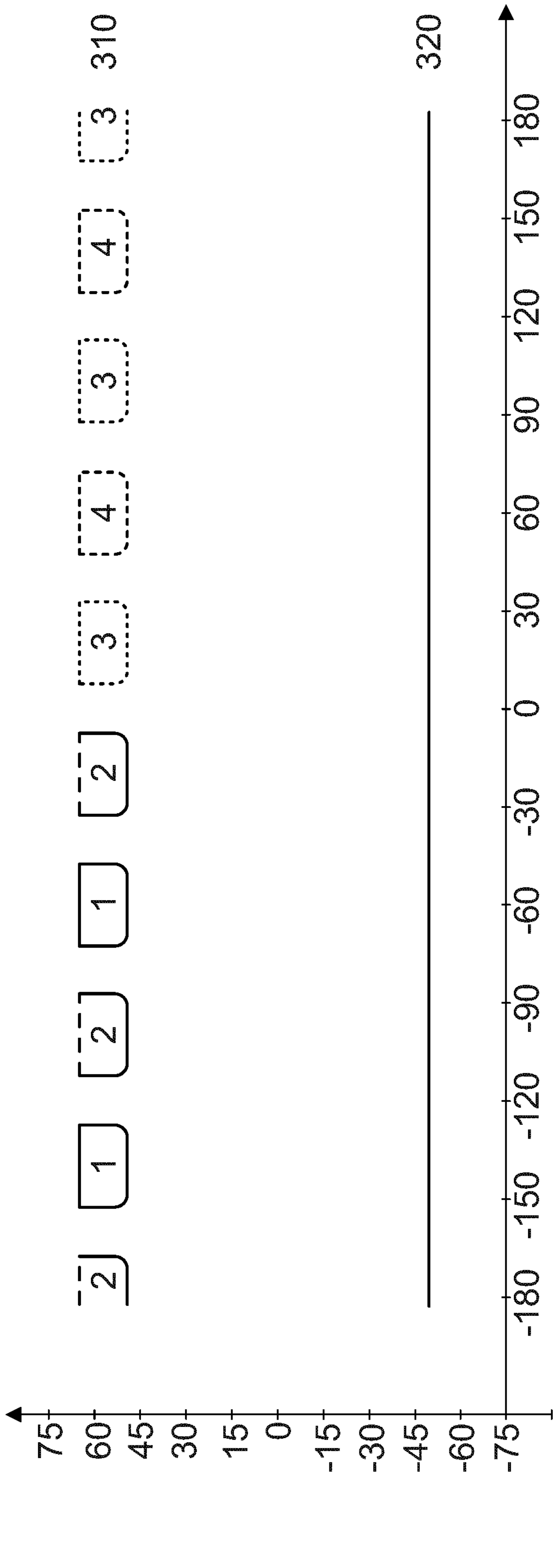
FIG. 13A shows a cross sectional view of a portion of an array of strip electrodes forming multipoles on a substrate and with a flat plate electrode.

Referring next to FIG. 13A, there is shown a cross sectional view of a portion of an array of strip electrodes 310 forming multipoles on a substrate and with a flat plate electrode 320, y (μm) against x (μm). This provides a second approach for the transmission (and/or confinement) of a sample of a given charge polarity of ions along an electrode array, the sample comprising both type C and type A mobility variance ions of a given charge polarity.

The arrays of electrodes form traps for ions of a given mobility variance. Groups of electrodes are provided with a voltage waveform of one polarity and other groups of electrodes are provided with a voltage waveform of the opposite polarity, the groups of electrodes all being upon a single substrate.

Figure 13B:
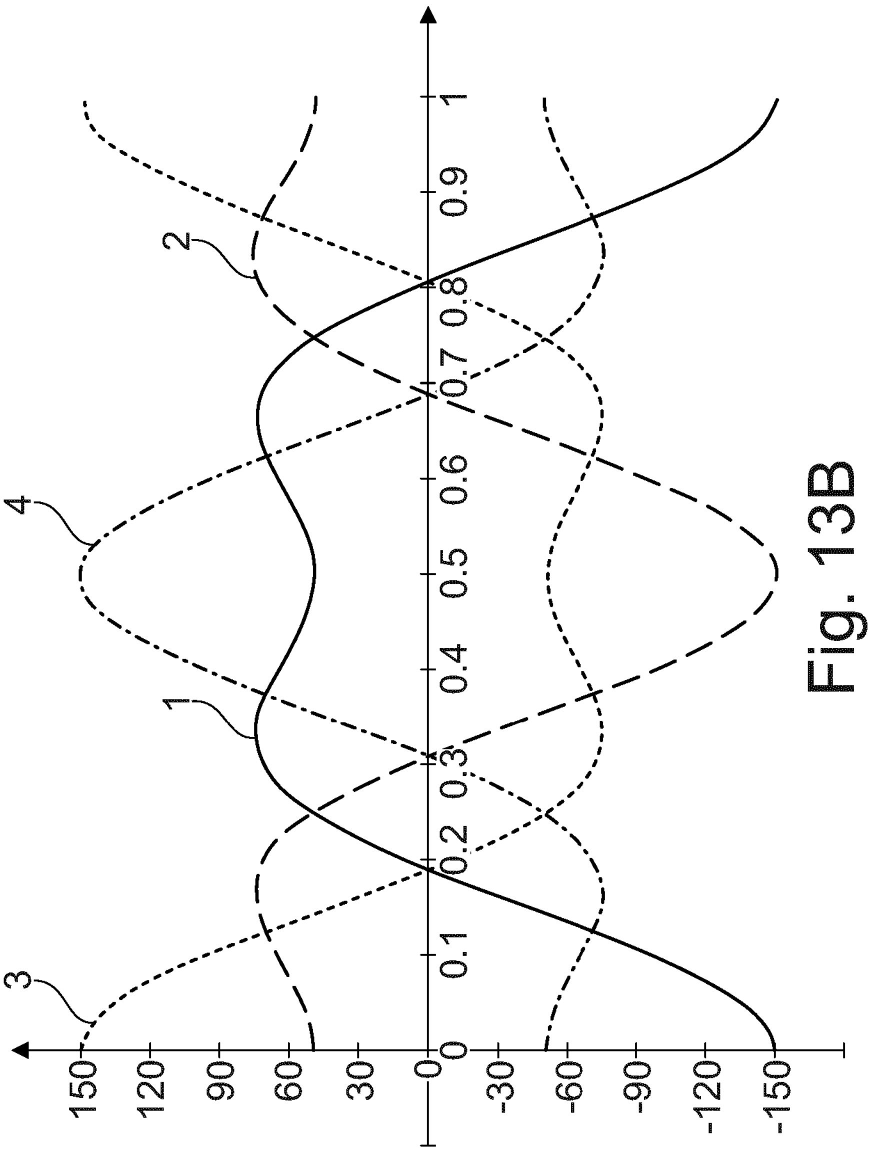
FIG. 13B plots voltage waveforms applied to the strip electrodes of FIG. 13A.

Referring to FIG. 13B, there are plotted voltage waveforms applied to the strip electrodes in this embodiment. In this example, a first group of strip electrodes (1, 2) lies at negative x and has negative polarity and a second group of electrodes (3, 4) lies at positive x and has positive polarity. The first group has negative polarity two-term cosine voltage waveform applied and the second group has positive polarity two-term cosine voltage waveform applied. Both the negative polarity voltage waveform and the positive polarity voltage waveform are split into two phases, with 180 degrees phase shift between them which is applied to alternate electrodes.

Figure 14A:
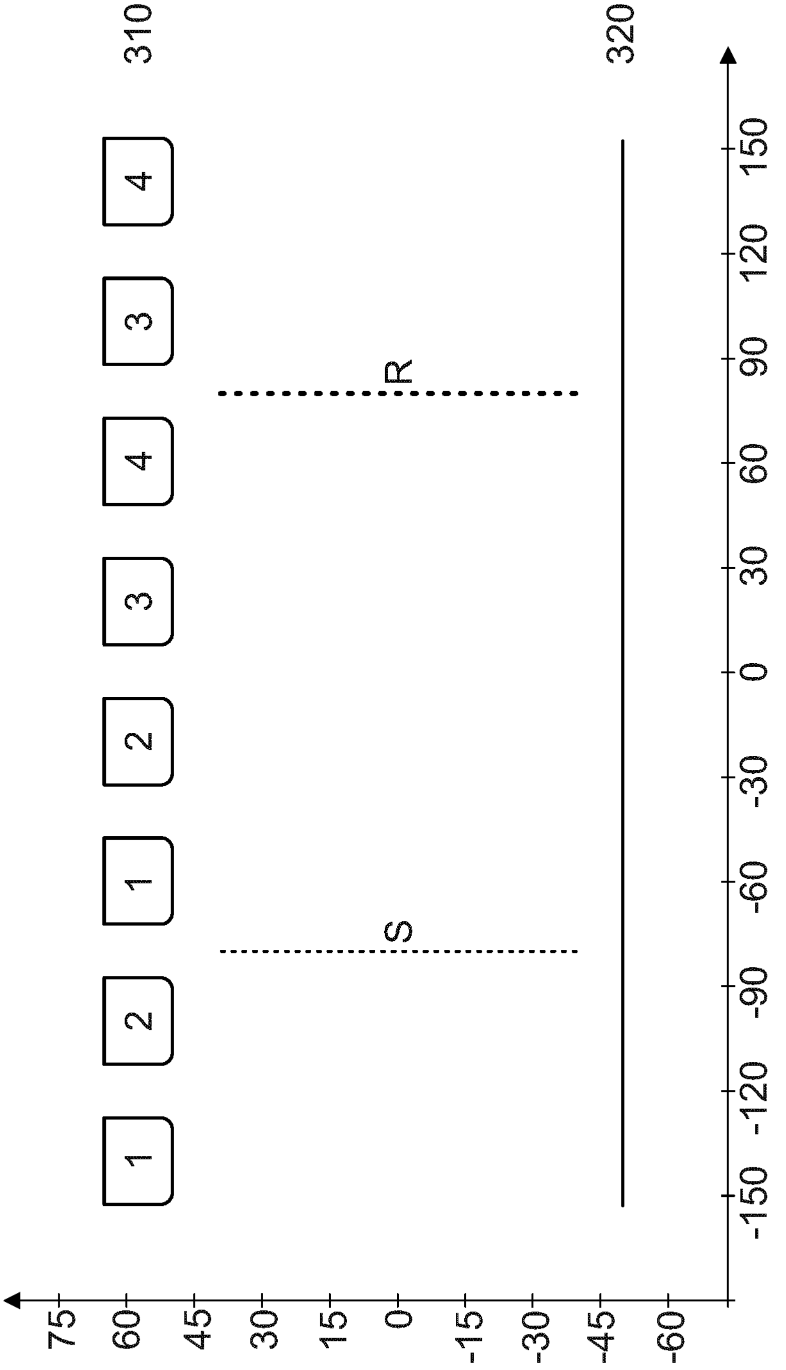
FIG. 14A shows a portion of the electrode structure of FIG. 13A in x-y space with test lines.

With reference to FIG. 14A, there is shown a portion of the electrode structure of FIG. 13A in x-y space (μm) (solid lines) with test lines R (dashed line) and S (dotted line), to indicate where pseudo-potential is calculated. The test lines R and S extend from 10 μm away from the flat plate electrode to 10 μm away from the surface of the strip electrodes. The test lines are located at x=−80 μm and +80 μm respectively.

Figure 14B:
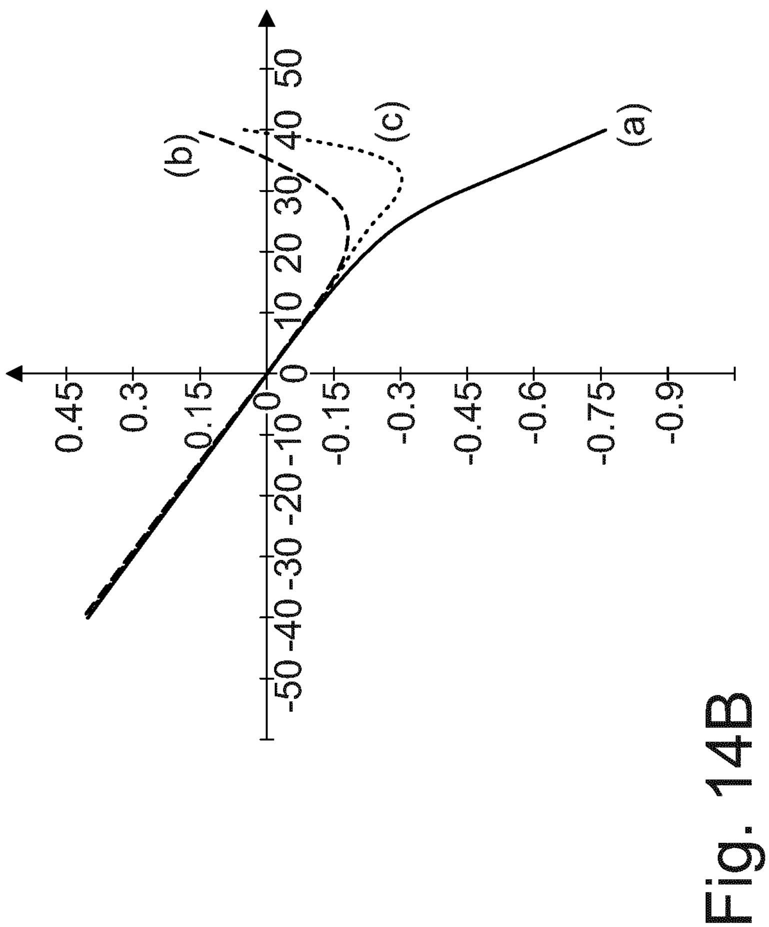
FIGS. 14B and 14C show plots of effective potential against y position along the test lines of FIG. 14A for singly charged ions.
Figure 14B:
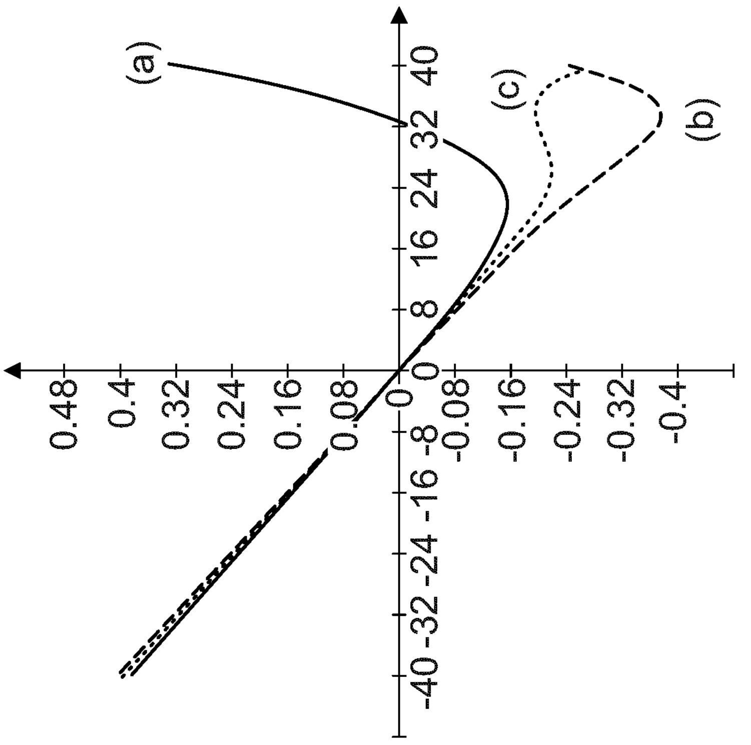
Figure 14C:
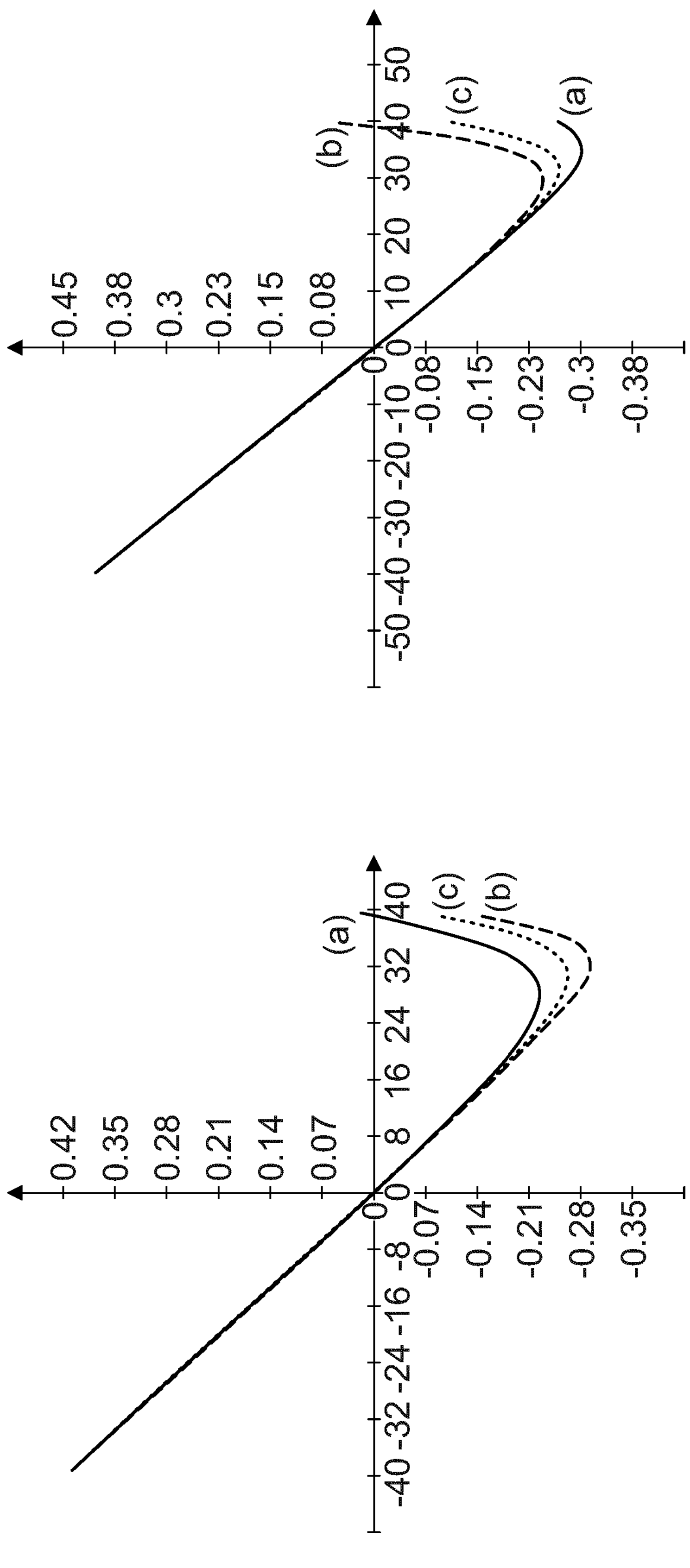
Figure 15A:
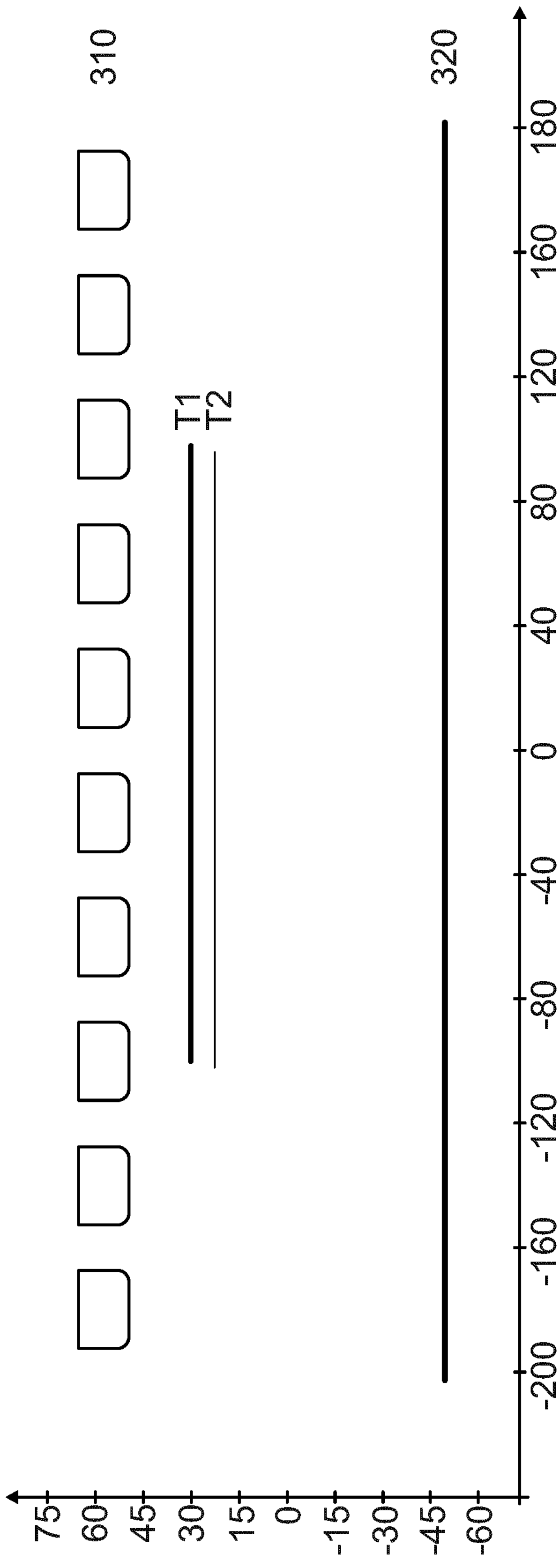
FIG. 15A shows a portion of the electrode structure of FIG. 13A with test lines.

Now, referring to FIGS. 14B and 14C, there are shown plots of effective potential (V) against y position (μm) along the test lines of FIG. 14A for singly charged ions. The mass of the ions in FIG. 14B is 100 Da and in FIG. 14C, the mass of the ions is 1000 Da. The left-hand plot of each drawing is along the test line R of FIG. 14A and the right-hand plot is along the test line S of FIG. 14B. The plots are for ions with: (a) type C mobility variance (solid line); (b) type A mobility variance (dashed line); and (c) invariant mobility (dotted line). A zero to peak two-term cosine RF voltage waveform of 150 V is applied with negative polarity to the upper electrodes at a base frequency of 20 MHz with 2-fold phase splitting. Alternative polarity waveforms are applied on different pairs of electrodes as discussed above and shown in FIG. 13B. As is seen by comparing FIGS. 14B and 14C, the position of the effective potential well is different for different mass ions. With reference to FIG. 15A, there is shown a portion of the electrode structure of FIG. 13A in x-y space (μm) (solid lines) with test lines T1 (dashed line) and T2 (dotted line), to indicate where pseudo-potential is calculated. The test lines T1 and T2 extend from −100 μm to +100 μm in x, and at y=23 μm (T1) and y=30 μm (T2). In view of the different positions of the effective potential well for different mass ions, two different y locations of test lines T1 and T2 are considered.

Figure 15B:
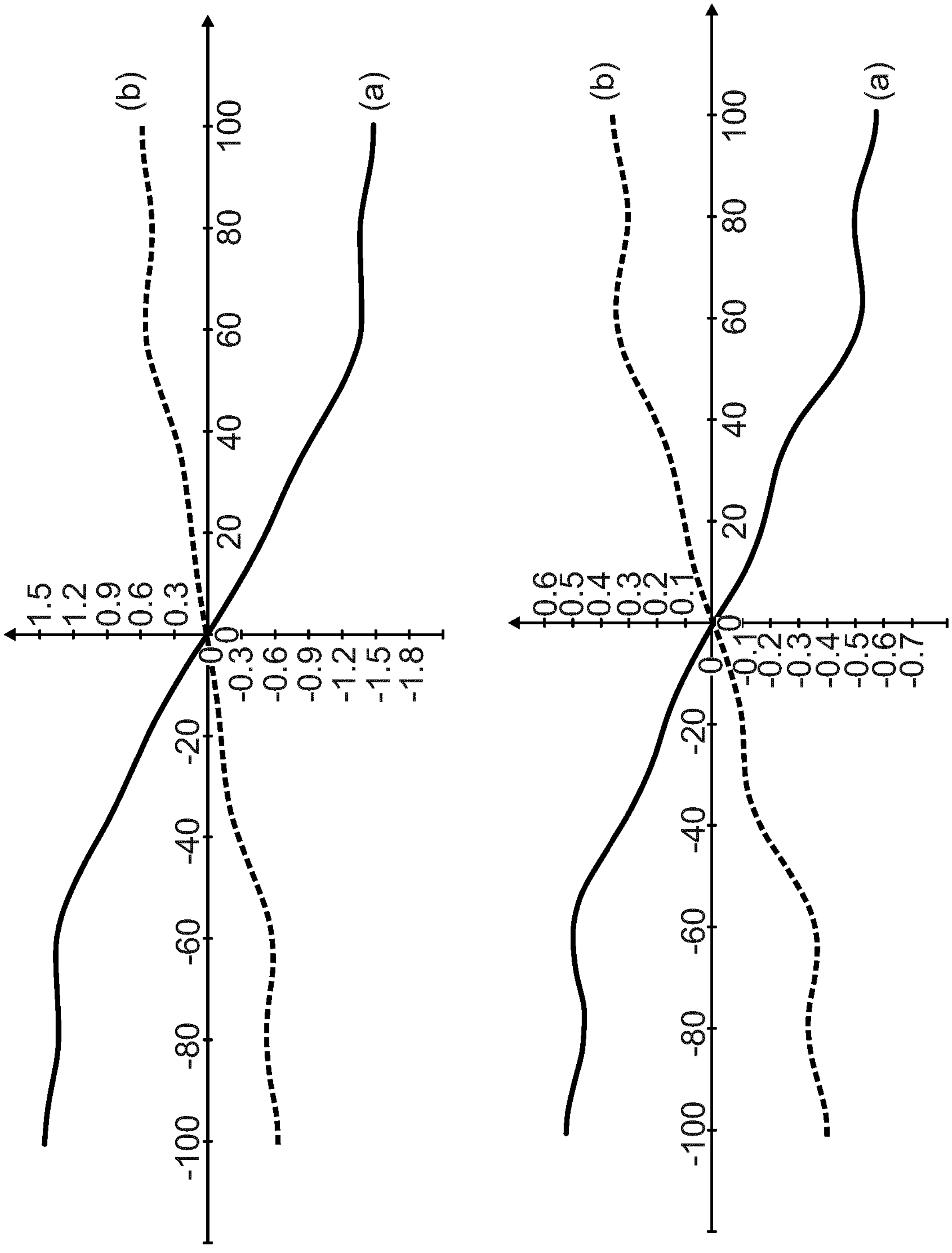
FIG. 15B shows plots of effective potential against x position along the test lines of FIG. 15A.

Now, referring to FIG. 15B, there are shown plots of effective potential (V) against x position (μm) along the test lines of FIG. 15A for singly charged ions. The upper plot is along the test line T1 of FIG. 15A and considers ions of mass 100 Da. The lower plot is along the test line T2 of FIG. 15A and considers ions of mass 1000 Da. The plots are for ions with: (a) type C mobility variance (solid line); (b) type A mobility variance (dashed line); and (c) invariant mobility (dotted line). A zero to peak two-term cosine RF voltage waveform of 150 V is applied with negative polarity to the upper electrodes at a base frequency of 20 MHz with 2-fold phase splitting. Alternative polarity waveforms are applied on different pairs of electrodes as discussed above and shown in FIG. 13B.

It can therefore be seen that a range of potential well locations are created for the different ions, separating ions in space. The use of alternate polarity waveforms on different pairs of electrodes enables ions of type C and type A to be repelled from the single substrate. The alternate polarity waveforms may be applied to adjacent pairs of electrodes, but more preferably they are applied to groups of the electrodes, each group having at least three electrodes within it. Type C ions are repelled from the areas of the substrate in which the polarity of the two-term cosine voltage waveform is negative polarity and type A ions are repelled from the areas of the substrate in which the polarity of the two-term cosine voltage waveform is positive polarity.

The effective potential barrier experienced by the ions in the x direction (across the array) once in or close to the potential well in the y direction is shown in FIG. 15B. This also shows the case of a preferred embodiment in which alternate polarity voltage waveforms are applied to adjacent groups of strip electrodes. Of course it is not necessary for all the electrodes of one group to be adjacent to one another. A portion or portions of the substrate may be used to repel ions having type C mobility variance and another portion or other portions may be used to repel ions having type A mobility variance by the application of the appropriate polarity voltage waveform to the electrodes in the different portions.

Based on evidence available it is suggested that, if the groups of electrodes having opposite polarity have only small numbers of strip electrodes, such as only two, for example, and the two groups are adjacent one other, ions getting close to the border between adjacent groups may become unstable and move into the region where the polarity of the voltage waveform produces an effective potential hill driving the ions onto the strip electrodes. It is therefore advantageous to have more than two electrodes in each group. This effect can be appreciated when comparing FIG. 15B with FIGS. 14B and 14C. When the effective potential is a well for type C ions scanning in y (FIG. 14B left plot and 14C left plot) there is a saddle when scanning along in x (FIG. 15B).

Figure 16A:
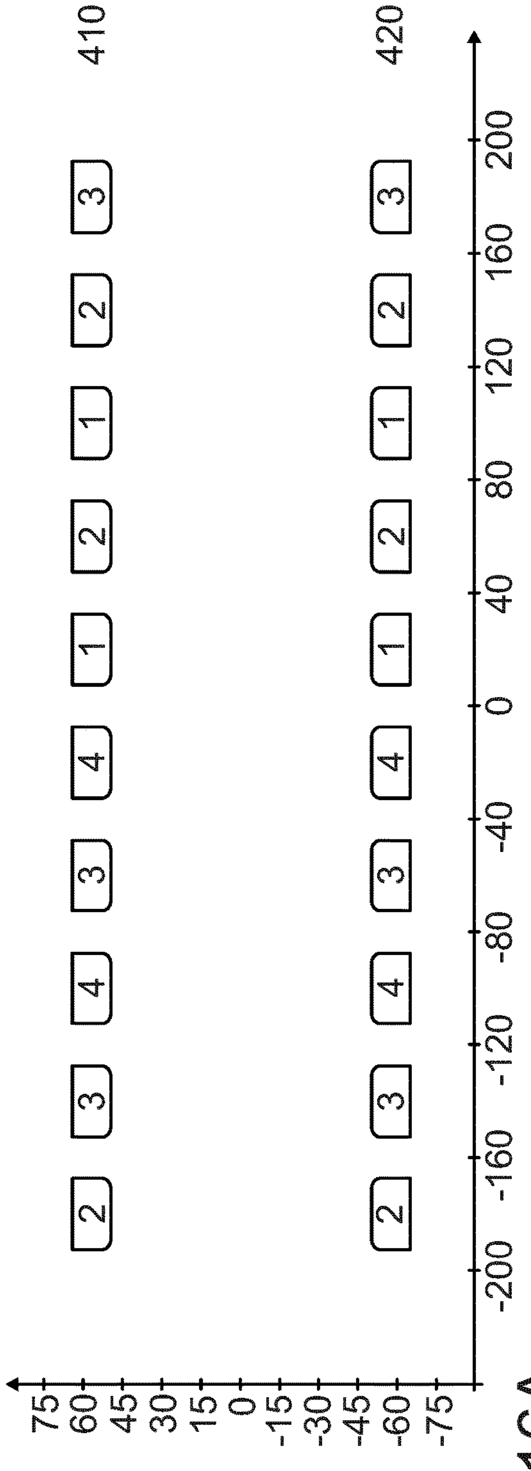
FIG. 16A shows a cross sectional view of a portion of first and second arrays of strip electrodes forming multipoles on respective, opposing substrates.
Figure 16B:
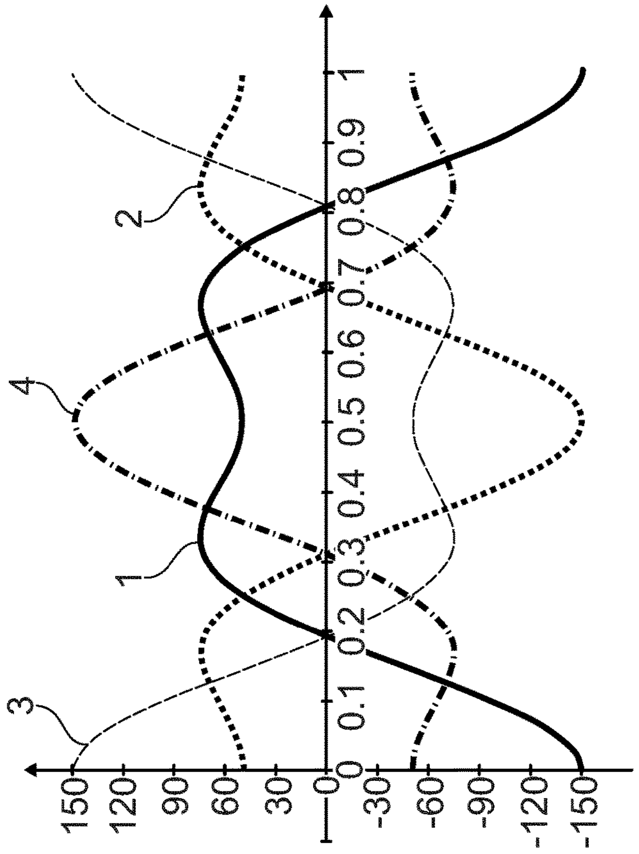
FIG. 16B plots voltage waveforms applied to the strip electrodes of FIG. 16A.

Referring next to FIG. 16A, there is shown a cross sectional view of a portion of first 410 and second 420 arrays of strip electrodes forming multipoles on respective, opposing substrates, y (μm) against x (μm). This provides a third approach for the transmission (and/or confinement) of a sample of a given charge polarity of ions along an electrode array, the sample comprising both type C and type A mobility variance ions of a given charge polarity. Referring to FIG. 16B, there are plotted voltage waveforms applied to the strip electrodes in this embodiment.

Pairs of electrodes 410 are provided with a voltage waveform of one polarity and other pairs of electrodes 410 are provided with a voltage waveform of the opposite polarity, all these electrodes 410 being upon a first substrate. Preferably, the following approach is taken. A first group of strip electrodes comprises two or more pairs of contiguous electrodes (labelled 1 and 2) having asymmetrical negative polarity voltage waveforms applied, alternate electrodes within the group having a phase shift in the voltages applied between them. A second group of strip electrodes, which comprises two or more pairs of contiguous electrodes (labelled 3 and 4), have asymmetrical positive polarity voltage waveforms applied. Alternate electrodes within the group have a phase shift in the voltages applied between them. The phase shift is preferably 180 degrees.

A second substrate having the same pattern of strip electrodes 420 is provided and is arranged to face the first substrate and be in alignment with it. The strip electrodes of the two substrates are aligned and have the same voltage waveform applied.

Figure 16C:
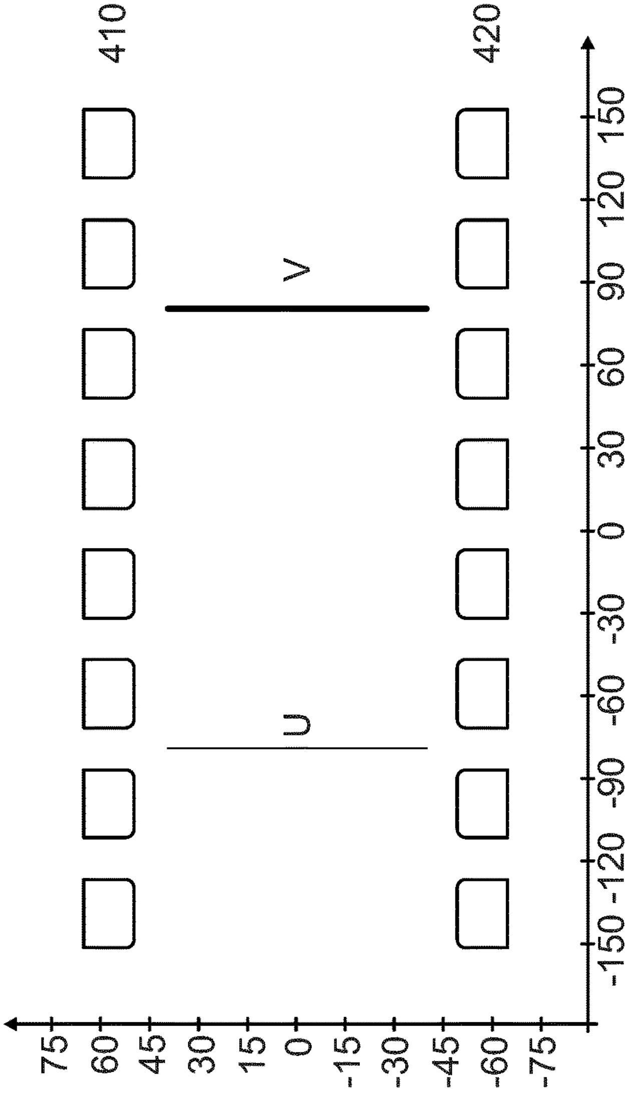
FIG. 16C shows a portion of the electrode structure of FIG. 16A with test lines.
Figure 16D:
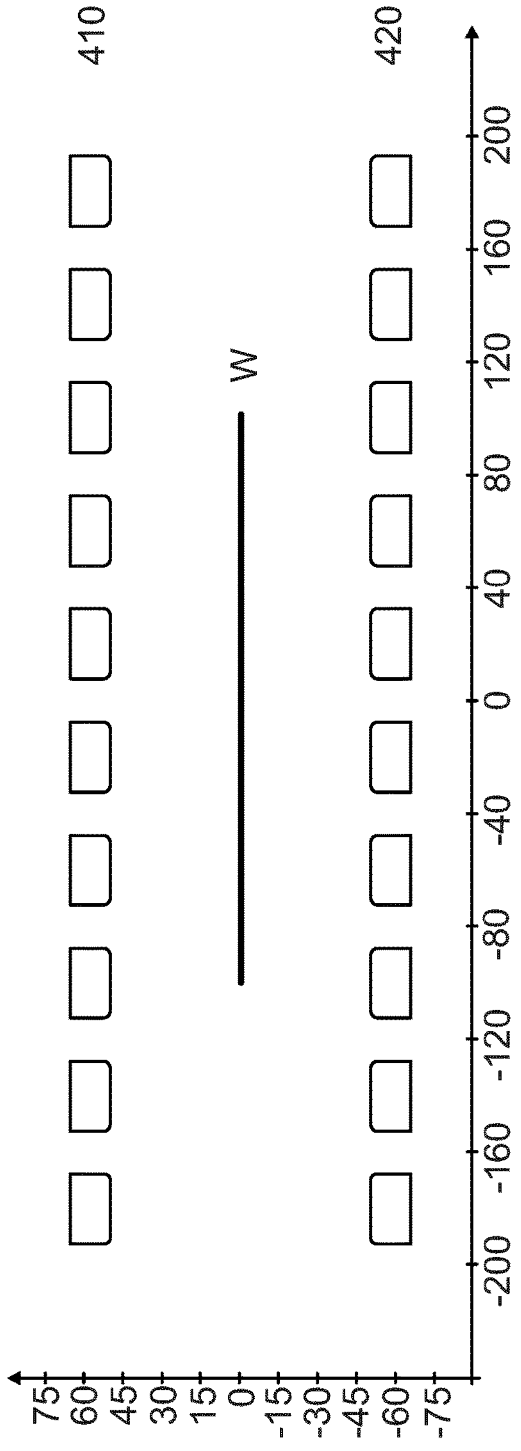
FIG. 16D shows a portion of the electrode structure of FIG. 16A with a further test line.

With reference to FIG. 16C, there is shown a portion of the electrode structure of FIG. 16A in x-y space (μm) (solid lines) with test lines U (dotted line) at x=−70 μm and V (dashed line) at x=70 μm, to indicate where pseudo-potential is calculated. Referring to FIG. 16D, there is shown a portion of the electrode structure of FIG. 16A in x-y space (μm) (solid lines) with a test line W, to indicate where pseudo-potential is calculated. Test line W lies midway between the two opposing substrates, at y=0.

Figure 16E:
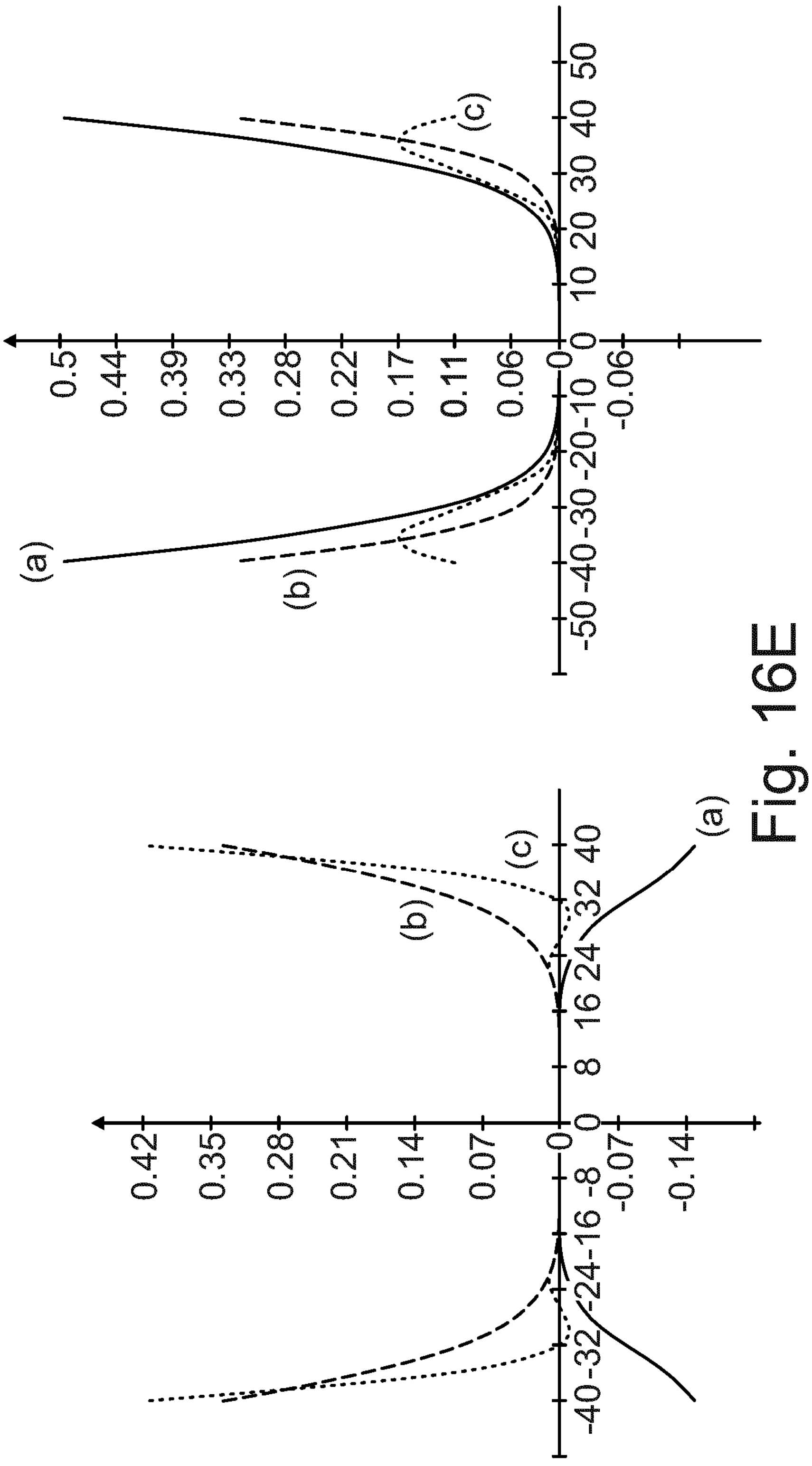
FIGS. 16E and 16F show plots of effective potential against y position along the test lines of FIG. 16C for singly charged ions.
Figure 16F:
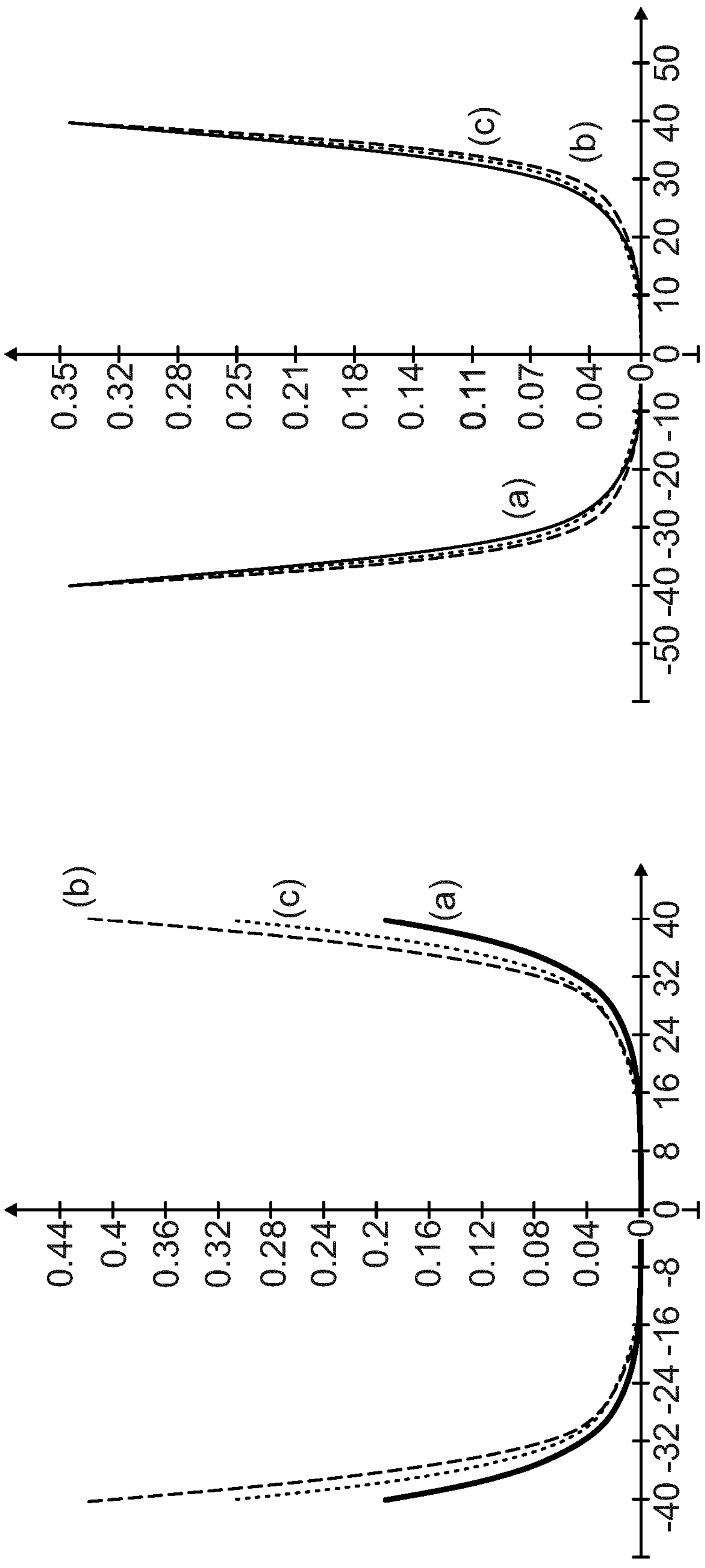

Now, referring to FIGS. 16E and 16F, there are shown plots of effective potential (V) against y position (μm) along the test lines of FIG. 16C for singly charged ions. The mass of the ions in FIG. 16E is 100 Da and in FIG. 16F, the mass of the ions is 1000 Da. The left-hand plot of each drawing is along the test line U of FIG. 16C and the right-hand plot is along the test line V of FIG. 16C. The plots are for ions with: (a) type C mobility variance (solid line); (b) type A mobility variance (dashed line); and (c) invariant mobility (dotted line). A zero to peak two-term cosine RF voltage waveform of 150 V is applied with negative polarity to the upper electrodes at a base frequency of 20 MHz with 2-fold phase splitting. Alternative polarity waveforms are applied on adjacent pairs of electrodes as discussed above and shown in FIG. 16B.

Figure 16G:
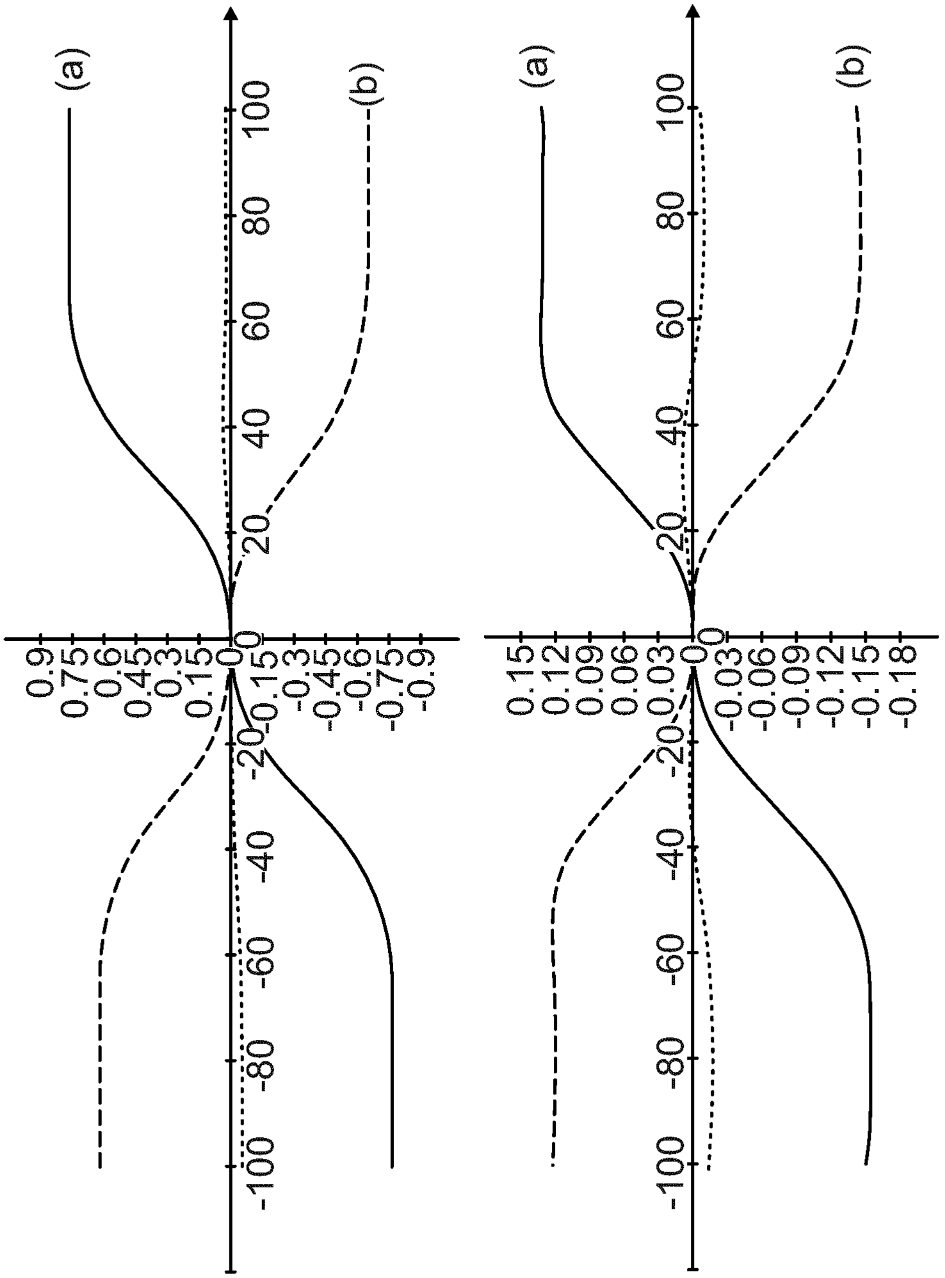
FIG. 16G shows plots of effective potential against x position along the test line of FIG. 16D for singly charged ions.

Now, referring to FIG. 16G, there are shown plots of effective potential (V) against x position (μm) along the test line W of FIG. 16D for singly charged ions. The upper plot is for singly charged ions of mass 100 Da and the lower plot is for singly charged ions of mass 1000 Da. The plots are for ions with: (a) type C mobility variance (solid line); (b) type A mobility variance (dashed line); and (c) invariant mobility (dotted line). A zero to peak two-term cosine RF voltage waveform of 150 V is applied with negative polarity to the upper electrodes at a base frequency of 20 MHz with 2-fold phase splitting. Alternative polarity waveforms are applied on adjacent pairs of electrodes as discussed above and shown in FIG. 16B. In this approach, the effective potential well of all ion species lies along the axis (y=0), as shown in FIGS. 16E, 16F and 16G.

It has been discovered that, if the groups of electrodes having opposite polarity have only small numbers of strip electrodes (for example, only two) and the two groups are adjacent one other, ions getting close to the border between adjacent groups may become unstable and move into the region where the polarity of the voltage waveform produces an effective potential hill driving the ions onto the strip electrodes. It is therefore advantageous to have more than two electrodes in each group. This effect can be appreciated when comparing FIG. 16G with FIGS. 16E and 16F. When the effective potential is a well for type C ions scanning in y there is a saddle when scanning along in x.

With reference to a general sense of the disclosure discussed above, another aspect of the disclosure may be found in an ion optical device, comprising a second substantially planar surface facing the ion repulsive surface. For example, the ion optical device may comprise: a first ion repulsive surface as herein disclosed; and a second ion repulsive surface as herein disclosed, spatially separated from the first ion repulsive surface, so as to define an ion channel between the first and second ion repulsive surfaces. In other words, the second substantially planar surface may be a second substrate of strip electrodes with the outer surfaces of the electrodes facing the outer surface of the electrodes of the first substrate. The space created between the outer surfaces of the two arrays of strip electrodes forms a channel, and typically that channel is of a size similar to or a few multiples of the spacing between strip electrodes (for instance, between 1 and 4 times, or between 1 and 3 times or between 1 and 2 times the spacing between strip electrodes), so that ions may be injected into this channel. The arrays of strip electrodes of the two substrates can be all elongated in the same (z) direction, and they can be aligned with each other. Alternatively, the strip electrodes on one substrate can be arranged at an angle to those of the second substrate. The angle can be 90 degrees. As with other ion optical devices considered herein, the frequency of the first and second RF voltages (especially the base frequency) may be selected such that ion oscillation amplitudes are less than a substantial fraction of a width of the ion channel. As above, an ion optical system, comprising a plurality of RF ion guides, each of the plurality of RF ion guides being formed by an ion optical device as herein disclosed may also be considered.

Optionally, a plate electrode may be positioned between and spatially separated from the first and second ion repulsive surfaces, so as to define a first ion channel between the first ion repulsive surface and the plate electrode and a second ion channel between the second ion repulsive surface and the plate electrode. Then, the first and second RF voltages of the first ion repulsive surface may have opposite polarity from the first and second RF voltages of the second ion repulsive surface. This may allow the first and second ion channels to transport ions of different mobility types. A FAIMS separator may be provided upstream the ion optical device, configured to separate ions according to their ion mobility type and direct a first type of ions to the first ion channel and a second type of ions to the second ion channel.

In the ion optical device, the first plurality of electrodes of the first ion repulsive surface are advantageously arranged to be aligned with and opposite the first plurality of electrodes of the second ion repulsive surface and/or the second plurality of electrodes of the first ion repulsive surface are arranged to be aligned with and opposite the second plurality of electrodes of the second ion repulsive surface. Then, the first RF voltage of the first ion repulsive surface is typically the same as the first RF voltage of the second ion repulsive surface and/or the second RF voltage of the first ion repulsive surface is typically the same as the second RF voltage of the second ion repulsive surface.

In some embodiments, each of the first and/or second ion repulsive surface have more than two respective pluralities of electrodes, for example having four pluralities of electrodes (each receiving a RF voltage of different phase), as discussed above. Then, the third plurality of electrodes of the first ion repulsive surface may be aligned with and opposite the third plurality of electrodes of the second ion repulsive surface and/or the fourth plurality of electrodes of the first ion repulsive surface may be aligned with and opposite the fourth plurality of electrodes of the second ion repulsive surface. Then, the third RF voltage of the first ion repulsive surface is typically the same as the third RF voltage of the second ion repulsive surface and/or the fourth RF voltage of the first ion repulsive surface is typically the same as the fourth RF voltage of the second ion repulsive surface. In such configurations, the first RF voltage and the third RF voltage may have opposite polarity and/or the second RF voltage and the fourth RF voltage may have opposite polarity (polarity in this context being defined by an average (mean) voltage or the polarity of the higher peak voltage across one cycle of a waveform of the respective RF voltage).

Transfer from One Pair of Opposing Strip Electrode Arrays to Another

Figure 17:
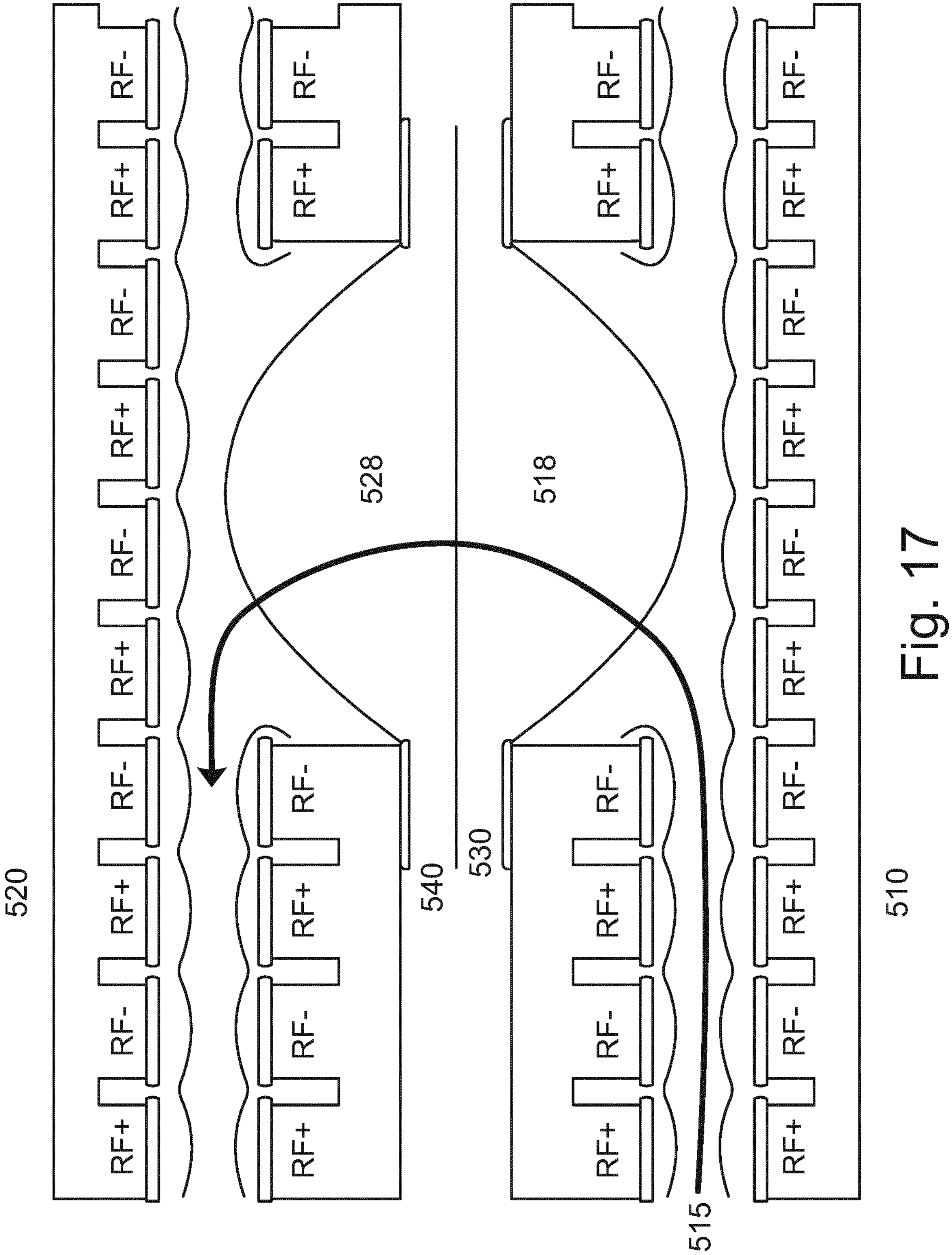
FIG. 17 depicts a schematic diagram of a first system with multiple ion optical devices.

Referring now to FIG. 17, a schematic diagram of a first system with multiple ion optical devices is shown, comprising: a first ion guide 510; a second ion guide 520; a first transfer electrode 530; and a second transfer electrode 540. The first transfer electrode 530 is located adjacent an aperture 518 in the first ion guide 510. The second transfer electrode 540 is located adjacent an aperture 528 in the second ion guide 520. Each of the first ion guide 510 and the second ion guide 520 is suitable for transmitting ions of one type of mobility variance at a given ion charge polarity, as discussed above. This arrangement allows parallel transfer of ions from one paired guide to another. Equi-potentials of effective potential (effective potential plus DC potential) are shown by thin lines. Phase shifting of 180 degrees of the two-term cosine waveform between adjacent electrodes is indicated by the terms 'RF−' and 'RF+'.

The second ion guide 520 has a lower voltage offset (for positive ions) than the first ion guide 510. For transmission of ions through the first ion guide 510 along a straight line, a repulsive voltage is applied to the first transfer electrode 530. For transfer into the second ion guide 520 along path 515, this voltage is switched to attractive one (negative for positive ions). The resulting field extracts ions from the aperture in the first ion guide 510 along DC voltage gradient into the second ion guide 520, where they are captured at the effective potential barrier of the second ion guide 520 and then directed by the DC gradient in the same way as described in the sections above. This process could be also run in gating mode, that is transfer taking place for a short time only, for example for selected species. In this case, rapid switching (or pulsing) of the voltage on transfer electrode 530 from repulsive to attractive and back to repulsive voltage can be used. The transfer electrodes may be referred to herein as gating electrodes in such embodiments.

Figure 18:
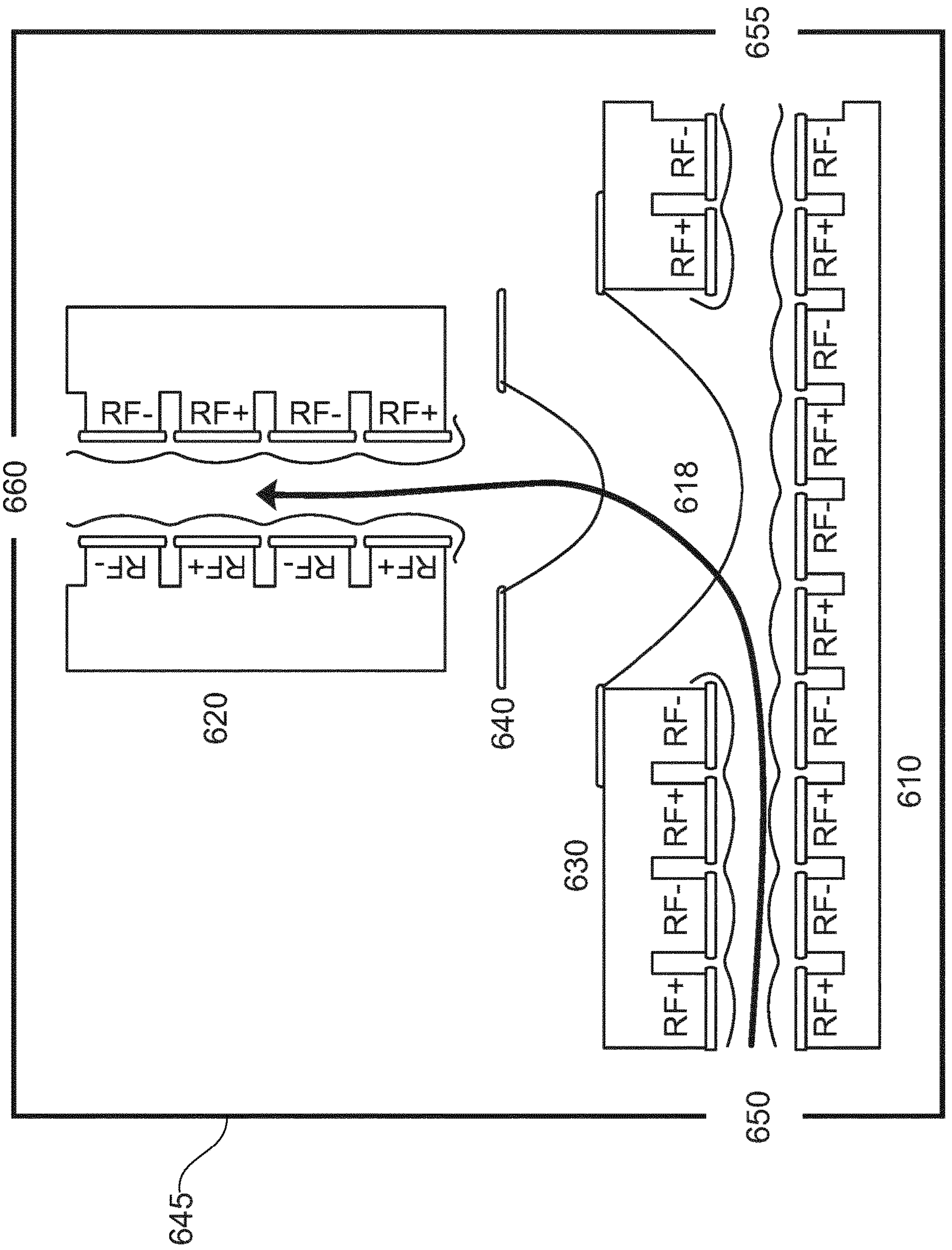
FIG. 18 shows a schematic diagram of a second system with multiple ion optical devices.

Referring next to FIG. 18, there is shown a schematic diagram of a second system with multiple ion optical devices. This embodiment allows transfer from a first paired ion guide 610 to a second, perpendicular ion guide 620 using first transfer electrode 630 and second transfer electrode 640. Each of the first ion guide 610 and second ion guide 620 is suitable for transmitting ions of one type of mobility variance at a given ion charge polarity. Also shown in this drawing (but applicable to other embodiments or implementations, as herein disclosed) is a housing 645. The housing 645 also includes a plurality of apertures for ion entry and/or ion exit. In this embodiment, these include: a first aperture 650 (allowing ions to be directed to or from one end of the first ion guide 610); a second aperture 655 (allowing ions to be directed to or from the other end of the first ion guide 610); and a third aperture 660 (allowing ions to be directed to or from an end of the second ion guide 620 distal the first ion guide 610). As above, equi-potentials of effective potential (effective potential plus DC potential) are shown by thin lines. Phase shifting of 180 degrees of the two-term cosine waveform between adjacent electrodes is indicated by the terms 'RF−' and 'RF+'.

The second ion guide 620 also has lower voltage offset (for positive ions) than the first ion guide 610. For transmission of ions through the first ion guide 610 on a straight line path, a repulsive voltage is applied to the first transfer electrode 630. For transfer through an aperture 618 in the first ion guide 610 into the second ion guide 620 guide, this voltage is switched to attractive one (negative for positive ions). The resulting field extracts ions along increasing DC voltage gradient created by the second transfer electrode 640. As known in the art, mobility-driven ions are concentrated by electric fields by a ratio equal to the ratio of electric fields. This enables concentration of ions on the narrow entrance of the orthogonal guide and their efficient capture. This could be accompanied by gating.

If a difference in voltage offsets between guides is undesirable and at the same time gating is required, an "energy lift" arrangement could be used as will now be discussed.

Figure 19:
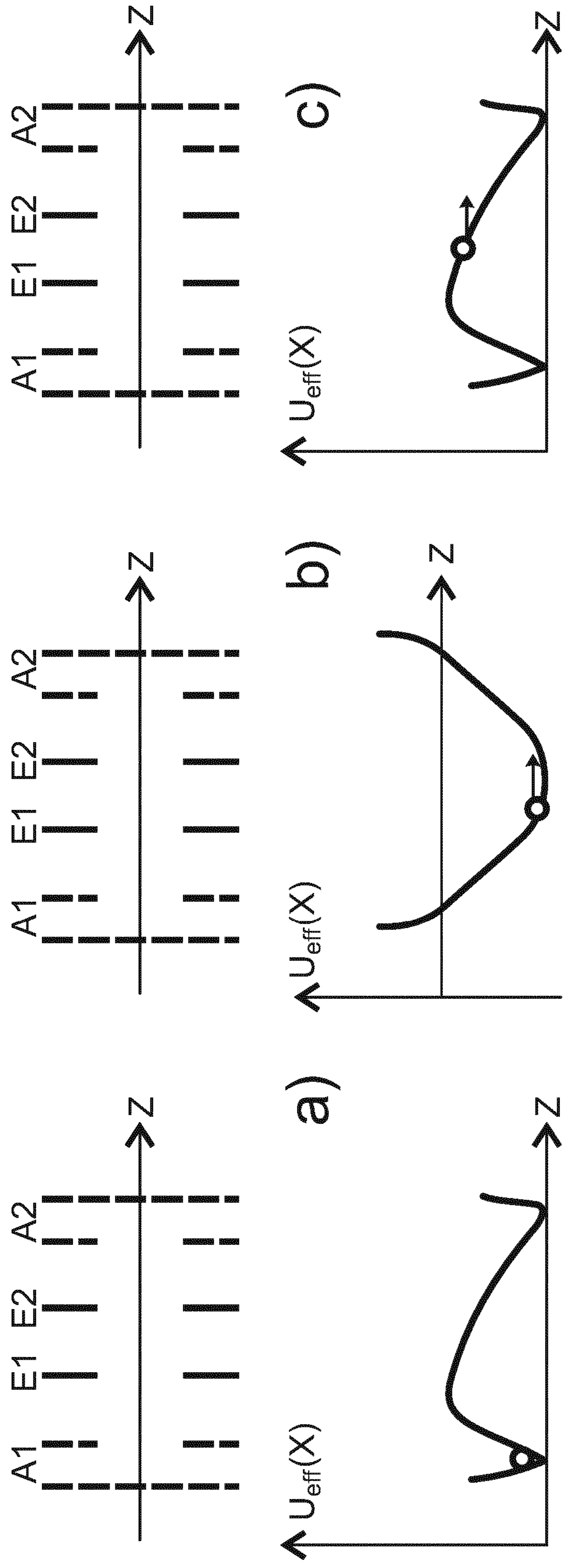
FIG. 19 illustrates effective potential distributions for energy lift to allow transfer between two ion guides at the same voltage offset.

Referring next to FIG. 19, there are illustrated effective potential distributions for an energy lift to allow transfer between two ion guides A1 and A2 at the same voltage offset. These are applicable to either the arrangement shown in FIG. 17 or that shown in FIG. 18.

The location of the transferred ion packet is shown by a circle and its direction of movement by an arrow. Three effective potential distributions are shown: (a) an initial distribution with ions in first ion guide A1 prior to transfer; (b) ions are transferred to the gap between first and second transfer electrodes (labelled E1 and E2, corresponding respectively to first transfer electrode 530, 630 and second transfer electrode 540, 640 of FIGS. 17 and 18) and continue moving there; and (c) a voltage pulse on both transfer electrodes is applied while ion packet is moving between the two transfer electrodes, so that DC voltage continues to drive ions towards the second (downstream) ion guide A2.

Figure 20:
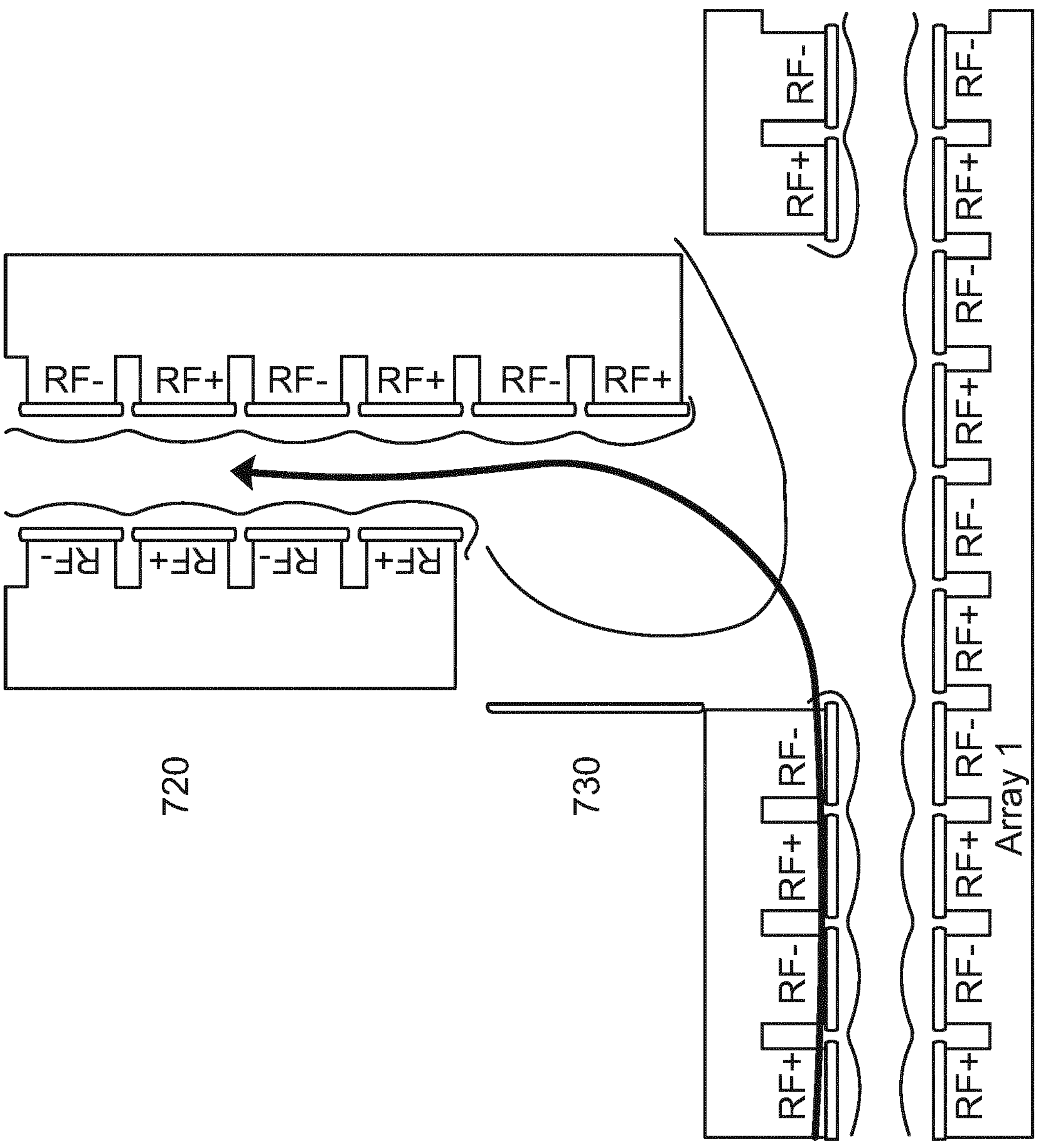
FIG. 20 shows a schematic diagram of a third system with multiple ion optical devices.

Referring next to FIG. 20, there is shown a schematic diagram of a third system with multiple ion optical devices. This allows perpendicular transfer of ions from a first paired ion guide 710 to a second ion guide 720 using a single transfer electrode 730. Equi-potentials of effective potential (pseudo-plus DC potential) are shown by thin lines. Phase shifting of 180 degrees of the two-term cosine waveform between adjacent electrodes is indicated by the terms 'RF−' and 'RF+'.

This drawing shows an alternative way to allow orthogonal transfer into an asymmetric paired guide. Each of the first ion guide 710 and the second ion guide 720 is suitable for transmitting ions of one type of mobility variance at a given ion charge polarity. In this case, there is no need for spatial focusing: once ions reach the extended open space of the second ion guide 720 on the right, they get captured by DC and RF fields and are transported into the narrow gap of the paired second ion guide 720.

It is important to mention that any of the arrangements discussed herein could be also used to dump unwanted ions into a dump cavity where they could be disposed of without contaminating ion guides. In this case, a dump cavity (for example, a Faraday cage) may replace the second ion guide.

Figure 21:
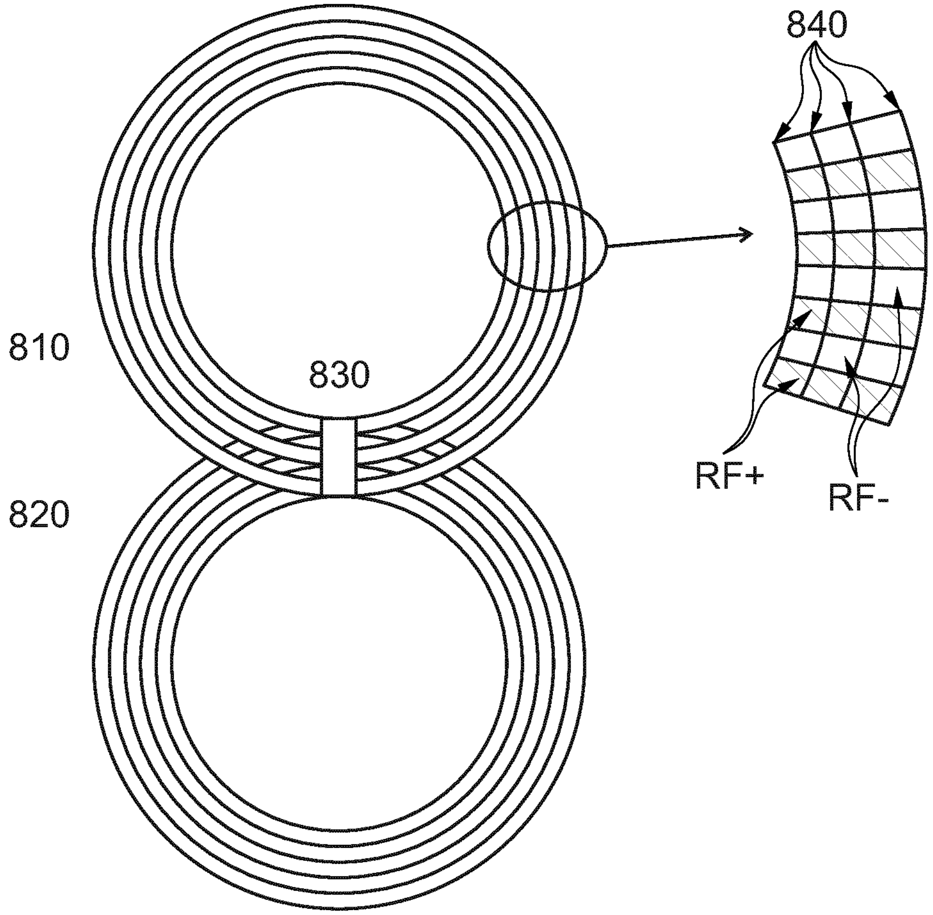
FIG. 21 shows a schematic diagram of a fourth system with multiple ion optical

Geometry other than straight planar geometry is feasible. Reference is now made to FIG. 21, showing a schematic diagram of a fourth system with multiple ion optical devices, specifically an embodiment based on circular geometry of each array. Ions are transferred between a first circular ion guide 810 and a second circular ion guide 820 via transfer optics 830. Phase shifting of 180 degrees of the two-term cosine waveform between adjacent electrodes is indicated by the term 'RF−' and 'RF+'. Confining DC electrodes 840 ensure narrow spread of ions in the radial direction. The DC confining electrodes 840 in this case partition the ion channel, in this case into three channels (inner, middle and outer). The inner channel or middle channel may be considered a first ion optical device having a first circular axis of a first radius and the outer channel may be considered a second ion optical device having a second circular axis, concentric with the first circular axis and of a second radius, greater than the first radius.

After passing through the first ion guide 810, ions are transferred into the second ion guide 820 as described before. To ensure the same drift length (for example, for ion mobility separation inside a set of arrays), the first ion guide 810 and second ion guide 820 could be arranged so that a smaller circle in the first ion guide 810 is followed by a larger circle in the second ion guide 820 and a larger circle in the first ion guide 810 is followed by a smaller circle in the second ion guide 820, summing up to the same length for all ions. This may be effected by transferring ions from the inner channel of the first ion guide 810 to the outer channel of the second ion guide 820, transferring ions from the outer channel of the first ion guide 810 to the inner channel of the second ion guide 820, transferring ions from the inner channel of the second ion guide 820 to the outer channel of the first ion guide 810 and transferring ions from the outer channel of the second ion guide 820 to the inner channel of the first ion guide 810.

Any combination of these elements could be used to create analytical instruments with any number and/or arrangement of stages. The embodiments described in relation to FIGS. 17 to 21 could be implemented using symmetric sinusoidal voltages only instead of the asymmetric waveforms described, so as to use the pseudo-potential effect alone to confine ions. However and as shown previously, an improved potential is preferable as is formed using the differential mobility effect.

Similar transfer principles could be also employed in a pulsed manner, especially for injection into other devices such as ion mobility spectrometers, between regions of different pressures or different gases, etc.

Considering a implementation using asymmetric or symmetric sinusoidal voltages, another generalised sense of the disclosure may be considered as an ion optical device, comprising: a first ion repulsive surface; and a second ion repulsive surface, spatially separated from the first ion repulsive surface, so as to define an ion channel between the first and second ion repulsive surfaces. Each of the first and second ion repulsive surfaces comprises: a first plurality of elongated electrodes distributed along an axis, configured to receive a first RF voltage; and a second plurality of elongated electrodes distributed along the axis, the second plurality of electrodes being interleaved with the first plurality of electrodes and configured to receive a second RF voltage, having a different phase than the first RF voltage. In such an aspect, the first and second RF voltages typically have symmetric waveforms. Any of the other features described herein with reference to the ion repulsive surfaces and/or ion optical devices may be applied to this configuration, for example including those discussed in a generalised or specific sense above. Also, ion optical systems using one or more ion optical devices may be considered, as detailed further below.

In accordance with any of the general senses of the disclosure considered above, the ion optical device may further comprise a transport controller, configured to induce movement of ions within the or each ion channel, for instance by controlling one or more of: application of time-invariant potentials to create a steady-state electric field along a length of the or each ion channel (for example, perpendicular to the length direction of the elongate electrodes, that is across the electrode); gas flow along the length of the or each ion channel; and application of travelling wave potentials to create a moving electric field along the length of the or each ion channel. Optionally, the transport controller may be configured to control the application of potentials to one or more of: the first plurality of electrodes; the second plurality of electrodes; and supplementary electrodes each positioned between one of the first plurality of electrodes and one of the second plurality of electrodes. The transport controller may comprise a computer system controlling one of more voltage supplies for application of the time-invariant potentials or travelling wave potentials and/or controlling one or more gas supplies for supplying the gas flow.

One aspect of the disclosure may be found in an ion optical system, comprising an ion optical device, configured to receive ions and as herein described. The ion optical system may further comprise: at least one gating electrode; and a DC power supply, configured selectively to provide a DC potential to the at least one gating electrode, so as to cause transfer of ions from the ion optical device to an output device. The output device may be another (that is, a second) ion optical device, which optionally may be in accordance with those described herein.

In some embodiments (examples of which are shown in FIGS. 17 to 20), the ion optical device may be formed using two ion repulsive surfaces positioned opposing one another. Then, an aperture may be provided (or formed) in one of the ion repulsive surfaces (for example, the first or second ion repulsive surface) or a plate electrode for ions to travel therethrough. The output device may be configured to receive ions from the ion optical device via the aperture.

Advantageously, a gating electrode may be positioned on the substrate of an ion repulsive surface of the ion optical device near the aperture. A single gating electrode may be used in some embodiments. In other embodiments, there may be multiple gating electrodes, for example: a first gating electrode, positioned on or adjacent to ion optical device; and a second gating electrode, positioned on or adjacent to the output device. In this case, a first DC gating potential may be provided to the first gating electrode and a second DC gating potential may be provided to the second gating electrode. The first and second DC gating potentials may then be configured to cause ions to travel from the first ion optical device through the aperture and to the second ion optical device.

Where the output device is a second ion optical device, configured to receive ions from the first ion optical device, a number of options may apply. In a first option, the second ion optical device is orientated parallel to the first ion optical device. Then, the first ion optical device may have a first aperture in an ion repulsive surface of the first ion optical device for ions to travel therethrough and the second ion optical device may have a second aperture in an ion repulsive surface of the second ion optical device for ions to be received from the first ion optical device. Alternatively, the second ion optical device may be orientated perpendicular to the first ion optical device. Then, the first ion optical device may have an aperture in an ion repulsive surface of the first ion optical device for ions to travel therethrough and the second ion optical device may be positioned such that ions can travel through the aperture and be received in an end of an ion channel of the second ion optical device (that is between the ion repulsive surfaces of the ion optical device or between an ion repulsive surface and a plate electrode of the ion optical device).

Considering an ion optical system having a plurality of RF ion guides, the plurality of RF ion guides may comprise: a first ion optical device having a first circular axis in a first plane; and a second ion optical device having a second circular axis that has a centre offset from the centre of the first circular axis, such that the first and second circular axes overlap. The second circular axis is beneficially defined in a second plane that is parallel with the first plane. Then, the ion optical system advantageously further comprises ion transfer optics, configured to transfer ions between the first and second ion optical devices in the region in which the first and second circular axes overlap.

In another configuration (an example of which is shown in FIG. 21), the plurality of RF ion guides may comprise: a first ion optical device having a first circular axis of a first radius; a second ion optical device having a second circular axis, concentric with the first circular axis and of a second radius, greater than the first radius; a third ion optical device having a third circular axis of the second radius, the centre of the third circular axis being offset from the centre of the first and second circular axes, such that the first and third circular axes overlap; and a fourth ion optical device having a fourth circular axis of the first radius, the fourth circular axis being concentric with the third circular axis, such that the second and fourth circular axes overlap. Then, the ion optical system may further comprise ion transfer optics, configured to: transfer ions between the first and third RF ion guides in the region in which the first and third circular axes overlap; and transfer ions between the second and fourth RF ion guides in the region in which the second and fourth circular axes overlap. Preferably, the first and second circular axes are defined in a first plane and the third and fourth circular axes are defined in a second plane that is parallel with the first plane.

For instance in the example shown in FIG. 21, there is also provided: a fifth ion optical device having a fifth circular axis, concentric with the first circular axis and of a third radius, greater than the first radius and smaller than the second radius; and a sixth ion optical device having a sixth circular axis, concentric with the second circular axis and of the third radius, such that the fifth and sixth circular axes overlap. The ion transfer optics may be further configured to transfer ions between the fifth and sixth RF ion guides in the region in which the fifth and sixth circular axes overlap. The fifth and sixth circular axes may be defined in a third plane that is parallel with the first and second planes.

Strip Electrode and Multipole Trapping

More complex ion optical devices may be formed from two parallel substrates each having an array of strip electrodes that are aligned on the opposing substrates and as such form an array of multipole devices. FIG. 4A shows a portion of such an array. An ion channel is thereby created in the space between the outer face of the strip electrodes of the two arrays.

In a first example, a two-term cosine voltage waveform is used, as described by equation (6) above and shown in FIG. 2. In FIG. 2, a higher peak voltage is depicted and this is positive voltage, which as noted above, is defined herein as positive polarity. In this example (similarly to the more basic examples described above), a peak voltage (zero to peak) of 200 V is used and a base frequency is 60 MHz. The second term of the cosine waveform therefore oscillates at 120 MHz.

The RF applied to the electrodes is split into two phases, with a first phase applied to electrodes 1, 3, 5, 7 and a second phase having 180 degrees difference being applied to electrodes 2, 4, 6, 8. The waveform used is the sum of two cosine terms as in equation (6) above, the voltage difference between two electrodes of differing phase is given by equation (9) above. Although the applied voltage waveform is asymmetrical, the voltage difference is a symmetrical waveform.

Figure 22A:
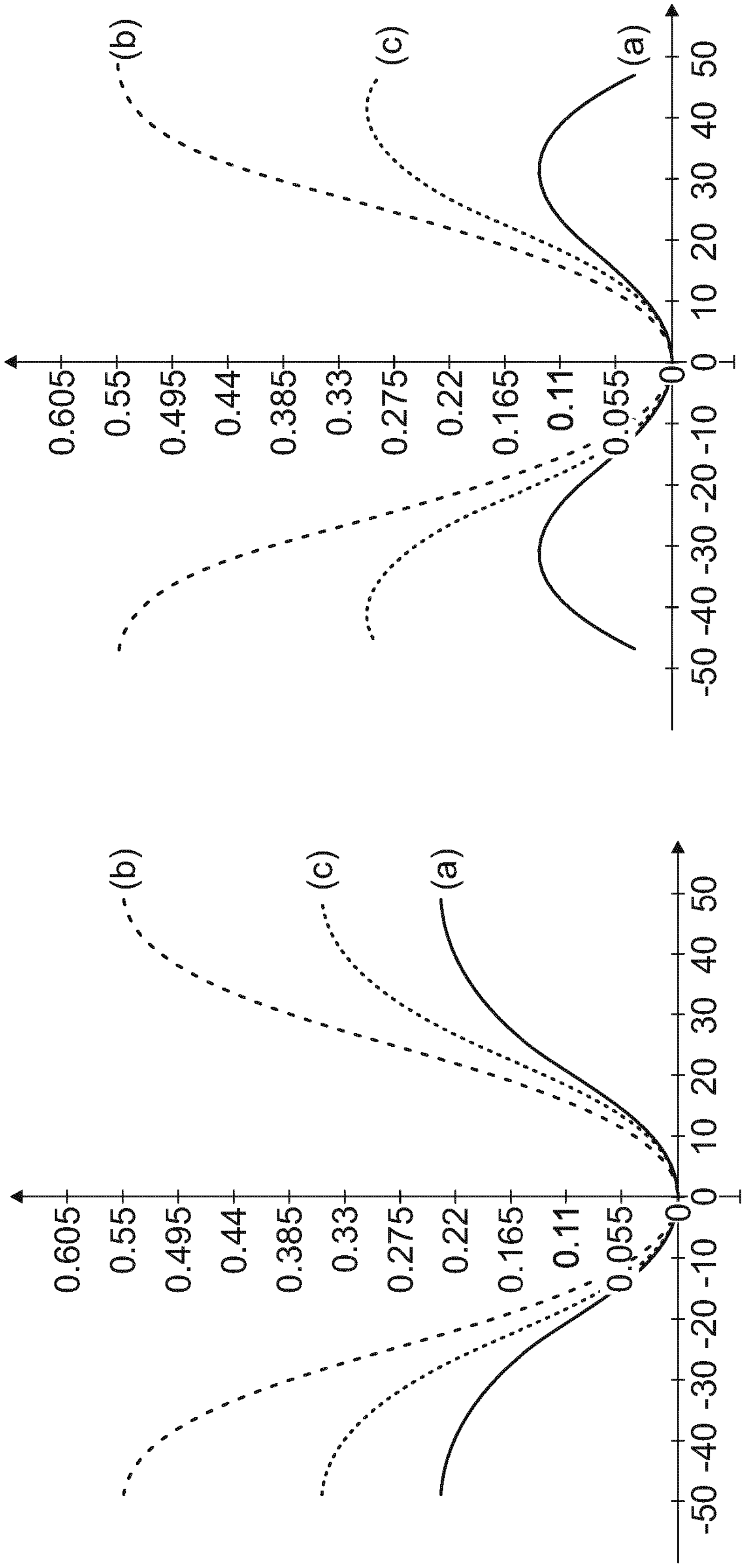
FIGS. 22A and 22B show plots of effective potential against position experienced by ions along the two test lines A and B for singly charged ions of mass 100 Da (FIG. 22A) and 1000 Da (FIG. 22B)
Figure 22B:
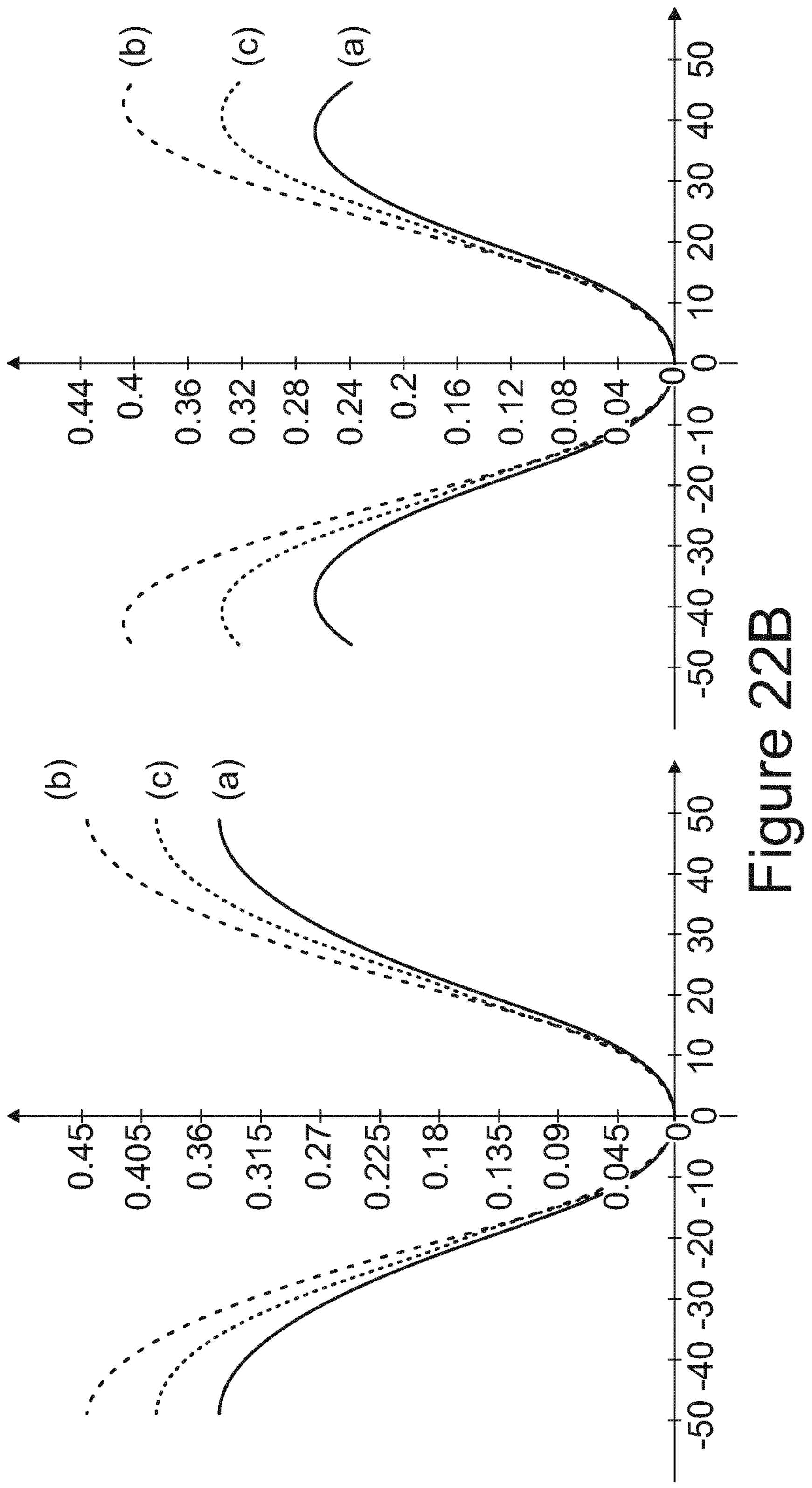

Referring next to FIG. 22A and FIG. 22B, there are shown plots of effective potential (V) against position (μm) experienced by ions along the two test lines A and B (as defined in FIG. 8A) when the two-fold phase split multipole potentials are applied. As above, the term "effective potential" is used herein to distinguish from the often-used term of pseudo-potential that is used with reference known methods applying sinusoidal voltage waveforms, which rely on the presence of a field gradient, as has been discussed above. The left-hand plot is along test line A (position in the plot being x-position) and the right-hand plot is along test line B (position in the plot being y-position). The plots are for singly charged ions of mass 100 Da (FIG. 22A) and 1000 Da (FIG. 22B) with: (a) type C mobility variance (solid line); (b) type A mobility variance (dashed line); and (c) invariant mobility (dotted line). A zero to peak two-term cosine RF voltage waveform of 200 V is applied at a base frequency of 60 MHz with two-fold phase splitting.

The symmetrical waveform of the voltage difference created between the electrodes provides an even lower potential barrier than is the case with the sinusoidal waveform (compare FIG. 22A with FIG. 8D and FIG. 22B with FIG. 8E).

Figure 22C:
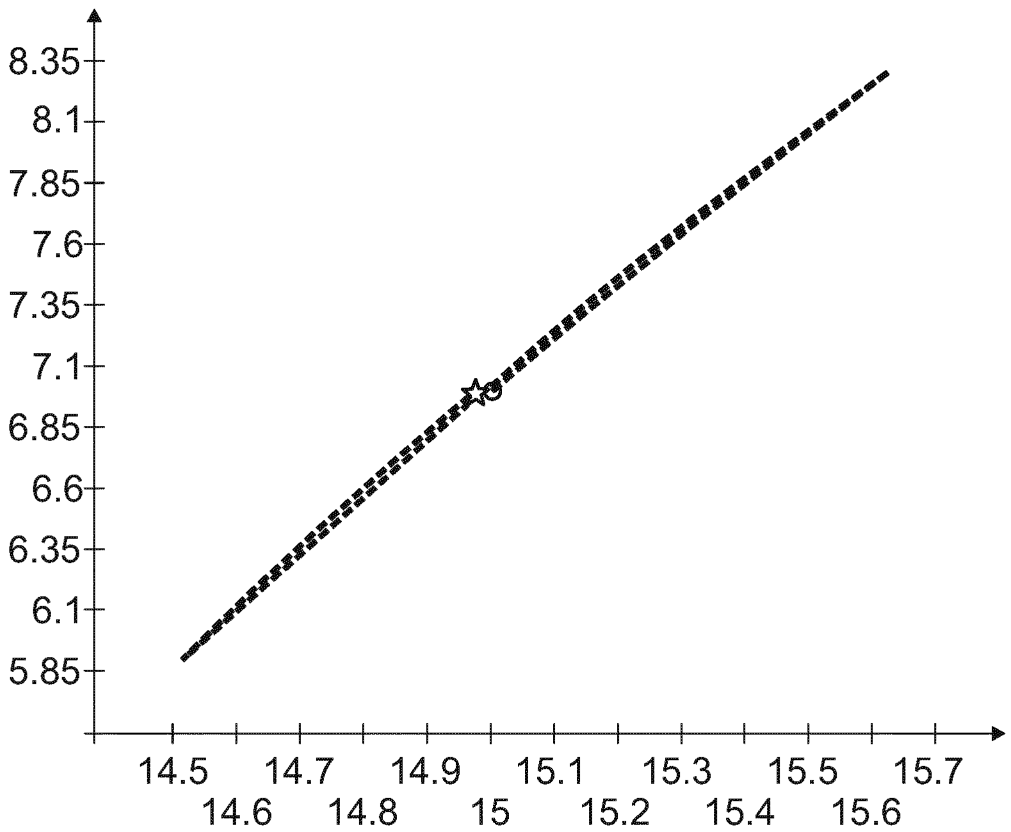
FIG. 22C illustrates an average ion trajectory calculated over one cycle of a voltage waveform of FIG. 2 applied with 2-fold phase splitting to the electrode array of FIG. 8.

Referring now to FIG. 22C, there is illustrated an average ion trajectory in x-y space (μm) calculated over one cycle of a voltage waveform of FIG. 2 applied with 2-fold phase splitting to the electrode array of FIG. 8, by solving equation (8). The applied voltage waveform polarity is negative. A type C ion of mass 100 Da starts from the location in microns of (15,7) indicated by the circular symbol, and follows the dotted trajectory reaching the star symbol after one cycle.

If multiple term cosine waveforms are split into only two different phases, as is proposed in many published documents, the electric field within the structure is greatly reduced for a substantial fraction of the cycle. This is readily appreciated when rectangular waveforms are considered. If a rectangular voltage waveform with ratio 2:1 is used instead of the two-term cosine waveform, for one third of the cycle there is no electric field created within the structure, as all poles are at the same voltage. Similar problems occur when using a 3:1 three-term cosine waveform: if a rectangular voltage waveform is used instead of the three-term cosine waveform, for half the cycle there is no electric field created within the structure, as all poles are at the same voltage.

In a general sense of the disclosure, there may be considered a multipole ion optical device, comprising: a first plurality of electrodes distributed along a first axis (for example, defined by a first substrate); and a second plurality of electrodes distributed along a second axis, generally parallel to the first axis (for example, defined by a second substrate), to define an ion channel between the first and second pluralities of electrodes. For instance, the first and second axes may be defined by respective substrates, upon which the respective plurality of electrodes are provided (or mounted). Each of the first plurality of electrodes and the second plurality of electrodes is configured to receive a respective RF voltage having an asymmetric waveform and such that adjacent electrodes of the first and second pluralities of electrodes receive RF voltages having different phases ("adjacent" in this context advantageously meaning both next to each other within the same plurality of electrodes or next to each other but on different axes). The RF voltages are beneficially multipole potentials. In this way, ions can be trapped in the ion channel, especially by effective potential wells formed by the multipole potentials. Advantageously, the first and second plurality of electrodes and the plurality of RF voltages are configured such to have a high electric field strength in the ion channel, in particular, sufficiently high for ions to experience mobility variation. As discussed above, the minimum field strength for ions to experience mobility variation may depend on the specific configuration, but in some embodiments, this may be achieved by a field strength of at least 104 V/cm or 1 MV/m.

Optionally, a housing encloses the first and second pluralities of electrodes. The environment in which the electrodes are located, for example the housing, is advantageously configured to operate at a gas pressure that is sufficiently high such that, in combination with a frequency of the RF voltages, a phase shift between the electric field and a velocity of ions in the ion channel experiencing the electric field is substantially zero. For example, a gas pressure of at least 10 kPa may be considered in embodiments. Functional operation at atmospheric pressure (or pressures approaching atmospheric) should also be possible. The environment may be air and/or the electrodes or housing may be configured to operate in air. Generally only RF voltages (that is, no DC, such as a FAIMS compensation voltage) are applied to the first and second pluralities of electrodes.

The RF voltages having asymmetric waveforms (typically the same waveform with different phases) may have a ratio of a positive peak voltage to a negative peak voltage (or a ratio of a negative peak voltage to a positive peak) with a magnitude of at least 2. Typically, this ratio is an integer.

In preferred embodiments, each of the first plurality of electrodes are equally axially spaced along the first axis and each of the second plurality of electrodes are equally axially spaced along the second axis. The equal spacing between electrodes may improve the quality of the effective potential well.

In one example, the first plurality of electrodes comprises: a first electrode; and a fourth electrode, adjacent the first electrode, and the second plurality of electrodes comprises: a second electrode, generally opposite (and aligned with) the first electrode; and a third electrode, adjacent the second electrode and generally opposite (and aligned with) the fourth electrode. A first RF voltage, having an asymmetric waveform and a RF frequency may be applied to the first electrode and the third electrode. A second RF voltage having an asymmetric waveform and the RF frequency may be applied to the second electrode and the fourth electrode. A phase difference between the first RF voltage and the second RF voltage is approximately $\pi$ (180 degrees).

The first and second pluralities of electrodes are advantageously configured in groups of a fixed number of adjacent of electrodes ("adjacent" in this context again meaning both next to each other within the same plurality of electrodes or next to each other but on different axes). The fixed number of electrodes in each group are beneficially configured to receive multipole RF voltages, such that adjacent electrodes within the group (and more preferably, between groups) receive RF voltages of the same frequency and having a phase differing by $2\pi$ divided by the fixed number. Thus, working clockwise around a group of the first and second pluralities of electrodes within the ion optical device, the phase of the RF voltage applied should differ by the same amount between each electrode, the phase difference between the last electrode and first electrode also being that same amount. Quadrupole and tripole examples of this configuration will now be discussed in specific terms, with a summary in these more general terms being provided thereafter.

A quadrupole example will first be discussed. According to this one embodiment of the present disclosure, the multiple-term cosine asymmetrical voltage waveform applied to the electrodes is split into four phases, each being 90 degrees ($\pi/2$ radians) apart. The waveform is split into four different phases and one phase applied to each of the first four electrodes and to each of the second group of four electrodes. Referring to FIG. 23A, there is schematically shown a cross-sectional view of a portion of an electrode structure in x-y space (μm). Reference is also made to FIG. 23B, showing voltage waveforms over one cycle of a base frequency and phases applied to corresponding electrodes in FIG. 23A. In this example, a 2:1 two-term cosine waveform described by equation (6) above is used. The left-hand plot shows positive polarity waveforms and the right-hand plot shows negative polarity waveforms. The waveform thus rotates anticlockwise around the first four electrodes (labelled 1, 2, 3, 4), clockwise around electrodes labelled 3, 4, 5, 6, and anticlockwise around the electrodes labelled 5, 6, 7, 8.

Referring now to FIG. 23C, there is illustrated an average ion trajectory in x-y space (μm) calculated over one cycle of a negative polarity voltage waveform of FIG. 23B applied with four-fold phase splitting to the electrode array of FIG. 23A, by solving equation (8). A type C ion of mass 100 Da starts from the location (15,7) indicated by the circular symbol and follows the dotted trajectory reaching the star symbol after one cycle. This shows that ion motion is rotational. Comparison with FIG. 22C shows the much larger net motion of the ion. The peak field strength within the ion volume is lower than with the sinusoidal waveform, as the voltage difference across the electrodes from the phase split waveform is lower. However, for some ions the effective potential is considerably higher, because the voltage difference is now not symmetrical.

Next, referring to FIG. 24 there is shown a vector field plot in x-y space (μm) of the net or effective electric field experienced each cycle by type C ions of mass 100 Da, under the action of a two-term cosine voltage waveform of negative polarity split into four phases having 200 V (zero to peak) at 60 MHz base frequency voltage waveform as shown in the lower plot of FIG. 23B (negative polarity). This is derived from the average net ion displacement over one cycle, as described above. The length of the arrows is in proportion to the net effective field at the centre of the stem of the arrow, and the direction of the arrow shows the direction of the effective field.

Each group of four electrodes possesses a potential well and a barrier exists for the type C ions, which can be made far greater than may be overcome by any significant number of ions simply by diffusion at room temperature. The proportion of ions that might exceed the barrier due to diffusion at a given effective temperature can be estimated using the Maxwell-Boltzmann probability density function. Given the model of the strip electrode structure, well inside the structure away from the edges where no electric fields exist in the z direction, the effective temperature of ions held within the effective potential wells can be derived from the velocity distribution in the z direction, when the simulation includes calculating individual random elastic collisions. Ions obtain kinetic energy in the z direction due to the random impact parameter and have a Gaussian velocity distribution from which the effective temperature can be derived.

Examination of FIG. 24 reveals that the net or effective electric field vectors over a cycle rotate suggesting that the vector potential is not conservative. A scalar potential calculated between two points may depend upon the path taken. Nevertheless, as an illustration only a scalar potential is calculated from a reference point (0,0).

Referring next to FIG. 25A and FIG. 25B, there are shown plots of effective potential (V) against position (μm) experienced by ions along the two test lines A and B (as defined in FIG. 8A) when the negative polarity four-fold phase split potentials are applied. The left-hand plot is along test line A (y=0, position in the plot being x-position) and the right-hand plot is along test line B (x=0, position in the plot being y-position). The plots are for singly charged ions of mass 100 Da (FIG. 25A) and 1000 Da (FIG. 25B) with: (a) type C mobility variance (solid line); (b) type A mobility variance (dashed line); and (c) invariant mobility (dotted line). A zero to peak two-term cosine RF negative polarity voltage waveform of 200 V is applied at a base frequency of 60 MHz with four-fold phase splitting.

Use of the four-fold phase split changes the effective potential within the structure. Now, type A ions and type C ions experience opposite net displacements over each cycle and where for the type C ion there is an effective potential well in the centre of each group of four electrodes, for ions of type A there is a potential hill. The magnitude of the well for type C low mass ions (100 Da) is about an order of magnitude larger than that obtained with the two-fold phase split (compare FIG. 22A with FIG. 25A). The higher mass ions (1000 Da) also experience a larger effective potential within the structure, in this case a more modest factor of two, or so. Lower mass ions are confined to a considerably greater degree than is possible with similar field strengths using the pseudo-potential effect. Note is made of the dotted lines (c) in FIGS. 25A and 25B which show the results for mobility-invariant ions of mass 100 Da and 1000 Da respectively. Any potential well for these ions must come from the pseudo-potential effect only.

Whilst the electrode structure is not wholly symmetrical, being formed of electrodes on two substrates which lie in the x-z plane, nevertheless the effective potential along the two orthogonal test lines indicates that the effective potential is very similar for the geometry considered here.

If the positive polarity voltage waveform is used (FIG. 23B upper plot), type A ions experience an effective potential well. Referring now to FIG. 26, there is illustrated an average ion trajectory in x-y space (μm) calculated over one cycle of a positive polarity voltage waveform of FIG. 23B applied with four-fold phase splitting to the electrode array of FIG. 23A, by solving equation (8). A type A ion of mass 100 Da starts from the location (15,7) indicated by the circular symbol and follows the dotted trajectory reaching the star symbol after one cycle. Thus, the type A ion travels anticlockwise as before (see FIG. 23C), as this motion is determined by the distribution of the split phases, but the ion proceeds in the negative y direction from its starting point, rather than the positive y direction seen in FIG. 23C for a type C ion with negative polarity voltage waveform.

Referring next to FIG. 27A and FIG. 27B, there are shown plots of effective potential (V) against position (μm) experienced by ions along the two test lines A and B (as defined in FIG. 8A) when the positive polarity four-fold phase split potentials are applied. The left-hand plot is along test line A (y=0, position in the plot being x-position) and the right-hand plot is along test line B (x=0, position in the plot being y-position). The plots are for singly charged ions of mass 100 Da (FIG. 27A) and 1000 Da (FIG. 27B) with: (a) type C mobility variance (solid line); (b) type A mobility variance (dashed line); and (c) invariant mobility (dotted line). A zero to peak two-term cosine RF positive polarity voltage waveform of 200 V is applied at a base frequency of 60 MHz with four-fold phase splitting.

It is noted that the mobility-invariant ion (c) shows the pseudo-potential effect only, which is the same regardless of the polarity of the waveform (compare positive and negative waveforms in FIGS. 25A and 26B with FIGS. 27A and 27B). The pseudo-potential effect is very small compared with the effective potential produced by the differential mobility effect, being at least an order of magnitude smaller. Use of the differential mobility effect has substantially improved the confinement of lower mass ions.

Traps operating with the differential mobility effect described above can only trap either type A ions (positive polarity) or type C ions (negative polarity). However, by operating electrodes 1, 2, 3, 4 in one polarity, and 5, 6, 7, 8 in the opposite polarity, adjacent traps will confine the different mobility variant ions.

With this in mind, reference is now made to FIG. 28A, showing voltage waveforms over one cycle of a base frequency, split into four phases applied to corresponding electrodes in FIG. 23A. Negative polarity waveforms are applied to electrodes 1-4 and positive polarity waveforms are applied to electrodes 5-8. Referring to FIG. 28B, there is schematically shown a cross-sectional view of a portion of the electrode structure of FIG. 23A in x-y space (μm), with a test line C (dashed line) to indicate where an effective potential is calculated. Test line C extends along the y=0 line between the electrodes.

Referring next to FIG. 29A and FIG. 29B, there are shown plots of effective potential (V) against x-position (μm) experienced by ions along test line C (as defined in FIG. 28B) when the potentials shown in FIG. 28A are applied. The plots are for singly charged ions of mass 100 Da (FIG. 29A) and 1000 Da (FIG. 29B) with: (a) type C mobility variance (solid line); (b) type A mobility variance (dashed line); and (c) invariant mobility (dotted line). A zero to peak two-term cosine RF positive polarity voltage waveform of 200 V is applied at a base frequency of 60 MHz with four-fold phase splitting.

It can be seen that electrodes 1-4 trap ions of type C mobility variance and electrodes 5-8 trap ions of type A mobility variance. Directing a source of ions into the strip electrode structure in the z direction-along the strips-will result in ions of type A and type C differential mobility being confined in those traps that have an effective potential well for that type of ion mobility. The trapping potential (effective potential) is far greater than that produced by existing methods that utilise the pseudo-potential effect only. A modest well exists for all ions between electrodes 3, 4, 5 and 6 (in the region of x=0). However at room temperature, diffusion can cause ions to exceed the barrier and ions may move to the location between electrodes 1-4 if the ions have type C mobility variance and between electrodes 5-8 if the ions have type A mobility variance.

Although two-term cosine voltage waveforms have been discussed above, voltage waveforms based on more than two cosine terms. For example, a 3:1 three-term cosine voltage waveform described by equation (7a) above can also be applied to embodiments according to the present disclosure.

Referring next to FIG. 30A and FIG. 30B, there are shown plots of effective potential (V) against position (μm) experienced by ions along test lines A and B (as defined in FIG. 8A) when three-term cosine RF negative polarity voltage waveforms are applied to the 8 electrodes of FIG. 23A. The left-hand plot is along test line A (y=0, position in the plot being x-position) and the right-hand plot is along test line B (x=0, position in the plot being y-position). The plots are for singly charged ions of mass 100 Da (FIG. 30A) and 1000 Da (FIG. 30B) with: (a) type C mobility variance (solid line); (b) type A mobility variance (dashed line); and (c) invariant mobility (dotted line). A zero to peak three-term cosine RF negative polarity voltage waveform of 200 V is applied at a base frequency of 60 MHz with four-fold phase splitting. An effective potential well of some 3.3 V is formed for ions of mass 100 Da, and a well of approximately 1.2 V is formed for ions of mass 1000 Da. These should be compared with FIGS. 25A and 25B for the use of 2:1 two-term cosine voltage waveforms.

Referring next to FIG. 30C, there are shown plots of effective potential (V) against x-position (μm) experienced by ions along test line C (y=0, as defined in FIG. 28B) when three-term cosine RF negative polarity voltage waveforms are applied to the 8 electrodes of FIG. 23A. The plots are for singly charged ions of mass 1000 Da with: (a) type C mobility variance (solid line); (b) type A mobility variance (dashed line); and (c) invariant mobility (dotted line). A zero to peak two-term cosine RF positive polarity voltage waveform of 200 V is applied at a base frequency of 60 MHz with four-fold phase splitting. Along these test lines, the scalar potential appears similar and this implies symmetry of the potential well along both directions.

FIG. 30C demonstrates the multiple effective potential wells that are created along the array. The zero effective potential reference point is again at (0,0). This presents a strong trapping effect in the x-y plane, resisting movement of ions across the array. However, ions are free to move in the z direction (which we herein term "along" the array) and ions may be readily transported in this direction using, for example, a gas flow. Alternatively, the ions could be confined in the z direction by provision of DC confining electrodes at the ends of the ion channel (in the z direction).

The array of strip electrodes having 4-fold phase splitting of the applied voltage waveform forms a set of traps. Traps are formed with asymmetric voltage waveforms having a ratio of peak voltages at opposite polarities which is not equal to one. Ratios of 2:1 and 3:1 have been illustrated here but other ratios may be used with such embodiments.

Returning to the general terms considered above, in one example (of quadrupole ion optical device), the first plurality of electrodes comprises: a first electrode; and a fourth electrode, adjacent the first electrode, and the second plurality of electrodes comprises: a second electrode, generally opposite (and aligned with) the first electrode; and a third electrode, adjacent the second electrode and generally opposite (and aligned with) the fourth electrode. A first RF voltage, having an asymmetric waveform and a RF frequency is applied to the first electrode. A second RF voltage having an asymmetric waveform and the RF frequency is applied to the second electrode, a phase difference between the first RF voltage and the second RF voltage being approximately $\pi/2$ (90 degrees). A third RF voltage, having an asymmetric waveform and the RF frequency is applied to the third electrode, a phase difference between the second RF voltage and the third RF voltage being approximately $\pi/2$. A fourth RF voltage having an asymmetric waveform and the RF frequency is applied to the fourth electrode, a phase difference between the third RF voltage and the fourth RF voltage being approximately $\pi/2$. Hence, a phase difference between the fourth RF voltage and the first RF voltage is also approximately $\pi/2$.

Optionally, the first plurality of electrodes further comprises a fifth electrode, adjacent the fourth electrode, the first RF voltage being applied to the fifth electrode, and the second plurality of electrodes further comprises a sixth electrode, adjacent the third electrode and generally opposite the fifth electrode, the second RF voltage being applied to the sixth electrode.

More generally, the first, second, third and fourth electrodes may define an electrode unit. Then, the electrode unit may be repeated along the first and second axes. Arrays of quadrupole traps may thereby be formed.

In one embodiment, the first, second, third and fourth electrodes define a first electrode unit and the RF voltages applied to the first electrode unit have a first polarity (in the sense of the polarity of the average voltage over a cycle of the waveform). Then, a second electrode unit may be provided adjacent the first electrode unit along the first and second axes. The second electrode unit is advantageously essentially identical to the first electrode unit except that the RF voltages applied to the second electrode unit have a second polarity that is opposite the first polarity. This may allow trapping of ions of different mobility variation type.

This may be applied more generally considering where the first and second pluralities of electrodes are configured in groups of a fixed number of adjacent electrodes, this fixed number of adjacent electrodes defining an electrode unit, which may be repeated. Optionally, a polarity of the RF voltages applied to one electrode unit may differ from a polarity of the RF voltages applied to another electrode unit, for example to allow trapping of ions of different mobility variation type.

Another example of a tripole ion optical device may be considered. For instance, the first plurality of electrodes may comprise: a first electrode; and a third electrode, adjacent the first electrode. The second plurality of electrodes may comprise a second electrode, opposite and axially between the first and third electrodes. Then, a first RF voltage, having an asymmetric waveform and a RF frequency may be applied to the first electrode, a second RF voltage having an asymmetric waveform and the RF frequency may be applied to the second electrode and a third RF voltage having an asymmetric waveform and the RF frequency may be applied to the third electrode. Advantageously, a phase difference between the first RF voltage and the second RF voltage is approximately $2\pi/3$ (120 degrees) and a phase difference between the second RF voltage and the third RF voltage is approximately $2\pi/3$. Thereby, a phase difference between the first RF voltage and the third RF voltage is beneficially also approximately $2\pi/3$.

As identified above, the tripole electrode unit may be repeated. However, the RF voltages applied between groups of three electrodes may need to be reversed for an adjacent group of three electrodes. For instance, the first plurality of electrodes may further comprise: a fifth electrode, adjacent the third electrode and having the second RF voltage applied, the second plurality of electrodes may comprise: a fourth electrode, adjacent the second electrode, opposite and axially between the third and fifth electrodes and having the first RF voltage applied; and a sixth electrode, adjacent the fourth electrode, axially displaced from the fifth electrode away from the fourth electrode and having the third RF voltage applied. Alternatively, it may be considered that the first, second, third, fourth, fifth and sixth electrodes define an electrode unit. Then, the electrode unit may be repeated along the first and second axes, in particular with approximately equal axial spacing between all electrodes.

This general sense will be discussed again below. First, more discussion of specific practical embodiments will be provided.

Driving Ions Across the Array

Ions can be induced to move across an array of traps by the application of a steady-state electric field created by biasing electrodes with time-invariant voltages of increasing magnitude along the array. Additionally or alternatively, a gas flow through the array may be used. In another approach (combinable with those previously described), a time-varying set of voltages may be applied to the trap electrodes and/or one or more supplementary electrodes to produce a travelling wave that creates an electric field which moves across the array, as is known and is for example described in U.S. Pat. No. 9,978,572 B2. As noted above, if a gas flow is used, ions may be retained within the same trap, the gas flow being directed in the z direction, parallel to the elongation of the trap electrodes. Alternatively, the gas flow may be at some other angle to the z axis, including perpendicular to it (that is, in the x direction). A controller may be used to effect transport of ions using any one or combination of these techniques.

In a first example, ions can be induced to move across the array of traps by the application of a steady-state electric field created by biasing electrodes (preferably to the same electrodes to which the RF is applied, but one or more supplementary electrodes can be used instead or in addition) with time-invariant voltages of increasing or decreasing magnitude across the array. Reference is now made to FIG. 31A, in which there is shown a plot of a time-invariant axial electric field strength (V/m, in x, at y=0) against x position (μm) in the electrode array of FIG. 23A when the time-varying voltage waveform (of FIG. 23B) is switched off and a time-invariant voltage is applied to the electrodes along the array: electrodes 1 and 2 have 0 V applied; electrodes 3 and 4 have −10 V applied; electrodes 5 and 6 have −20 V applied; electrodes 7 and 8 have −30 V applied.

The time-invariant voltages create a net field along the channel, which is termed herein as an axial field. With no time varying field applied, even if the voltage offset between adjacent electrodes on both substrates is constant, the axial field will not be constant along the array as the width (in x) of the electrodes is the same or similar to the gap between electrodes (in x). The field strength is larger adjacent a gap and smaller adjacent an electrode.

The field strength in x on the axis (y=0) follows an oscillating profile somewhat similar to a sinusoid. The field strength parallel to the axis but displaced by 10 μm (y=10 μm) has a slightly distorted profile. Of course, it is not essential that the electrode width is equal to the gap width and the profile of the oscillating axial field need not be sinusoidal. A non-zero axial electric field along the channel between the substrates is highly desirable though.

When the time varying (RF) voltages are applied, as well as the time-invariant voltages, the traps are formed and the axial field changes with time. Ions can receive a net axial motion under some conditions. Ions are driven across the array if the time-invariant axial field created by the time-invariant voltages is sufficient to drive the ions over the effective potential barriers between the traps. The trapping in the perpendicular direction (y) keeps the ions from striking the electrodes.

Due to the difference in the depth of the effective potential wells (as shown in FIGS. 30A and 30B) at low axial fields, the higher mass or lower mobility ions are able to escape the traps at lower time-invariant fields than lower mass or higher mobility ions. Reference is now made to FIG. 31B, in which there is shown a plot of axial distance travelled (μm) against time (μs) for average type C ions of different mass when both RF potentials with four-fold phase splitting and a lower voltage (−10 V) time-invariant potential are applied. Plots are shown for ions having masses every 100 Da between and including 100 and 1000 Da (as labelled) in the electrode structure of FIG. 23A under the action of a zero to peak three-term cosine RF negative polarity voltage waveform of 200 V applied to the electrodes at a base frequency of 60 MHz with four-fold phase splitting, plus a time-invariant field as depicted in FIG. 31A, due to −10 V applied between successive pairs of electrodes along the axis. Masses 100 and 200 Da are not transmitted through the structure.

Referring to FIG. 31C, there is shown a plot of axial distance travelled (μm) against time (μs) for average type C ions of different mass when both RF potentials with four-fold phase splitting and a higher voltage (−20 V) time-invariant potential are applied. As before, a zero to peak three-term cosine RF negative polarity voltage waveform of 200 V is applied to the electrodes at a base frequency of 60 MHz with four-fold phase splitting. In this case, the −20 V potential is applied between successive pairs of electrodes along the axis. All masses tested are transmitted, with higher mass or lower mobility ions taking longer to travel a set axial distance.

Referring now to FIG. 31D, there are shown plots of axial ion velocity (in x dimension, $m \cdot s^{-1}$) against mass (Da, left-hand plot), mobility ($m^2 \cdot V^{-1} \cdot ms^{-1}$, middle plot) and collision cross section ($Å^2$, right-hand plot). The data was taken from average ion trajectories for type C ions having masses every 100 Da between and including 100 and 1000 Da in the electrode structure of FIG. 23A. The field is due to a zero to peak three-term cosine RF negative polarity voltage waveform of 200 V applied to the electrodes at a base frequency of 60 MHz with 4-fold phase splitting, plus a time-invariant field due to −20 V applied between successive pairs of electrodes along the axis. The ion diameters in the collision cross sections used for ions herein are based upon work by Tao et. al. (J Am. Soc. Mass Spectrom. 2007, 18, 1232-1238), in which a relationship between collision cross sections in He are given for ion neutral collision data of singly charged peptide ions.

At low fields low mass or high mobility ions cannot escape the axial traps and are not driven across the array along the axis, whilst high mass or low mobility ions escape the traps and receive a net axial velocity in the ion channel between the substrates (see FIG. 31B, as discussed above). The array of traps then acts as a high-pass mass or low-pass mobility filter. The effective potential traps formed by the time-variant voltages are deeper for low mass or high mobility ions, slowing down or preventing their escape from the traps. Such a filter might be used in conjunction with a downstream device to limit the range of mobilities supplied to the device, for example. It might also be used to trap low mass or high mobility ions for subsequent use, with higher mass or lower mobility ions being discarded.

At higher axial fields, all ions can escape the traps and low mass or high mobility ions are driven across the array with a higher net axial velocity than the high mass or low mobility ions, and the array of traps forms an ion mobility drift tube (see FIG. 31C, as discussed above).

As a second example, ions may be driven across the array of traps with the use of an axial gas flow. In a first case, a gas velocity of 25 m/s in the positive x direction is considered, causing ions to move from left to right through the array, moving from trap to trap. Referring to FIG. 32A, there is shown a plot of the average trajectory, y (μm) against x (μm), of singly charged type C ions in the quadrupole electrode arrangement of FIG. 23A with a gas flow applied. Ion having masses every 100 Da between and including 100 and 1000 Da are considered, under the action of a three-term cosine voltage waveform of negative polarity split into four phases having 200 V (zero to peak) at 60 MHz base frequency and a uniform gas flow velocity of 25 m/s in the positive x direction. Ions all start at the point (−100, 0) (μm). Ion trajectories are terminated at the plane x=100 μm.

A gas flow rate of less than some 22 m/s appears to be insufficient to carry the mass 100 Da ion over the barrier of the first trapping region but higher mass ions can escape. For lower gas flows, the minimum mass transmitted is higher. At 10 m/s flow velocity, 330 Da ions and above escape the trap and progress across the array; lower masses remain trapped. If the gas flow velocity is increased to 22 m/s, ions of mass 100 Da and above have sufficiently large collision cross sections that they may escape the effective potential well. The ions progress along the tube with different velocities.

Referring now to FIG. 32B, there are shown plots of axial ion velocity (in x dimension, $m \cdot s^{-1}$) against mass (Da, left-hand plot), mobility ($m^2 \cdot V^{-1} \cdot ms^{-1}$, middle plot) and collision cross section ($Å^2$, right-hand plot) for a gas velocity of 22 m/s in the positive x direction. The data is taken from average ion trajectories of singly charged type C ions under the action of a three-term cosine voltage waveform of negative polarity split into four phases having 200 V (zero to peak) at 60 MHz base frequency. Ions move across the array of traps at a velocity that is a little less than the gas flow rate and higher mass ions, having a lower mobility and larger cross section, move faster than lower-mass and higher mobility ions with smaller cross sections. The array of traps can therefore act as a spectrometer, separating ions according to their mobility in an inverse fashion compared with a linear mobility drift tube.

Embodiments of the present disclosure function as described above to form traps for ions within cells comprising sets of four strip electrodes. By displacing one substrate with respect to the other by half the length of one cell in the x direction, sets of tripole traps may be constructed. Similar electrode structures as described above, fabricated using MEMS technology, may be utilised. A straightforward shift of one substrate with respect to the other is required and a different allocation of voltages. The voltage waveform is preferably split into three phases, one phase applied to each electrode of each cell. Referring to FIG. 33A, there is shown a cross sectional view of a portion of an array of tripoles formed from strip electrodes on aligned opposing substrates, y (μm) against x (μm). The substrate material is not shown in the drawing. The electrodes are numbered 1 to 9. The electrodes on one substrate lie axially between the electrodes on the other substrate.

Referring next to FIG. 33B, there are shown voltage waveforms over one cycle over one cycle of the base frequency and phases applied to corresponding electrodes in FIG. 33A. The left-hand plot shows positive polarity waveforms and the right-hand plot shows negative polarity waveforms. As can be seen by these drawings, the waveform phase thus rotates anticlockwise around the electrodes labelled 1-3, electrodes 3-5, electrodes 5-7, and electrodes 7-9. The waveform phase rotates clockwise around electrodes labelled 2-4, electrodes 4-6, and electrodes 6-8.

Reference is now made to FIG. 33C, plotting average ion trajectory in x-y space (μm) for a single ion calculated over one cycle of the negative polarity voltage waveform of FIG. 33B by solving equation (8) above. A type C ion of mass 100 Da is assumed and its average dampened trajectory within the three electrodes labelled 4, 5 and 6 is shown. The ion starts from the location (0,−15) indicated by the circular symbol, and follows the dotted trajectory reaching the star symbol after one cycle.

Referring next to FIG. 33D, there is plotted average ion trajectories in x-y space (μm) for ions of different masses calculated over one cycle of the negative polarity voltage waveform of FIG. 33B by solving equation (8) above. Type C ions of masses 100-1000 Da (labelled) start from the location (0,−15) and follow the dotted trajectories for one cycle. It can therefore be seen that the ion motion rotates and when ions are within one of the trapping regions they follow a roughly triangular trajectory. Ions of higher mobility and lower mass have the largest oscillation amplitudes.

Now, referring to FIG. 34, there is plotted a vector field in x-y space (μm) of effective electric field experienced each cycle by type C ions of mass 100 Da when waveforms according to FIG. 33B are applied to the electrode arrangement shown in FIG. 33A. Thus, the ions are considered under the action of a two-term cosine voltage waveform of negative polarity split into three phases having 200 V (zero to peak) at 60 MHz base frequency voltage waveform as shown in the right-hand plot of FIG. 33B. This therefore shows traps formed within each group of three electrodes, two electrodes of one substrate and one electrode of the other substrate. The traps are offset towards the gap between the two electrodes on the same substrate.

Examination of FIG. 34 reveals that the net electric field vectors over a cycle rotate suggesting that the vector potential is not conservative. A scalar potential calculated between two points may depend upon the path taken. Nevertheless, a scalar potential is calculated, as an illustration only. Referring to FIG. 35, there is plotted effective potential (V) against y position (μm) along a test line for ions of different mobility types when waveforms according to FIG. 33B are applied to the electrode arrangement shown in FIG. 33A. The test line runs from y=−50 μm to +20 μm at x=0 and ions are considered from a reference point (0,0). The effective potential is calculated from the net electric field in y over one cycle for singly charged ions of mass 100 Da under the action of a two-term cosine voltage waveform of negative polarity split into three phases having 200 V (zero to peak) at 60 MHz base frequency. The electric field between the reference point and each other point on the plot was integrated to obtain an estimate of the effective potential.

Three mobility types are considered: (a) type C ions (solid line); (b) type A ions (dashed line); and (c) mobility invariant ions (dotted line). Using this approximate method, the bottom of the well appears to be offset by approximately 14 μm in y. A well of some 2.5 V is formed for these ions.

As noted above, ions can be induced to move across the array of traps in a number of different ways. Firstly, by the application of a steady-state electric field created by biasing electrodes with time-invariant voltages of increasing or decreasing magnitude along the array. Alternatively, a gas flow through the array may be used to drive ions either along the array or across the array, or some combination of the two. In a third option, a time-varying set of voltages may be applied to the trap electrodes and/or one or more supplementary electrodes to produce a travelling wave to create an electric field that moves across the array. These can also be applied to tripole-based traps.

With reference to FIG. 36A, there is shown a plot of the average trajectory, y (μm) against x (μm), of singly charged type C ions in the tripole electrode arrangement of FIG. 33A with a lower gas flow applied. Ions having masses every 100 Da between and including 100 and 1000 Da are considered, under the action of a two-term cosine voltage waveform of negative polarity split into three phases having 200 V (zero to peak) at 60 MHZ base frequency, and a uniform gas flow velocity of 20 m/s in the positive x direction. Ions all start at the point (−150, 14) (μm). Ion trajectories are terminated at the plane x=150 μm and the final ion positions are shown with black circle symbols.

In this example, under the action of a gas flow velocity of 20 m/s in the positive x direction, ions move from left to right across the array, seemingly finding the path of least resistance, moving from trap to trap. A gas flow rate of less than some 19 m/s appears insufficient to carry the mass 100 Da ion over the barrier of the first trapping region but higher mass ions can escape. For lower gas flows, the minimum mass transmitted appears to be higher. At 10 m/s gas flow velocity, ions of masses equal to and greater than mass of approximately 250 Da can escape the trap and progress across the array. If the gas flow velocity is increased to 19 m/s, mass 100 Da ions may escape the effective potential well. The ions progress across the array with different velocities.

Referring now to FIG. 36B, there are shown plots of axial ion velocity (in x dimension, $m \cdot s^{-1}$) against mass (Da, left-hand plot), mobility ($m^2 \cdot V^{-1} \cdot ms^{-1}$, middle plot) and collision cross section ($Å^2$, right-hand plot) for a gas velocity of 20 m/s in the positive x direction. The data is taken from average ion trajectories of singly charged type C ions under the action of a two-term cosine voltage waveform of negative polarity split into three phases having 200 V (zero to peak) at 60 MHz base frequency. Ions move across the array at a velocity which is a little less than the gas flow rate, and higher mass ions which have lower mobility move faster than lower mass higher mobility ions. The array of traps can therefore act as a spectrometer, separating ions according to their mobility in an inverse fashion compared with a linear mobility drift tube.

At an increased gas flow of 25 m/s the difference in axial velocities for different mass ions reduces somewhat. With reference to FIG. 37A, there is shown a plot of the average trajectory, y (μm) against x (μm), of singly charged type C ions in the tripole electrode arrangement of FIG. 33A with a higher gas flow applied. Ions having masses every 100 Da between and including 100 and 1000 Da are considered, under the action of a two-term cosine voltage waveform of negative polarity split into three phases having 200 V (zero to peak) at 60 MHz base frequency, and a uniform gas flow velocity of 25 m/s in the positive x direction. Ions all start at the point (−150, 14) (μm). Ion trajectories are terminated at the plane x=150 μm and the final ion positions are shown with black circle symbols.

Referring next to FIG. 37B, there are shown plots of axial ion velocity (in x dimension, $m \cdot s^{-1}$) against mass (Da, left-hand plot), mobility ($m^2 \cdot V^{-1} \cdot ms^{-1}$, middle plot) and collision cross section ($Å^2$, right-hand plot) for a gas velocity of 25 m/s in the positive x direction. The data is taken from average ion trajectories of singly charged type C ions under the action of a two-term cosine voltage waveform of negative polarity split into three phases having 200 V (zero to peak) at 60 MHz base frequency.

Other multipoles may be used for the present disclosure and whilst quadrupole and tripole trap structures have been described in some detail, the skilled person can readily extend the treatment to other multipole arrangements.

Returning again to general senses of the disclosure considered above, it may be understood that the first and second pluralities of electrodes define at least one ion trap. Then, the multipole ion optical device may further comprise an ion transport controller, configured to induce the movement of ions trapped in the at least one ion trap. For instance, the ion transport controller may be configured to induce the movement of ions trapped in the at least one ion trap by one or more of: a) applying a steady-state electric field to the at least one ion trap first and/or second pluralities of electrodes, by biasing the first and/or second pluralities of electrodes and/or one or more supplementary electrodes with time-invariant voltages to generate a voltage gradient (for instance, voltages of increasing or decreasing magnitude) along the first and/or second axis; b) causing a gas to flow through the array (ion channel); and c) applying a time-varying set of voltages to the first and/or second pluralities of electrodes and/or one or more supplementary electrodes to produce a travelling wave, such than an electric field is caused that moves across the first and/or second axis. Using any of these techniques (alone or in combination), the ion transport controller may be configured to induce the movement of ions trapped in the at least one ion trap in a direction parallel to the first axis and/or the second axis. This may also allow separation of ions according to their mass and/or mobility (or mobility type). Applying a time-invariant bias voltage to the first and/or second pluralities of electrodes of a predetermined voltage may allow the ion transport controller to separate of ions by their mass and/or mobility.

The use of gas flow may be advantageous in other ways. For example, the ion transport controller may be configured to induce the movement of ions trapped in the at least one ion trap in a direction perpendicular to the first axis and the second axis, by causing a gas to flow through the array. In embodiments, the ion transport controller is configured to separate ions according to their mass and/or mobility, by causing a gas to flow through the array at a predetermined flow rate.

The use of one or more multipole ion optical devices in accordance with the present disclosure may allow sophisticated instruments, for example, a mass spectrometer or ion mobility spectrometer, comprising such a multipole ion optical device may be considered. In embodiments, the multipole ion optical device is configured to act as one or more of: a mass filter; a mass analyser; an ion mobility filter; an ion mobility analyser; and a drift tube.

Various Structures

Although embodiments according to the disclosure have been described with reference to particular types of devices and applications (particularly mass spectrometers and/or ion mobility spectrometers) and the embodiments have particular advantages in such case, as discussed herein, approaches according to the disclosure may be applied to other types of device and/or application. The specific manufacturing details of the ion repulsive surface, ion optical device (such as ion guide), ion optical system and associated uses, whilst potentially advantageous (especially in view of known manufacturing constraints and capabilities), may be varied significantly to arrive at devices with similar or identical operation. Each feature disclosed in this specification, unless stated otherwise, may be replaced by alternative features serving the same, equivalent or similar purpose. Thus, unless stated otherwise, each feature disclosed is one example only of a generic series of equivalent or similar features.

The methods and apparatus of the present disclosure can be utilised with a variety of electrode structures. Strip electrodes have been used in examples above, but the present disclosure is not limited to the use of such elongated linear electrodes. Electrodes of appropriate dimensions can be arranged into symmetrical or asymmetrical patterns upon substrates and if elongation of electrodes is beneficial for a particular application, the electrodes may be linear or curving. Individual electrodes can be hemispherical, rectangular or of other shapes. The presence of a substrate is not essential for working the invention. The strip electrodes may be supported in other ways, for example held at their ends by electrically-insulating supports. The substrate, if present, can be planar or can have a non-planar surface upon which electrodes are arranged. The substrates could comprise two concentric cylinders, with one or both of the curved surfaces facing each other having an array of elongated electrodes located on them. The cylinders can be considered as equivalent to the planar substrates described above but rolled-up. The elongated electrodes may be annular in such embodiments using cylinders. One of the cylinders could be a DC only electrode, with a function similar to the flat plate electrode in the embodiments described above. In some embodiments using two concentric cylinders as substrates, a third cylinder may be located between them, which could have a DC voltage only applied, analogous to the planar structure shown in FIG. 12A. The size of the electrodes may depend upon the pressure of the gas in which the electrode structures are to be used. Field strengths should preferably be such as to cause the ions of interest for the particular application to approach and preferably exceed the speed of sound in the gas at the chosen pressure over a fraction of the voltage waveform, so that the differential mobility effect creates effective potential barriers for the ions of interest.

At atmospheric pressure in air it is advantageous to utilise electrodes having characteristic dimension (width and/or height) of ten or a few tens of microns, and to have similar sized or preferably slightly smaller gaps between adjacent electrodes which are to have a different phase and/or polarity of voltage applied to them. The field strength which can be obtained before breakdown increases rapidly as the distance between electrodes is reduced. A higher field strength causes ions to reach the higher velocities over parts of the oscillation cycle which enables the differential mobility effect to be utilised. Preferably the strip electrodes are somewhat wider in x than are the gaps between adjacent electrodes in x and at atmospheric pressure in air, a favourable x width of 30 μm with 15 μm gaps is a preferable combination. More generally, a width of the electrode (in the x dimension) may be from 10 μm to 50 μm and more preferably from 20 μm to 40 μm and/or the ratio of electrode width to gap is preferably 1 to 3, more preferably 1.5 to 2.5 and advantageously approximately 2. Such configurations may be provided in conjunction with a flat plate electrode preferably situated at a distance from strip electrodes that is 2-5 times (or 3-4 times) the width of the strip electrodes, for instance about 100 μm from the outer face of the strip electrodes. The base frequency of the voltage drive (the frequency of the largest cosine component) is preferably 20-80 MHz and the voltage 150-200 V (zero-to-peak). Reducing the width of the ion channel may require higher voltage drive frequency so that ion oscillation amplitudes do not become a substantial fraction of the ion channel width.

Preferably, where there is a substrate, the strip electrodes are wider (in x) than any underlying raised portion of the substrate, so that the conductive strips overhang the substrate. Examples of such overhanging electrodes on a substrate are described in WO2014/048837 A2. In another embodiment, the strip electrodes are manufactured to be the full height from a planar substrate surface, as has been the case in the simulations described above.

Ions can be induced to move within the ion channel by the application of a steady-state electric field created by biasing electrodes with time-invariant voltages of increasing or decreasing magnitude along the array. Alternatively or additionally, a gas flow through the array (ion channel) may be used or a time-varying set of voltages may be applied to the array electrodes to produce a travelling wave, which creates an electric field which moves along the array, as is known and is for example described in U.S. Pat. No. 9,978,572 B2. If a gas flow is used, ions may be retained between the same elongated electrodes, the gas flow being directed in the z direction, parallel to the elongation of the array electrodes. Alternatively, the gas flow may be at some other angle to the z axis, including perpendicular to it (that is, in the x direction). If a static distribution of time-invariant voltages is used to create an electric field across the ion channel in the x direction, the time-invariant voltages may be applied as offsets to the RF potentials provided to the strip electrodes. This is a relatively simple approach, but over extended lengths, it can result in an impractically large voltage drop across the array. The travelling wave approach requires a more sophisticated control, but it avoids the voltage build-up problem. An alternative implementation is to provide supplementary electrodes situated in the bottom of the troughs, which are aligned to drive ions along the x or z direction. Where either a steady-state electric field or a travelling wave electric field is used to drive ions within the ion channel, a gas flow may be provided that flows in a direction counter to the direction in which the ions are driven by the electric field. Such counter gas flow configurations may be used for ion mobility separation of ions within the ion channel.

As used herein, including in the claims, unless the context indicates otherwise, singular forms of the terms herein are to be construed as including the plural form and vice versa. For instance, unless the context indicates otherwise, a singular reference herein including in the claims, such as “a” or “an” (such as an analogue to digital convertor) means “one or more” (for instance, one or more analogue to digital convertor). Throughout the description and claims of this disclosure, the words “comprise”, “including”, “having” and “contain” and variations of the words, for example “comprising” and “comprises” or similar, mean “including but not limited to”, and are not intended to (and do not) exclude other components.

The use of any and all examples, or exemplary language (“for instance”, “such as”, “for example” and like language) provided herein, is intended merely to better illustrate the invention and does not indicate a limitation on the scope of the invention unless otherwise claimed. No language in the specification should be construed as indicating any non-claimed element as essential to the practice of the invention.

Any steps described in this specification may be performed in any order or simultaneously unless stated or the context requires otherwise.

All of the aspects and/or features disclosed in this specification may be combined in any combination, except combinations where at least some of such features and/or steps are mutually exclusive. As described herein, there may be particular combinations of aspects that are of further benefit, such the aspects of ion guides for use in mass spectrometers and/or ion mobility spectrometers. In particular, the preferred features of the invention are applicable to all aspects of the invention and may be used in any combination. Likewise, features described in non-essential combinations may be used separately (not in combination).

The invention claimed is:

1. An ion optical device, comprising:

first and second electrode arrangements, spatially separated from one another, arranged to operate in an environment having a high gas pressure, wherein the first electrode arrangement comprises a plurality of first electrodes comprising a first group of elongated strip electrodes and the second electrode arrangement comprises a plurality of second electrodes comprising a second group of elongated strip electrodes, the plurality of first electrodes and the plurality of second electrodes being positioned on a same planar substrate and interleaved with one another to form at least a portion of an ion-repulsive surface, wherein the ion optical device is configured to receive ions and a gas such that the ions travel adjacent to the planar substrate, wherein the first electrode arrangement and the second electrode arrangement are configured to generate at least a portion of an electric field experienced by the received ions; and an RF voltage supply, configured to apply:

a first RF voltage comprising one or more RF drive frequencies to the first electrode arrangement; and a second RF voltage comprising the one or more RF drive frequencies, having a different phase than the first RF voltage, to the second electrode arrangement, wherein the first and second RF voltages have an asymmetric waveform, the application of the first and second RF voltages to the first and second electrode arrangements respectively generating at least a portion of the electric field experienced by the received ions, and wherein the first and second electrode arrangements and the RF voltage supply are configured such that a strength of the electric field experienced by the received ions is sufficient to cause the received ions to experience mobility variation and to be repelled from the ion-repulsive surface.

2. The ion optical device of claim 1, wherein an amplitude of the asymmetric waveform has an integral over time of substantially zero.

3. The ion optical device of claim 1, wherein the asymmetric waveform has a shape defined by a sum of two or more cosine functions.

4. The ion optical device of claim 1, wherein the first and second electrode arrangements and the RF voltage supply are configured such that a strength of the electric field experienced by the received ions is at least 1 MV/m.

5. The ion optical device of claim 1, wherein a phase difference between the first RF voltage and the second RF voltage is at least $\pi/2$.

6. The ion optical device of claim 1, further comprising:

a third electrode arrangement, spatially separated from the first electrode arrangement and the second electrode arrangement and arranged to operate in the environment having the high gas pressure; and wherein the RF voltage supply is further configured to apply a third RF voltage comprising the one or more RF drive frequencies, having a different phase than the first RF voltage and than the second RF voltage, to the third electrode arrangement, wherein the third RF voltage has an asymmetric waveform, the application of the third RF voltage to the third electrode arrangement generating a portion of the electric field experienced by the received ions.

7. The ion optical device of claim 6, wherein the first and second electrode arrangements are positioned in a first plane and the third electrode arrangement is positioned in a second plane that is substantially parallel to and spatially separated from the first plane.

8. The ion optical device of claim 1, further comprising:

a DC electrode arrangement; and a DC voltage supply, configured to apply a DC voltage to the DC electrode arrangement.

9. The ion optical device of claim 8, wherein the DC electrode arrangement is positioned outside a spatial extent of the first and second electrode arrangements.

10. A method, comprising operating an ion optical device, wherein the ion optical device comprises:

first and second electrode arrangements, spatially separated from one another, arranged to operate in an environment having a high gas pressure, wherein the first electrode arrangement comprises a plurality of first electrodes comprising a first group of elongated strip electrodes and the second electrode arrangement comprises a plurality of second electrodes comprising a second group of elongated strip electrodes, the plurality of first electrodes and the plurality of second electrodes being positioned on a same planar substrate and interleaved with one another to form at least a portion of an ion-repulsive surface, wherein the ion optical device is configured to receive ions and a gas such that the ions travel adjacent to the planar substrate, wherein the first electrode arrangement and the second electrode arrangement are configured to generate at least a portion of an electric field experienced by the received ions; and an RF voltage supply, configured to apply:

a first RF voltage comprising one or more RF drive frequencies to the first electrode arrangement; and a second RF voltage comprising the one or more RF drive frequencies, having a different phase than the first RF voltage, to the second electrode arrangement, wherein the first and second RF voltages have an asymmetric waveform, the application of the first and second RF voltages to the first and second electrode arrangements respectively generating at least a portion of the electric field experienced by the received ions, and wherein the first and second electrode arrangements and the RF voltage supply are configured such that a strength of the electric field experienced by the received ions is sufficient for the ions to experience mobility variation;

the method comprising:

receiving the ions and gas with the ion optical device; and applying the first RF voltage to the first electrode arrangement and applying the second RF voltage to the second electrode arrangement to produce the mobility variation and to repel the ions from the ion-repulsive surface.

11. The method of claim 10, further comprising operating the first and second electrode arrangements in an environment having a gas pressure that is sufficiently high such that, in combination with the one or more RF drive frequencies, a phase shift between the electric field and a velocity of the received ions experiencing the electric field is substantially zero.

12. The method of claim 10, further comprising operating the first and second electrode arrangements in an environment having a gas pressure of at least 10 kPa and/or wherein the gas is air.

* * * * *